(12) United States Patent
Chien et al.

(10) Patent No.: US 12,224,108 B2
(45) Date of Patent: Feb. 11, 2025

(54) COIL MODULE

(71) Applicant: TDK TAIWAN CORP., Taoyuan (TW)

(72) Inventors: Feng-Lung Chien, Taoyuan (TW); Tsang-Feng Wu, Taoyuan (TW); Yuan Han, Taoyuan (TW); Tzu-Chieh Kao, Taoyuan (TW); Chien-Hung Lin, Taoyuan (TW); Kuang-Lun Lee, Taoyuan (TW); Hsiang-Hui Hsu, Taoyuan (TW); Shu-Yi Tsui, Taoyuan (TW); Kuo-Jui Lee, Taoyuan (TW); Kun-Ying Lee, Taoyuan (TW); Mao-Chun Chen, Taoyuan (TW); Tai-Hsien Yu, Taoyuan (TW); Wei-Yu Chen, Taoyuan (TW); Yi-Ju Li, Taoyuan (TW); Kuei-Yuan Chang, Taoyuan (TW); Wei-Chun Li, Taoyuan (TW); Ni-Ni Lai, Taoyuan (TW); Sheng-Hao Luo, Taoyuan (TW); Heng-Sheng Peng, Taoyuan (TW); Yueh-Hui Kuan, Taoyuan (TW); Hsiu-Chen Lin, Taoyuan (TW); Yan-Bing Zhou, Taoyuan (TW); Chris T. Burket, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 18/481,530

(22) Filed: Oct. 5, 2023

(65) Prior Publication Data

US 2024/0038440 A1    Feb. 1, 2024

Related U.S. Application Data

(63) Continuation of application No. 16/862,902, filed on Apr. 30, 2020, now Pat. No. 11,817,253.

(Continued)

(51) Int. Cl.
*H01F 27/28* (2006.01)
*H01F 27/32* (2006.01)
(Continued)

(52) U.S. Cl.
CPC ......... *H01F 27/2871* (2013.01); *H01F 27/28* (2013.01); *H01F 27/2876* (2013.01);
(Continued)

(58) Field of Classification Search
CPC .. H01F 27/2871; H01F 27/28; H01F 27/2876; H01F 27/288; H01F 27/32;
(Continued)

(56) References Cited

U.S. PATENT DOCUMENTS

| 6,268,785 B1 | 7/2001 | Kollman et al. |
| 2014/0239892 A1 | 8/2014 | Sawa et al. |

(Continued)

FOREIGN PATENT DOCUMENTS

| DE | 19743860 C1 | 4/1999 | |
| EP | 2450921 A1 * | 5/2012 | ............. H01F 38/14 |

OTHER PUBLICATIONS

Search Report issued in corresponding EP application No. 20172310.3 on Oct. 7, 2020.

*Primary Examiner* — Shawki S Ismail
*Assistant Examiner* — Kazi S Hossain
(74) *Attorney, Agent, or Firm* — MUNCY, GEISSLER, OLDS & LOWE, P.C.

(57) ABSTRACT

A coil module is provided, including a second coil mechanism. The second coil mechanism includes a third coil assembly and a second base corresponding to the third coil assembly. The second base has a positioning assembly corresponding to a first coil mechanism.

16 Claims, 94 Drawing Sheets

Related U.S. Application Data

(60) Provisional application No. 62/842,678, filed on May 3, 2019.

(51) Int. Cl.
    *H02J 7/02*           (2016.01)
    *H02J 50/10*         (2016.01)
    *H04B 5/79*         (2024.01)

(52) U.S. Cl.
    CPC ........... *H01F 27/288* (2013.01); *H01F 27/32* (2013.01); *H02J 7/02* (2013.01); *H02J 50/10* (2016.02); *H04B 5/79* (2024.01)

(58) Field of Classification Search
    CPC ........... H01F 27/366; H02J 7/02; H02J 50/10; H04B 5/0037
    USPC ......................................... 336/180, 221, 220
    See application file for complete search history.

(56) References Cited

U.S. PATENT DOCUMENTS

| | | | |
|---|---|---|---|
| 2016/0048033 A1* | 2/2016 | Kim | ..................... G02B 27/646 348/357 |
| 2018/0034327 A1 | 2/2018 | Ren et al. | |
| 2018/0259914 A1 | 9/2018 | Chae | |
| 2018/0348594 A1* | 12/2018 | Shin | ..................... H04N 23/57 |
| 2019/0033554 A1 | 1/2019 | Shin | |
| 2019/0081496 A1 | 3/2019 | Itagaki et al. | |

\* cited by examiner

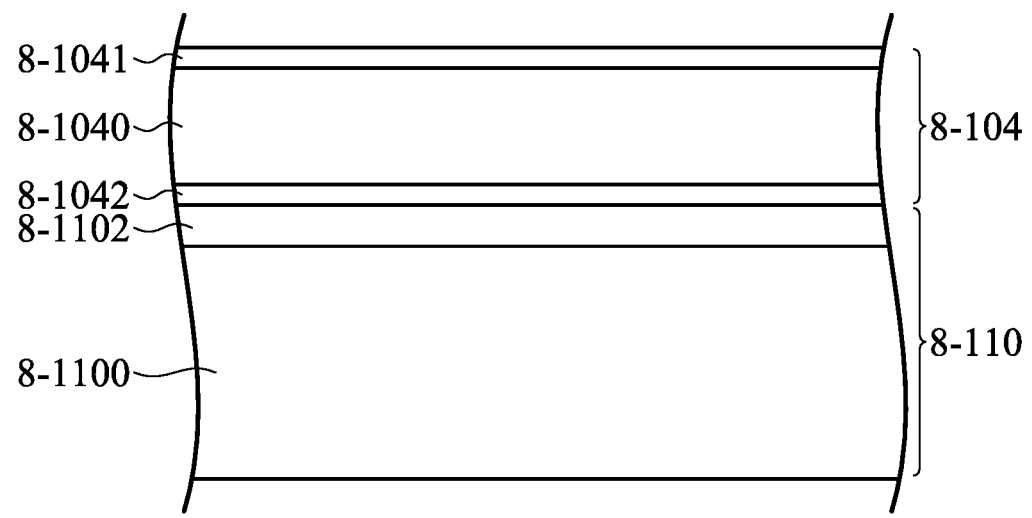
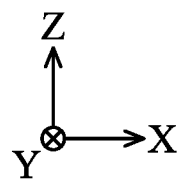
FIG. 28

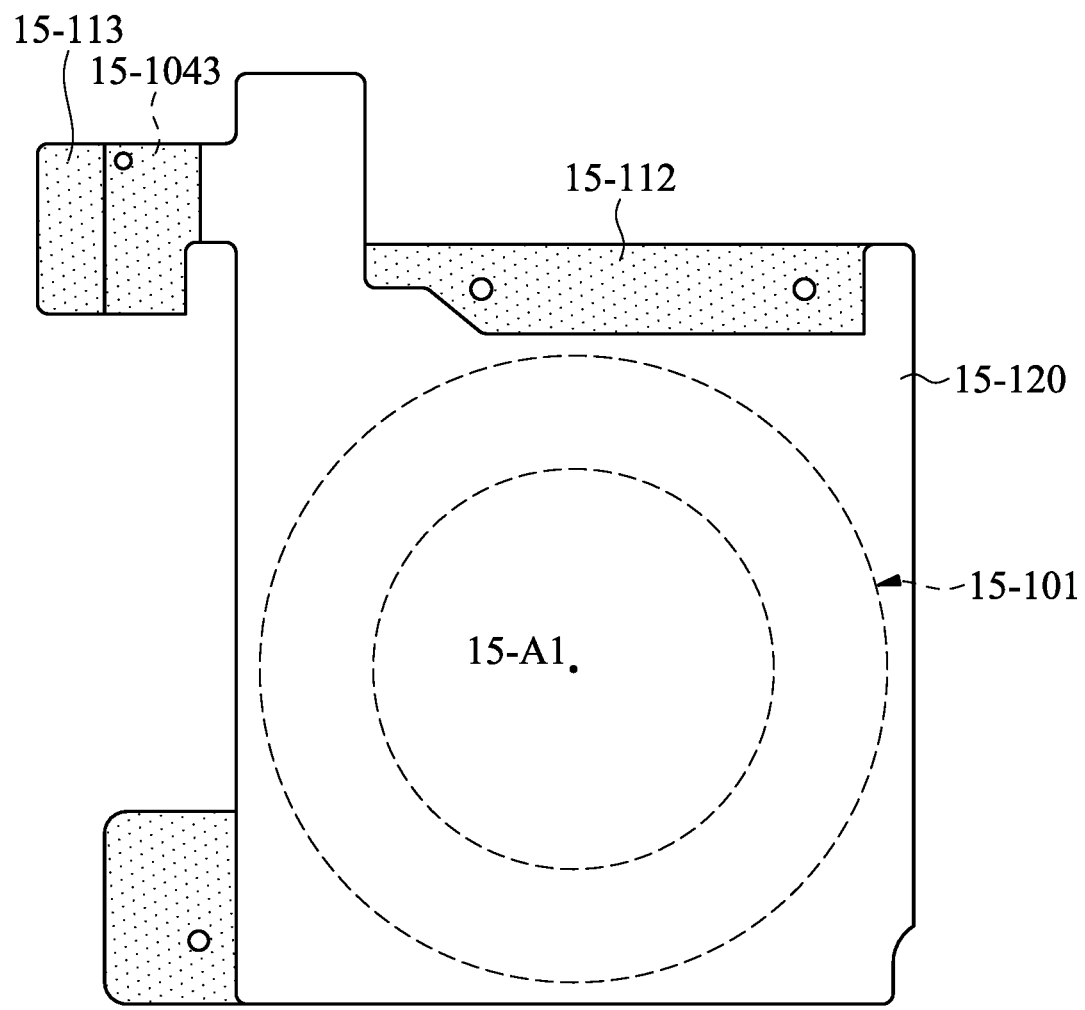
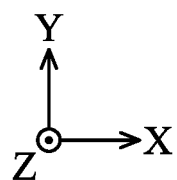
FIG. 46

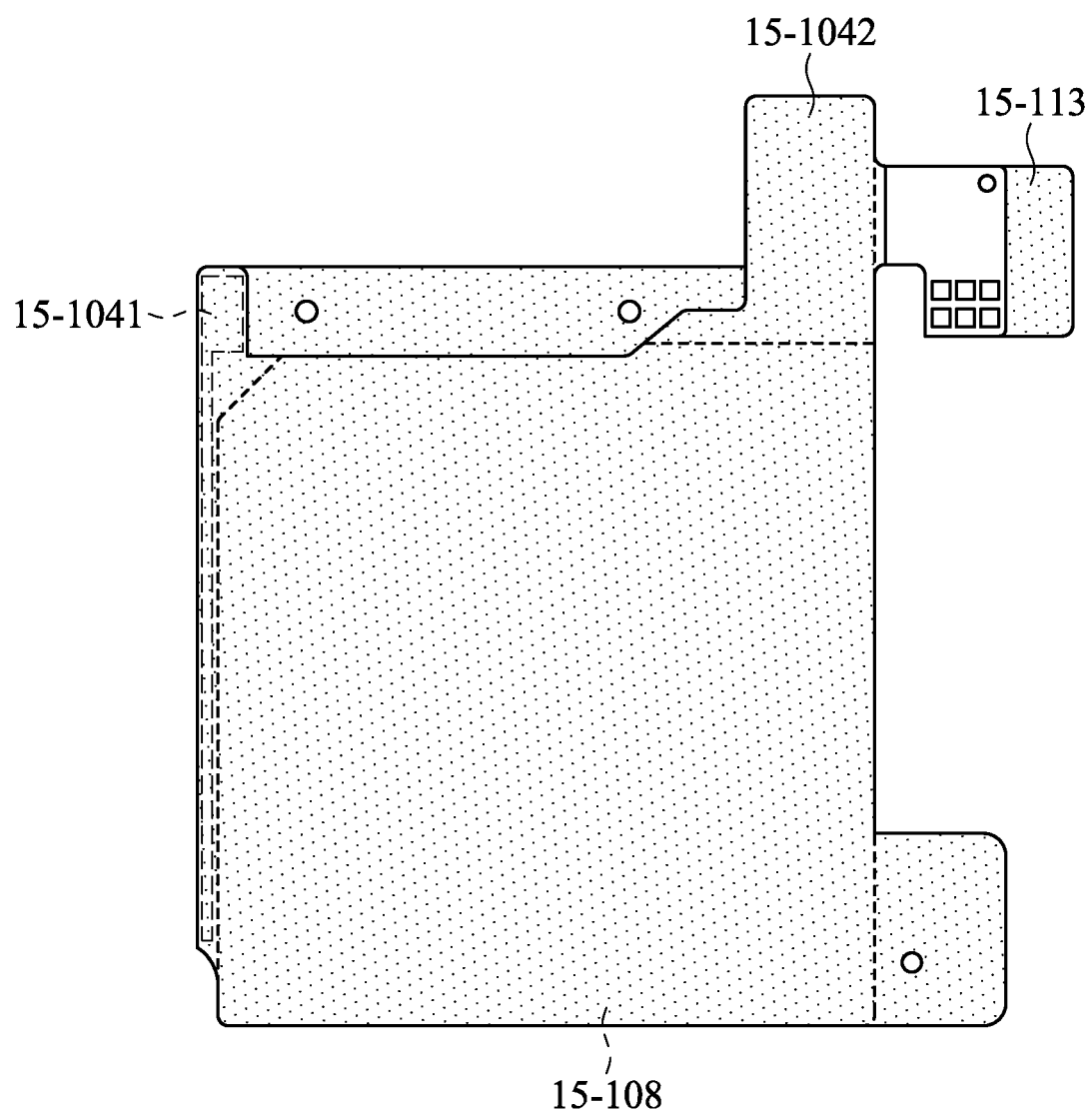
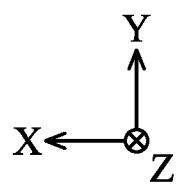
FIG. 47

21-500

21-500

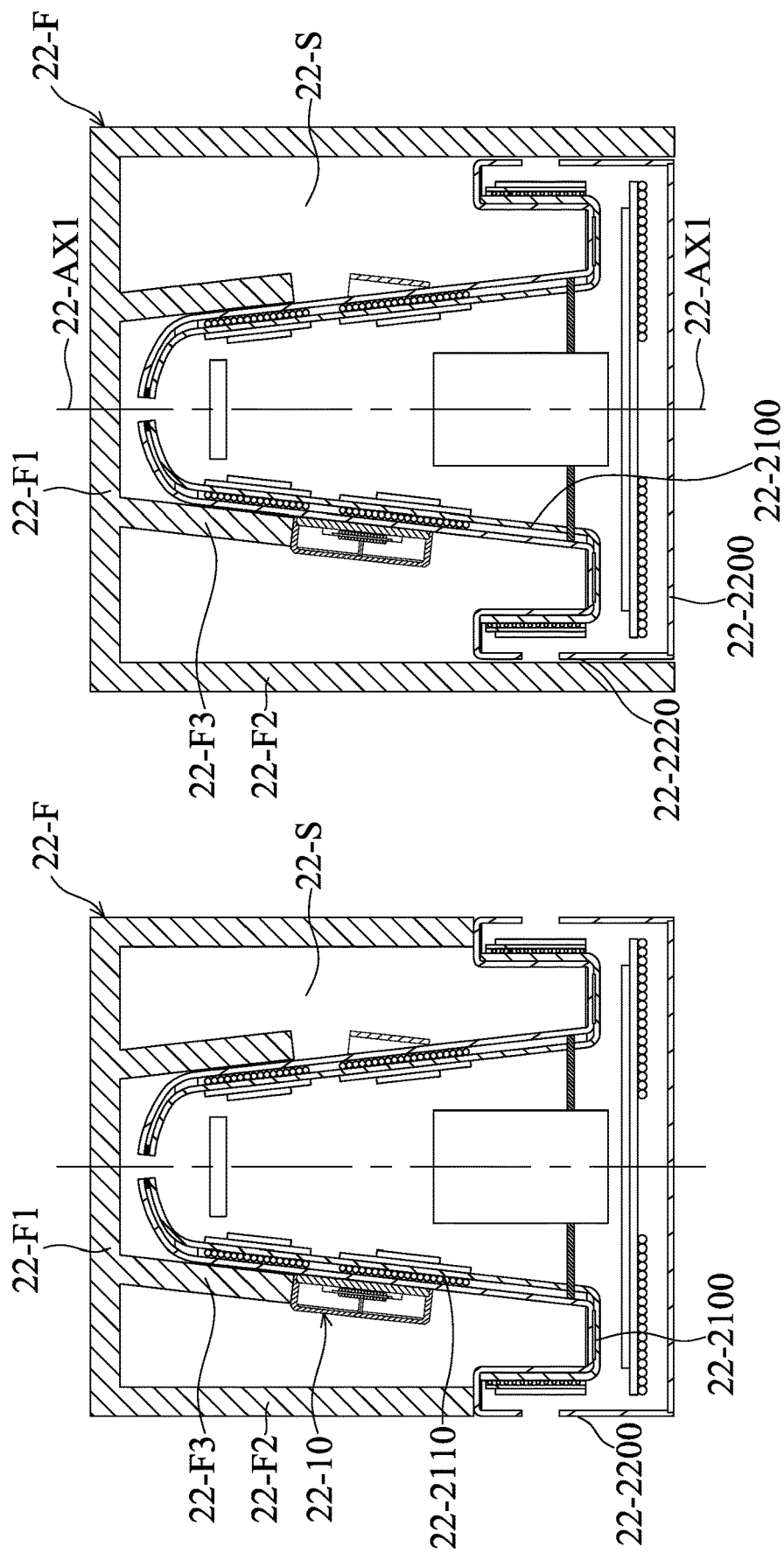

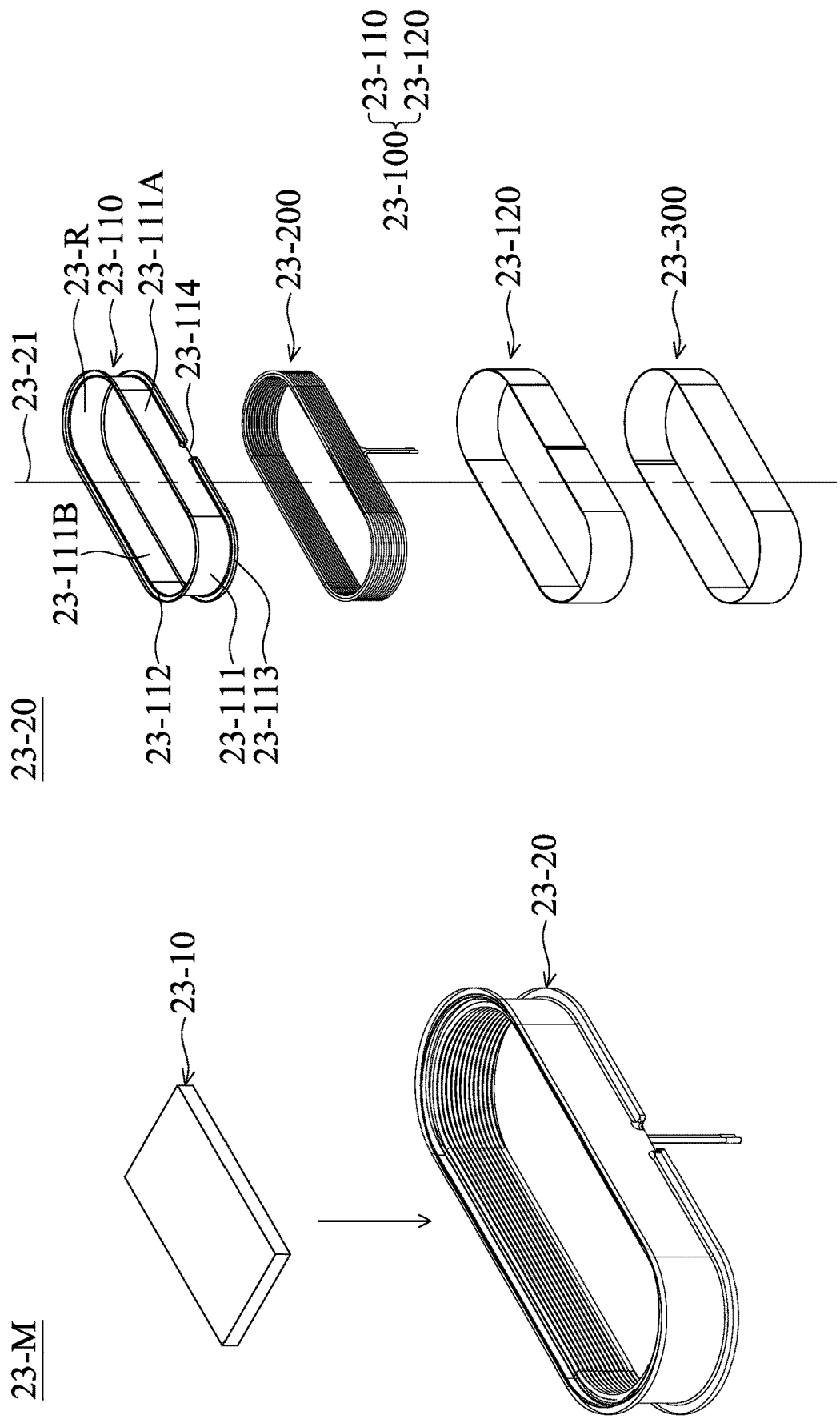

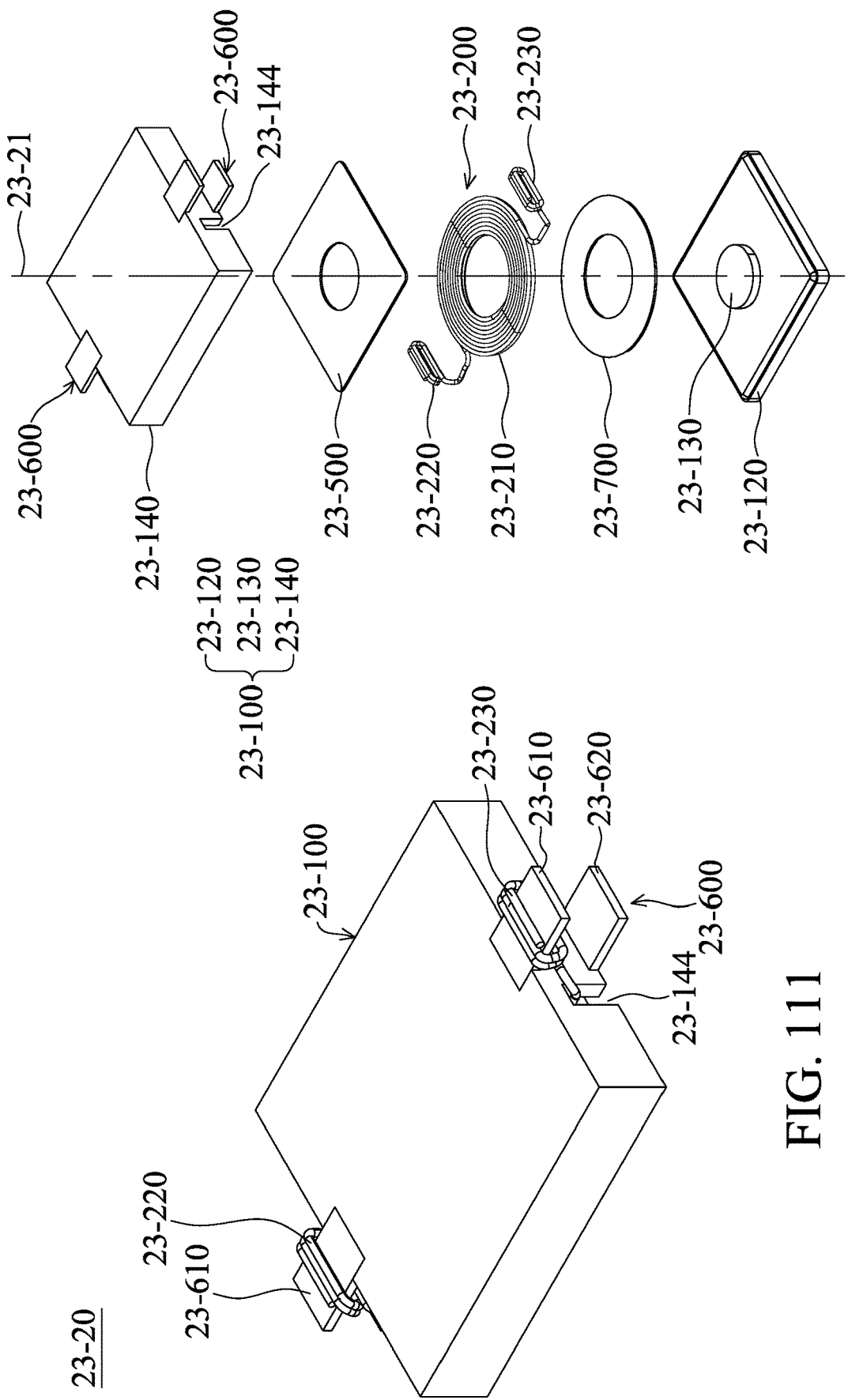

COIL MODULE

CROSS REFERENCE TO RELATED APPLICATIONS

This application is a Continuation of application Ser. No. 16/862,902, filed on Apr. 30, 2020, the entirety of which is incorporated by reference herein.

BACKGROUND OF THE INVENTION

Field of the Invention

The application relates in general to a coil module, and in particular, to a coil module used in wireless charging.

Description of the Related Art

Wireless charging is an alternating current induction technology that works on the electromagnetic induction principle. The coil in a wireless charging device generates an electromagnetic field that generates current within the receiving coil. That current can be converted into direct current and used to charge the electronic device. Recently, the electronic devices having the function of wireless charging include different appearances. Thus, how to design a coil module with a well charging performance has become an important issue.

BRIEF SUMMARY OF INVENTION

A coil module is provided, including a second coil mechanism. The second coil mechanism includes a third coil assembly and a second base corresponding to the third coil assembly. The second base has a positioning assembly corresponding to a first coil mechanism.

In some embodiments, the second coil mechanism also comprises a fourth coil assembly and a fifth coil assembly. The third coil assembly, the fourth coil assembly, and the fifth coil assembly are electrically independent of each other.

In some embodiments, the second coil mechanism also comprises a main axis, parallel to a third main body of the third coil assembly. The third main body has a three-dimensional structure, extending along the main axis and having a tapered structure. The fourth coil assembly is extended along the main axis, and the winding axis of the fourth coil assembly is parallel to the main axis. The fourth coil assembly has a fourth main body, and the fourth main body has a three-dimensional structure extending along the main axis. The fourth main body has a tapered structure tapering toward the third main body, and the third main body has a tapered structure tapering away from the fourth coil assembly. The third coil assembly is extended along the main axis, the winding axis of the fifth main body of the fifth coil assembly is parallel to the main axis. The fifth main body has a three-dimensional structure extending along the main axis. As seen from the main axis, a gap is formed between the third main body and the fifth main body. As seen from a direction perpendicular to the main axis, the third main body does not overlap the fifth main body. The second coil mechanism also comprises a sixth coil assembly, which is configured to perform a first function. The third coil assembly is configured to perform a second function. The first function is different from the second function. A sixth main body of the sixth coil assembly has a plate structure. As seen from the direction perpendicular to the main axis, the third main body does not overlap the sixth main body. As seen from the direction perpendicular to the main axis, the third main body, the fourth main body, the fifth main body, and the sixth main body do not overlap.

In some embodiments, the second base also comprises a third coil assembly magnetic permeability member, having a third magnetic permeability member surface facing the third coil assembly. The shortest distance between the third magnetic permeability member surface and the main axis is less than the shortest distance between the third main body and the main axis. As seen from the direction perpendicular to the main axis, the third magnetic permeability member surface overlaps the third main body. As seen from the main axis, the third magnetic permeability member surface overlaps the third main body. The second base also comprises a fourth coil assembly magnetic permeability member, having a fourth magnetic permeability member surface facing the fourth coil assembly. The shortest distance between the fourth magnetic permeability member surface and the main axis is less than the shortest distance between the fourth main body and the main axis. As seen from the direction perpendicular to the main axis, the fourth magnetic permeability member surface overlaps the fourth main body. As seen from the main axis, the fourth magnetic permeability member surface overlaps the fourth main body. The third coil assembly magnetic permeability member and the fourth coil assembly magnetic permeability member are integrally formed as one piece. The third magnetic permeability member surface is parallel to the fourth magnetic permeability member surface. The second base also comprises a fifth coil assembly magnetic permeability member, having a fifth magnetic permeability member surface facing the fifth coil assembly. The shortest distance between the fifth magnetic permeability member surface and the main axis is greater than the shortest distance between the fifth main body and the main axis. The third magnetic permeability member surface is not parallel to the fifth magnetic permeability member surface. As seen from the main axis, the third coil assembly magnetic permeability member, the third main body, the fifth main body, and the fifth coil assembly magnetic permeability member are arranged in order from the main axis from inside to outside. As seen from the main axis, the third magnetic permeability member surface does not overlap the fifth magnetic permeability member surface. As seen from the direction perpendicular to the main axis, the third magnetic permeability member surface does not overlap the fifth magnetic permeability member surface. As seen from the direction perpendicular to the main axis, the fourth magnetic permeability member surface does not overlap the fifth magnetic permeability member surface. The second base also comprises a sixth coil assembly magnetic permeability member, having a sixth magnetic permeability member surface facing the sixth coil assembly. The sixth magnetic permeability member surface is not parallel to the main axis. The sixth magnetic permeability member surface is perpendicular to the main axis. The third magnetic permeability member surface and the sixth magnetic permeability member surface are not parallel. As seen from the direction perpendicular to the main axis, the third magnetic permeability member surface does not overlap the sixth magnetic permeability member surface. As seen from the direction perpendicular to the main axis, the fifth magnetic permeability member surface does not overlap the sixth magnetic permeability member surface. As seen from the main axis, the third magnetic permeability member surface overlaps the sixth magnetic permeability member surface. As seen from the main axis, the fifth magnetic permeability member surface overlaps the sixth magnetic permeability member surface. As seen from the main axis, the third magnetic permeability member surface overlaps the fourth magnetic permeability member surface. As seen from the main axis, the third main body overlaps the fourth main body.

In some embodiments, the second coil mechanism also comprises a first housing and a second housing. The first housing comprises a first section, a second section, and a third section. The first section has an outer surface facing the third coil assembly. The outer surface of the first section is not parallel to the main axis. The thermal conductivity coefficient of the first section exceeds 20 W/mK. The magnetic permeability coefficient of the first section is less than the magnetic permeability coefficient of the third coil assembly magnetic permeability member. The magnetic permeability coefficient of the first section is less than $125 \times 10^{-6}$ H/m. The first section is disposed between the third coil assembly and the third coil assembly magnetic permeability member. The second section has an outer surface facing the fifth coil assembly. The outer surface of the first section is not parallel to the outer surface of the second section. The outer surface of the second section is parallel to the main axis. The thermal conductivity coefficient of the second section exceeds 20 W/mK. The magnetic permeability coefficient of the second section is less than the magnetic permeability coefficient of the fifth coil assembly magnetic permeability member. The magnetic permeability coefficient of the second section is less than $125 \times 10^{-6}$ H/m. The first section is connected to the second section via the third section. The third section has an outer surface. The outer surface of the third section is not parallel to the main axis. The second housing is fixedly connected to the first housing and comprises a fifth section, a sixth section, a seventh section, and an eighth section. The fifth section has an inner surface facing the third coil assembly. The inner surface of the fifth section is not parallel to the main axis. The thermal conductivity coefficient of the first section is different from the thermal conductivity coefficient of the fifth section. The thermal conductivity coefficient of the first section is greater than the thermal conductivity coefficient of the fifth section. The magnetic permeability coefficient of the fifth section is lower than the magnetic permeability coefficient of the third coil assembly magnetic permeability member. The third coil assembly is disposed between the first section and the fifth section. The shortest distance between the third coil assembly and the first section is different from the shortest distance between the third coil assembly and the fifth section. The shortest distance between the third coil assembly and the first section is less than the shortest distance between the third coil assembly and the fifth section. There is a gap between the inner surface of the fifth section and the third main body. The sixth section has an inner surface facing the fifth coil assembly. The inner surface of the sixth section is parallel to the main axis. The thermal conductivity coefficient of the first section is different from the thermal conductivity coefficient of the sixth section. The thermal conductivity coefficient of the second section is greater than the thermal conductivity coefficient of the sixth section. The magnetic permeability coefficient of the sixth section is lower than the magnetic permeability coefficient of the fifth coil assembly magnetic permeability member. The second section is disposed between the fifth main body and the sixth section. The fifth section is connected to the sixth section via the seventh section. The seventh section has an inner surface. The inner surface is not parallel to the main axis. The outer surface of the third section is parallel to the inner surface of the seventh section.

The outer surface of the third section is fixedly connected to the inner surface of the seventh section. The outer surface of the third section is fixedly connected to the inner surface of the seventh section by an adhesive member. The eighth section is connected to the fifth section. The eighth section corresponds to a fourth section of the first housing, which is connected to the first section. The fourth section is not in contact with the eighth section. A buffering member is disposed between the fourth section and the eighth section. The buffering member has elastic material. The fourth section, the first section, and the third section are arranged along the main axis in sequence. The thermal conductivity coefficient of the first housing is greater than the thermal conductivity coefficient of the second housing. The outer surface of the fourth section is not parallel to the main axis. The outer surface of the eighth section is not parallel to the main axis.

In some embodiments, the second coil mechanism also comprises a heat dissipation assembly, configured to enhance the heat dissipation efficiency of the second coil mechanism. At least a portion of the heat dissipation assembly is disposed in a first receiving space of the first housing. At least a portion of the heat dissipation assembly is disposed between the second housing and the first receiving space. At least a portion of the heat dissipation assembly is disposed in a second receiving space of the second housing. At least a portion of the heat dissipation assembly is disposed between the second housing and the second receiving space. The heat dissipation assembly comprises a first thermal conductive member, a second thermal conductive member, a third thermal conductive member, and an active heat dissipation member. The first thermal conductive member corresponds to the third coil assembly. The first thermal conductive member is disposed in the first receiving space. The second thermal conductive member corresponds to the fifth coil assembly. The second thermal conductive member is disposed in the second receiving space. The third thermal conductive member corresponds to the sixth coil assembly. The third thermal conductive member is disposed in a third receiving space of the second housing. The active heat dissipation member is configured to drive the fluid to flow. The active heat dissipation member is disposed in the first receiving space, the second receiving space, or the third receiving space. The active heat dissipation member is disposed in the first receiving space. The sixth main body is disposed in the third receiving space. A gas exchange can be generated between the first receiving space and the second receiving space. The gas exchange can be generated between the first receiving space and the second receiving space via the third receiving space. The second coil mechanism also comprises a first heat dissipation path and a second heat dissipation path. The first heat dissipation path is configured to guide the heat of the first thermal conductive member. The first heat dissipation path is disposed on the first housing. The first heat dissipation path is communicated with the first receiving space. The first heat dissipation path has a heat dissipation hole disposed on the fourth section. The second heat dissipation path is configured to guide the heat of the second thermal conductive member. The second heat dissipation path is disposed on the second housing. The second heat dissipation path is communicated with the second receiving space. The second heat dissipation path has an additional heat dissipation hole.

In some embodiments, the second coil mechanism also comprises a control assembly electrically connected to the third coil assembly. At least a portion of the lead of the third coil assembly is disposed in the gap between the inner surface of the fifth section and the third main body. The lead of the third coil assembly is connected to the control assembly through a hole on the first housing. The lead of the fourth coil assembly is connected to the control assembly through an additional hole on the first housing. As seen from the main axis, the hole and the additional hole are disposed on opposite sides of the main axis. The first housing has a lead receiving portion, configured to receive the lead of the third coil assembly. The second housing has an additional lead receiving portion, configured to receive the lead of the third coil assembly. The control assembly comprises an electronic member, a power storage member, a temperature sensor, and an electroacoustic transducer. The electronic member is electrically connected to the third coil assembly. The electronic member is electrically connected to the fourth coil assembly. The electronic member is electrically connected to the fifth coil assembly. The electronic member is electrically connected to the sixth coil assembly. The electronic member is disposed in the first receiving space or the third receiving space. The electronic member is disposed in the third receiving space. The electronic member is configured to correspond to an external circuit. The external circuit is connected to the electronic member through an opening of the second housing. The power storage member is configured to store electric energy or chemical energy. The power storage member is electrically connected to the electronic member. The power storage member is disposed in the first receiving space. At least a portion of the third coil assembly magnetic permeability member is disposed between the power storage member and the third main body. At least a portion of the sixth coil assembly magnetic permeability member is disposed between the power storage member and the sixth main body. The temperature sensor is configured to measure the temperature of the second coil mechanism. The temperature sensor is disposed on the third coil assembly magnetic permeability member. The temperature sensor is electrically connected to the electronic member. The electroacoustic transducer is electrically connected to the electronic member. The electroacoustic transducer is configured to transform the electrical energy to the acoustic energy.

In some embodiments, the second coil mechanism also comprises a frame, and a storage space is formed between the frame and the second housing when the frame and the second housing are assembled. The frame has shielding material, configured to shield the electromagnetic wave of the third coil assembly, the fourth coil assembly, or the fifth coil assembly. The frame comprises a top surface and a lateral wall that extends from the top surface. The lateral wall is substantially parallel to the main axis. When the frame and the second housing are assembled, the lateral wall overlaps the first section as seen from the direction perpendicular to the main axis. When the frame and the second housing are assembled, the lateral wall overlaps the sixth section as seen from the direction perpendicular to the main axis. The positioning assembly is disposed on the frame. The positioning assembly is disposed on the second housing. The positioning assembly has elastic material and corresponds to the first coil mechanism.

In some embodiments, the first coil mechanism also comprises a first base and a first coil assembly. The first coil assembly is disposed on the first base. The first base is made of magnetic permeability material. When the coil module is in use, the first coil mechanism is disposed in the storage space. When the coil module is in use, the winding direction of a first main body of the first coil assembly is not perpendicular to the winding direction of the third main body. When the coil module is in use, the first main body overlaps at least one of the third main body, the fourth main body, and the fifth main body as seen from the direction perpendicular to the main axis. When the coil module is in use, the position assembly is in contact with the first coil mechanism at a first contact point and a second contact point. As seen from the main axis, the included angle between the connection line between the first contact point and the main axis and the connection line between the second contact point and the main axis exceeds 45 degrees. As seen from the main axis, the included angle between the connection line between the first contact point and the main axis and the connection line between the second contact point and the main axis exceeds 120 degrees. When the coil module is in use, the positioning assembly is also in contact with the first coil mechanism at a third contact point. The first coil mechanism also comprises a second coil assembly, which is electrically independent of the first coil assembly. The first coil assembly is configured to perform a second function. The second coil assembly is configured to perform a third function. The first function, the second function, and the third function are different.

In some embodiments, the second coil mechanism is configured to correspond to a plurality of first coil mechanisms. When in use, as seen from the main axis, the included angle between the connection line between the center of one of the first main bodies and the main axis and the connection line between the center of another one of the first main bodies and the main axis is not zero.

In some embodiments, when the first function is performed, the sixth main body is configured to receive power provided by an external circuit and charge the power storage member. When the second function is performed, the first main body is configured to receive power provided by the third main body and charge the first coil mechanism. When the second function is performed, the power provided by the third main body is from the third coil mechanism or the power storage member. The first function and the second function can be simultaneously performed. The second function and the third function cannot be simultaneously performed.

In some embodiments, the wire diameter of a first main body of the first coil mechanism is different from the wire diameter of the third main body. The wire diameter of the third main body is different from the wire diameter of the fifth main body. The wire diameter of the third main body is smaller than the wire diameter of the fifth main body. The wire diameter of the third main body is different from the wire diameter of the sixth main body. The wire diameter of the third main body is larger than the wire diameter of the sixth main body. The wire diameter of the fifth main body is different from the wire diameter of the sixth main body. The wire diameter of the fifth main body is larger than the wire diameter of the sixth main body.

In some embodiments, the second base also comprises a third coil assembly magnetic permeability member, having a third magnetic permeability member surface facing the third coil assembly. The shortest distance between the third magnetic permeability member surface and the main axis is less than the shortest distance between the third main body and the main axis. As seen from the direction perpendicular to the main axis, the third magnetic permeability member surface overlaps the third main body. As seen from the main axis, the third magnetic permeability member surface does not overlap the third main body. The second base also comprises a fourth coil assembly magnetic permeability member, having a fourth magnetic permeability member surface facing the fourth coil assembly. The shortest distance between the fourth magnetic permeability member surface and the main axis is less than the shortest distance between the fourth main body and the main axis. As seen from the direction perpendicular to the main axis, the fourth magnetic permeability member surface overlaps the fourth main body. As seen from the main axis, the fourth magnetic permeability member surface does not overlap the fourth main body. The third magnetic permeability member surface is parallel to the fourth magnetic permeability member surface. The second base also comprises a fifth coil assembly magnetic permeability member, having a fifth magnetic permeability member surface facing the fifth coil assembly. The shortest distance between the fifth magnetic permeability member surface and the main axis is less than the shortest distance between the fifth main body and the main axis. The third magnetic permeability member surface is parallel to the fifth magnetic permeability member surface. As seen from the main axis, the third coil assembly magnetic permeability member, the third main body, the fifth coil assembly magnetic permeability member, and the fifth main body are arranged in order from inside to outside. As seen from the main axis, the third magnetic permeability member surface does not overlap the fifth magnetic permeability member surface. As seen from the direction perpendicular to the main axis, the third magnetic permeability member surface does not overlap the fifth magnetic permeability member surface. As seen from the direction perpendicular to the main axis, the fourth magnetic permeability member surface does not overlap the fifth magnetic permeability member surface. As seen from the main axis, the third main body does not overlap the fourth main body. As seen from the main axis, the third magnetic permeability member surface does not overlap the fourth magnetic permeability member surface.

In some embodiments, the second base further comprises a third coil assembly magnetic permeability member, a fourth coil assembly magnetic permeability member. The third coil assembly magnetic permeability member has a third magnetic permeability member surface that faces the third coil assembly. The shortest distance between the third magnetic permeability member surface and the main axis is less than the shortest distance between the third main body and the main axis. The fourth coil assembly magnetic permeability member has a fourth magnetic permeability member surface that faces the fourth coil assembly. The shortest distance between the fourth magnetic permeability member surface and the main axis is less than the shortest distance between the fourth main body and the main axis. The third magnetic permeability member surface is not parallel to the fourth magnetic permeability member surface.

BRIEF DESCRIPTION OF DRAWINGS

The invention can be more fully understood by reading the subsequent detailed description and examples with references made to the accompanying drawings, wherein:

FIG. 28 is a schematic cross-sectional view of the coil module 8-100 after assembly according to this embodiment of the present disclosure;

FIG. 46 is a top view of the coil module 15-100 after assembly according to an embodiment of the present disclosure;

FIG. 47 is a bottom view of the coil module 15-100 after assembly according to an embodiment of the present disclosure;

FIG. 97 is a schematic diagram of a second coil mechanism according to another embodiment of the invention;

FIG. 98 is a schematic diagram of a second coil mechanism according to another embodiment of the invention;

FIG. 100 is a schematic diagram of a coil module according to an embodiment of the invention;

FIG. 101 is an exploded-view diagram of a second coil mechanism according to an embodiment of the invention;

FIG. 111 is a schematic diagram of a second coil mechanism according to another embodiment of the invention;

FIG. 112 is an exploded-view diagram of the second coil mechanism according to another embodiment of the invention.

DETAILED DESCRIPTION OF INVENTION

The making and using of the embodiments of the coil module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
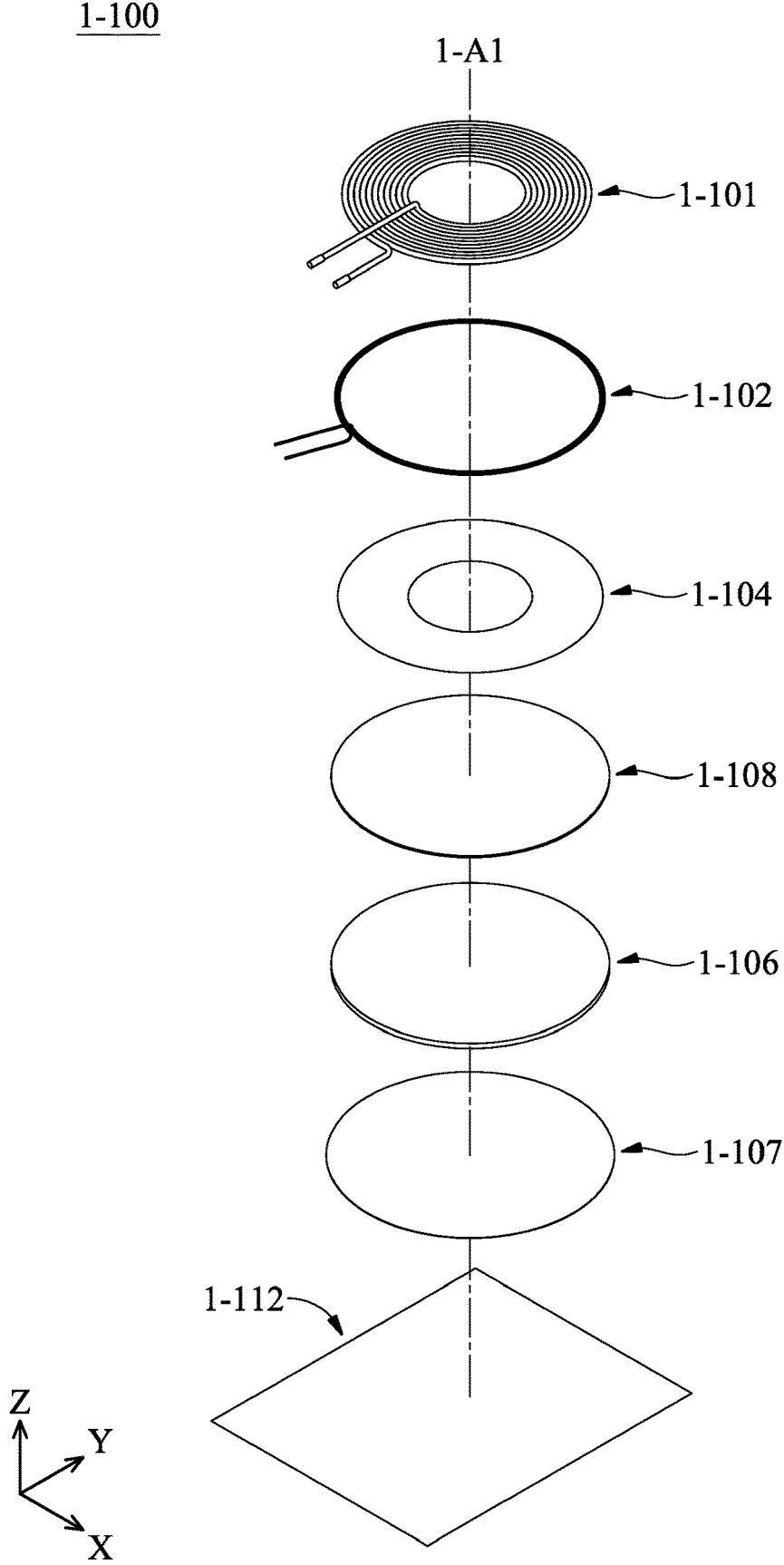
FIG. 1 is an exploded diagram of a coil module 1-100 according to an embodiment of the present disclosure.

Please refer to FIG. 1, which is an exploded diagram of a coil module 1-100 according to an embodiment of the present disclosure. As shown in FIG. 1, the coil module 1-100 is a coil module that can be used for transmitting energy or signals. The coil module 1-100 may include a first coil mechanism. The first coil mechanism may include a first coil assembly 1-101, a second coil assembly 1-102, an adhesive layer 1-104, an adhesive layer 1-107, an adhesive layer 1-108, an induction substrate 1-106 (the first base) and a protection element 2-112.

In this embodiment, the first coil assembly 1-101, the second coil assembly 1-102, the adhesive layer 1-104, the adhesive layer 1-108, the induction substrate 1-106, the adhesive layer 1-107 and the protection element 2-112 are arranged in a first direction 1-A1 in sequence. The first direction 1-A1 may be the extending direction of a winding axis of the first coil assembly 1-101 and the second coil assembly 1-102.

In this embodiment, the first coil assembly 1-101 can serve as a charging coil to be wireless charged by an external charging device. For example, the first coil assembly 1-101 can operate as a resonant charging coil based on the standard of the Alliance for Wireless Power (A4WP), but it is not limited thereto. In addition, the first coil assembly 1-101 can operate as an inductive charging coil based on the standard of Wireless Power Consortium (WPC), such as the Qi standard. Therefore, the first coil assembly 1-101 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first coil assembly 1-101 can also serve as a communication coil, for example, operating in a Near Field Communication (NFC) mode to communicate with external electronic devices.

In this embodiment, the induction substrate 1-106 is disposed adjacent to the coil assembly (the first coil assembly 1-101 and the second coil assembly 1-102), and the induction substrate 1-106 is configured to change the electromagnetic field distribution near the coil assemblies. The induction substrate 1-106 may be a ferrite, but it is not limited thereto. For example, in other embodiments, the induction substrate 1-106 may also include a nanocrystalline material. The induction substrate 1-106 may have a magnetic permeability corresponding to the coil assemblies so that the electromagnetic waves of the coil assemblies can be more concentrated.

The adhesive layer 1-104, the adhesive layer 1-107 and the adhesive layer 1-108 may be double-sided adhesive tape or single-sided adhesive tape to adhere to one or two adjacent elements. In some embodiments, one or more of the adhesive layer 1-104, the adhesive layer 1-107 and the adhesive layer 1-108 may be made of polyethylene terephthalate (PET), but it is not limited thereto. The protection element 1-112 can be used to protect the coil module 1-100 and can be removed when the coil module 1-100 is installed in an electronic device (not shown).

Figure 2:
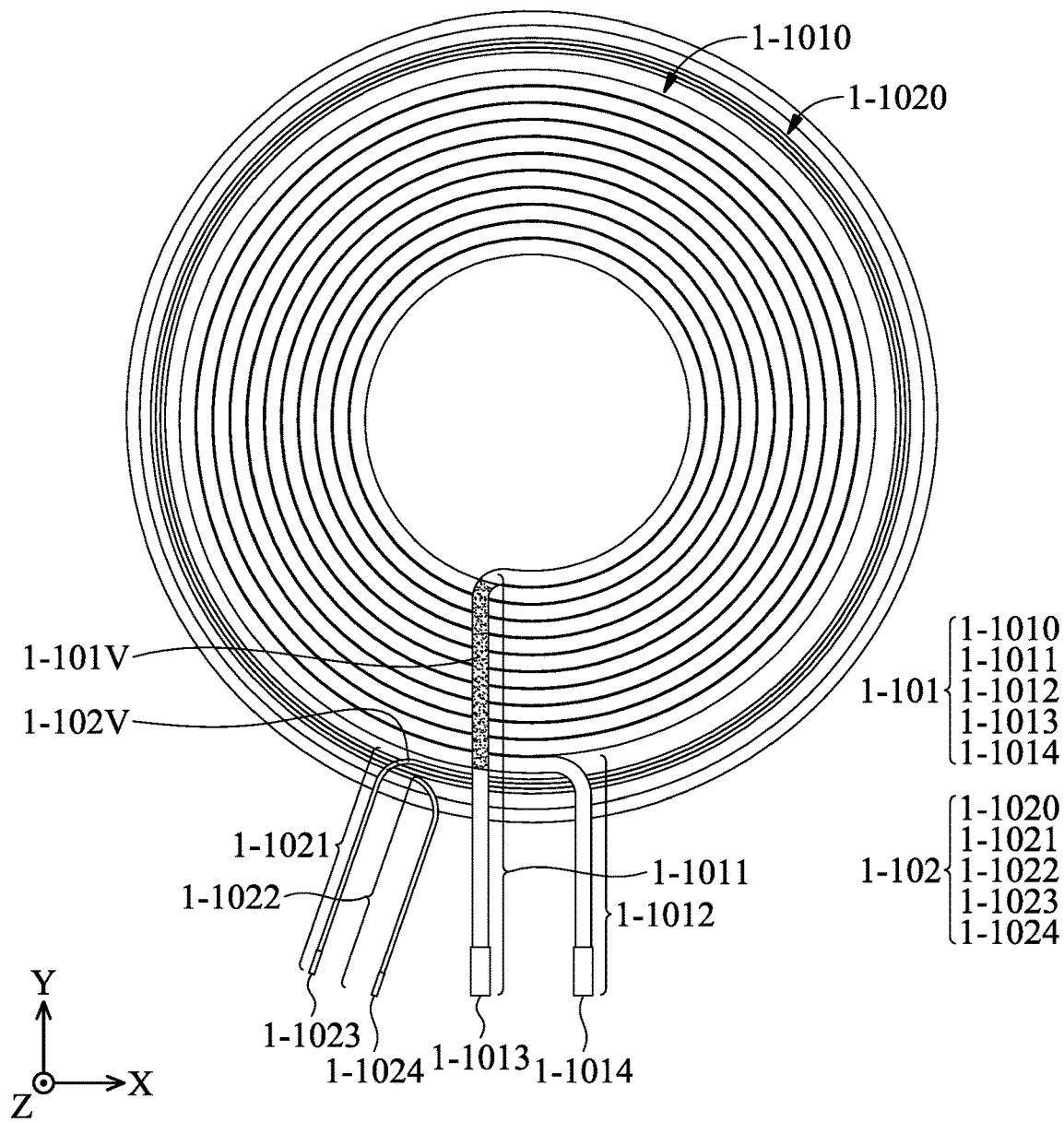
FIG. 2 is a top view of the coil module 1-100 after assembly according to an embodiment of the present disclosure.
Figure 3:
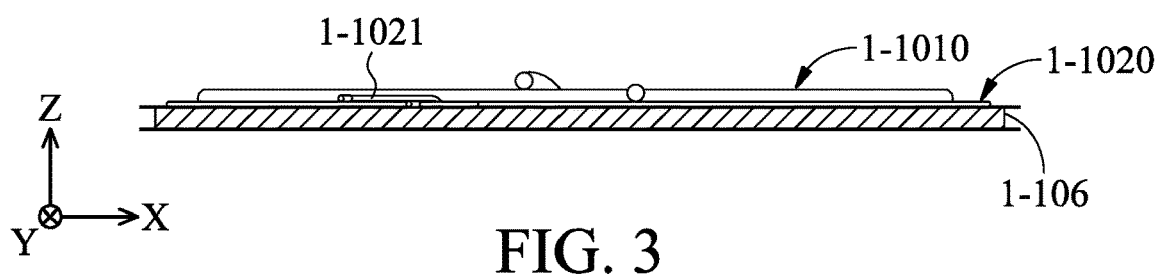
FIG. 3 is a diagram of the coil module 1-100 viewed in the Y-axis after assembly according to an embodiment of the present disclosure.

Please also refer to FIG. 1 to FIG. 3. FIG. 2 is a top view of the coil module 1-100 after assembly according to an embodiment of the present disclosure, and FIG. 3 is a diagram of the coil module 1-100 viewed in the Y-axis after assembly according to an embodiment of the present disclosure. As shown in the figures, the first coil assembly 1-101 and the second coil assembly 1-102 are disposed on the induction substrate 1-106, and the first coil assembly 1-101 is electrically independent from the second coil assembly 1-102. The first coil assembly 1-101 includes a first body 1-1010, a first leading wire 1-1011 and a second leading wire 1-1012. The first leading wire 1-1011 is disposed across at least a portion of the first body 1-1010. When viewed in the first direction 1-A1 (the Z-axis), a first overlapping portion 1-101V of the first leading wire 1-1011 completely overlaps the first body 1-1010, and the first overlapping portion 1-101V does not overlap the second coil assembly 1-102.

The first leading wire 1-1011 has a first leading end 1-1013, the second leading wire 1-1012 has a second leading end 1-1014, and when viewed in the first direction 1-A1, the second leading end 1-1014 is substantially parallel to the first leading end 1-1013.

Furthermore, the second coil assembly 1-102 includes a second body 1-1020, a third leading wire 1-1021, and a fourth leading wire 1-1022. The third leading wire 1-1021 is disposed across at least a portion of the second body 1-1020. When viewed in the first direction 1-A1, a third overlapping portion 1-102V of the third leading wire 1-1021 completely overlaps the second body 1-1020. When viewed in a direction (such as the Y-axis) perpendicular to the first direction 1-A1, as shown in FIG. 3, the second body 1-1020 and the third leading wire 1-1021 overlap at least a portion of the first body 1-1010.

In this embodiment, the wire diameters of the first coil assembly 1-101 and the second coil assembly 1-102 are different. For example, the wire diameter of the second coil assembly 1-102 is less than half the wire diameter of the first coil assembly 1-101.

As shown in FIG. 2, the third leading wire 1-1021 has a third leading end 1-1023, and the fourth leading wire 1-1022 has a fourth leading end 1-1024. When viewed in the first direction 1-A1, the third leading end 1-1023 is substantially parallel to the fourth leading end 1-1024, and the extending direction of the first leading end 1-1013 is different from the extending direction of the third leading end 1-1023.

Figure 4:
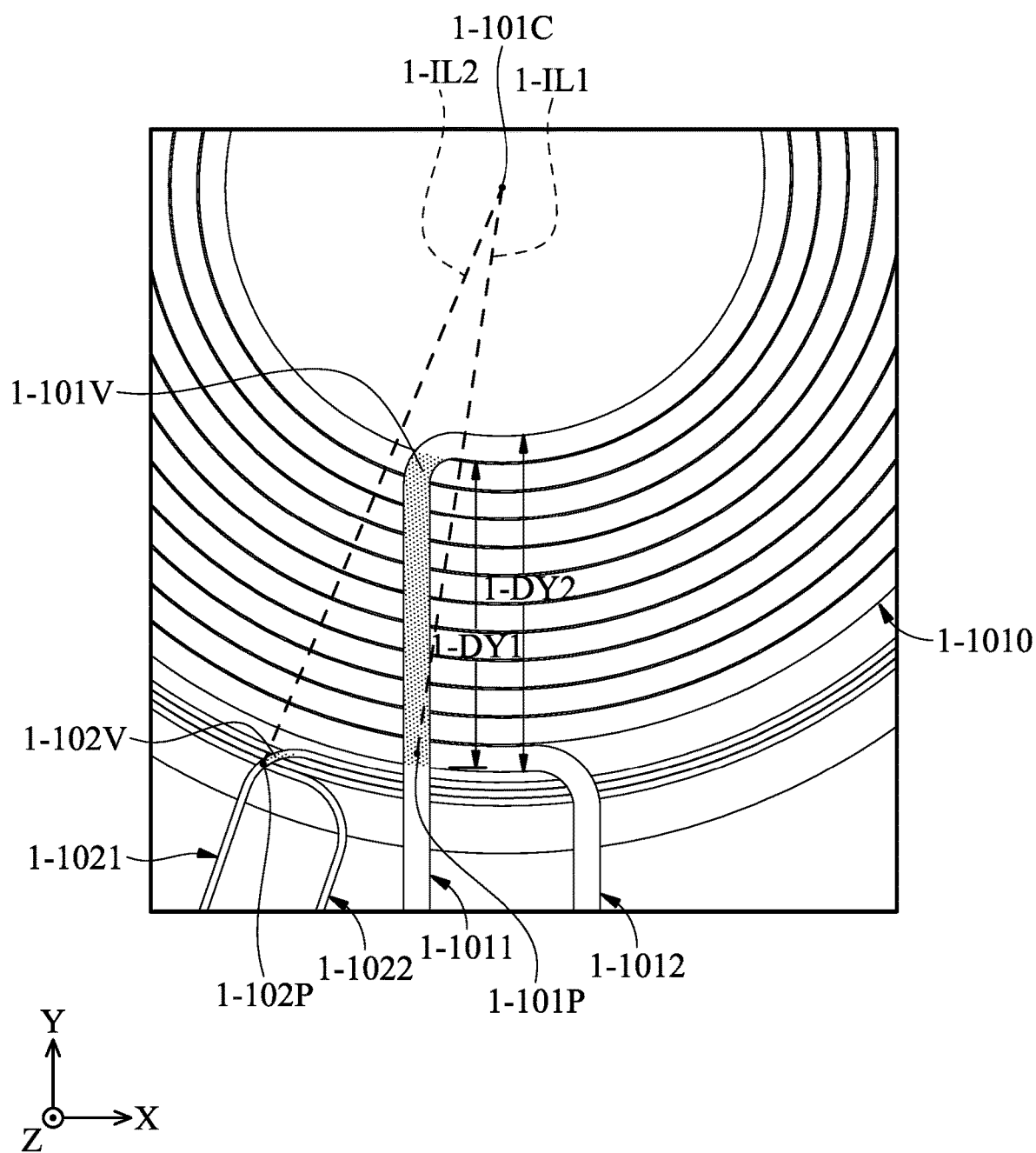
FIG. 4 is an enlarged schematic diagram of FIG. 2 according to an embodiment of the present disclosure.

Please refer to FIG. 4, which is an enlarged schematic diagram of FIG. 2 according to an embodiment of the present disclosure. As shown in FIG. 4, the extending direction of the first overlapping portion 1-101V is not parallel to the extending direction of the third overlapping portion 1-102V.

The first overlapping portion 1-101V has a linear structure which spans at least two thirds of the first body 1-1010, and the third overlapping portion 1-102V has a linear structure which spans at least a half of the second body 1-1020. For example, the linear structure of the first overlapping portion 1-101V has a length 1-DY1 in the Y-axis, the first body 1-1010 has a length 1-DY2 in the Y-axis, and the length 1-DY1 is greater than or equal to two thirds of the length 1-DY2.

In other embodiments, when viewed in the first direction 1-A1, the first leading wire 1-1011 may overlap at least a portion of the third leading wire 1-1021 (not shown in the figure).

Furthermore, as shown in FIG. 4, the second leading wire 1-1012 and the first leading wire 1-1011 intersect at a first intersection point 1-101P, and the fourth leading wire 1-1022 and the third leading wire 1-1021 intersect at a second intersection point 1-102P. A center 1-101C of the first coil assembly 1-101 and the first intersection point 1-101P are arranged along a first imaginary line 1-IL1, and the center 1-101C and the second intersection point 1-102P are arranged along a second imaginary line 1-IL2. When viewed in the first direction 1-A1, the angle between the first imaginary line 1-IL1 and the second imaginary line 1-IL2 is from 5 to 45 degrees.

Figure 5:
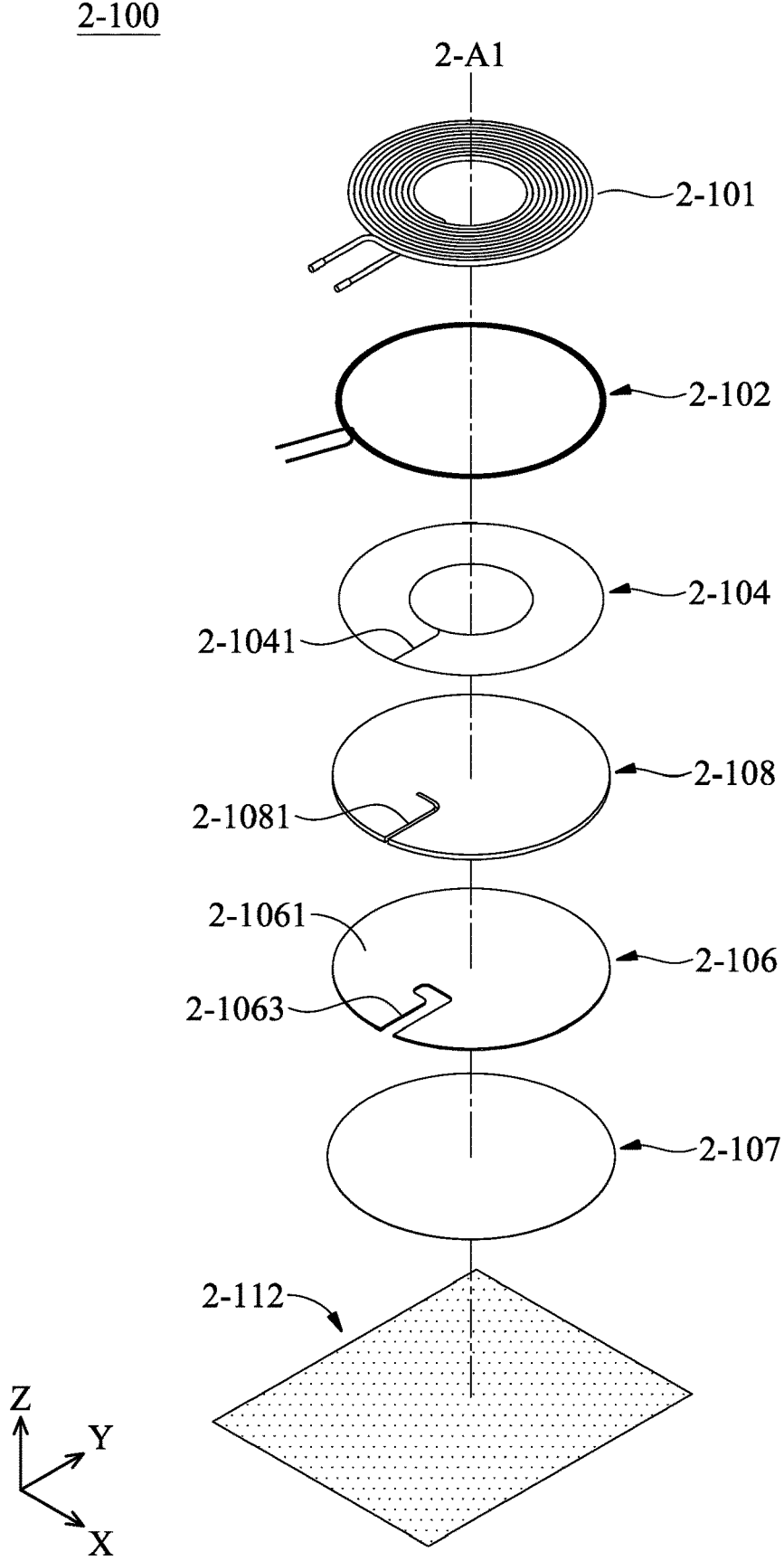
FIG. 5 is an exploded diagram of a coil module 2-100 according to another embodiment of the present disclosure.

Please refer to FIG. 5, which is an exploded diagram of a coil module 2-100 according to another embodiment of the present disclosure. The coil module 2-100 is similar to the coil module 1-100. The coil module 2-100 may include a first coil mechanism. The first coil mechanism includes a first coil assembly 2-101, a second coil assembly 2-102, an adhesive layer 2-104, an adhesive layer 2-107, an adhesive layer 2-108, an induction substrate 2-106 (the first base), and a protection element 2-112.

In this embodiment, the first coil assembly 2-101, the second coil assembly 2-102, the adhesive layer 2-104, the adhesive layer 2-108, the induction substrate 2-106, the adhesive layer 2-107, and the protection element 2-112 are arranged in a first direction 2-A1 in sequence. The first direction 2-A1 may be the extending direction of the winding axis of the first coil assembly 2-101 and the second coil assembly 2-102. In addition, in this embodiment, the induction substrate 2-106 has a first base surface 2-1061 facing the first coil assembly 2-101.

In this embodiment, the first coil assembly 2-101 can serve as a charging coil to be wireless charged by an external charging device. The second coil assembly 2-102 can serve as a communication coil, for example, operating in Near Field Communication (NFC) mode to communicate with external electronic devices.

This embodiment is similar to the previous embodiment, and the components with the same name have the same function, so they are not repeated in this embodiment.

Figure 6:
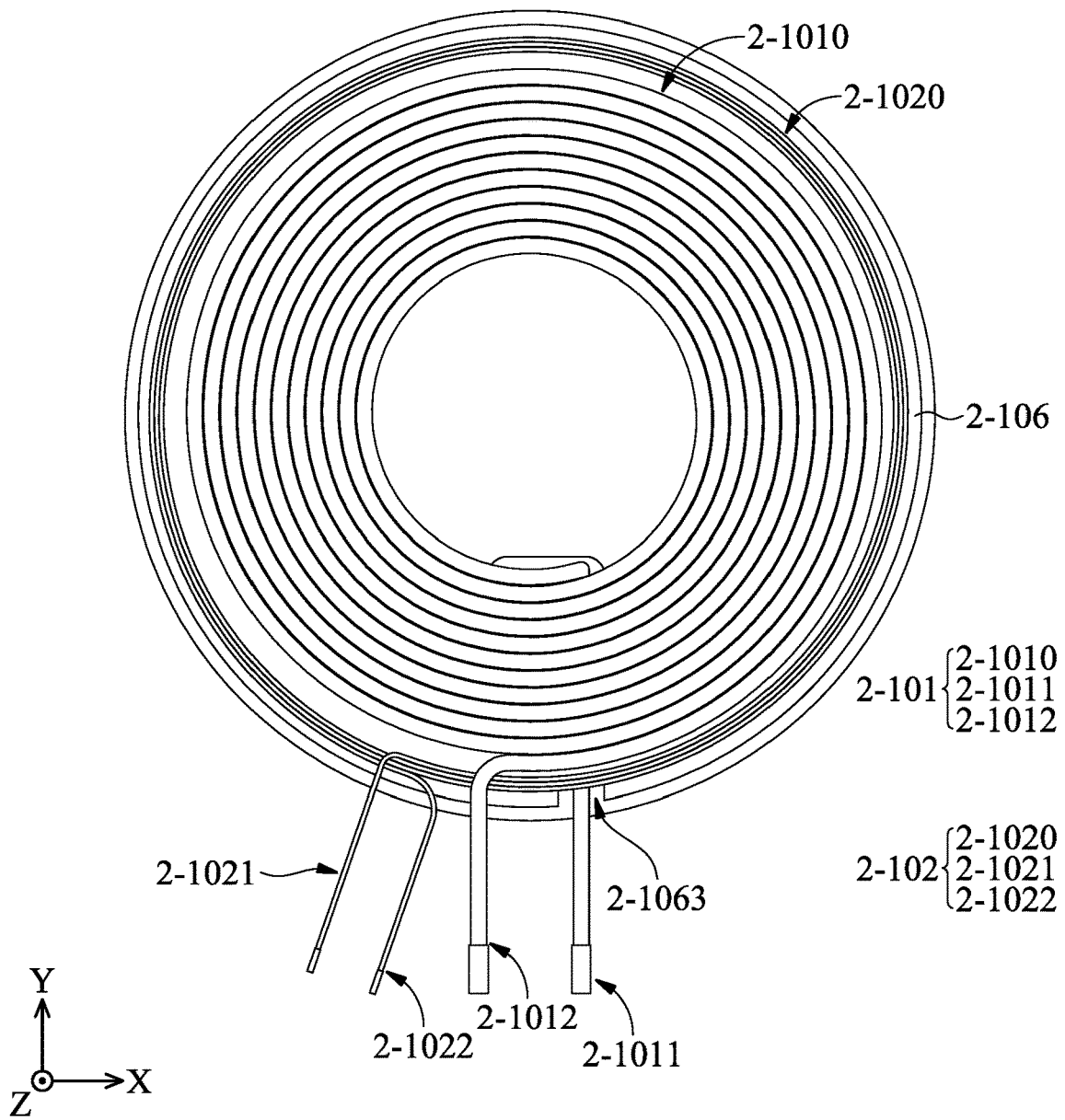
FIG. 6 is a top view of the coil module 2-100 after assembly according to an embodiment of the present disclosure.
Figure 7:
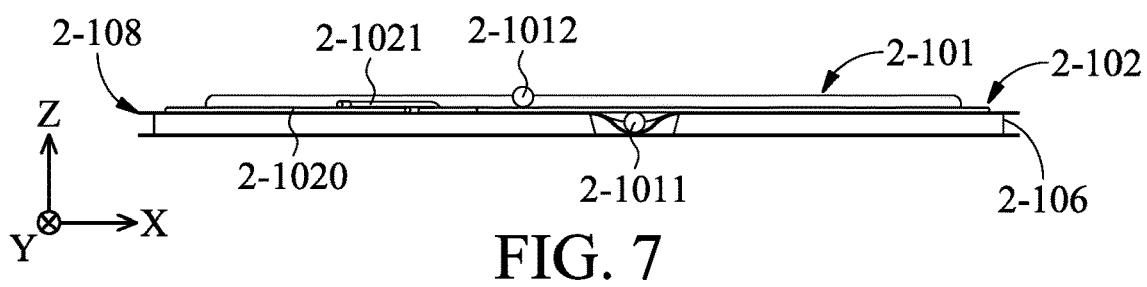
FIG. 7 is a diagram of the coil module 2-100 viewed in the Y-axis after assembly according to an embodiment of the present disclosure.

Please refer to FIG. 5 to FIG. 7. FIG. 6 is a top view of the coil module 2-100 after assembly according to an embodiment of the present disclosure, and FIG. 7 is a diagram of the coil module 2-100 viewed in the Y-axis after assembly according to an embodiment of the present disclosure. As shown in the figures, the first coil assembly 2-101 and the second coil assembly 2-102 are disposed on the induction substrate 2-106, and the first coil assembly 2-101 is electrically independent of the second coil assembly 2-102. The first coil assembly 2-101 includes a first body 2-1010, a first leading wire 2-1011, and a second leading wire 2-1012, and the first leading wire 2-1011 and the second leading wire 2-1012 are electrically connected to the first body 2-1010.

When viewed in the first direction 2-A1 (the Z-axis), as shown in FIG. 6, at least a portion of the second coil assembly 2-102 is located between the first leading wire 2-1011 and the second leading wire 2-1012.

Furthermore, as shown in FIG. 7, when viewed in an arrangement direction of the first leading wire 2-1011 and the second leading wire 2-1012, at least a portion of the second coil assembly 2-102 overlaps the first leading wire 2-1011. Because a portion of the second coil assembly 2-102 is located between the first leading wire 2-1011 and the second leading wire 2-1012, the overall height of the coil module 2-100 can be reduced to achieve the purpose of miniaturization.

The second coil assembly 2-102 may include a second body 2-1020, a third leading wire 2-1021, and a fourth leading wire 2-1022. The third leading wire 2-1021 and the fourth leading wire 2-1022 are electrically connected to the second body 2-1020, and as shown in FIG. 7, a side (the top side) of the second body 2-1020 faces the second leading wire 2-1012 and the third leading wire 2-1021.

As shown in FIG. 5 and FIG. 6, the induction substrate 2-106 may further have a first leading wire accommodating portion 2-1063 for accommodating at least a portion of the first leading wire 2-1011, and when viewed in the first direction 2-A1, the first leading wire accommodating portion 2-1063 and the third leading wire 2-1021 do not overlap.

Figure 8:
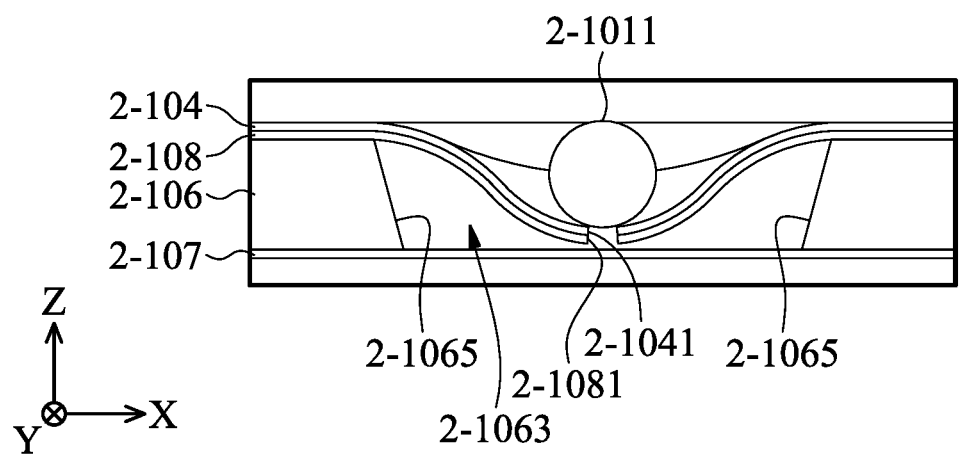
FIG. 8 is an enlarged diagram of a partial structure of FIG. 7 according to an embodiment of the present disclosure.

Please refer to FIG. 8, which is an enlarged diagram of a partial structure of FIG. 7 according to an embodiment of the present disclosure. The adhesive layer 2-104 may be referred to as an adhesive assembly, such as double-sided tape, which is disposed on the adhesive layer 2-108 and the induction substrate 2-106, and the adhesive layer 2-104 has a groove 2-1041 corresponding to the first leading wire accommodating portion 2-1063.

When viewed in a direction perpendicular to the first direction 2-A1 (for example, the X-axis), the first leading wire 2-1011 partially overlaps the induction substrate 2-106. That is, the first leading wire 2-1011 can be accommodated in the induction substrate 2-106 to achieve the purpose of miniaturization.

The adhesive layer 2-108 may be referred to as a first protection assembly for protecting the induction substrate 2-106. The elastic limit of the adhesive layer 2-108 is different from the elastic limit of the adhesive layer 2-104, and the adhesive layer 2-108 has a first protection assembly groove 2-1081 corresponding to the first leading wire accommodating portion 2-1063. It is worth noting that when viewed in the first direction 2-A1, the maximum size of the adhesive layer 2-108 is larger than the maximum size of the induction substrate 2-106. For example, the area of the adhesive layer 2-108 is larger than the area of the induction substrate 2-106, so that after the coil module 2-100 is assembled, the adhesive layer 2-108 completely covers the induction substrate 2-106.

When viewed in a direction (for example, the Y-axis) perpendicular to the first direction 2-A1, at least a portion of the adhesive layer 2-104 overlaps the first leading wire accommodating portion 2-1063. That is, part of the adhesive layer 2-104 is buried in the first leading wire accommodating portion 2-1063.

As shown in FIG. 8, at least a portion of the adhesive layer 2-104 is in direct contact with the first leading wire 2-1011, and the adhesive layer 2-104 is not in direct contact with a side surface 2-1065 of the first leading wire accommodating portion 2-1061. The side surface 2-1065 is not perpendicular to the first direction 2-A1, and the side surface 2-1065 is not parallel to the first direction 2-A1.

Figure 9:
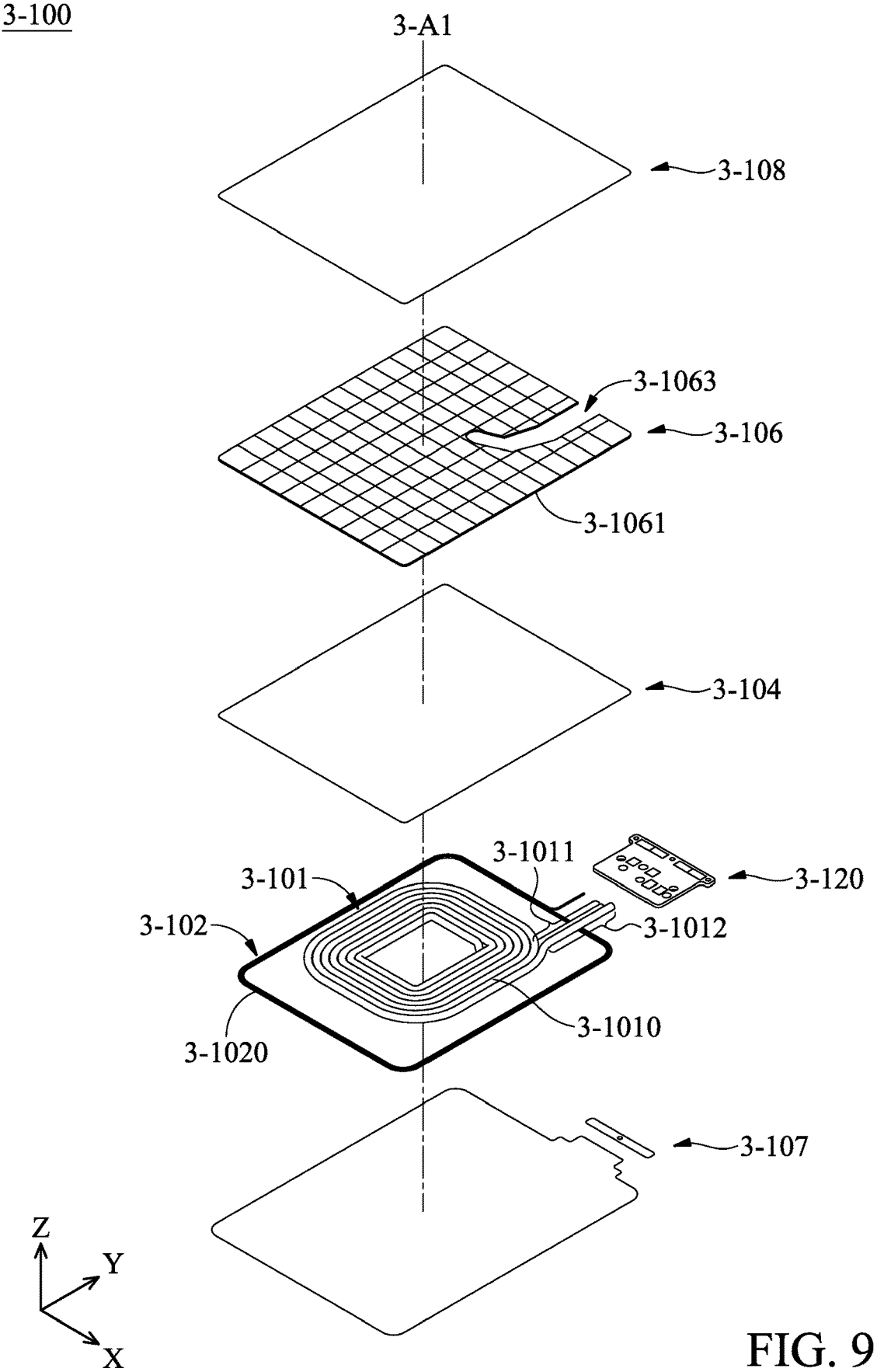
FIG. 9 is an exploded diagram of a coil module 3-100 according to an embodiment of the present disclosure.

Please refer to FIG. 9, which is an exploded diagram of a coil module 3-100 according to an embodiment of the present disclosure. As shown in FIG. 9, the coil module 3-100 is a coil module that can be used for transmitting energy or signals. The coil module 3-100 may include a first coil mechanism. The first coil mechanism may include a first coil assembly 3-101, a second coil assembly 3-102, an adhesive layer 3-104, an adhesive layer 3-107, an adhesive layer 3-108, an induction substrate 3-106 and a circuit assembly 3-120.

In this embodiment, the adhesive layer 3-108, the induction substrate 3-106, the adhesive layer 3-104, the first coil assembly 3-101, the second coil assembly 3-102, the adhesive layer 3-107 are arranged in a first direction 3-A1 in sequence. The first direction 3-A1 may be the extending direction of a winding axis of the first coil assembly 3-101 and the second coil assembly 3-102. In addition, in this embodiment, the induction substrate 3-106 is configured to support the first coil assembly 3-101 and has a first base surface 3-1061 which faces the first coil assembly 3-101.

In this embodiment, the first coil assembly 3-101 can serve as a charging coil to be wireless charged by an external charging device. For example, the first coil assembly 3-101 can operate as a resonant charging coil based on the standard of the Alliance for Wireless Power (A4WP), but it is not limited thereto. In addition, the first coil assembly 3-101 can operate as an inductive charging coil based on the standard of Wireless Power Consortium (WPC), such as the Qi standard. Therefore, the first coil assembly 3-101 can respond to different forms of charging so as to enlarge the range of applications in this embodiment. For example, in the case of a close distance (for example, 1 cm or less), the inductive type operation is used; and at a long distance, a resonance type operation is used.

In this embodiment, the second coil assembly 3-102 can also serve as a communication coil, for example, operating in a Near Field Communication (NFC) mode to communicate with external electronic devices.

In this embodiment, the induction substrate 3-106 is disposed adjacent to the coil assemblies, and the induction substrate 3-106 is configured to change the electromagnetic field distribution near the coil assemblies. The induction substrate 3-106 may be a ferrite, but it is not limited thereto. For example, in other embodiments, the induction substrate 3-106 may also include a nanocrystalline material. The induction substrate 3-106 may have a magnetic permeability corresponding to the coil assemblies so that the electromagnetic waves of the coil assemblies can be more concentrated.

The adhesive layer 3-104, the adhesive layer 3-107 and the adhesive layer 3-108 may be double-sided adhesive tape or single-sided adhesive tape to adhere to one or two adjacent elements. In some embodiments, one or more of the adhesive layer 3-104, the adhesive layer 3-107 and the adhesive layer 3-108 may be made of polyethylene terephthalate (PET), but it is not limited thereto. The adhesive layer 3-107 can be used to protect the coil module 3-100 and can be removed when the coil module 3-100 is installed in an electronic device (not shown).

The circuit assembly 3-120 (the first connection assembly) in the coil module 3-100 is a flexible circuit board having a plate-shaped structure, and the circuit assembly 3-120 is configured to be connected to an external electronic device (not shown).

Figure 10:
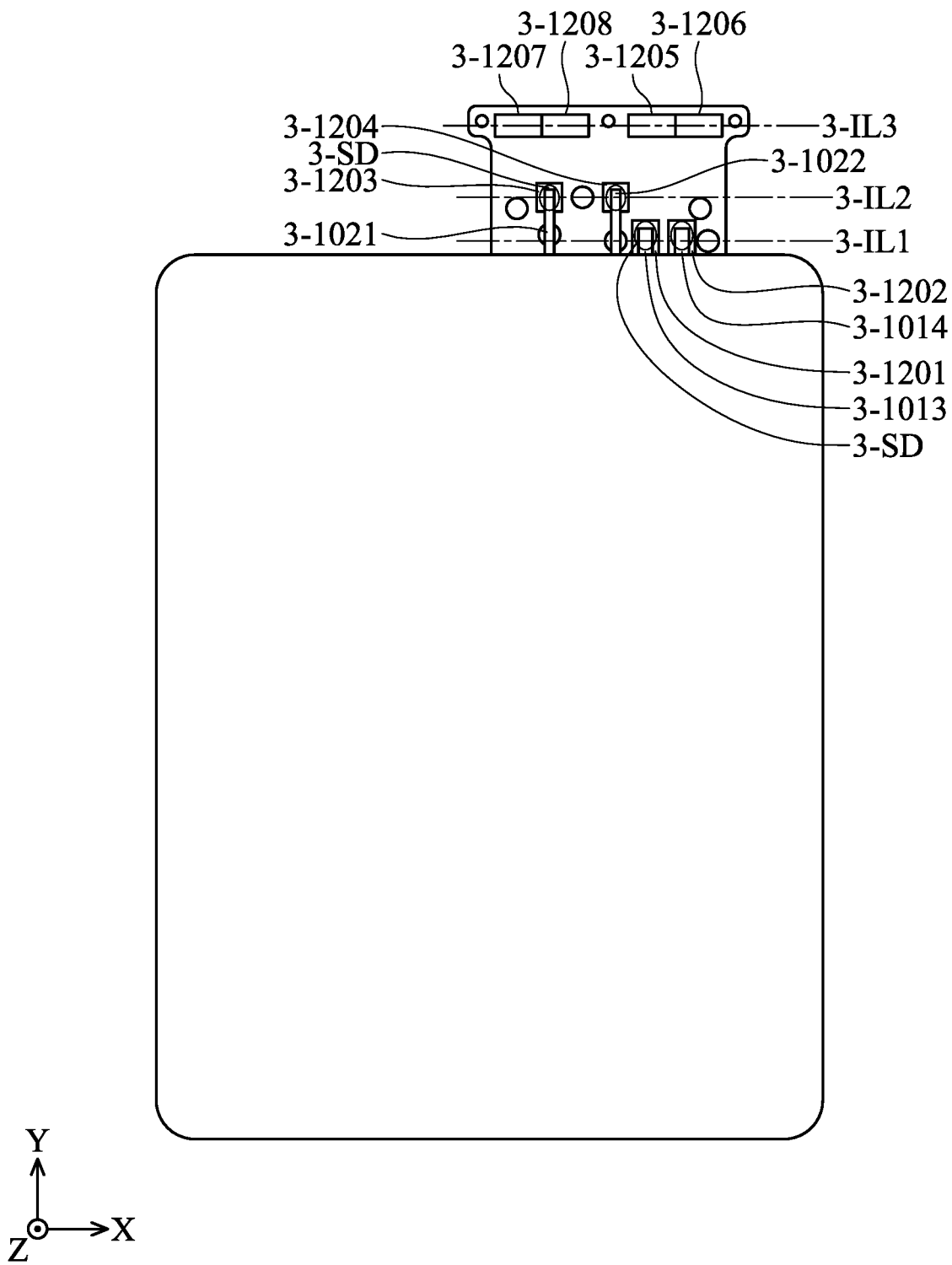
FIG. 10 is a top view of the coil module 3-100 after assembly according to an embodiment of the present disclosure.
Figure 11:
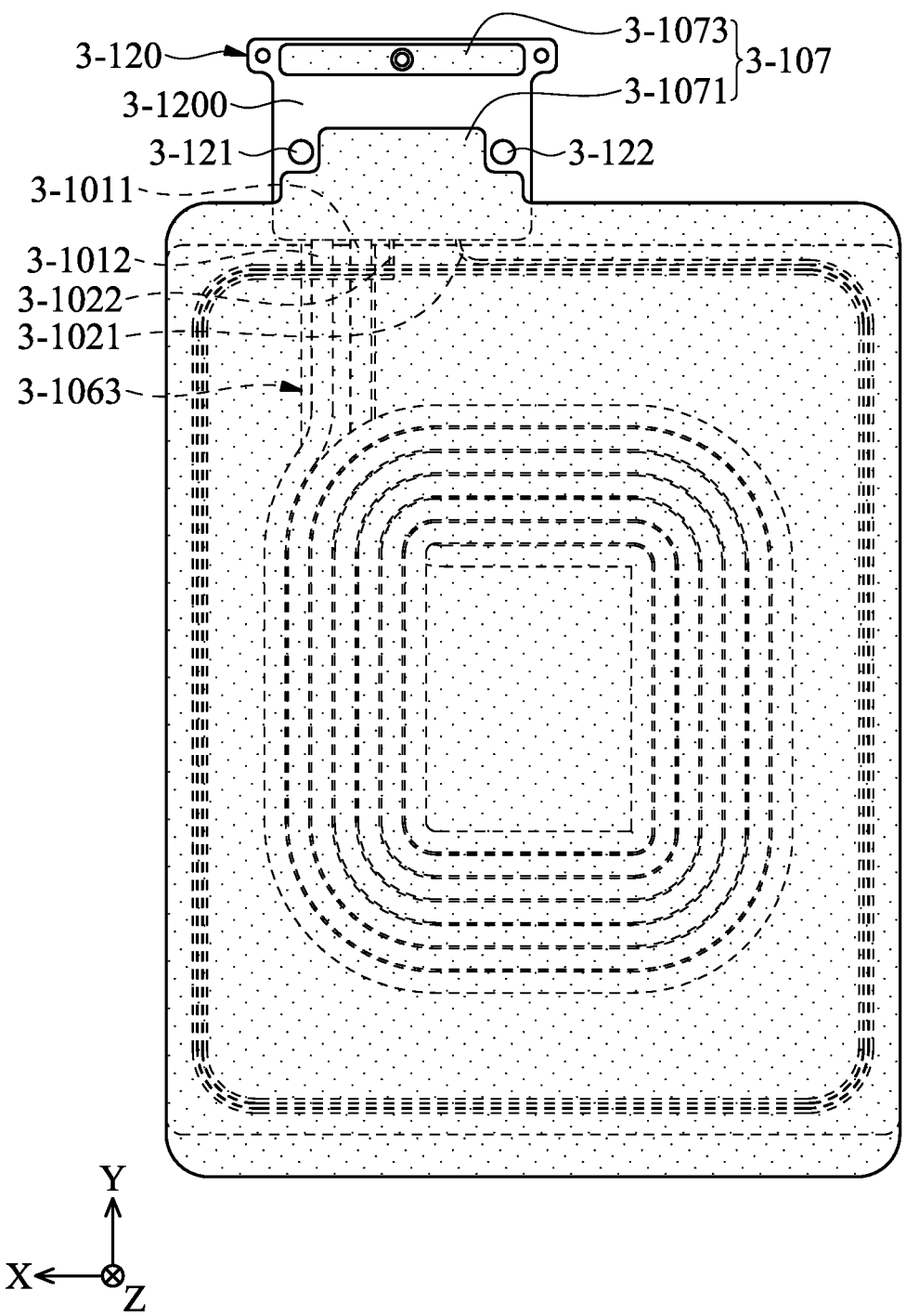
FIG. 11 is a bottom view of the coil module 3-100 after assembly according to an embodiment of the present disclosure.

Please also refer to FIG. 9 to FIG. 11. FIG. 10 is a top view of the coil module 3-100 after assembly according to an embodiment of the present disclosure, and FIG. 11 is a bottom view of the coil module 3-100 after assembly according to an embodiment of the present disclosure. As shown in the figures, the first coil assembly 3-101 and the second coil assembly 3-102 are disposed on the induction substrate 3-106, and the first coil assembly 3-101 is electrically independent of the second coil assembly 3-102.

The first coil assembly 3-101 is formed by a wire (the first wire), and the first coil assembly 3-101 includes a first body 3-1010, a first leading wire 3-1011 and a second leading wire 3-1012. The first leading wire 3-1011 is electrically connected to the first body 3-1010 and has flexibility, and the first body 3-1010 is electrically connected to the circuit assembly 3-120 (first connection assembly) via the first leading wire 3-1011. Because the first leading wire 3-1011 and the second leading wire 3-1012 are connected to the circuit assembly 3-120 and have bendability, the first coil assembly 3-101 has the advantages of shock absorption and ease of assembly.

Two ends of the first leading wire 3-1011 are respectively fixedly connected to the first body 3-1010 and the circuit assembly 3-120 in different manners. For example, one end of the first leading wire 3-1011 is fixedly connected to the first body 3-1010 by an adhesive member (such as glue, not shown) having a resin material, but it is not limited thereto. In other embodiments, one end of the first leading wire 3-1011 can be fixed to the first body 3-1010 by welding. The other end of the first leading wire 3-1011 can be fixedly connected to the circuit assembly 3-120 by a conductive member (such as solder) having a metal material.

Figure 12:
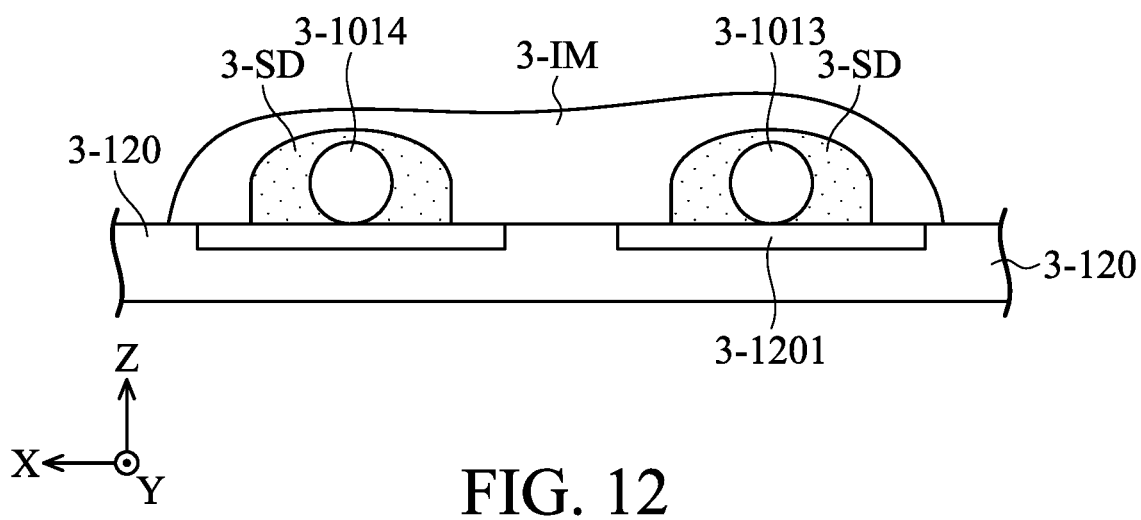
FIG. 12 is a partial structural diagram of the coil module 3-100 after assembly from another view according to an embodiment of the present disclosure.

Please refer to FIG. 10 and FIG. 12 at the same time. FIG. 12 is a partial structural diagram of the coil module 3-100 after assembly from another view according to an embodiment of the present disclosure. A first leading terminal 3-1013 of the first leading wire 3-1011 is electrically connected to a first conductive surface 3-1201 of the circuit assembly 3-120 through a conductive member 3-SD, and the first conductive surface 3-1201 is perpendicular to the first direction 3-A1 (the Z-axis). The first leading terminal 3-1013 extends in a second direction (the Y-axis), and the first direction 3-A1, the second direction and a third direction (the X-axis) are perpendicular to each other. As shown in FIG. 12, the maximum size (the height) of the conductive member 3-SD in the first direction 3-A1 is smaller than the maximum size (the width) of the conductive member 3-SD in the third direction (the X-axis).

Figure 13:
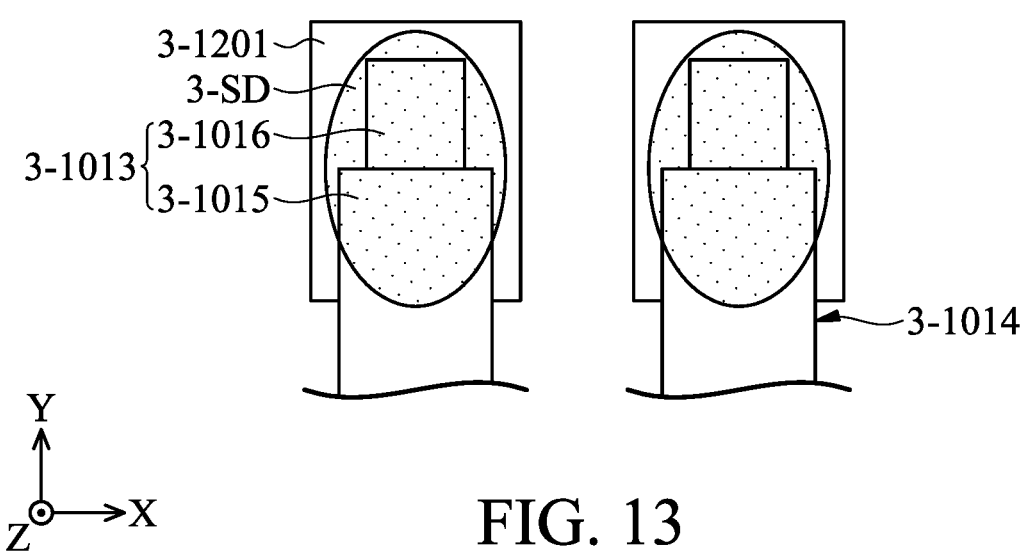
FIG. 13 is an enlarged diagram of a partial structure of FIG. 10 according to an embodiment of the present disclosure.

Please refer to FIG. 13, which is an enlarged diagram of a partial structure of FIG. 10 according to an embodiment of the present disclosure. The first leading terminal 3-1013 further includes a first insulating section 3-1015 and a first exposed section 3-1016. The first insulating section 3-1015 is covered with an insulating material, such as plastic. The first exposed section 3-1016 has a metal material, such as copper, and the conductive member 3-SD is in direct contact with the first insulating section 3-1015 and the first exposed section 3-1016. Based on this configuration, the problem that the first leading terminal 3-1013 is broken due to external impact can be avoided.

When viewed in the first direction 3-A1 (the Z-axis), the first conductive surface 3-1201 partially overlaps the first exposed section 3-1016 and the first insulating section 3-1015. Furthermore, the first coil mechanism may further include an insulating member 3-IM disposed on the conductive member 3-SD, and the insulating member 3-IM may be disposed between the first leading terminal 3-1013 and a second leading terminal 3-1014 of the second leading wire 3-1012 (FIG. 4).

Please refer to FIG. 9 to FIG. 11. The adhesive layer 3-107 may have a first adhesive extending portion 3-1071 corresponding to the first leading wire 3-1011. The first conductive surface 3-1201 of the circuit assembly 3-120 faces the first leading wire 3-1011, and when viewed in the first direction 3-A1, the first adhesive extending portion 3-1071 overlaps at least a portion of the first leading wire 3-1011 and the circuit assembly 3-120. That is, a portion of the first leading wire 3-1011 and a portion of the first adhesive extending portion 3-1071 are located on opposite sides of the circuit assembly 3-120, so that the mechanical strength of the connection between the first leading wire 3-1011 and the first conductive surface 3-1201 can be improved.

The adhesive layer 3-107 (the first adhesive assembly) further includes a first separation adhesive portion 3-1073 which is separated from the first adhesive extending portion 3-1071, and a first connection assembly surface 3-1200 of the circuit assembly 3-120 faces the first adhesive extending portion 3-1071 and the first separation adhesive portion 3-1073.

As shown in FIG. 11, the circuit assembly 3-120 (the first connection assembly) further includes a first positioning structure 3-121 and a second positioning structure 3-122, which are located between the first adhesive extending portion 3-1071 and the first separation adhesive portion 3-1073. The first positioning structure 3-121 and the second positioning structure 3-122 may be holes, openings, or metal pins.

The circuit assembly 3-120 further includes a second conductive surface 3-1202, a third conductive surface 3-1203, a fourth conductive surface 3-1204, a fifth conductive surface 3-1205, a sixth conductive surface 3-1206, a seventh conductive surface 3-1207 and an eighth conductive surface 3-1208. Each conductive surface may be a metal pad. When viewed in the first direction 3-A1, the first separation adhesive portion 3-1073 does not overlap the first leading wire 3-1011, and the fifth conductive surface 3-1205 overlaps at least a portion of the first separation adhesive portion 3-1073. The above configuration can enhance the accuracy and strength during assembly.

The second coil assembly 3-102 includes a second body 3-1020, a third leading wire 3-1021, and a fourth leading wire 3-1022. The third leading wire 3-1021 and the fourth leading wire 3-1022 are electrically connected to the second body 3-1020, and the second body 3-1020, the third leading wire 3-1021 and the fourth leading wire 3-1022 may be formed by another first wire. The second body 3-1020 is electrically connected to the circuit assembly 3-120 (the first connection assembly) via the third leading wire 3-1021 and the fourth leading wire 3-1022.

The first conductive surface 3-1201 to the fourth conductive surface 3-1204 are respectively electrically connected to the first leading wire 3-1011 to the fourth leading wire 3-1022, and the fifth conductive surface 3-1205 to the eight conductive surface 3-1208 are respectively electrically connected to the first conductive surface 3-1201 to the fourth conductive surface 3-1204. As shown in FIG. 10, the center of the first conductive surface 3-1201 and the center of the second conductive surface 3-1202 are arranged along a first imaginary line 3-IL1, the center of the third conductive surface 3-1203 and the center of the fourth conductive surface 3-1204 are arranged along a second imaginary line 3-IL2, and the first imaginary line 3-IL1 and the second imaginary line 3-IL2 do not overlap each other. It should be noted that the term "not overlap" in this embodiment refers to parallel or intersected, meaning that they are not the same line.

As shown in FIG. 10, the center of the fifth conductive surface 3-1205, the center of the sixth conductive surface 3-1206, the center of the seventh conductive surface 3-1207, and the center of the eighth conductive surface 3-1208 are arranged along a third imaginary line 3-IL3.

Please refer to FIG. 9 and FIG. 11. The induction substrate 3-106 (the first base) has a first leading wire accommodating portion 3-1063 for accommodating the aforementioned leading wires. The induction substrate 3-106 and the first body 3-1010 are arranged in the first direction 3-A1, and when viewed in the first direction 3-A1, the first leading wire accommodating portion 3-1063 does not overlap the third leading wire 3-1021.

Figure 14:
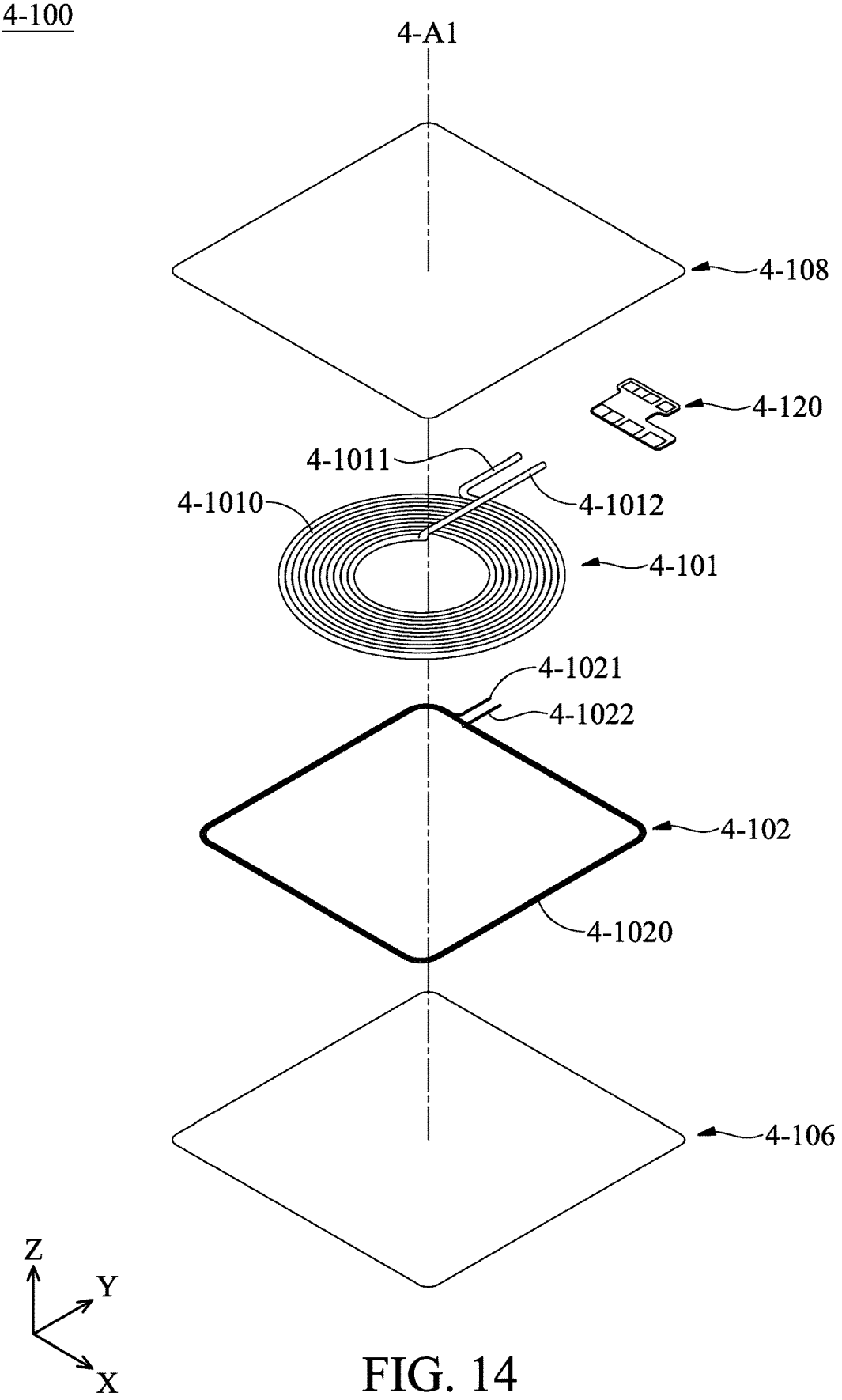
FIG. 14 is an exploded diagram of a coil module 4-100 according to another embodiment of the present disclosure.

Please refer to FIG. 14, which is an exploded diagram of a coil module 4-100 according to another embodiment of the present disclosure. The coil module 4-100 is similar to the coil module 3-100. The coil module 4-100 may include a first coil mechanism. The first coil mechanism includes a first coil assembly 4-101, a second coil assembly 4-102, an induction substrate 4-106, an adhesive layer 4-108, and a circuit assembly 4-120.

In this embodiment, the adhesive layer 4-108, the circuit assembly 4-120, the first coil assembly 4-101, the second coil assembly 4-102 and the induction substrate 4-106 are arranged in the first direction 4-A1 in sequence.

In this embodiment, the first coil assembly 4-101 can serve as a charging coil to be wireless charged by an external charging device. The second coil assembly 4-102 can serve as a communication coil, for example, operating in near field communication (NFC) mode to communicate with external electronic devices.

This embodiment is similar to the previous embodiment, and the elements with the same name have the same function, so they are not be repeated in this embodiment.

Figure 15:
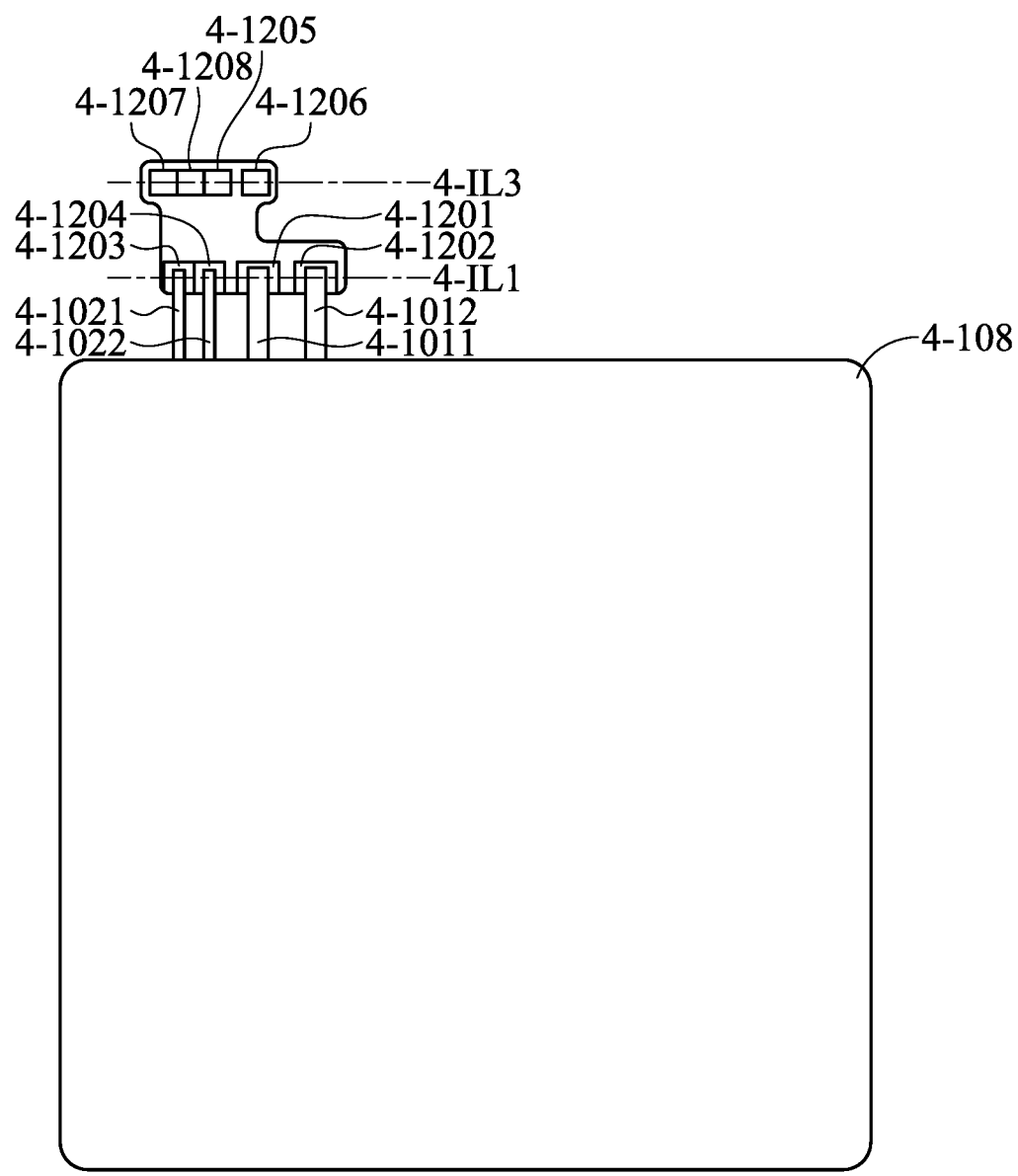
FIG. 15 is a top view of the coil module 4-100 after assembly according to an embodiment of the present disclosure.

Please also refer to FIG. 14 to FIG. 15, and FIG. 15 is a top view of the coil module 4-100 after assembly according to an embodiment of the present disclosure. As shown in the figures, the first coil assembly 4-101 and the second coil assembly 4-102 are disposed on the induction substrate 4-106, and the first coil assembly 4-101 is electrically independent of the second coil assembly 4-102. The first coil assembly 4-101 includes a first body 4-1010, a first leading wire 4-1011 and a second leading wire 4-1012, and the second coil assembly 4-102 includes a second body 4-1020, a third leading wire 4-1021 and a fourth leading wire 4-1022.

The circuit assembly 4-120 includes a first conductive surface 4-1201 to an eighth conductive surface 4-1208. The first conductive surface 4-1201 to the fourth conductive surface 4-1204 are respectively electrically connected to the first leading wire 4-1011 to the fourth leading wire 4-1022, and the fifth conductive surface 4-1205 to the eighth conductive surface 4-1208 are respectively electrically connected to the first conductive surface 4-1201 to the fourth conductive surface 4-1204. As shown in FIG. 15, the center of the first conductive surface 4-1201, the center of the second conductive surface 4-1202, the center of the third conductive surface 4-1203 and the center of the fourth conductive surface 4-1204 are arranged along a first imaginary line 4-IL1.

The center of the fifth conductive surface 4-1205, the center of the sixth conductive surface 4-1206, the center of the seventh conductive surface 4-1207, and the center of the eighth conductive surface 4-1208 are arranged along a third imaginary line 4-IL3, and the first imaginary line 4-IL1 is parallel to the third imaginary line 4-IL3.

Figure 16:
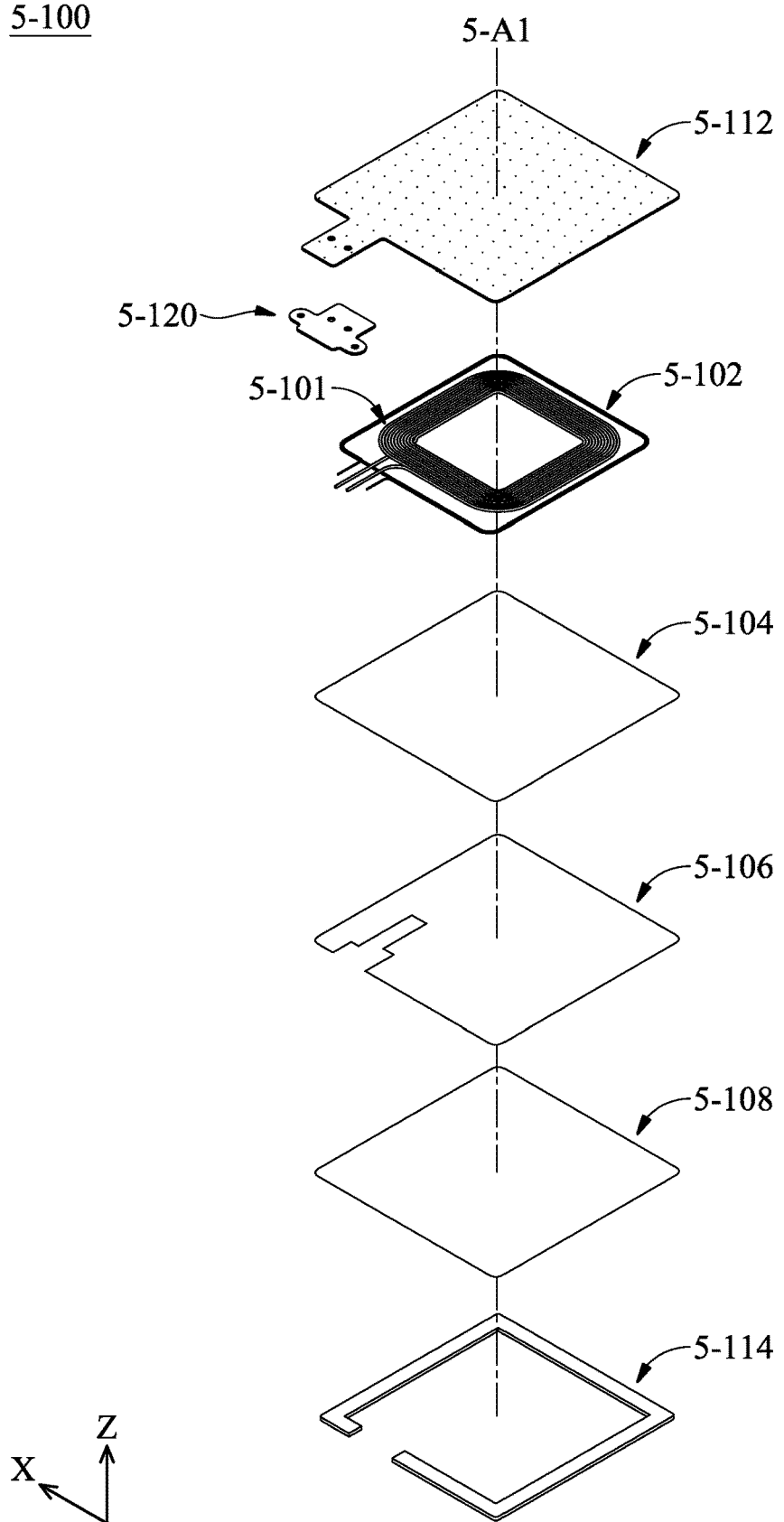
FIG. 16 is an exploded diagram of a coil module 5-100 according to another embodiment of the present disclosure.

Please refer to FIG. 16, which is an exploded diagram of a coil module 5-100 according to another embodiment of the present disclosure. The coil module 5-100 is similar to the coil module 1-100. The coil module 5-100 may include a first coil mechanism. The first coil mechanism includes a first coil assembly 5-101, a second coil assembly 5-102, an adhesive layer 5-104, an adhesive layer 5-108, an induction substrate 5-106, a protecting element 5-112, a buffering element 5-114 and a circuit assembly 5-120.

In this embodiment, the protecting element 5-112, the circuit assembly 5-120, the second coil assembly 5-102, the first coil assembly 5-101, the adhesive layer 5-104, the induction substrate 5-106, the adhesive layer 5-108 and the buffering element 5-114 are arranged in the first direction 5-A1 in sequence. The first direction 5-A1 may be the extending direction of a winding axis of the first coil assembly 5-101 and the second coil assembly 5-102.

In this embodiment, the first coil assembly 5-101 can serve as a charging coil to be wireless charged by an external charging device. The second coil assembly 5-102 can serve as a communication coil, for example, operating in near field communication (NFC) mode to communicate with external electronic devices.

This embodiment is similar to the previous embodiment, and the components with the same name have the same function, so they are not be repeated in this embodiment.

The protecting element 5-112 or the adhesive layer 5-104 may be referred to as a first adhesive assembly which is disposed on the first coil assembly 5-101 or the induction substrate 5-106 (the first base). The buffering element 5-114 may be foam (or sponge) which is disposed on the aforementioned coil assembly or the bottom surface of the induction substrate 5-106, and the elastic coefficient of the first adhesive assembly is different from the elastic coefficient (such as the k value, Young's modulus) of the buffering element 5-114.

As shown in FIG. 16, the protecting element 5-112 is disposed on the first coil assembly 5-101, the buffering element 5-114 is disposed on the bottom of the induction substrate 5-106, and the first coil assembly 5-101 and induction substrate 5-106 are located between the buffering element 5-114 and the protecting element 5-112.

Specifically, the elastic coefficient of the first adhesive assembly is greater than the elastic coefficient of the buffering element 5-114 (the first buffering element). That is, the adhesive layer 5-104 and the protecting element 5-112 are harder than the buffering element 5-114. In addition, the induction substrate 5-106 is located between the first adhesive assembly and the buffering element 5-114.

Figure 17:
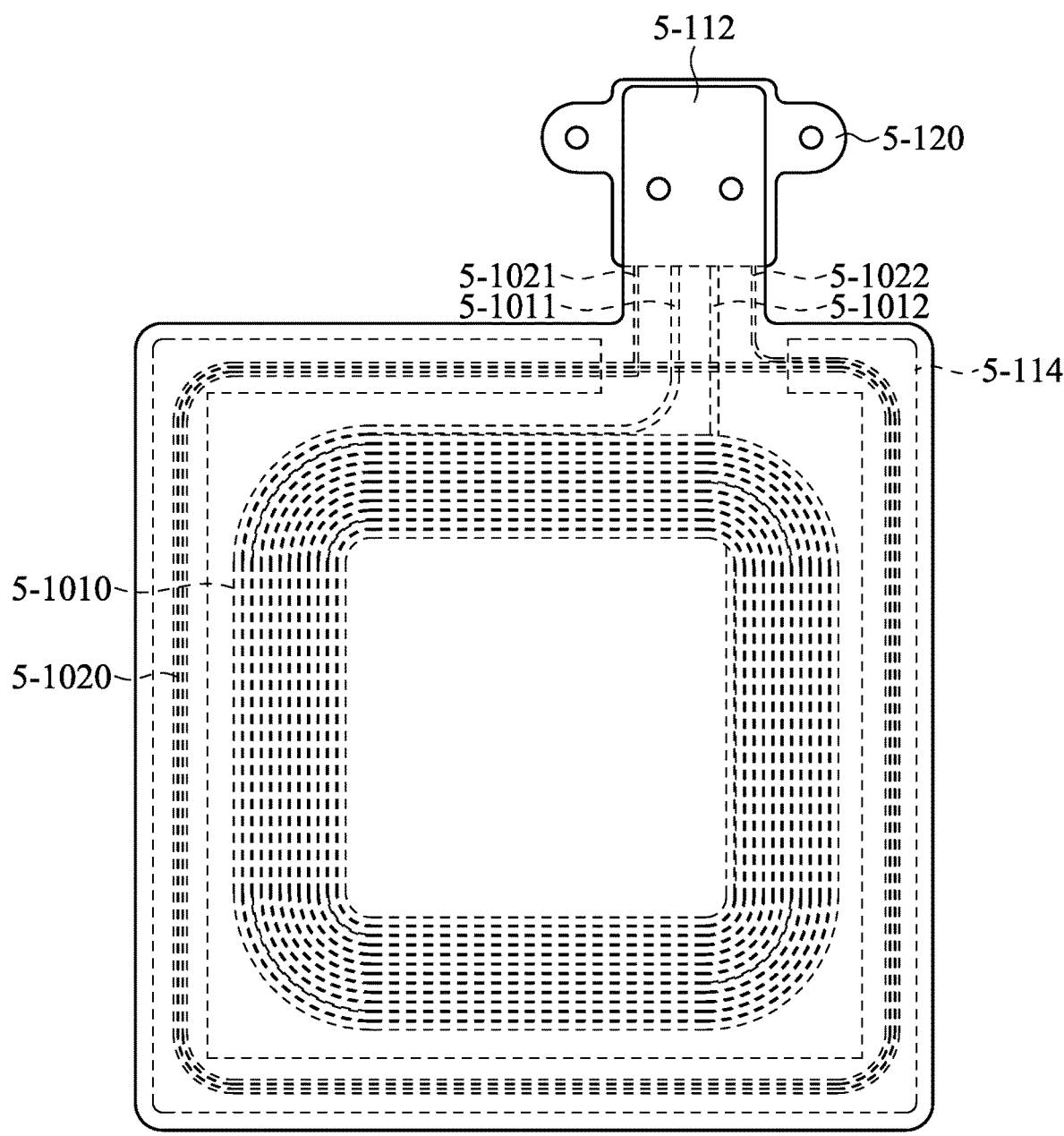
FIG. 17 is a top view of the coil module 5-100 after assembly according to an embodiment of the present disclosure.
Figure 18:
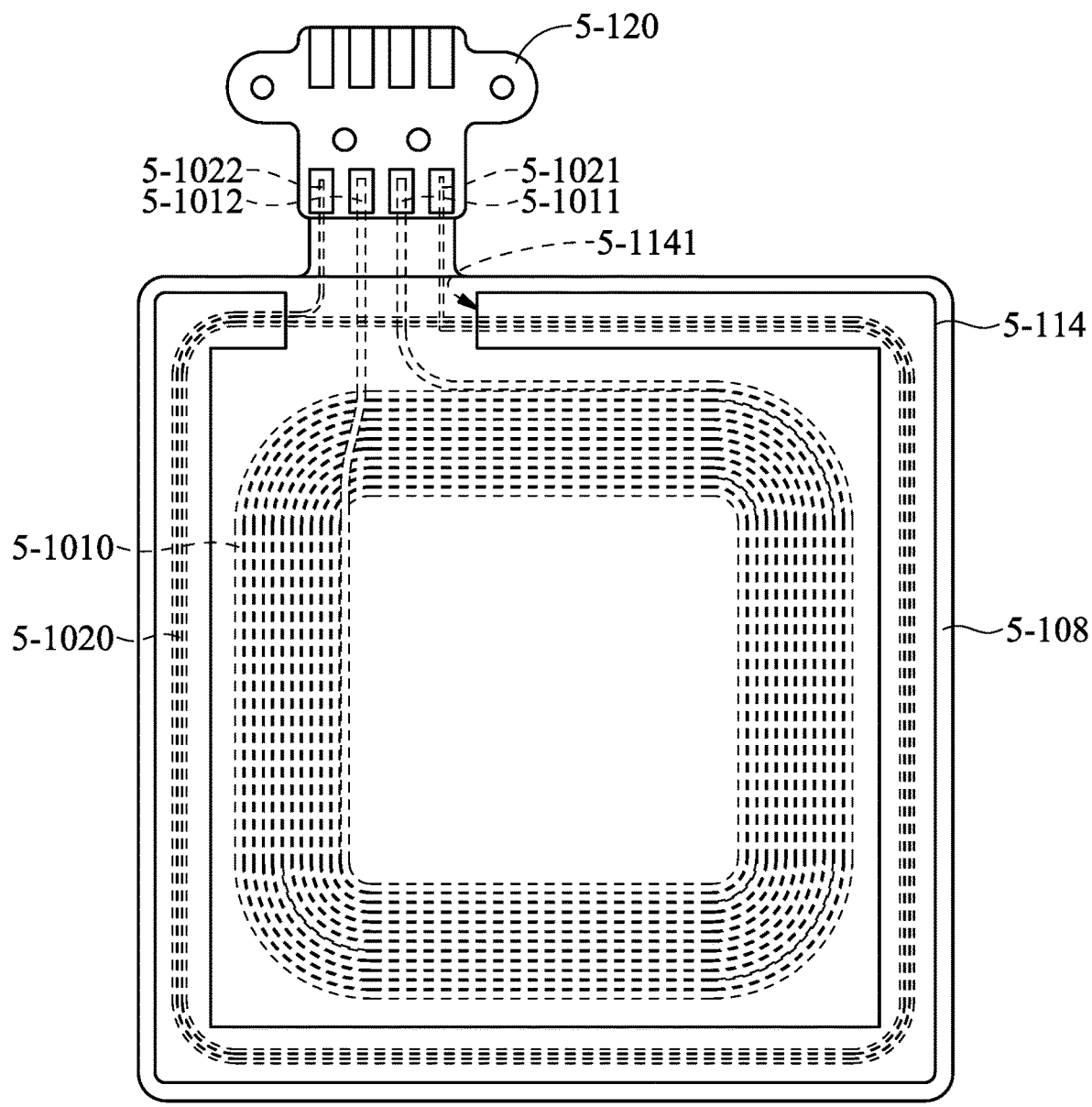
FIG. 18 is a bottom view of the coil module 5-100 after assembly according to the present embodiment of the present disclosure.

Please also refer to FIGS. 16 to 10 together. FIG. 17 is a top view of the coil module after assembly according to an embodiment of the present disclosure, and FIG. 18 is a bottom view of the coil module 5-100 after assembly according to the present embodiment of the present disclosure. As shown in the figures, the first coil assembly 5-101 includes a first body 5-1010, a first leading wire 5-1011, and a second leading wire 5-1012. The second coil assembly 5-102 includes a second body 5-1020, a third leading wire 5-1021, and a fourth leading wire 5-1022.

As shown in FIG. 17, when viewed in the first direction 5-A1 (the Z-axis), the buffering element 5-114 does not overlap the first body 5-1010. In addition, the second coil assembly 5-102 is electrically independent of the first coil assembly 5-101.

As shown in FIG. 17 to FIG. 18, when viewed in the first direction 5-A1, the buffering element 5-114 overlaps at least a portion of the second coil assembly 5-102. The third leading wire 5-1021 is electrically connected to the second body 5-1020, and an opening of the buffering element 5-114 corresponds to the first leading wire 5-1011 and the third leading wire 5-1021. When viewed in the first direction 5-A1, the buffering element 5-114 does not overlap the first leading wire 5-1011 or the third leading wire 5-1021.

In this embodiment, the wire diameter of the wire of the first coil assembly 5-101 is larger than that of the second coil assembly 5-102. In the first direction 5-A1, the maximum size of the first coil assembly 5-101 (for example, one layer) is larger than the maximum size of the second coil assembly 5-102 (for example, two layers).

Figure 19:
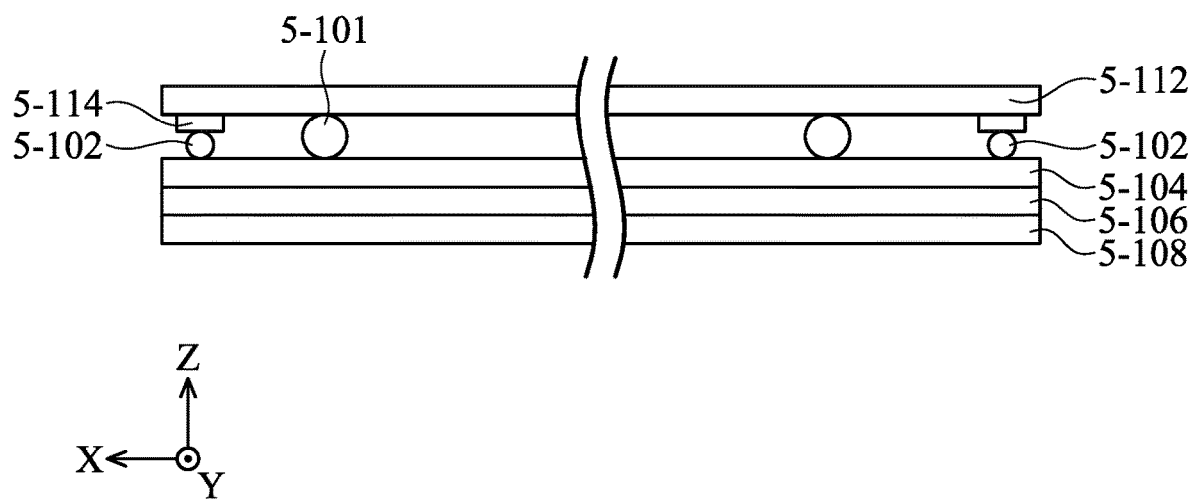
FIG. 19 is a schematic cross-sectional view of the coil module 5-100 when viewed in the Y-axis according to another embodiment of the present disclosure.

Please refer to FIG. 19, which is a schematic cross-sectional view of the coil module 5-100 when viewed in the Y-axis according to another embodiment of the present disclosure. The adhesive layer 5-104 (the first adhesive assembly) is disposed on the bottom of the first coil assembly 5-101, and the buffering element 5-114 is disposed on the second coil assembly 5-102. When viewed in a direction (the X-axis) perpendicular to the first direction 5-A1, the buffering element 5-114 overlaps at least a portion of the first coil assembly 5-101.

Figure 20:
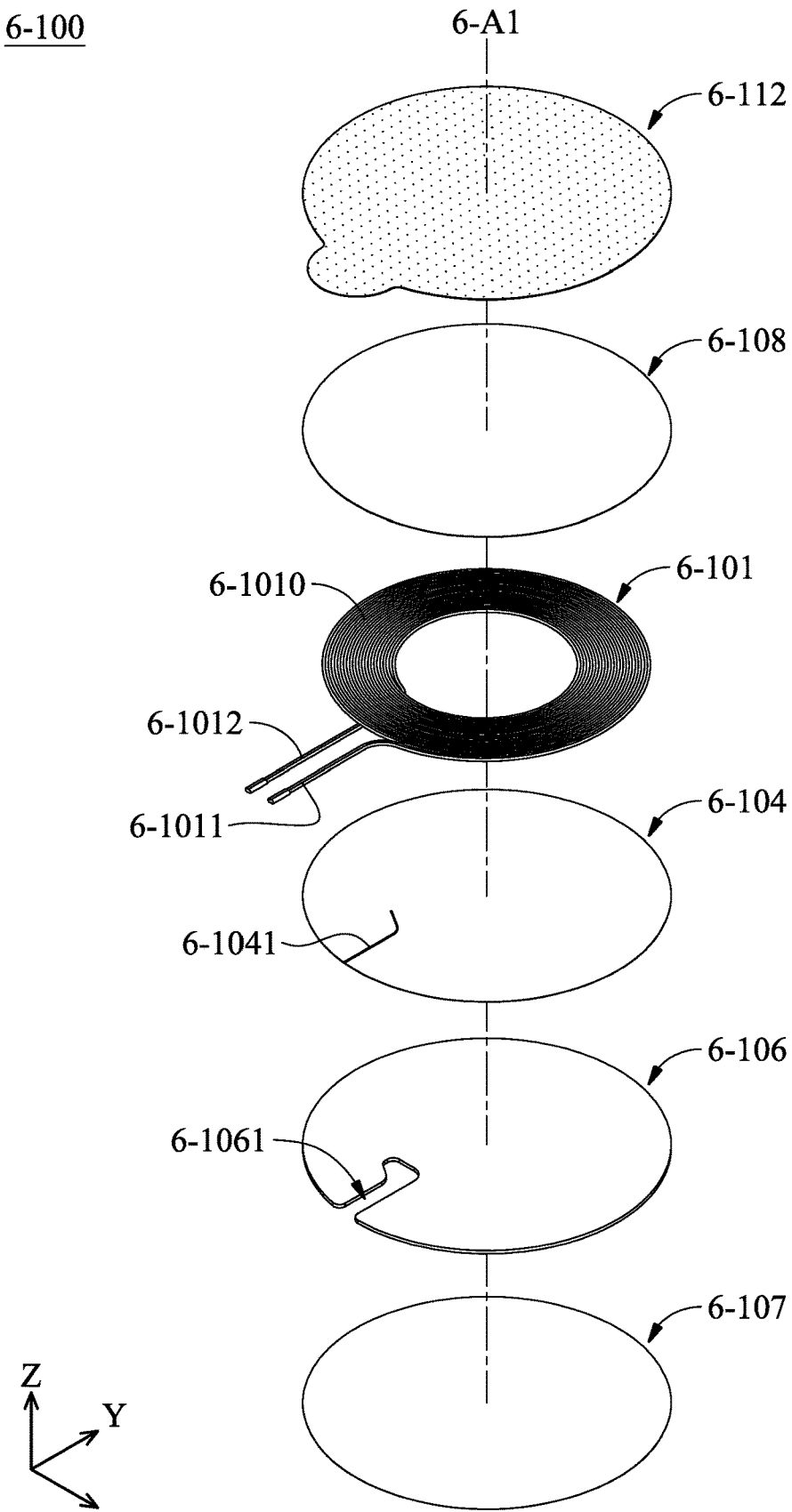
FIG. 20 is an exploded diagram of a coil module 6-100 according to an embodiment of the present disclosure.

Please refer to FIG. 20, which is an exploded diagram of a coil module 6-100 according to an embodiment of the present disclosure. As shown in FIG. 20, the coil module 6-100 is a coil module that can be used for transmitting energy or signals. The coil module 6-100 may include a first coil mechanism. The first coil mechanism may include a first coil assembly 6-101, an adhesive layer 6-104, an adhesive layer 6-107, an adhesive layer 6-108, an induction substrate 6-106 and a protection element 6-112.

In this embodiment, the protection element 6-112, the adhesive layer 6-108, the first coil assembly 6-101, the adhesive layer 6-104, the induction substrate 6-106, the adhesive layer 6-107 and are arranged in a first direction 6-A1 in sequence. The first direction 6-A1 may be the extending direction of a winding axis of the first coil assembly 6-101.

In this embodiment, the first coil assembly 6-101 can serve as a charging coil to be wireless charged by an external charging device. For example, the first coil assembly 6-101 can operate as a resonant charging coil based on the standard of the Alliance for Wireless Power (A4WP), but it is not limited thereto. In addition, the first coil assembly 6-101 can operate as an inductive charging coil based on the standard of Wireless Power Consortium (WPC), such as the Qi standard. Therefore, the first coil assembly 6-101 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first coil assembly 6-101 can also serve as a communication coil, for example, operating in a near field communication (NFC) mode to communicate with external electronic devices.

In this embodiment, the induction substrate 6-106 is disposed adjacent to the coil assembly, and the induction substrate 6-106 is configured to change the electromagnetic field distribution near the coil assembly. The induction substrate 6-106 may be a ferrite, but it is not limited thereto. For example, in other embodiments, the induction substrate 6-106 may also include a nanocrystalline material. The induction substrate 6-106 may have a magnetic permeability corresponding to the coil assembly so that the electromagnetic waves of the coil assembly can be more concentrated.

The adhesive layer 6-104, the adhesive layer 6-107 and the adhesive layer 6-108 may be double-sided adhesive tape or single-sided adhesive tape to adhere to one or two adjacent elements. In some embodiments, one or more of the adhesive layer 6-104, the adhesive layer 6-107 and the adhesive layer 6-108 may be made of polyethylene terephthalate (PET), but it is not limited thereto. The protection element 6-112 can be used to protect the coil module 6-100, and the protection element 6-112 is removed when the coil module 6-100 is installed in an electronic device (not shown).

Figure 21:
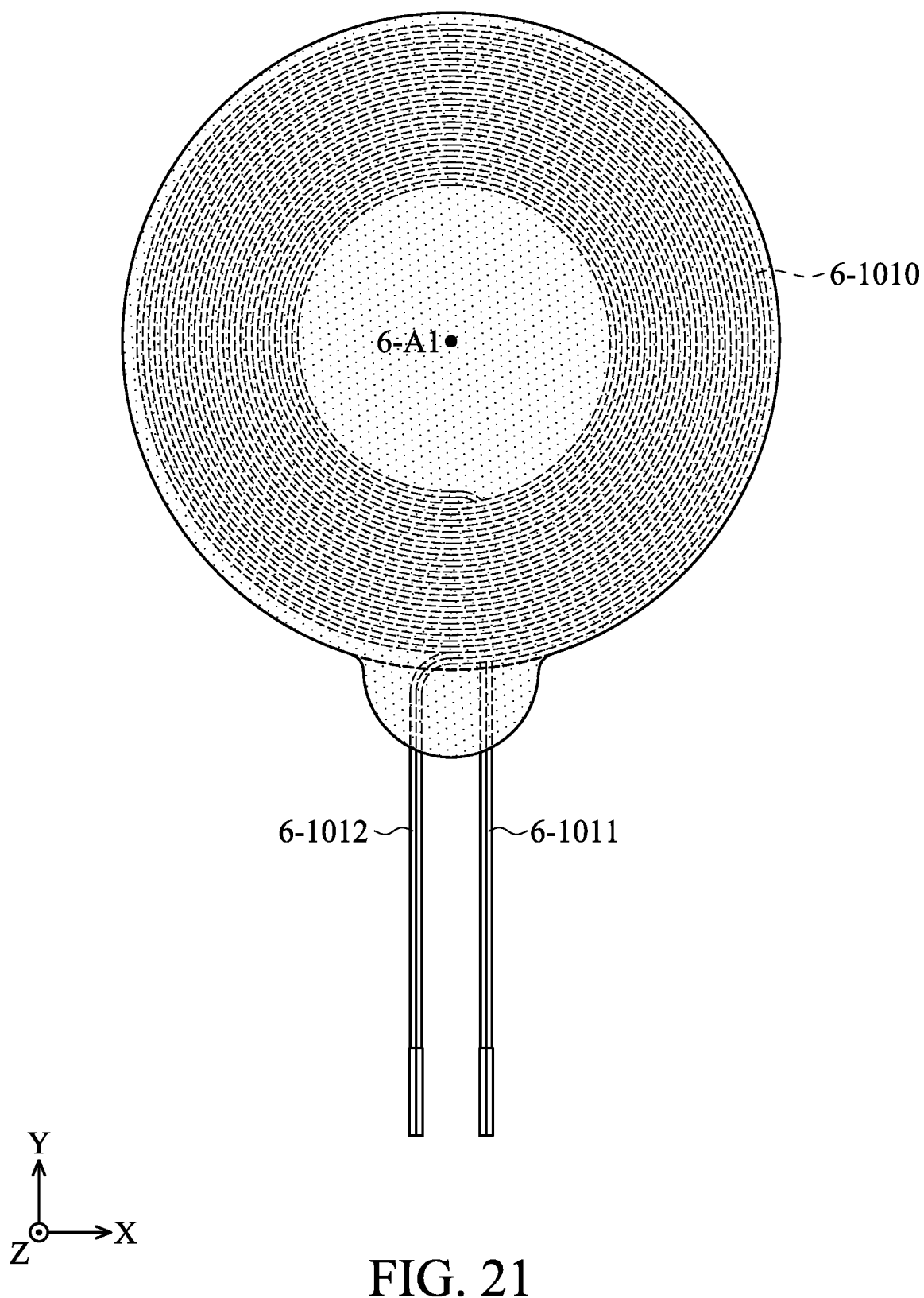
FIG. 21 is a top view of the coil module 6-100 after assembly according to an embodiment of the present disclosure.
Figure 22:
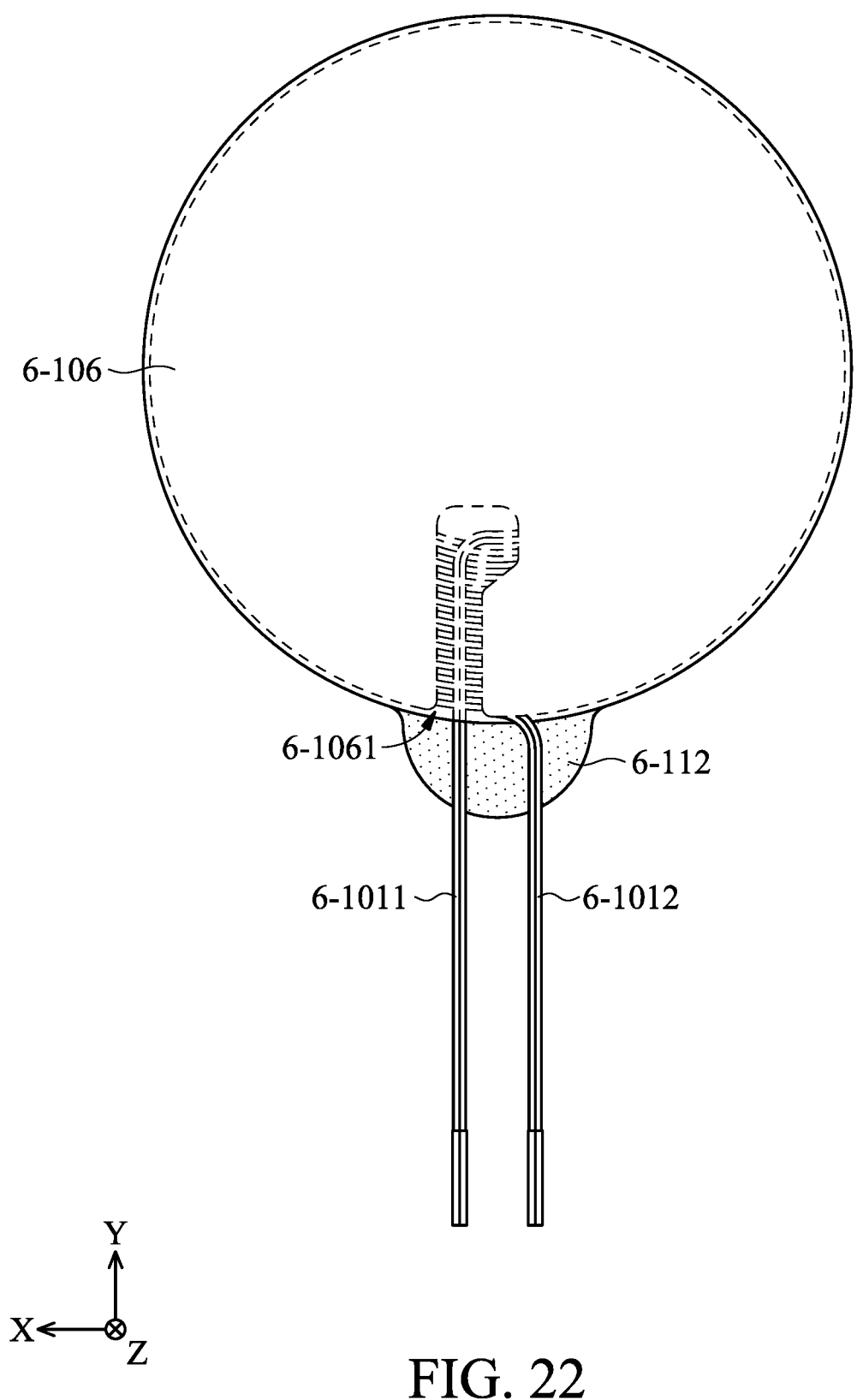
FIG. 22 is a bottom view of the coil module 6-100 after assembly according to an embodiment of the present disclosure.

Please also refer to FIG. 20 to FIG. 22. FIG. 21 is a top view of the coil module 6-100 after assembly according to an embodiment of the present disclosure, and FIG. 22 is a bottom view of the coil module 6-100 after assembly according to an embodiment of the present disclosure. As shown in the figures, the first coil assembly 6-101 includes a first body 6-1010, a first leading wire 6-1011, and a second leading wire 6-1012. The first leading wire 6-1011 and the second leading wire 6-1012 are electrically connected to the first body 6-1010.

In this embodiment, the induction substrate 6-106 may be referred to as a first base, the adhesive layer 6-108 may be referred to as a first adhesive assembly, the adhesive layer 6-107 may be referred to as a first protection assembly, and the adhesive layer 6-104 may be referred to as a second adhesive assembly. The induction substrate 6-106 (the first base) is configured to support the first coil assembly 6-101.

In this embodiment, the elastic limit of the adhesive layer 6-107 (the first protection assembly) is different from the elastic limit of the adhesive layer 6-108 (the first adhesive assembly). For example, the elastic limit of the adhesive layer 6-107 (the first protection assembly) is greater than the elastic limit of the adhesive layer 6-108 (the first adhesive assembly). The elastic limit is defined as the maximum stress that can restore the original shape when an elastic element is stressed.

In the first direction 6-A1, the maximum size of the adhesive layer 6-107 (the first protection assembly) is different from the maximum size of the adhesive layer 6-108 (the first adhesive assembly). For example, in the first direction 6-A1, the maximum size (such as the thickness) of the adhesive layer 6-107 (the first protection assembly) is larger than the maximum size of the adhesive layer 6-108 (the first adhesive assembly).

The first coil assembly 6-101, the induction substrate 6-106 (the first base), the adhesive layer 6-108 (the first adhesive assembly) and the adhesive layer 6-104 (the second adhesive assembly) are arranged in the first direction 6-A1. In the first direction 6-A1, the maximum size of the adhesive layer 6-108 (the first adhesive assembly) is different from the maximum size of the adhesive layer 6-104 (the second adhesive assembly). For example, they have different thickness.

The adhesive layer 6-104 (the second adhesive assembly) is disposed between the first coil assembly 6-101 and the induction substrate 6-106 (the first base), and the adhesive layer 6-108 (the first adhesive assembly) is not located between the first coil assembly 6-101 and the induction substrate 6-106 (the first base). In the first direction 6-A1, the maximum size of the adhesive layer 6-108 (the first adhesive assembly) is larger than the maximum size of the adhesive layer 6-104 (the second adhesive assembly).

In other embodiments, the first coil assembly 6-101 may be disposed between the adhesive layer 6-108 (the first adhesive assembly) and the adhesive layer 6-107 (the first protection assembly). In addition, the first coil mechanism may further include a second protection assembly (not shown). The first coil assembly 6-101 is disposed between the adhesive layer 6-107 (the first protection assembly) and the second protection assembly, and the introduction substrate 6-106 (the first base) is disposed between the adhesive layer 6-107 (the first protection assembly) and the second protection assembly.

Figure 23:
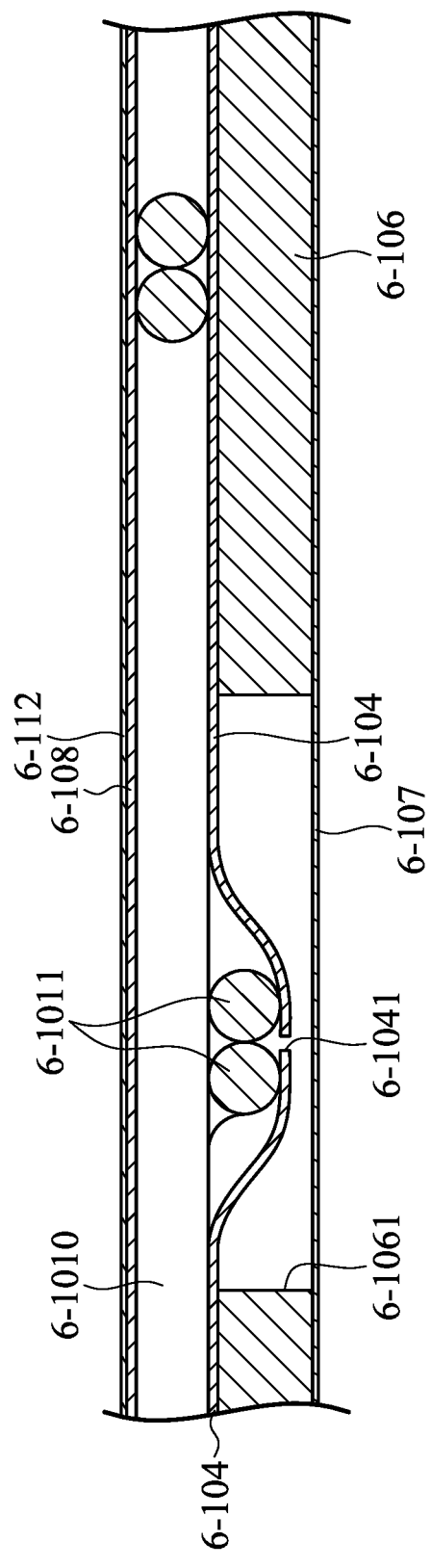
FIG. 23 is a front view of the coil module 6-100 according to an embodiment of the present disclosure.

Please refer to FIG. 20 and FIG. 23. FIG. 23 is a front view of the coil module 6-100 according to an embodiment of the present disclosure. The induction substrate 6-106 has an accommodating portion 6-1061, and the adhesive layer 6-104 has a groove 6-1041. As shown in FIG. 23, the groove 6-1041 corresponds to the first leading wire 6-1011, so that the first leading wire 6-1011 can be accommodated in the accommodating portion 6-1061. When viewed in a direction perpendicular to the first direction 6-A1 (for example, the X-axis), a portion of the adhesive layer 6-104 overlaps the induction substrate 6-106.

Figure 24:
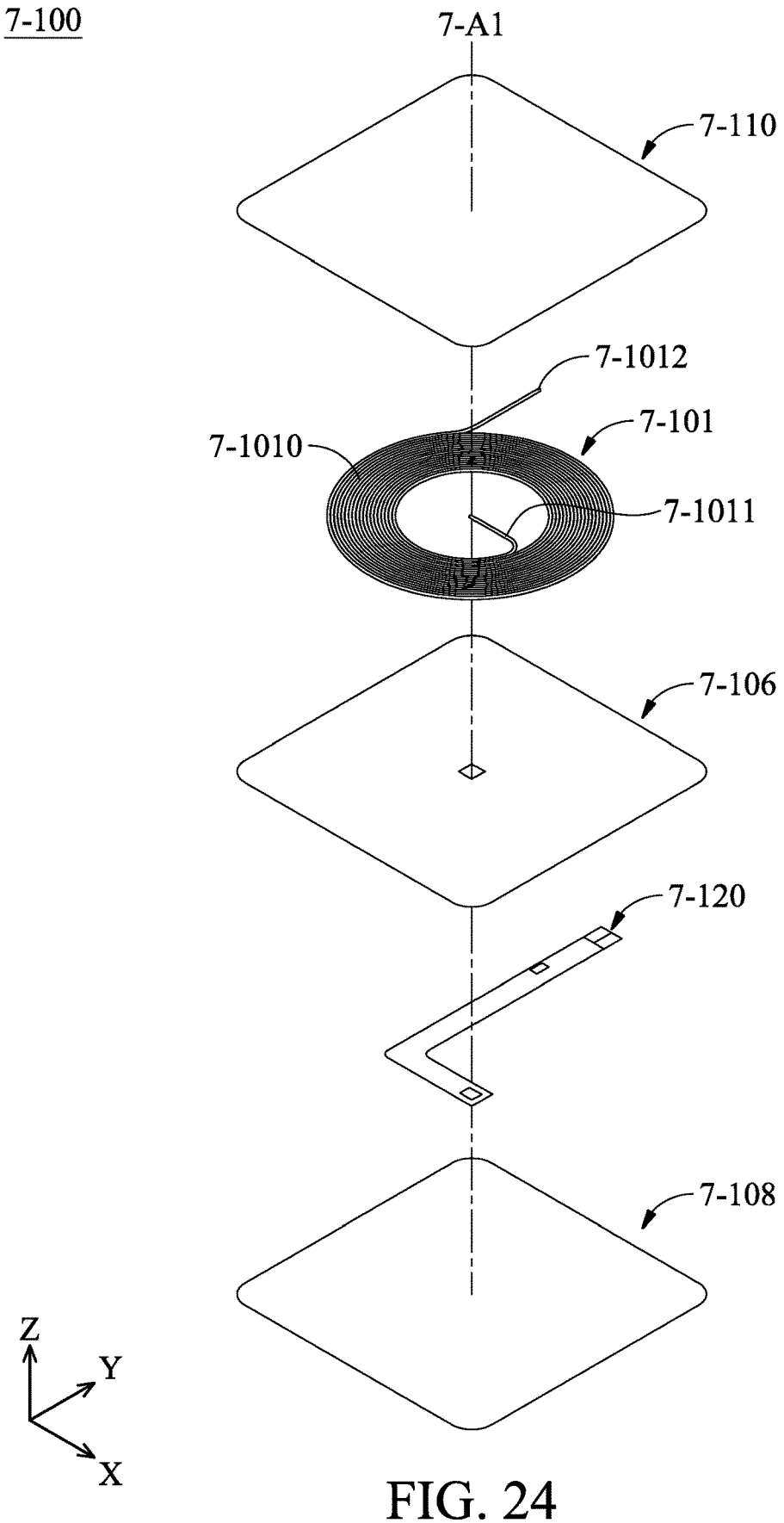
FIG. 24 is an exploded diagram of a coil module 7-100 according to another embodiment of the present disclosure.

Please refer to FIG. 24, which is an exploded diagram of a coil module 7-100 according to another embodiment of the present disclosure. The coil module 7-100 may include a first coil mechanism, and the first coil mechanism includes a first coil assembly 7-101, an adhesive layer 7-108, an adhesive layer 7-110, an induction substrate 7-106, and a circuit assembly 7-120.

In this embodiment, the adhesive layer 7-110, the first coil assembly 7-101, the induction substrate 7-106, the circuit assembly 7-120, and the adhesive layer 7-108 are arranged in a first direction 7-A1 in sequence. The first direction 7-A1 may be the extending direction of the winding axis of the first coil assembly 7-101.

In this embodiment, the first coil assembly 7-101 can serve as a charging coil to be wireless charged by an external charging device. The first coil assembly 7-101 can also serve as a communication coil, for example, operating in near field communication (NFC) mode to communicate with external electronic devices.

This embodiment is similar to the previous embodiment, and the components with the same name have the same function, so that they are not repeated in this embodiment.

Figure 25:
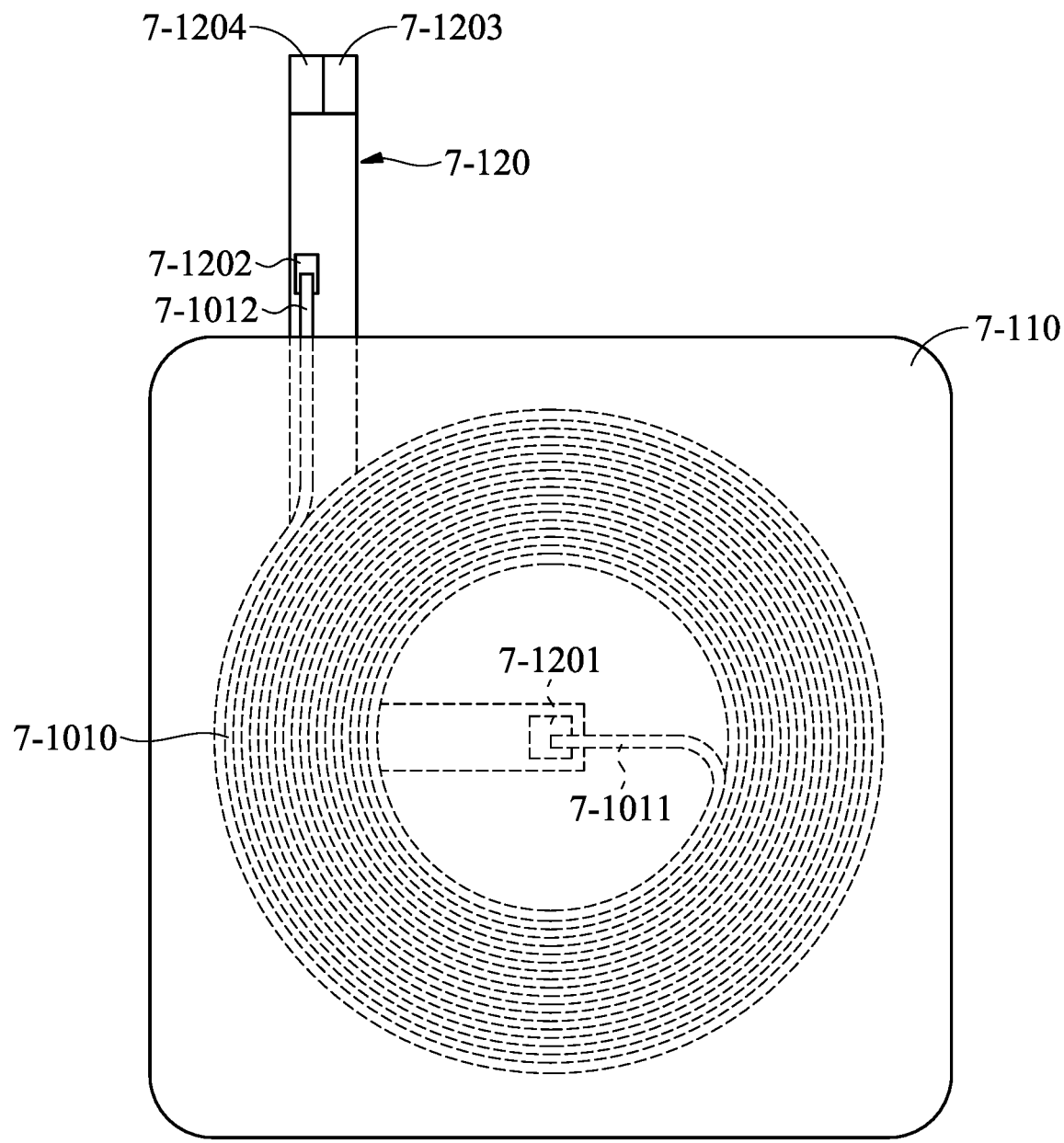
FIG. 25 is a top view of the coil module 7-100 after assembly according to an embodiment of the present disclosure.
Figure 26:
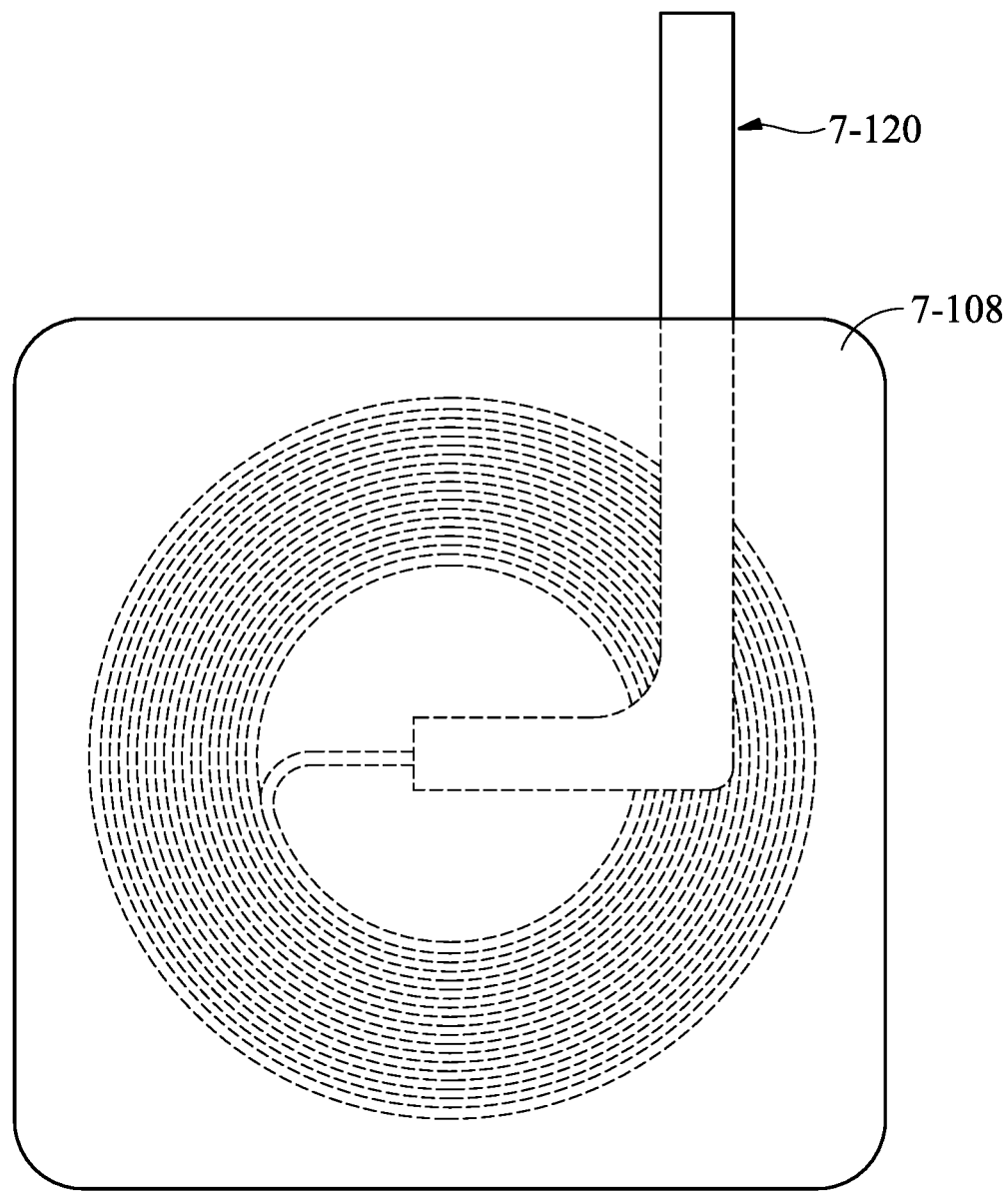
FIG. 26 is a bottom view of the coil module 7-100 after assembly according to an embodiment of the present disclosure.

Please refer to FIG. 24 to FIG. 26 together. FIG. 25 is a top view of the coil module 7-100 after assembly according to an embodiment of the present disclosure, and FIG. 26 is a bottom view of the coil module 7-100 after assembly according to an embodiment of the present disclosure. As shown in the figures, the first coil assembly 7-101 includes a first body 7-1010, a first leading wire 7-1011 and a second leading wire 7-1012, and the first leading wire 7-1011 and the second leading wire 7-1012 are electrically connected to the first body 7-1010.

The circuit assembly 7-120 may be a flexible circuit board having a first contact 7-1201 and a second contact 7-1202, and the first leading wire 7-1011 and the second leading wire 7-012 are respectively electrically connected to the first contact 7-1201 and the second contact 7-1202. The circuit assembly 7-120 may further include a third contact 7-1203 and a fourth contact 7-1204 which are respectively electrically connected to the first contact 7-1201 and the second contact 7-1202.

In this embodiment, the adhesive layer 7-108 and the adhesive layer 7-110 may be referred to as a first protection assembly and a second protection assembly, respectively. The induction substrate 7-106 and the first coil assembly 7-101 are disposed between the adhesive layer 7-108 and the adhesive layer 7-110.

Figure 27:
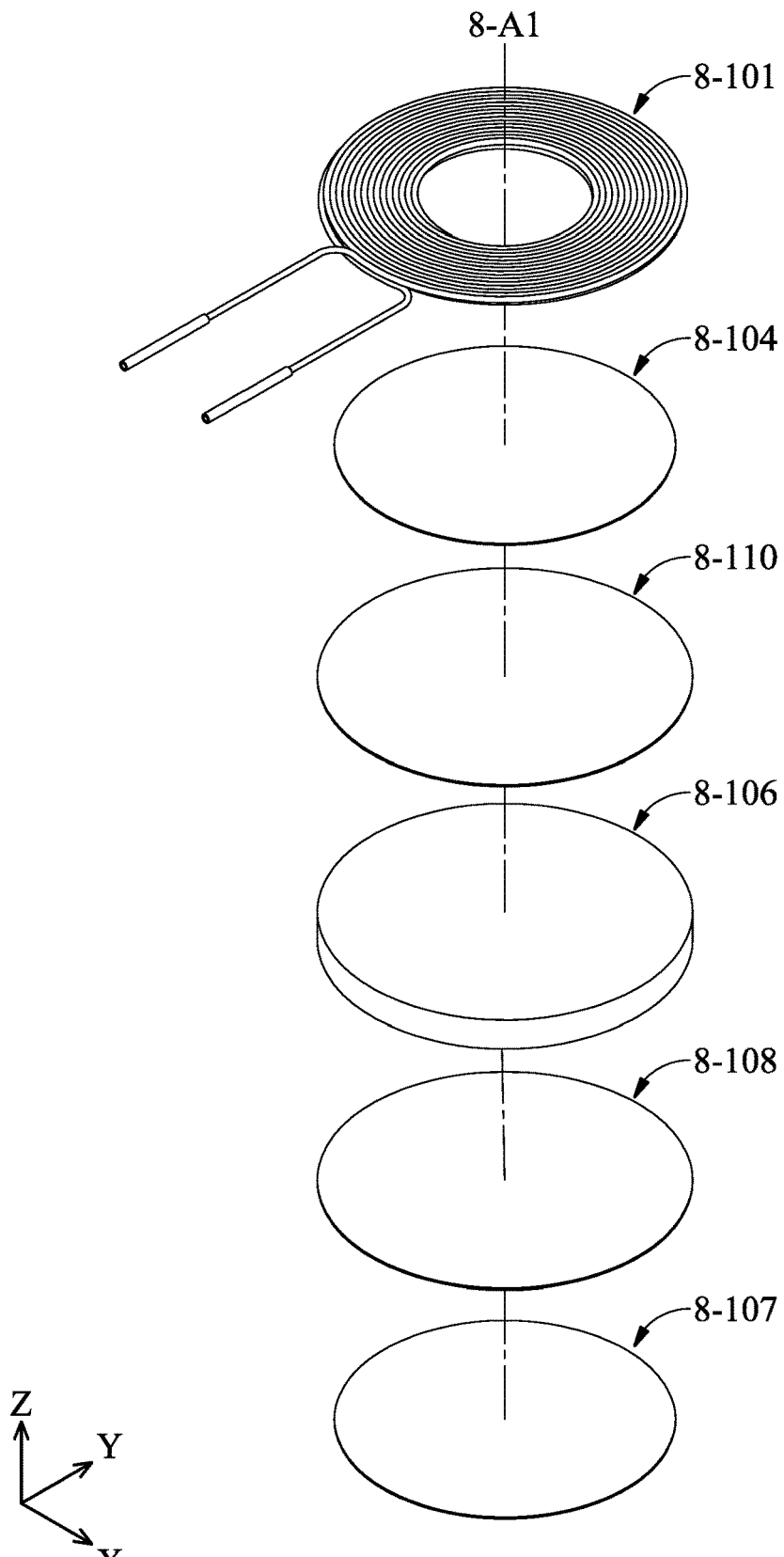
FIG. 27 is an exploded diagram of a coil module 8-100 according to another embodiment of the present disclosure.

Please refer to FIG. 27, which is an exploded diagram of a coil module 8-100 according to another embodiment of the present disclosure. The coil module 8-100 may include a first coil mechanism, and the first coil mechanism includes a first coil assembly 8-101, an adhesive layer 8-104, an adhesive layer 8-107, an adhesive layer 8-108, an adhesive layer 8-110 and an induction substrate 8-106.

In this embodiment, the first coil assembly 8-101, the adhesive layer 8-104, the adhesive layer 8-110, the induction substrate 8-106, the adhesive layer 8-108, and the adhesive layer 8-107 are arranged in a first direction 8-A1 in sequence. The first direction 8-A1 may be the extending direction of the winding axis of the first coil assembly 8-101.

In this embodiment, the adhesive layer 8-104 may be referred to as a first adhesive assembly, the adhesive layer 8-107 may be referred to as a second adhesive assembly, the adhesive layer 8-110 may be referred to as a first protection assembly, and the adhesive layer 8-108 may be referred to as a second protection assembly. The adhesive layer 8-108 and the adhesive layer 8-110 can be made of polyethylene terephthalate (PET).

Please also refer to FIG. 28, which is a schematic cross-sectional view of the coil module 8-100 after assembly according to this embodiment of the present disclosure. The adhesive layer 8-104 (the first adhesive assembly) includes a first adhesive body 8-1040 and two adhesive layers 8-1041 and 8-1042 disposed on two sides of the first adhesive body 8-1040. The adhesive layer 8-110 (the first protection assembly) includes a first protection body 8-1100 and an adhesive layer 8-1102 disposed on one side of the first protection body 8-1100, and in the first direction 8-A1 (the Z-axis), the maximum size of the first adhesive body 8-1040 is different from the maximum size of the first protection body 8-1100.

In this embodiment, the thermal conductivity coefficient of the adhesive layer 8-104 is greater than 1 (W/mK), and the thermal conductivity coefficient of the adhesive layer 8-104 (the first adhesive assembly) is different from the thermal conductivity coefficient of the adhesive layer 8-107 (the second adhesive assembly). The adhesive layer 8-104 and the adhesive layer 8-107 may be thermally conductive adhesive or thermally conductive double-sided tape.

Figure 29:
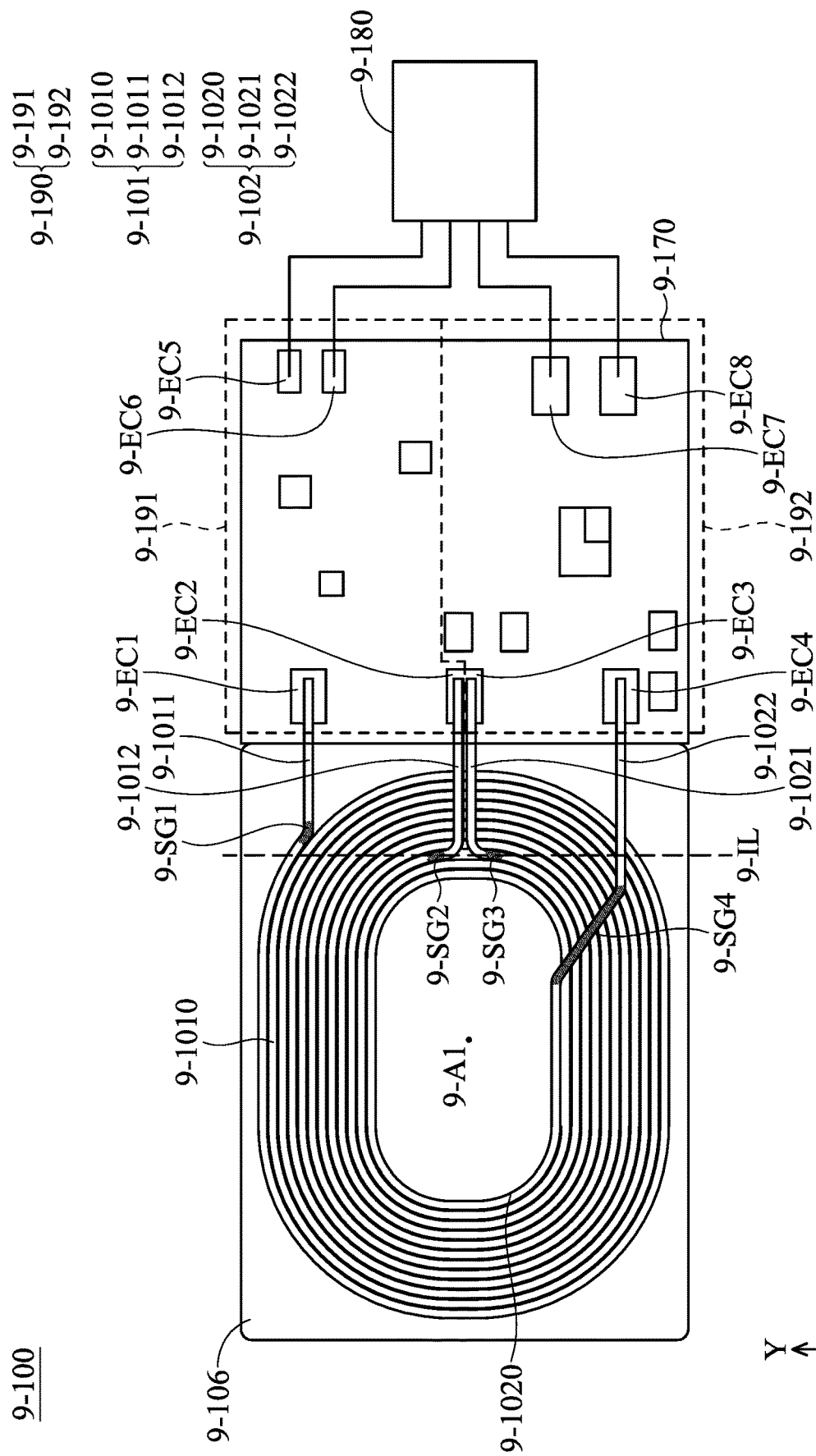
FIG. 29 is a schematic diagram of a coil module 9-100 according to an embodiment of the present disclosure.

Please refer to FIG. 29, which is a schematic diagram of a coil module 9-100 according to an embodiment of the present disclosure. The coil module 9-100 includes a first coil assembly 9-101, a second coil assembly 9-102, an induction substrate 9-106 and a circuit module 9-190. The induction substrate 9-106 (the first base) is configured to support the first coil assembly 9-101 and the second coil assembly 9-102, and the first coil assembly 9-101 and the induction substrate 9-106 are arranged in a first direction 9-A1 (the Z-axis).

The first coil assembly 9-101 includes a first body 9-1010, a first leading wire 9-1011 and a second leading wire 9-1012. The first leading wire 9-1011 and the second leading wire 9-1012 are electrically connected to the first body 9-1010 and extends outward from the first body 9-1010.

Furthermore, the second coil assembly 9-102 includes a second body 9-1020, a third leading wire 9-1021 and a fourth leading wire 9-1022. The third leading wire 9-1021 and the fourth leading wire 9-1022 are electrically connected to the second body 9-1020 and extends outward from the second body 9-1020.

The first coil assembly 9-101 further includes a first segment 9-SG1 and a second segment 9-SG2. The first segment 9-SG1 is connected to the first leading wire 9-1011 and the first body 9-1010, and the second segment 9-SG2 is connected to the second leading wire 9-1012 and the first body 9-1010.

The second coil assembly 9-102 further includes a third segment 9-SG3 and a fourth segment 9-SG4. The third segment 9-SG3 is connected to the third leading wire 9-1021 and the second body 9-1020, and the fourth segment 9-SG4 is connected to the fourth leading wire 9-1022 and the second body 9-1020.

As shown in FIG. 29, the second segment 9-SG2 is adjacent to the third segment 9-SG3, and the second leading wire 9-1012 and the third leading wire 9-1021 are adjacent to each other and extend in the same direction (such as the Y-axis).

The second segment 9-SG2 and the third segment 9-SG3 are disposed on an imaginary line 9-IL, and the imaginary line 9-IL has a straight structure or an arc structure. Based on the structural configuration of the present disclosure, the coil module 9-100 can have both a wireless transmitter assembly and a wireless receiver assembly at the same time, and can also achieve the advantages of miniaturization and simplified overall circuit.

The circuit module 9-190 includes a first circuit assembly 9-191 and a second circuit assembly 9-192. The first circuit assembly 9-191 includes at least one passive electronic component, such as a resistor or a capacitor. The first circuit assembly 9-191 is electrically connected to the first body 9-1010, and the first circuit assembly 9-191 has a first electrical contact 9-EC1 and a second electrical contact 9-EC2 which are respectively connected to the first leading wire 9-1011 and the second leading wire 9-1012, so as to be electrically connected to the first body 9-1010.

The second circuit assembly 9-192 includes at least one passive electronic component, such as a resistor or a capacitor. The second circuit assembly 9-192 has a third electrical contact 9-EC3 and a fourth electrical contact 9-EC4 which are respectively connected to the third leading wire 9-1021 and the fourth leading wire 9-1022, so as to be electrically connected to the second body 9-1020.

It is worth noting that, in this embodiment, the second electrical contact 9-EC2 is electrically connected to the third electrical contact 9-EC3. Specifically, the second electrical contact 9-EC2 and the third electrical contact 9-EC3 are the same electrical contact, but in other embodiments, they may be different electrical contacts.

The first circuit assembly 9-191 has a fifth electrical contact 9-EC5 and a sixth electrical contact 9-EC6, and the second circuit assembly 9-192 further has a seventh electrical contact 9-EC7 and an eighth electrical contact 9-EC8. The fifth electrical contact 9-EC5 to the eighth electrical contact 9-EC8 are electrically connected to a battery 9-180, and the first circuit assembly 9-191 and the second circuit assembly 9-192 are both disposed on a circuit board 9-170.

In this embodiment, the first coil assembly 9-101 is configured to perform a first function (such wireless charging), and the second coil assembly 9-102 is configured to perform a second function (such as Bluetooth communication). Furthermore, the first coil assembly 9-101 and the second coil assembly 9-102 can be connected in series or in parallel via the circuit module 9-190 to perform a third function. The third function can be, for example, near field communication (NFC), whose frequency band is different from the frequency band of Bluetooth communication. That is, the first function, the second function, and the third function are different.

In another embodiment, the first coil assembly 9-101 can be configured to receive energy from a first external circuit (not shown) outside the coil module 9-100 and input the energy to the battery 9-180, so as to charge the battery 9-180. In addition, the second coil assembly 9-102 can be configured to extract energy from the battery 9-180 and output the energy to a second external circuit (not shown) outside the coil module 9-100.

Figure 30:
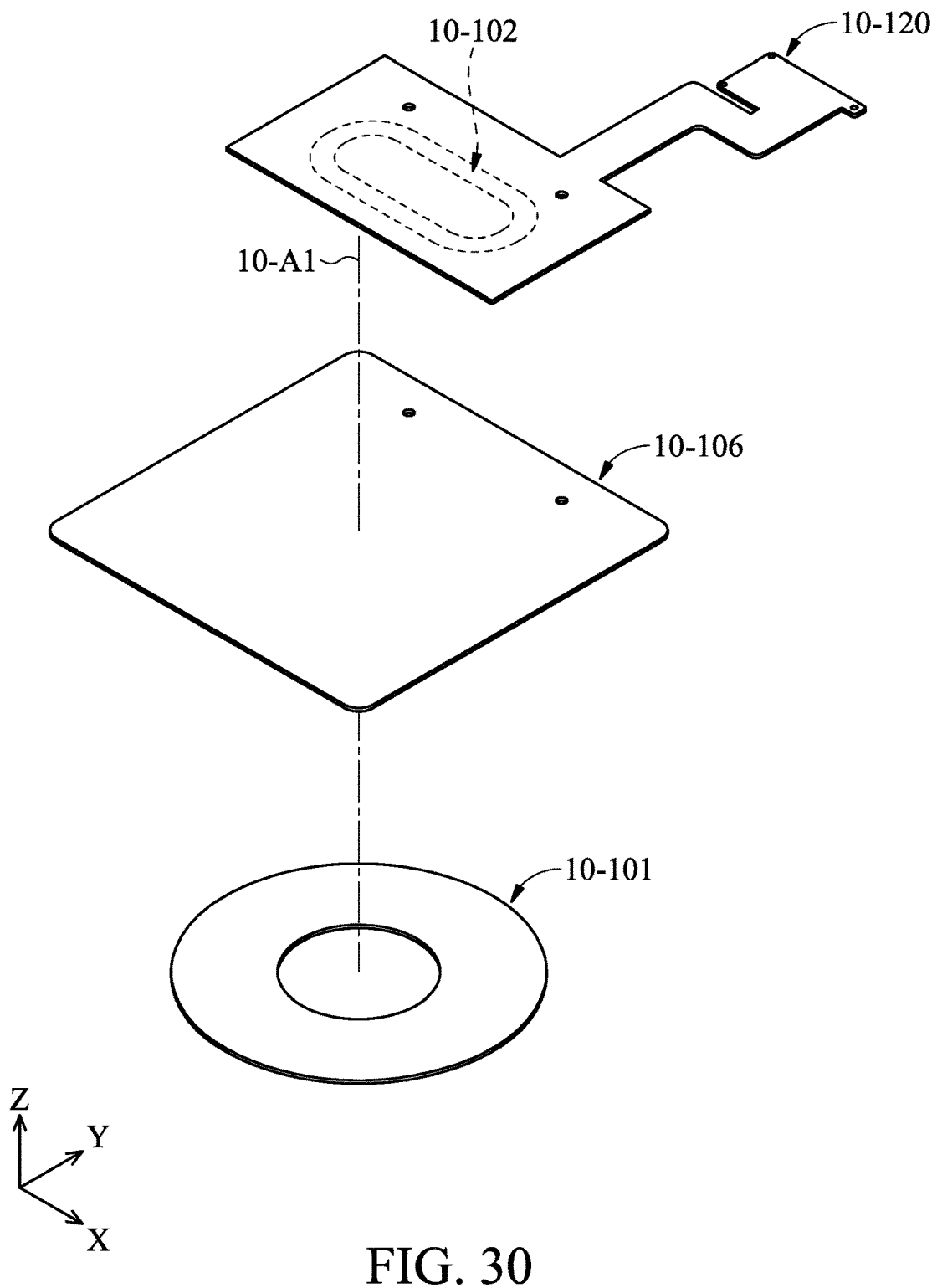
FIG. 30 is an exploded diagram of a coil module 10-100 according to another embodiment of the present disclosure.

Please refer to FIG. 30, which is an exploded diagram of a coil module 10-100 according to another embodiment of the present disclosure. The coil module 10-100 may include a first coil mechanism, and the first coil mechanism includes a first coil assembly 10-101, a second coil assembly 10-102, an induction substrate 10-106, and a circuit assembly 10-120.

In this embodiment, the circuit assembly 10-120, the induction substrate 10-106 and the first coil assembly 10-101 are arranged in a first direction 10-A1 in sequence. The first direction 10-A1 may be the extending direction of the winding axis of the first coil assembly 10-101.

Figure 31:
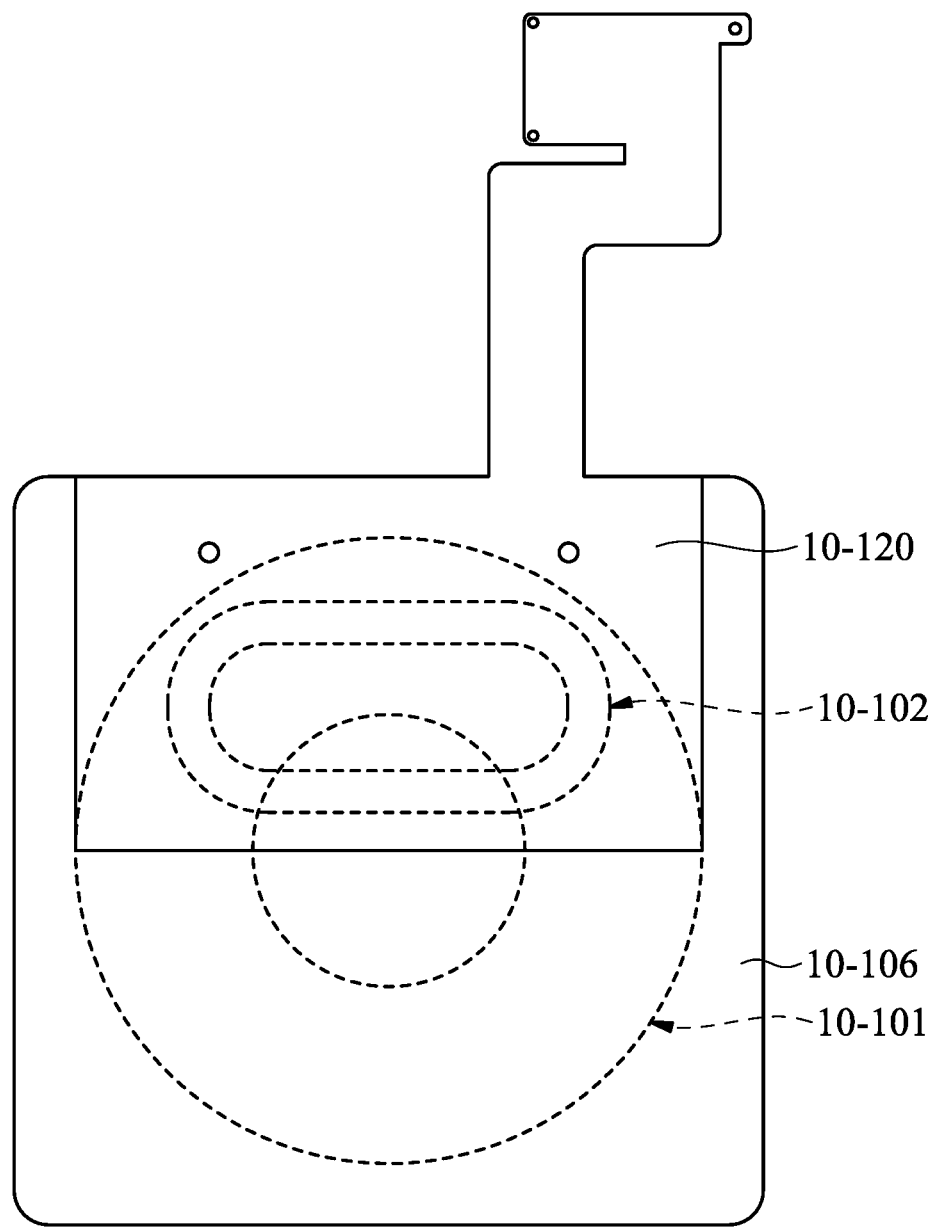
FIG. 31 is a top view of the coil module 10-100 after assembly according to an embodiment of the present disclosure.
Figure 32:
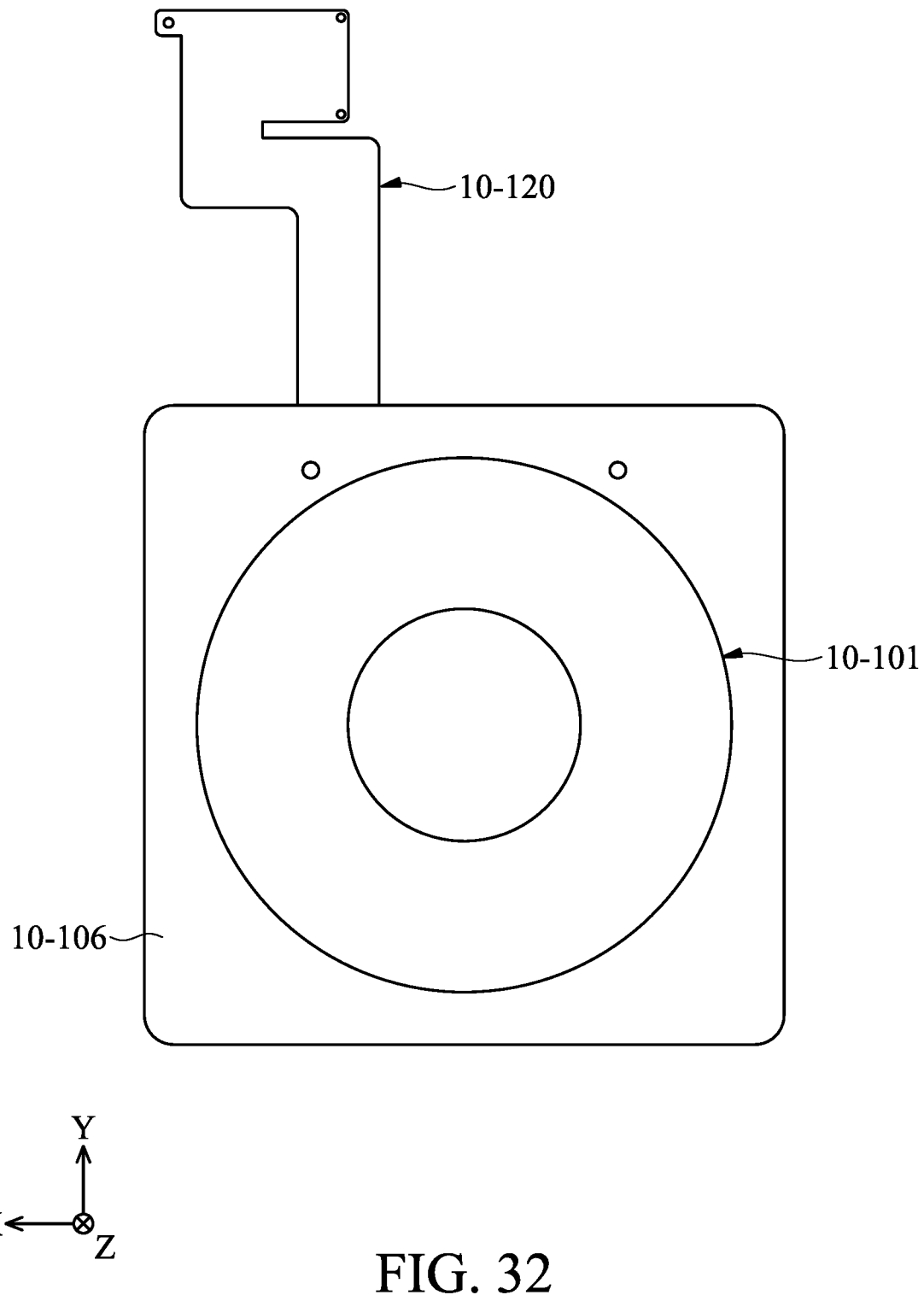
FIG. 32 is a bottom view of the coil module 10-100 after assembly according to an embodiment of the present disclosure.

Please refer to FIG. 30 to FIG. 32 together. FIG. 31 is a top view of the coil module 10-100 after assembly according to an embodiment of the present disclosure, and FIG. 32 is a bottom view of the coil module 10-100 after assembly according to an embodiment of the present disclosure. As shown in the figures, the second coil assembly 10-102 is disposed in the circuit assembly 10-120 (the first connection assembly).

The second coil assembly 10-102 is electrically independent of the first coil assembly 10-101, and the induction substrate 10-106 (the first base) is located between the first coil assembly 10-101 and the second coil assembly 10-102. When viewed in the first direction 10-A1, the first coil assembly 10-101 overlaps at least a portion of the second coil assembly 10-102.

Because the first coil assembly 10-101 and the second coil assembly 10-102 having different functions are disposed on different sides of the circuit assembly 10-120, the interference between these two coil assemblies can be reduced.

Figure 33:
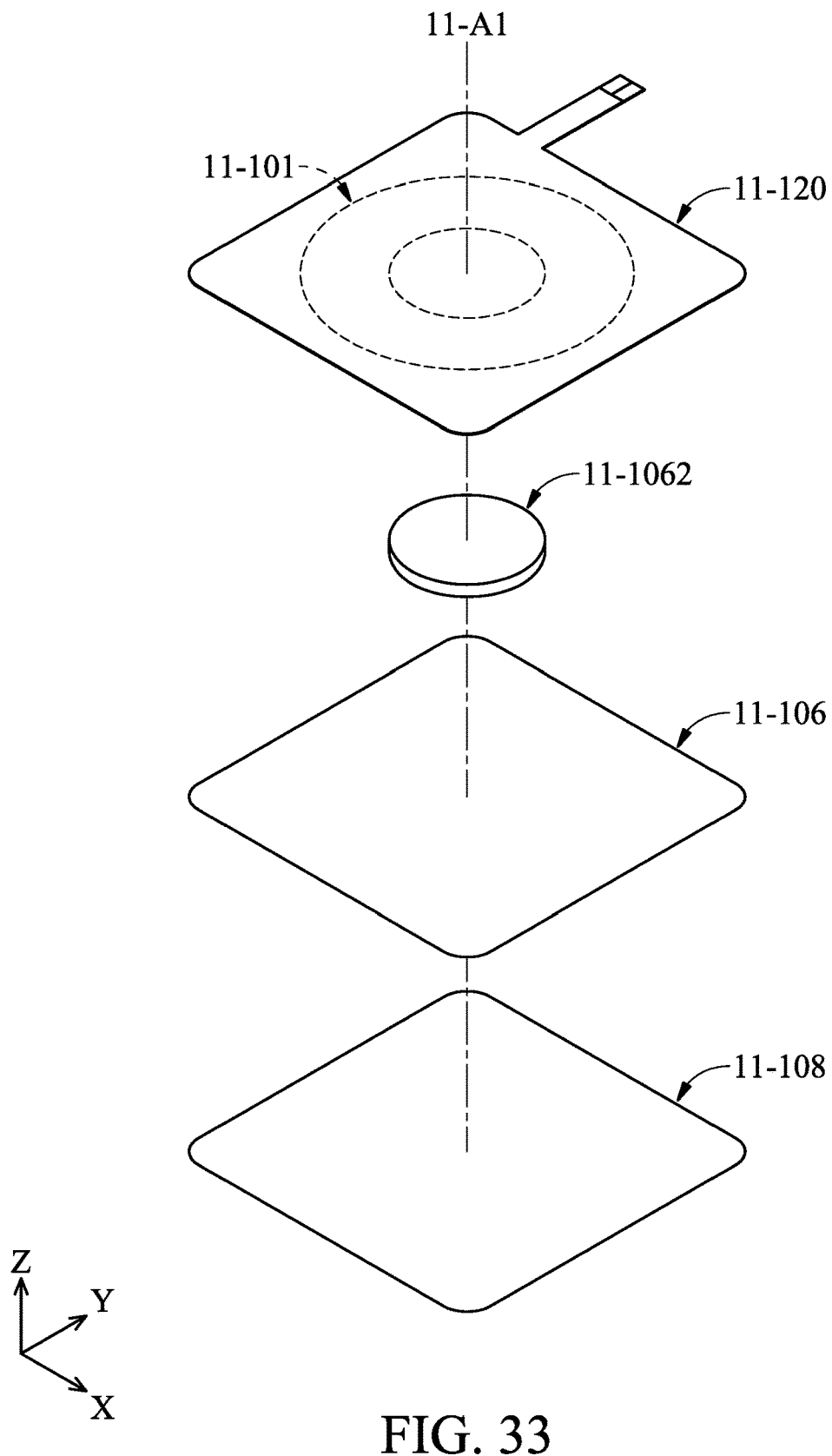
FIG. 33 is an exploded diagram of a coil module 11-100 according to another embodiment of the present disclosure.

Please refer to FIG. 33, which is an exploded diagram of a coil module 11-100 according to another embodiment of the present disclosure. The coil module 11-100 may include a first coil mechanism, and the first coil mechanism includes a first coil assembly 11-101, an adhesive layer 11-108, an induction substrate 11-106, a magnetic member 11-1062 and a circuit assembly 11-120.

In this embodiment, the circuit assembly 11-120, the magnetic member 11-1062, the induction substrate 11-106, and the adhesive layer 11-108 are arranged in a first direction 11-A1 in sequence. The first direction 11-A1 may be the extending direction of the winding axis of the first coil assembly 11-101.

Figure 34:
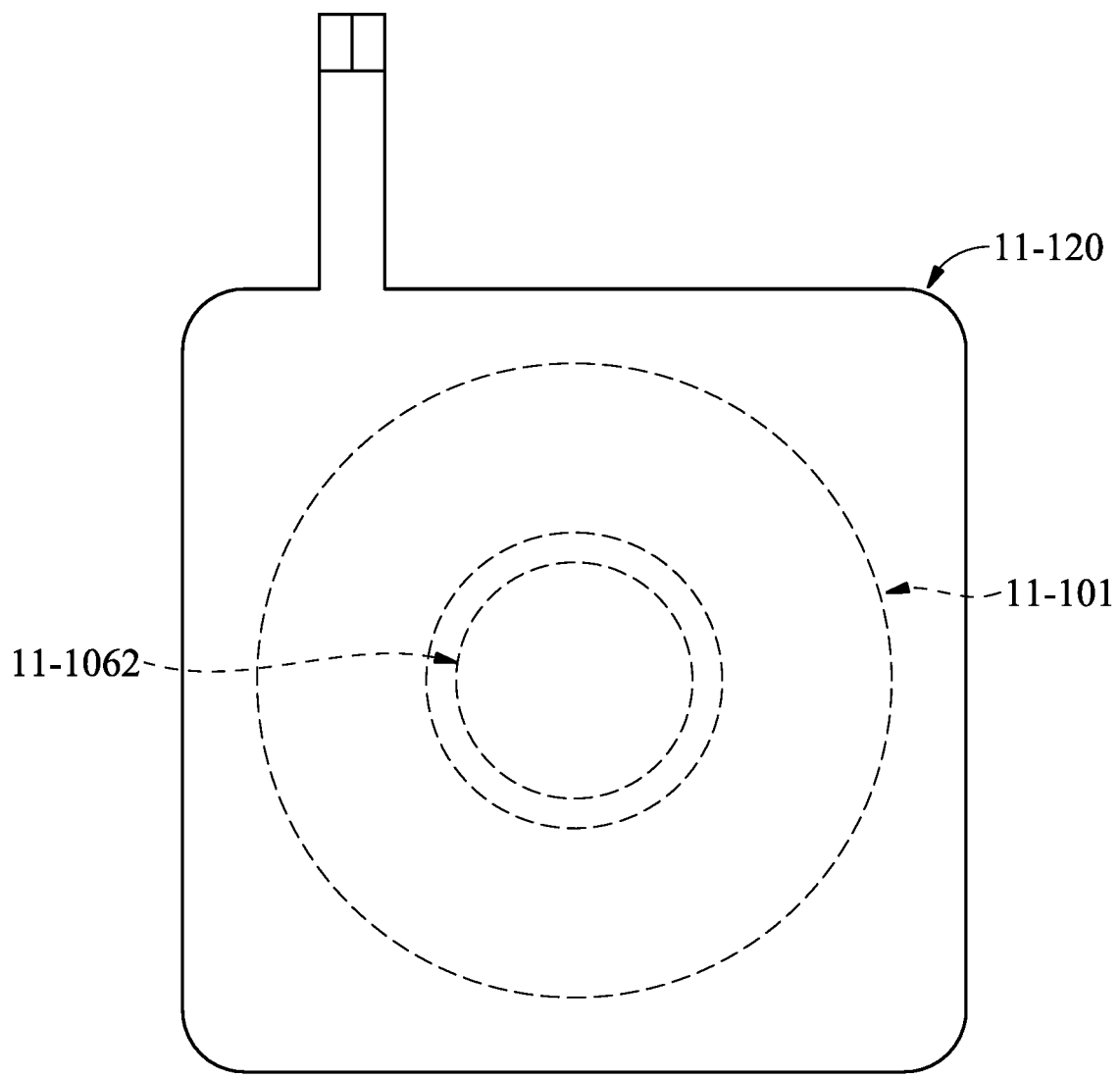
FIG. 34 is a top view of the coil module 11-100 after assembly according to an embodiment of the present disclosure.
Figure 35:
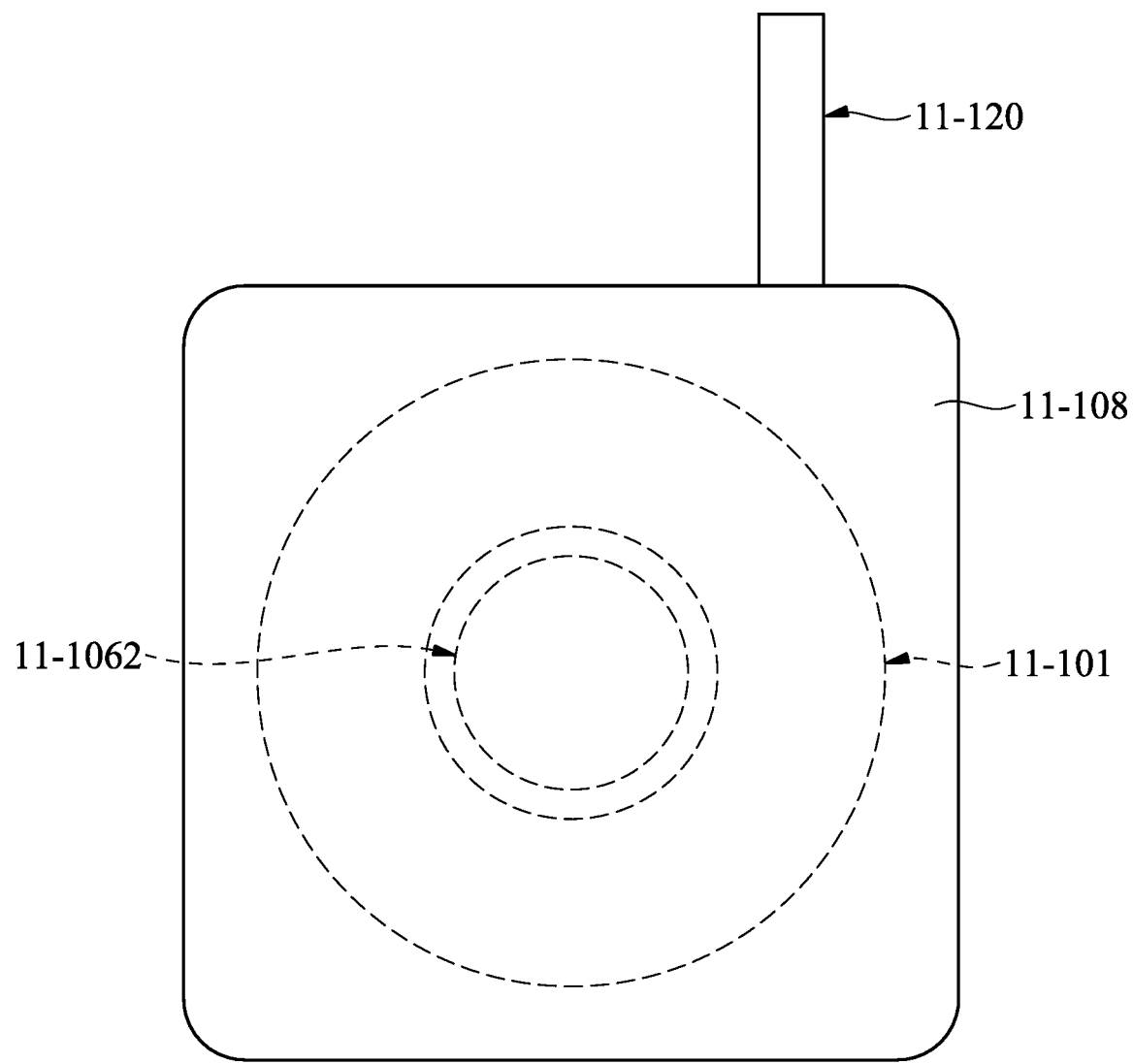
FIG. 35 is a bottom view of the coil module 11-100 after assembly according to an embodiment of the present disclosure.

Please also refer to FIG. 33 to FIG. 35 together. FIG. 34 is a top view of the coil module 11-100 after assembly according to an embodiment of the present disclosure, and FIG. 35 is a bottom view of the coil module 11-100 after assembly according to an embodiment of the present disclosure.

The circuit assembly 11-120 may be referred to as a first connection assembly, the adhesive layer 11-108 may be referred to as a first protection assembly, and the induction substrate 11-106 may be referred to as a first base. The circuit assembly 11-120 (the first connection assembly) is a flexible circuit board with flexibility, and the induction substrate 11-106 (the first base) is disposed between the circuit assembly 11-120 (the first connection assembly) and the adhesive layer 11-108 (the first protection assembly). The first coil assembly 11-101 is disposed in the circuit assembly 11-120 (the first connection assembly).

The magnetic member 11-1062 is disposed between the first coil assembly 11-101 and the induction substrate 11-106 (the first base), and when viewed in the first direction 11-A1, a portion of the circuit assembly 11-120 (the first connection assembly) overlaps the magnetic member 11-1062, and the first coil assembly 11-101 does not overlap the magnetic member 11-1062. Based on the structural design of this embodiment, the magnetic member 11-1062 can be protected and the mechanical strength of the coil module 11-100 can be improved.

Figure 36:
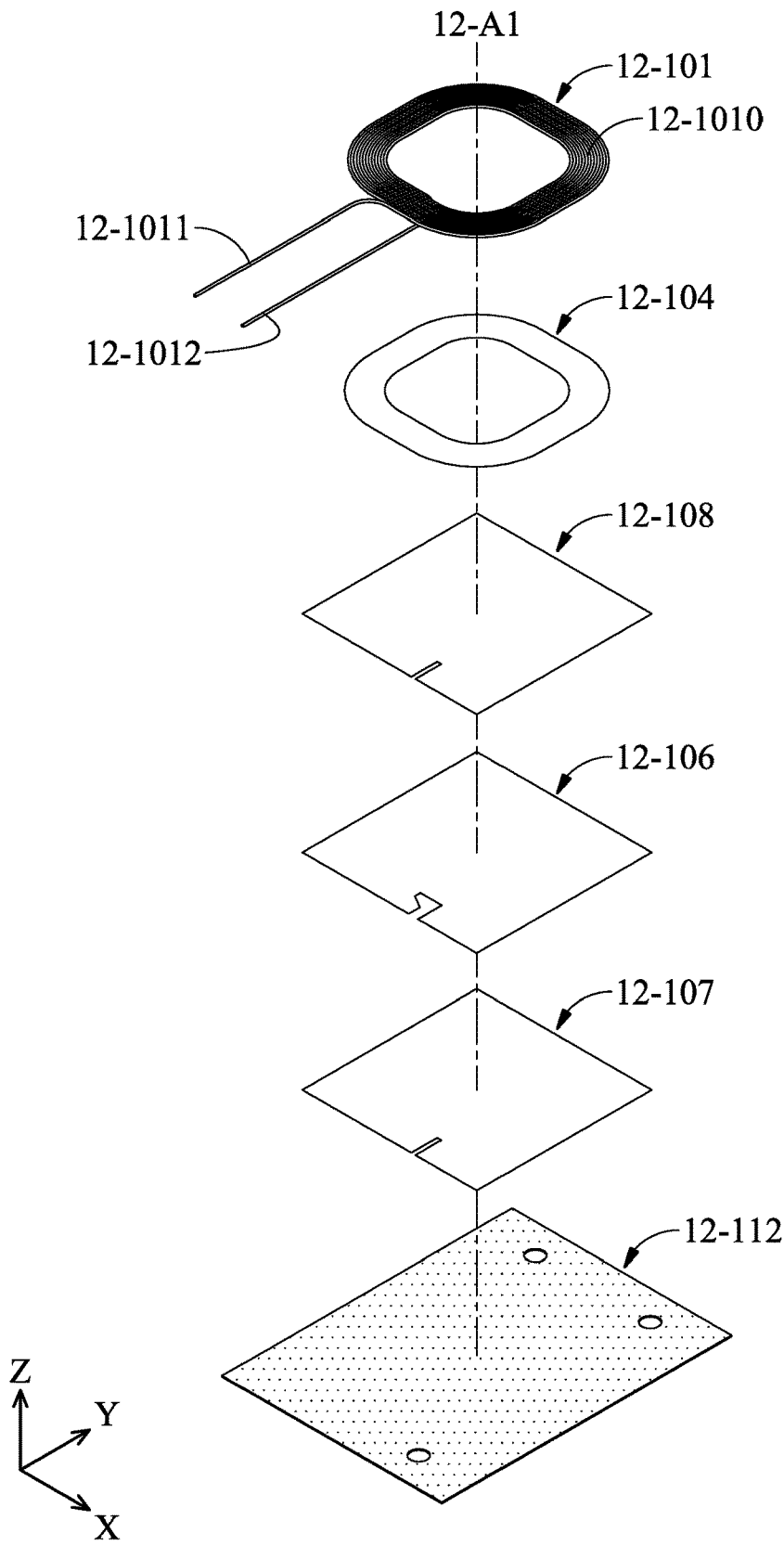
FIG. 36 is an exploded diagram of a coil module 12-100 according to an embodiment of the present disclosure.

Please refer to FIG. 36, which is an exploded diagram of a coil module 12-100 according to an embodiment of the present disclosure. As shown in FIG. 36, the coil module 12-100 is a coil module that can be used for transmitting energy or signals. The coil module 12-100 may include a first coil mechanism. The first coil mechanism may include a first coil assembly 12-101, an adhesive layer 12-104, an adhesive layer 12-107, an adhesive layer 12-108, an induction substrate 12-106 and a protection element 12-112.

In this embodiment, the first coil assembly 12-101, the adhesive layer 12-104, the adhesive layer 12-108, the induction substrate 12-106, the adhesive layer 12-107 and the protection element 12-112 are arranged in a first direction 12-A1 in sequence. The first direction 12-A1 may be the extending direction of a winding axis of the first coil assembly 12-101.

In this embodiment, the first coil assembly 12-101 can serve as a charging coil to be wireless charged by an external charging device. For example, the first coil assembly 12-101 can operate as a resonant charging coil based on the standard of the Alliance for Wireless Power (A4WP), but it is not limited thereto. In addition, the first coil assembly 12-101 can operate as an inductive charging coil based on the standard of Wireless Power Consortium (WPC), such as the Qi standard. Therefore, the first coil assembly 12-101 can respond to different forms of charging so as to enlarge the range of applications in this embodiment. For example, in the case of a close distance (for example, 1 cm or less), the inductive type operation is used; and at a long distance, a resonance type operation is used.

In this embodiment, the first coil assembly 12-101 can also serve as a communication coil, for example, operating in a Near Field Communication (NFC) mode to communicate with external electronic devices.

In this embodiment, the induction substrate 12-106 is disposed adjacent to the coil assembly, and the induction substrate 12-106 is configured to change the electromagnetic field distribution near the coil assembly. The induction substrate 12-106 may be a ferrite, but it is not limited thereto. For example, in other embodiments, the induction substrate 12-106 may also include a nanocrystalline material. The induction substrate 12-106 may have a magnetic permeability corresponding to the coil assemblies so that the electromagnetic waves of the coil assemblies can be more concentrated.

The adhesive layer 12-104, the adhesive layer 12-107 and the adhesive layer 12-108 may be double-sided adhesive tape or single-sided adhesive tape to adhere to one or two adjacent elements. In some embodiments, one or more of the adhesive layer 12-104, the adhesive layer 12-107 and the adhesive layer 12-108 may be made of polyethylene terephthalate (PET), but it is not limited thereto.

In this embodiment, the induction substrate 12-106 may be referred to as a first base, the adhesive layer 12-104 or the adhesive layer 12-107 may be referred to as a first adhesive assembly, and the protection element 12-112 may be referred to as a first separating element.

The first coil assembly 12-101 has a winding axis parallel to the first direction 12-A1. The induction substrate 12-106 is configured to support the first coil assembly 12-101. The adhesive layer 12-104 is disposed on the first coil assembly 12-101, and the adhesive layer 12-107 is disposed on the induction substrate 12-106. The protective element 12-112 (the first separating element) is disposed on the adhesive layer 12-107, and the protective element 12-112 is configured to be separated when the coil module 12-100 is disposed on an external electronic device (not shown in the figures), so that the coil module 12-100 is directly fixed to the external electronic device by the adhesive layer 12-107.

Figure 37:
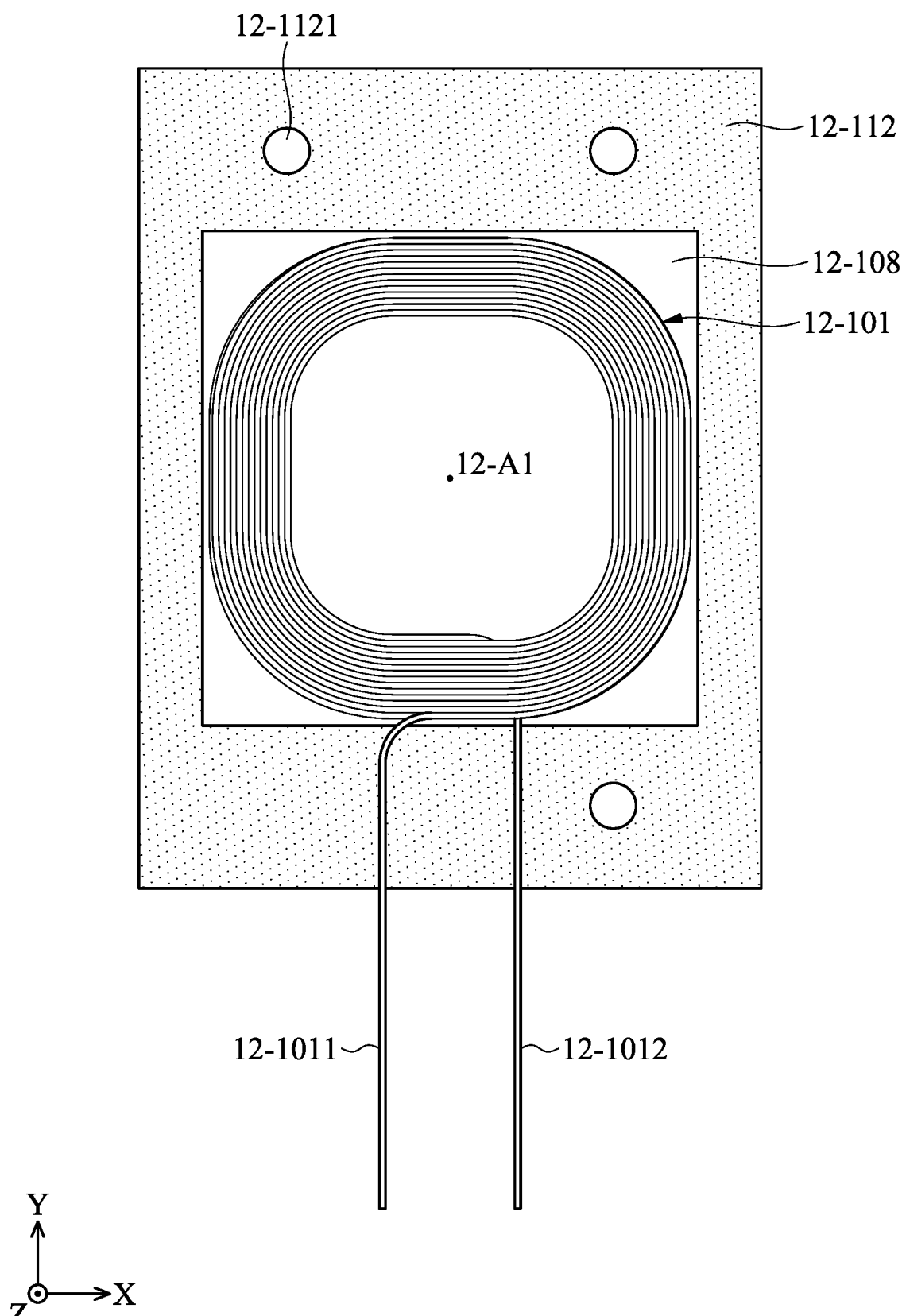
FIG. 37 is a top view of the coil module 12-100 after assembly according to an embodiment of the present disclosure.
Figure 38:
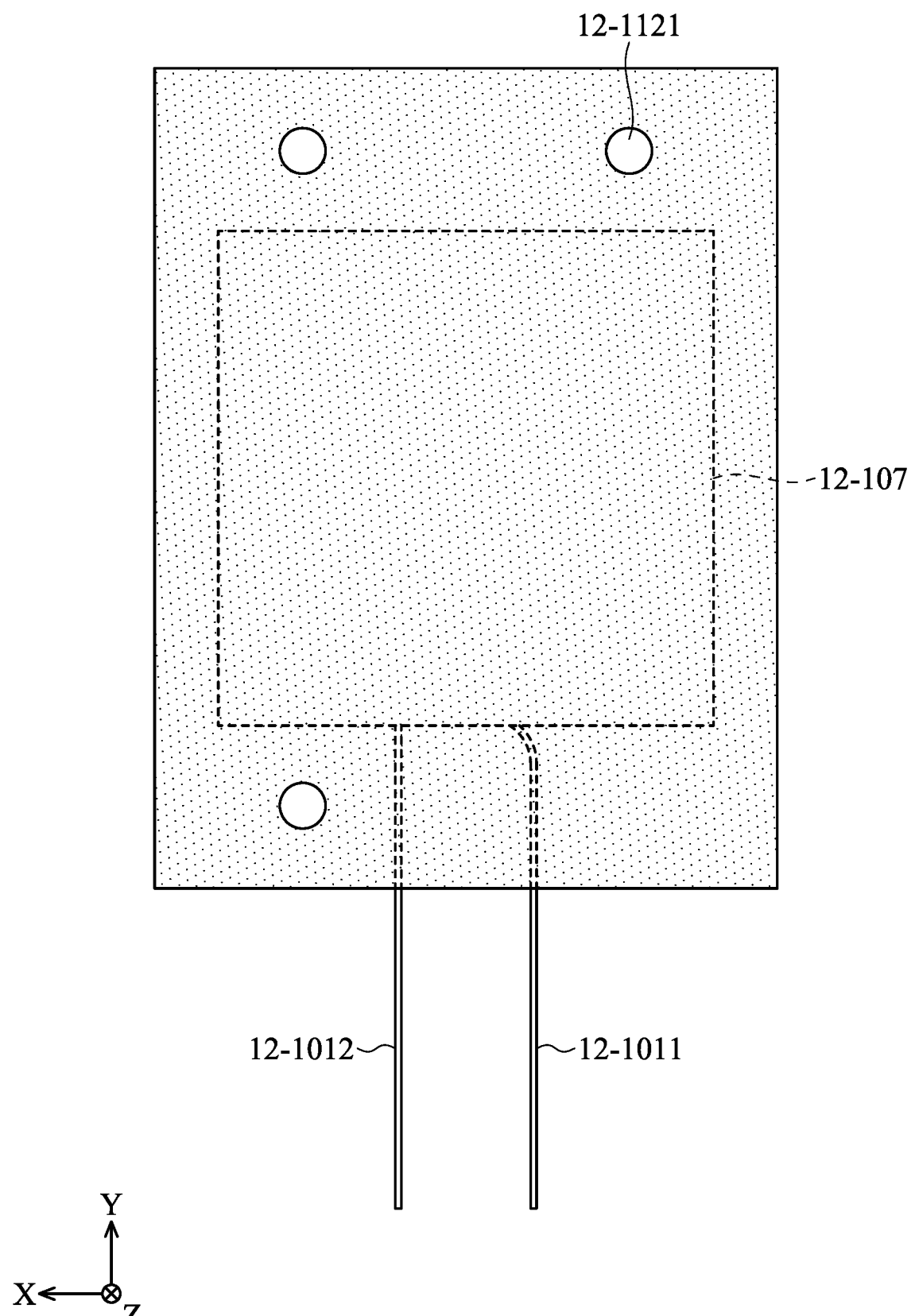
FIG. 38 is a bottom view of the coil module 12-100 after assembly according to an embodiment of the present disclosure.

Please also refer to FIG. 36 to FIG. 38. FIG. 37 is a top view of the coil module 12-100 after assembly according to an embodiment of the present disclosure, and FIG. 38 is a bottom view of the coil module 12-100 after assembly according to an embodiment of the present disclosure. As shown in the figures, the first coil assembly 12-101 includes a first body 12-1010, a first leading wire 12-1011, and a second leading wire 12-1012.

Furthermore, the protection element 12-112 (the first separating element) may include one or more perforations 12-1121, and when viewed in the first direction 12-A1 (the direction of the winding axis), as shown in FIG. 37, the perforations 12-1121 do not overlap the first coil assembly 12-101.

Specifically, the winding axis overlaps the first direction 12-A1, and a part of the first coil assembly 12-101 is disposed between the perforation 12-1121 and the winding axis. The perforation 12-1121 can be used to position the coil module 12-100 when the coil module 12-100 is installed in an external electronic device.

Figure 39:
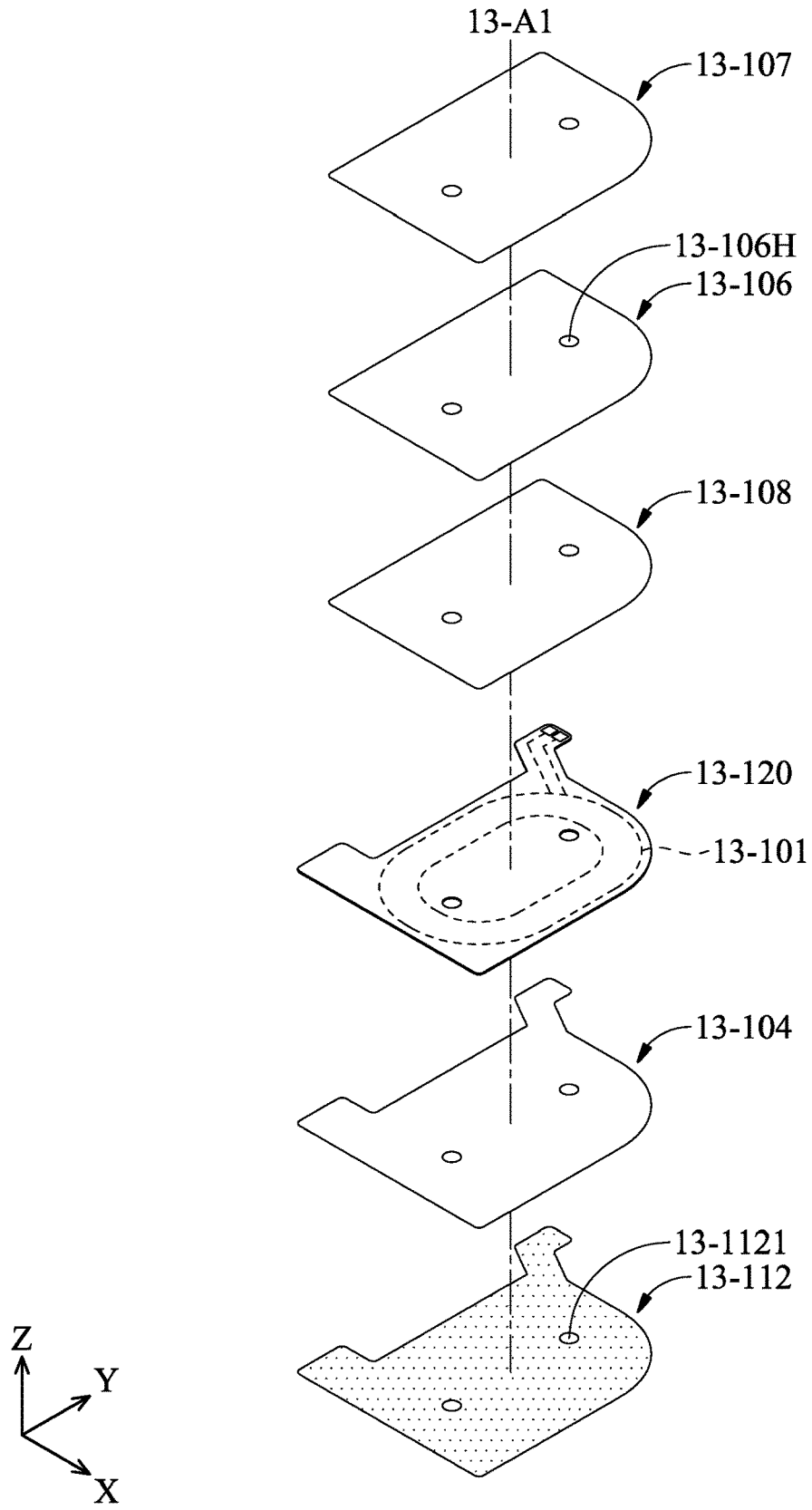
FIG. 39 is an exploded diagram of a coil module 13-100 according to another embodiment of the present disclosure.

Please refer to FIG. 39, which is an exploded diagram of a coil module 13-100 according to another embodiment of the present disclosure. The coil module 13-100 is similar to the coil module 12-100. The coil module 13-100 may include a first coil mechanism. The first coil mechanism includes a first coil assembly 13-101, an adhesive layer 13-104, an adhesive layer 13-107, an adhesive layer 13-108, an induction substrate 13-106, a protection element 13-112 and a circuit assembly 13-120.

In this embodiment, the adhesive layer 13-107, the induction substrate 13-106, the adhesive layer 13-108, the circuit assembly 13-120, the adhesive layer 13-104, and the protection element 13-112 are arranged in a first direction 13-A1 in sequence. The first direction 13-A1 may be the extending direction of the winding axis of the first coil assembly 13-101.

In this embodiment, the first coil assembly 13-101 can serve as a charging coil to be wireless charged by an external charging device. The first coil assembly 13-101 can serve as a communication coil, for example, operating in near field communication (NFC) mode to communicate with external electronic devices.

This embodiment is similar to the previous embodiment, and the components with the same name have the same function, so they are not repeated in this embodiment.

Figure 40:
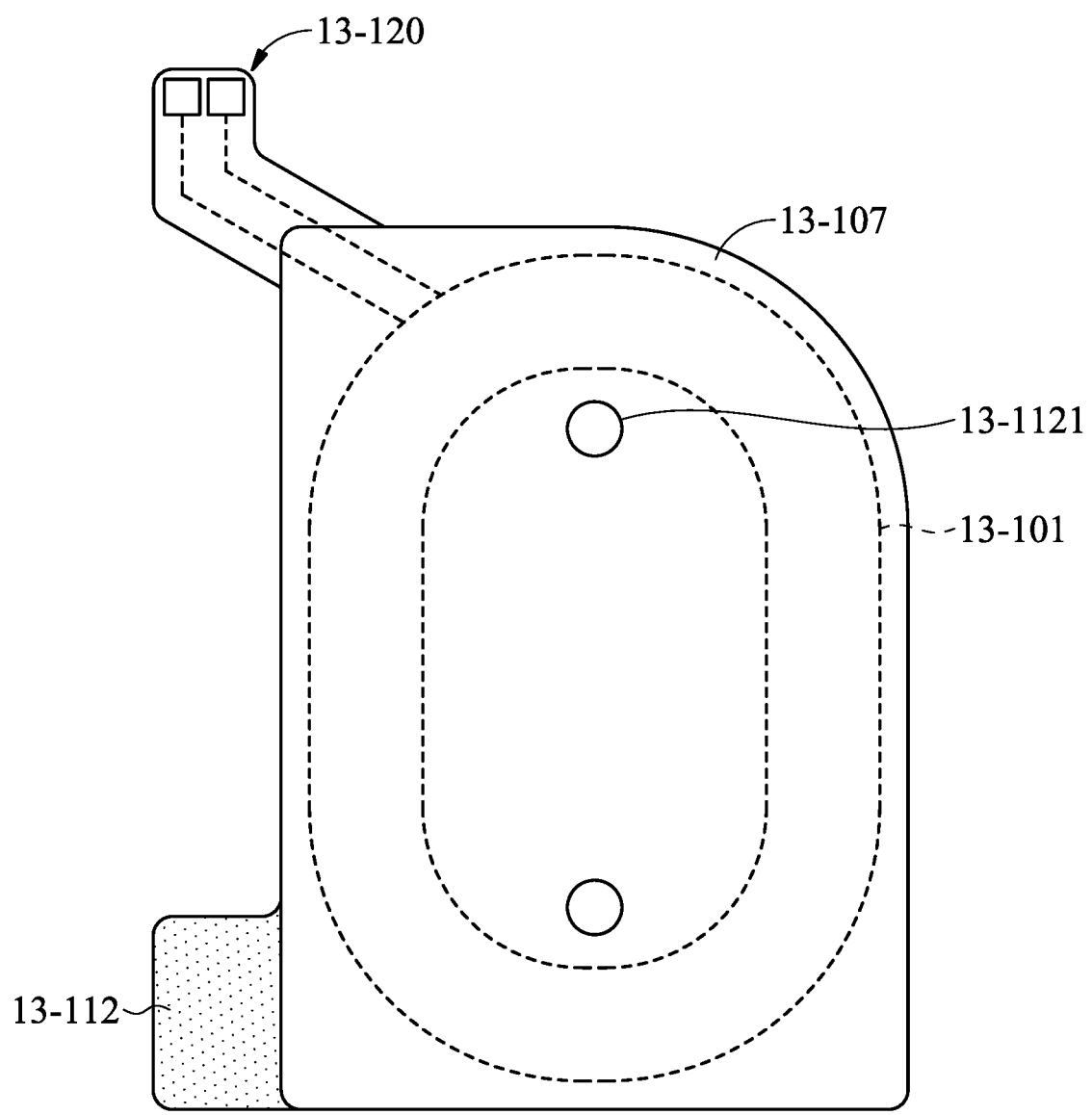
FIG. 40 is a top view of the coil module 13-100 after assembly according to an embodiment of the present disclosure.
Figure 41:
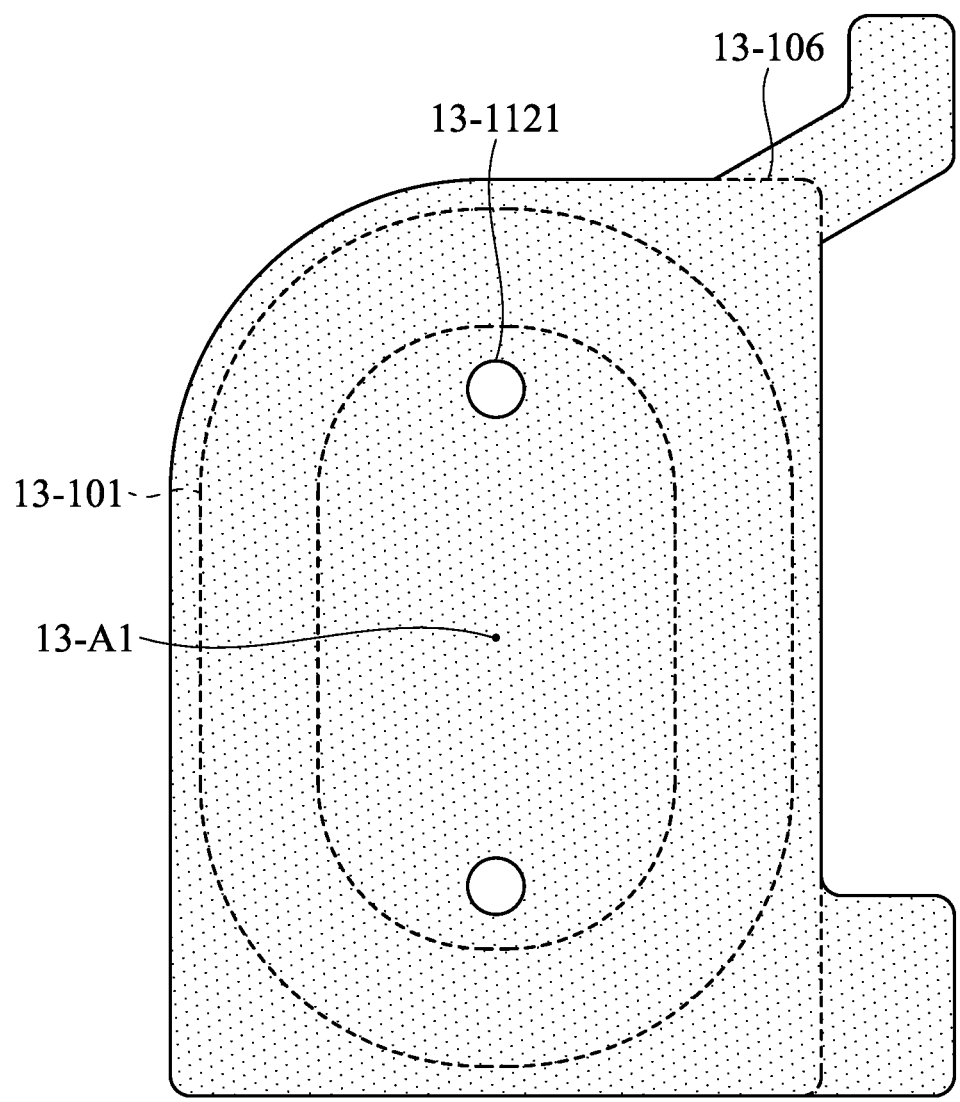
FIG. 41 is a bottom view of the coil module 13-100 after assembly according to an embodiment of the present disclosure.

Please also refer to FIG. 39 to FIG. 41. FIG. 40 is a top view of the coil module 13-100 after assembly according to an embodiment of the present disclosure, and FIG. 41 is a bottom view of the coil module 13-100 after assembly according to an embodiment of the present disclosure. As shown in the figures, the first coil assembly 13-101 is disposed in the circuit assembly 13-120 (the first connection assembly).

Similar to the previous embodiment, the protection element 13-112 may include two perforations 13-1121. As shown in FIG. 40 and FIG. 41, the perforations 13-1121 are disposed between the first coil assembly 13-101 and the first direction 13-A1 (the winding axis).

Furthermore, the induction substrate 13-106 (the first base) further includes two through holes 13-106H corresponding to two perforations 13-1121. When viewed in the first direction 13-A1 (the direction of the winding axis), the perforations 13-1121 partially or completely overlap the through holes 13-106H.

In addition to the induction substrate 13-106 and the protection element 13-112, other components of the coil module 13-100 also have corresponding openings, corresponding to the perforations 13-1121, so that the coil module 13-100 may be easily positioned.

Figure 42:
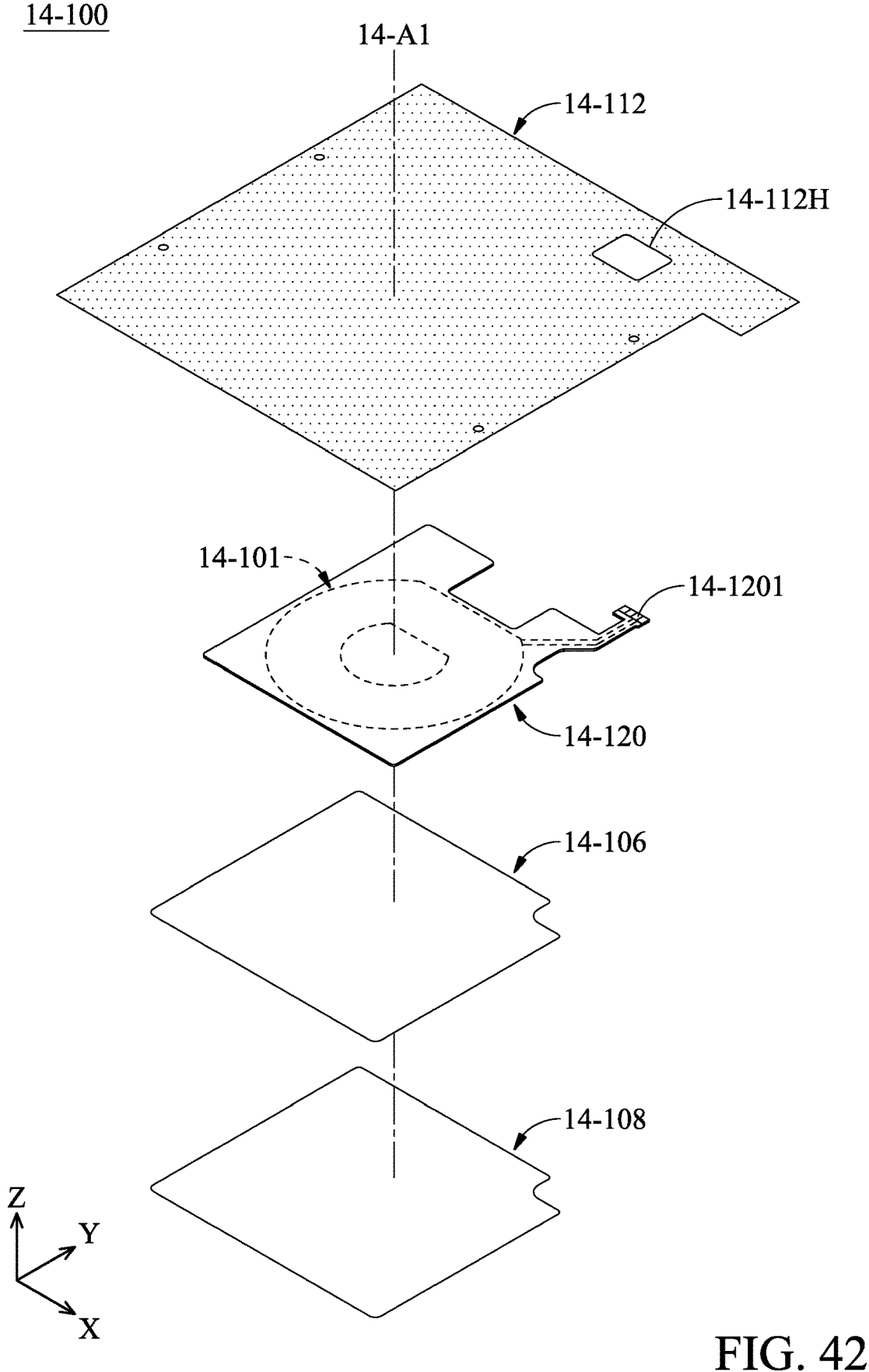
FIG. 42 is an exploded diagram of a coil module 14-100 according to another embodiment of the present disclosure.

Please refer to FIG. 42, which is an exploded diagram of a coil module 14-100 according to another embodiment of the present disclosure. The coil module 14-100 may include a first coil mechanism, and the first coil mechanism includes a first coil assembly 14-101, an adhesive layer 14-108, an induction substrate 14-106, a protection element 14-112 and a circuit assembly 14-120.

In this embodiment, the protection element 14-112, the first coil assembly 14-101, the circuit assembly 14-120, the induction substrate 14-106 and the adhesive layer 14-108 are arranged in a first direction 14-A1 in sequence. The first direction 14-A1 may be the extending direction of the winding axis of the first coil assembly 14-101.

Figure 43:
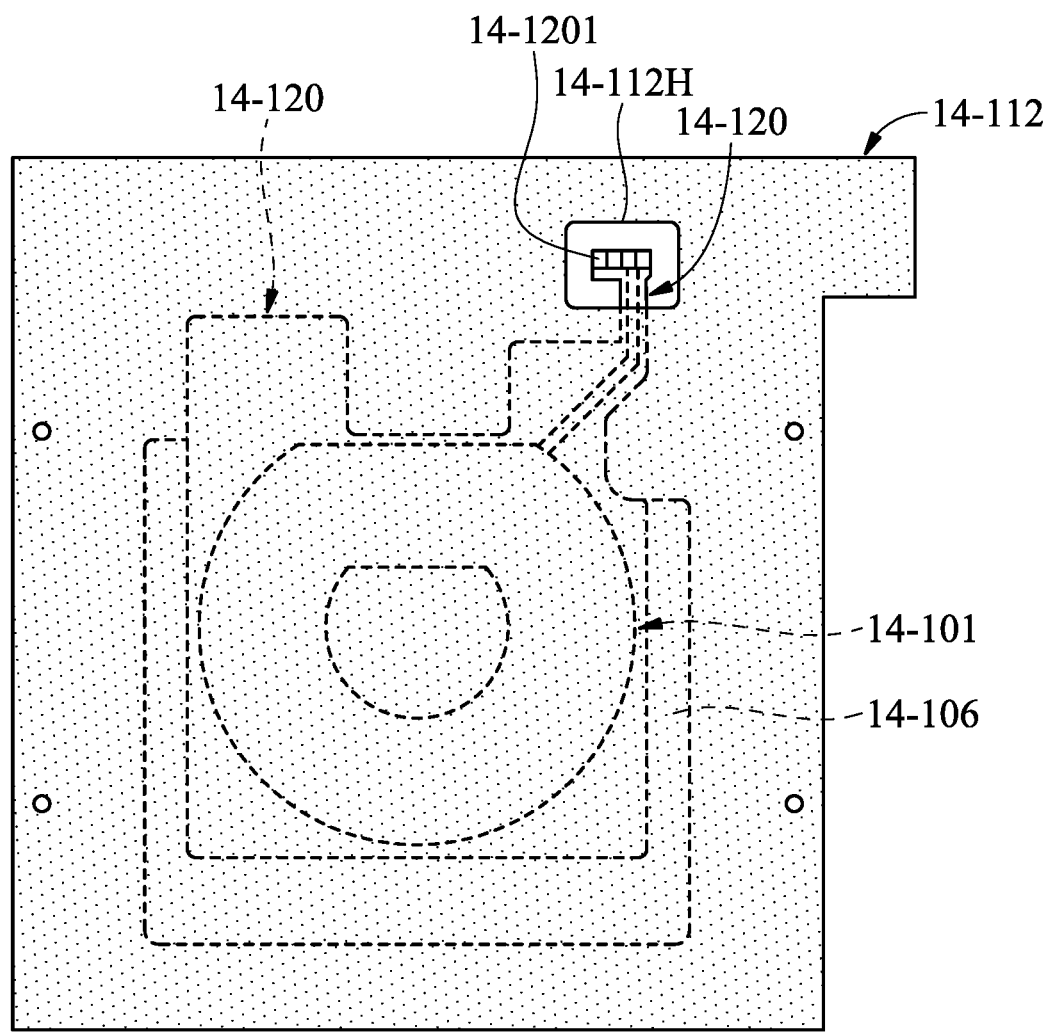
FIG. 43 is a top view of the coil module 14-100 after assembly according to an embodiment of the present disclosure.
Figure 44:
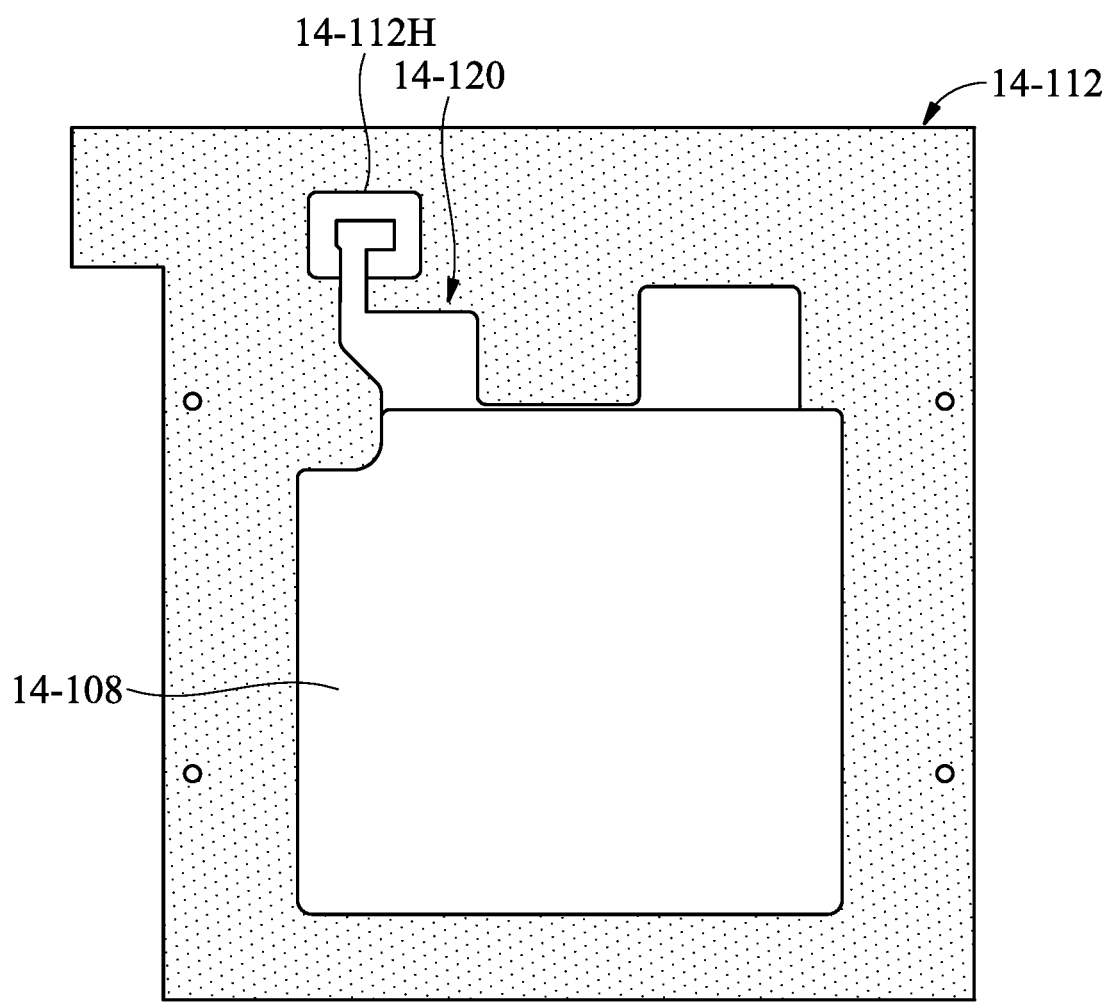
FIG. 44 is a bottom view of the coil module 14-100 after assembly according to an embodiment of the present disclosure.

Please refer to FIG. 42 to FIG. 44 together. FIG. 43 is a top view of the coil module 14-100 after assembly according to an embodiment of the present disclosure, and FIG. 44 is a bottom view of the coil module 14-100 after assembly according to an embodiment of the present disclosure. As shown in the figures, the first coil assembly 14-101 is disposed in the circuit assembly 14-120 (the first connection assembly).

In this embodiment, the protection element 14-112 (the first separating element) may have an opening 14-112H corresponding to one or more electrical contacts 14-1201 of the circuit assembly 14-120 (the first connection assembly). When viewed in the first direction 14-A1 (the Z-axis, the direction of the winding axis), the opening 14-112H partially or completely overlaps the electrical contacts 14-1201.

The first coil assembly 14-101 is disposed in the circuit assembly 14-120, and at least two electrical contacts 14-1201 are electrically connected to the first coil assembly 14-101, so that the first coil assembly 14-101 is tested by the electrical contacts 14-1201. It is worth noting that because the electrical contacts 14-1201 are exposed from the opening 14-112H, the first coil assembly 14-101 can still be tested before the coil module 14-100 is installed in an external electronic device and the protection element 14-112 is removed.

Figure 45:
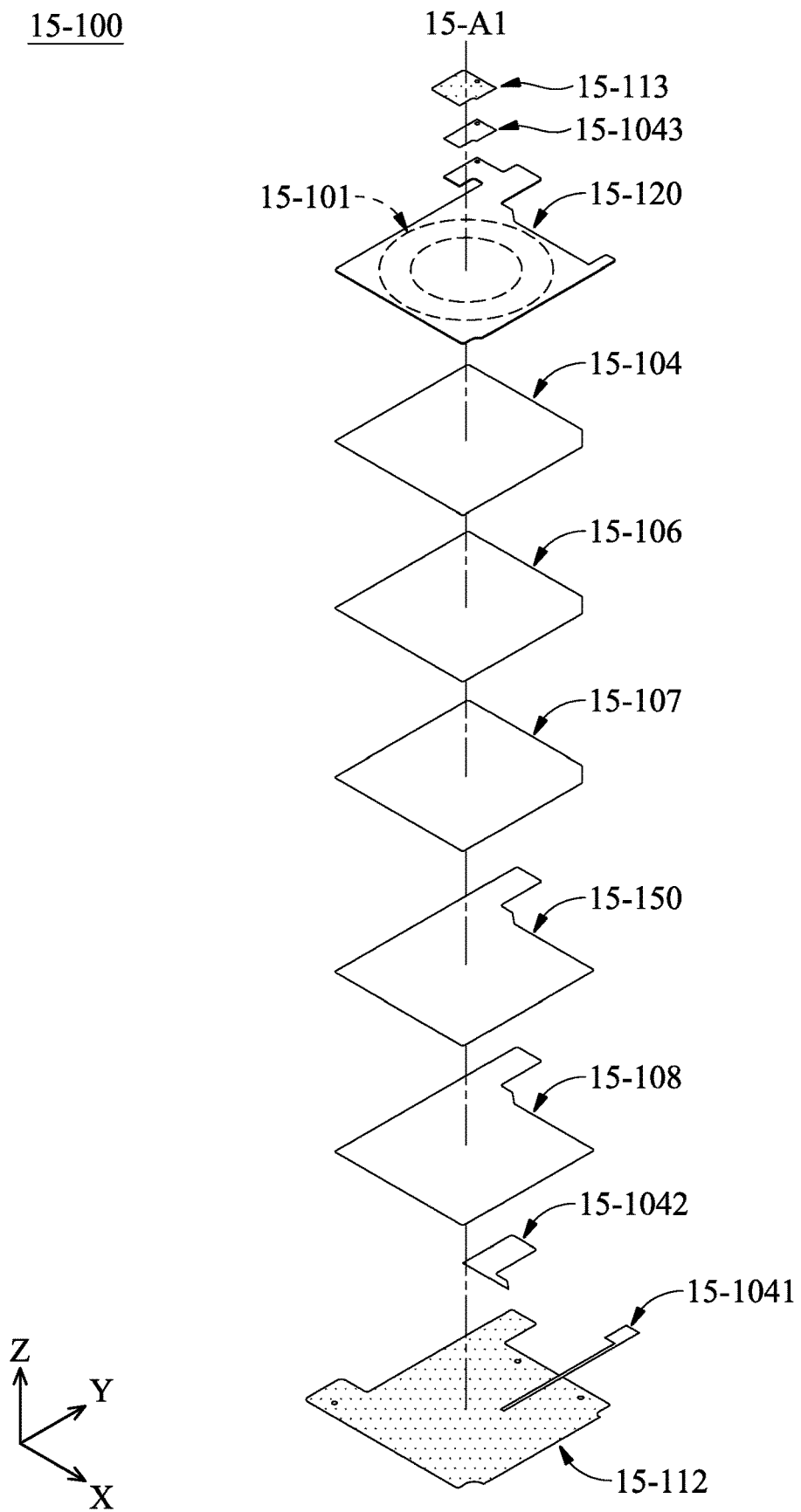
FIG. 45 is an exploded diagram of a coil module 15-100 according to another embodiment of the present disclosure.

Please refer to FIG. 45, which is an exploded diagram of a coil module 15-100 according to another embodiment of the present disclosure. The coil module 15-100 may include a first coil mechanism, and the first coil mechanism includes a first coil assembly 15-101, an adhesive layer 15-104, an adhesive layer 15-107, an adhesive layer 15-108, an reinforcement element 15-150, an induction substrate 15-106, a protection element 15-112 and a circuit assembly 15-120.

In this embodiment, the circuit assembly 15-120, the adhesive layer 15-104, the induction substrate 15-106, the adhesive layer 15-107, the reinforcement element 15-150, the adhesive layer 15-108 and the protection element 15-112 are arranged in a first direction 15-A1 in sequence. The first direction 15-A1 may be the extending direction of the winding axis of the first coil assembly 15-101.

Please also refer to FIG. 45 to FIG. 47. FIG. 46 is a top view of the coil module 15-100 after assembly according to an embodiment of the present disclosure, and FIG. 47 is a bottom view of the coil module 15-100 after assembly according to an embodiment of the present disclosure. As shown in the figures, the first coil assembly 15-101 is disposed in the circuit assembly 15-120 (the first connection assembly).

In this embodiment, the first coil mechanism may further include a plurality of first adhesive assemblies (such as an adhesive layer 15-1041 and an adhesive layer 15-1042), the adhesive layer 15-1041 and the adhesive layer 15-1042 are separated from each other and both are disposed on a surface of the protection element 15-112 (the first separating element), such as on the upper surface (FIG. 10).

The first coil mechanism may further include a protection element 15-113 (the second separating element), and the protection element 15-112 (the first separating element) and the protection element 15-113 (the second separating element) are respectively disposed on opposite sides of the first coil assembly 15-101.

In addition, the first coil mechanism further includes a second adhesive assembly (such as an adhesive layer 15-1043) disposed between the protection element 15-113 (the second separating element) and the circuit assembly 15-120 (including the first coil assembly 15-101). In addition, when viewed in the first direction 15-A1 (the direction of the winding axis), the first adhesive assembly and the second adhesive assembly do not overlap. Furthermore, the first separating element and the second separating element do not overlap.

In this embodiment, the reinforcement element 15-150 may be made of graphite, but it is not limited thereto. Based on the structural configuration of the coil module 15-100 of the present disclosure, it can reduce costs, achieve local miniaturization, and improve mechanical strength.

Figure 48:
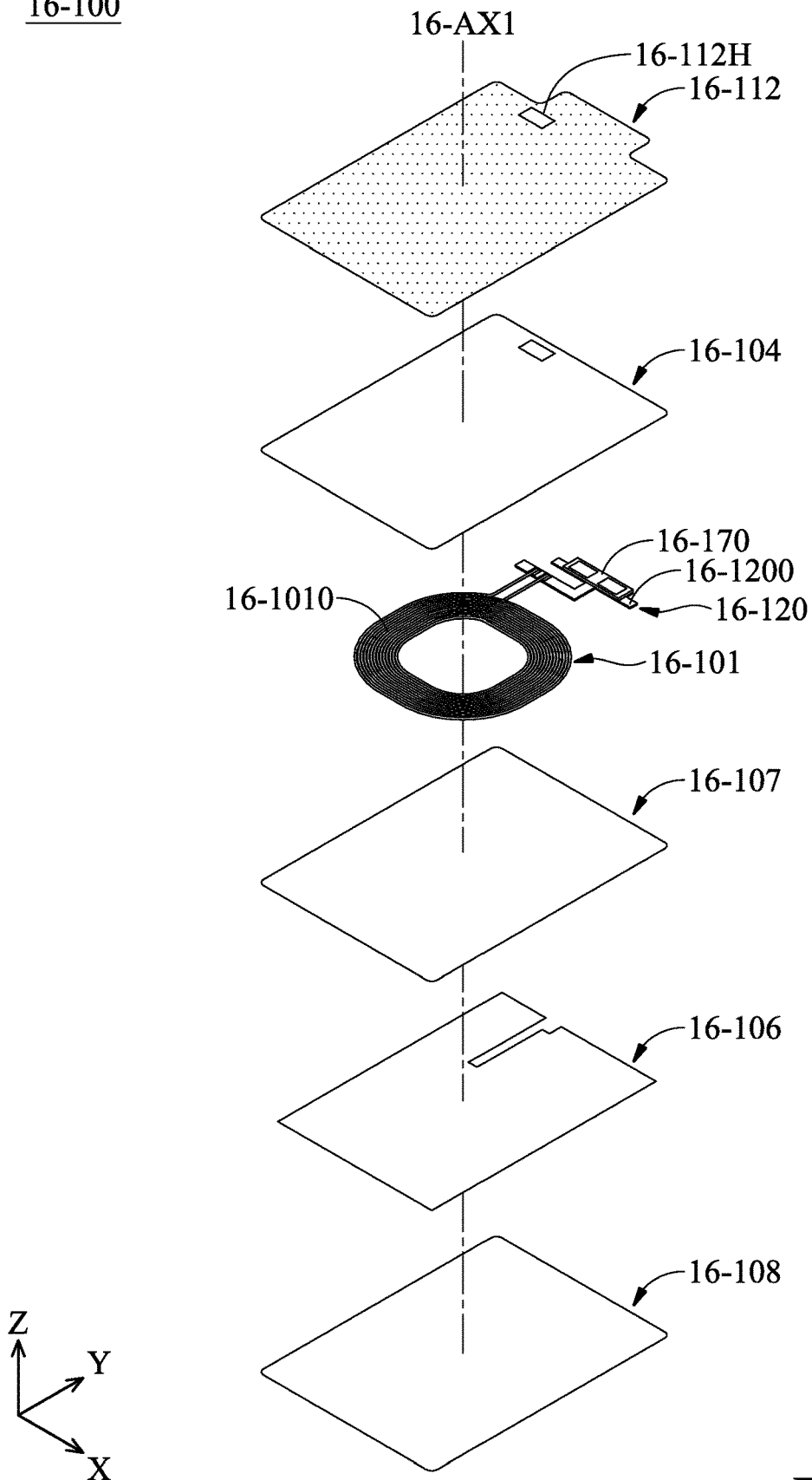
FIG. 48 is an exploded diagram of a coil module 16-100 according to another embodiment of the present disclosure.

Please refer to FIG. 48, which is an exploded diagram of a coil module 16-100 according to another embodiment of the present disclosure. The coil module 16-100 may include a first coil mechanism, and the first coil mechanism includes a first coil assembly 16-101, an adhesive layer 16-104, an adhesive layer 16-107, an adhesive layer 16-108, an induction substrate 16-106, a protection element 16-112 and a circuit assembly 16-120.

In this embodiment, the protection element 16-112, the adhesive layer 16-104, the circuit assembly 16-120, the first coil assembly 16-101, the adhesive layer 16-107, the induction substrate 16-106 and the adhesive layer 16-108 are arranged along a first winding axis 16-AX1 of the first coil assembly 16-101 in sequence.

Figure 49:
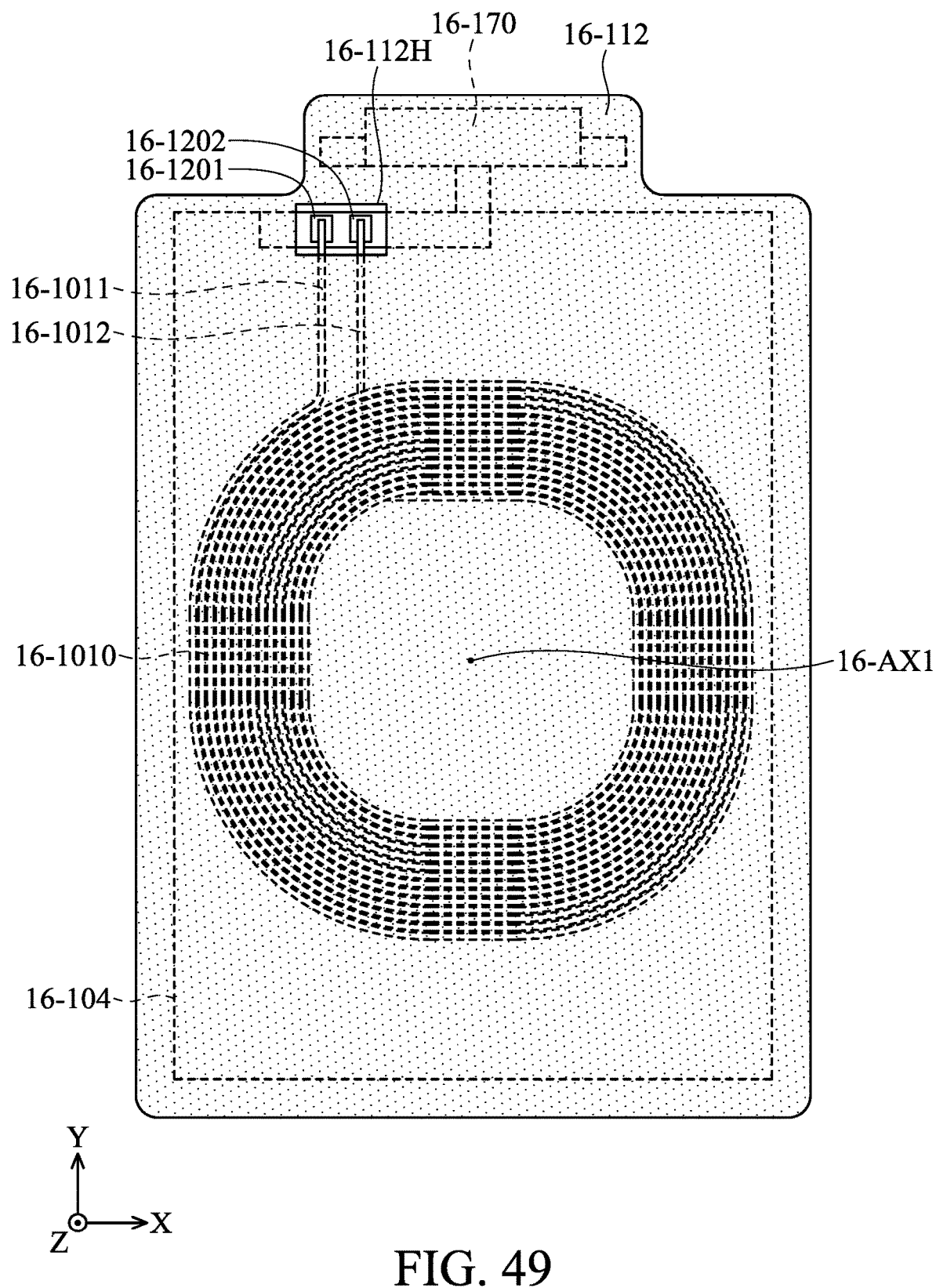
FIG. 49 is a top view of the coil module 16-100 after assembly according to an embodiment of the present disclosure.
Figure 50:
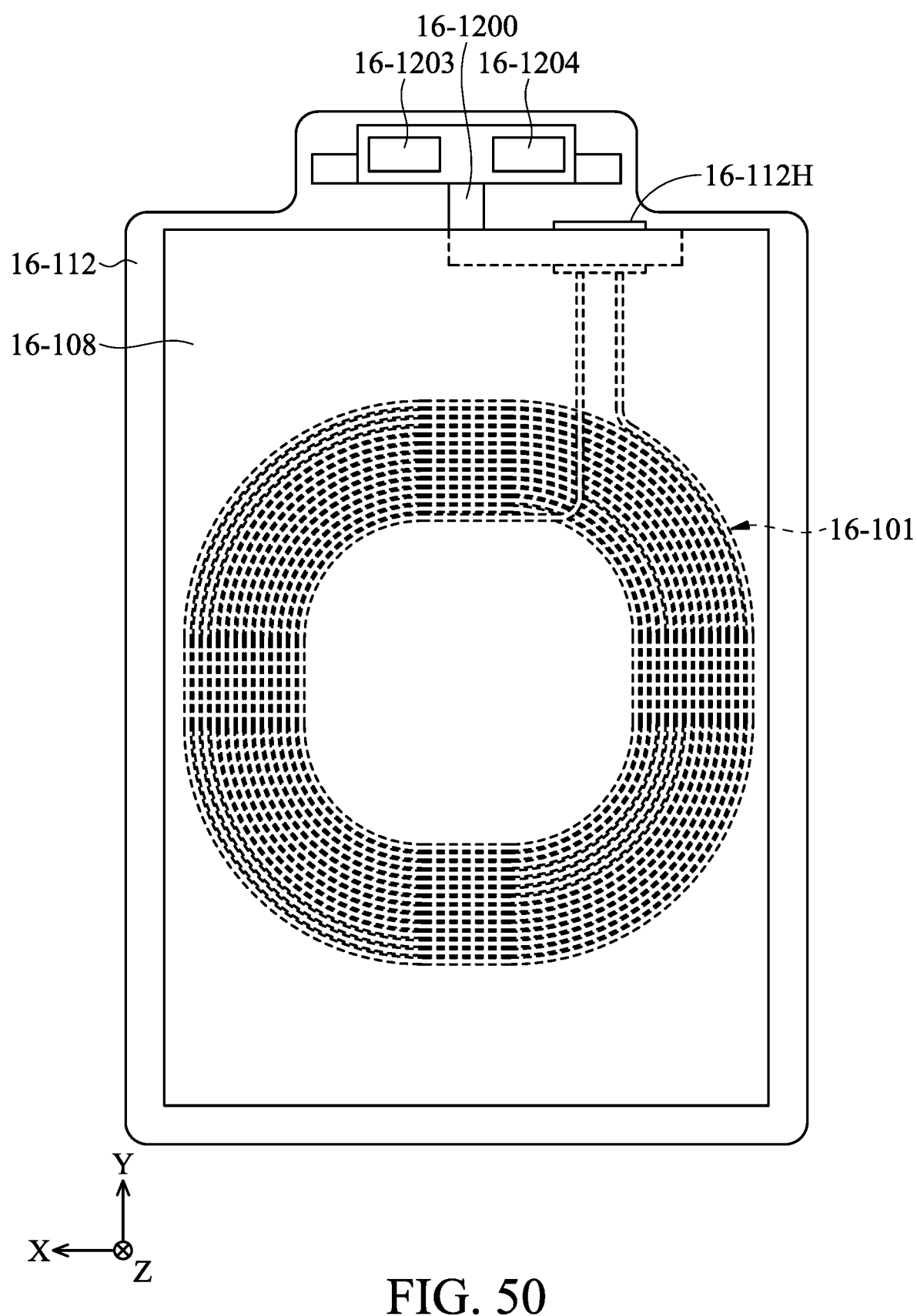
FIG. 50 is a bottom view of the coil module 16-100 after assembly according to an embodiment of the present disclosure.

Please refer to FIG. 48 to FIG. 50 together. FIG. 49 is a top view of the coil module 16-100 after assembly according to an embodiment of the present disclosure, and FIG. 50 is a bottom view of the coil module 16-100 after assembly according to an embodiment of the present disclosure. The first coil assembly 16-101 has a first coil body 16-1010, a first leading wire 16-1011 and a second leading wire 16-1012. The first coil body 16-1010 is wound around the first winding axis 16-AX1, the first leading wire 16-1011 and the second leading wire 16-1012 are connected to the first coil body 16-1010, and the first coil body 16-1010, the first leading wire 16-1011 and the second leading wire 16-1012 are both formed by a wire.

The circuit assembly 16-120 (the first connection assembly) may have a body 16-1200, a plurality of circuit members, two first electrical contacts and two second electrical contacts. The circuit members (not shown) are circuit wires and are embedded in the body 16-1200. The first leading wire 16-1011 and the second leading wire 16-1012 are respectively connected to the first electrical contact 16-1201 and the first electrical contact 16-1202, so as to be electrically connected to the circuit members.

The first electrical contact 16-1201 and the first electrical contact 16-1202 are respectively electrically connected to the second electrical contact 16-1203 and the second electrical contact 16-1204, and the circuit members can be electrically connected to an external circuit via the second electrical contact 16-1203 and the second electrical contact 16-1204.

In this embodiment, the body 16-1200 may have a positioning structure 16-170 corresponding to a fixed structure of an electronic device or a positioning jig (not shown in the figures).

The adhesive layer 16-104 (the first adhesive assembly) is disposed between the protection element 16-112 (the first separating element) and the first coil assembly 16-101. The protection element 16-112 (the first separating element) is configured to be separated when the coil module 16-100 is installed in an external electronic device, so that the adhesive layer 16-104 (the first adhesive assembly) affixes the coil module 16-100 directly onto the external electronic device.

The protection element 16-112 may include an opening 16-112H corresponding to the first electrical contacts 16-1201, 16-1202, and when viewed along the first winding axis 16-AX1, the opening 16-112H partially overlaps the first electrical contacts 16-1201 and 16-1202.

Based on the structural configuration of this embodiment, advantages such as simplifying the procedure of positioning assembly and miniaturized circuit assembly can be achieved.

Figure 51:
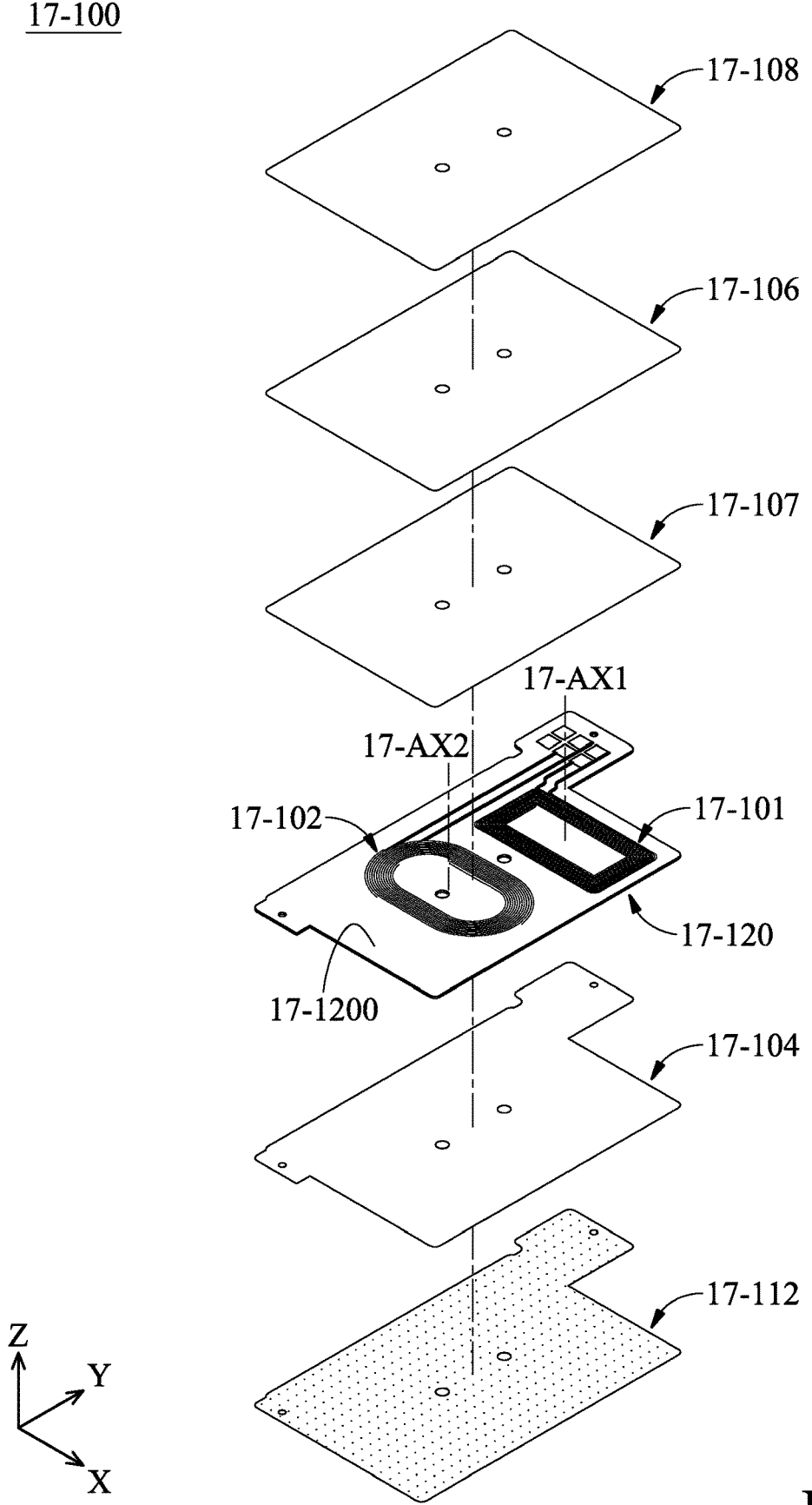
FIG. 51 is an exploded view of a coil module 17-100 according to another embodiment of the present disclosure.

Please refer to FIG. 51, which is an exploded view of a coil module 17-100 according to another embodiment of the present disclosure. The coil module 17-100 may include a first coil mechanism, and the first coil mechanism includes a first coil assembly 17-101, a second coil assembly 17-102, an adhesive layer 17-104, an adhesive layer 17-107, an adhesive layer 17-108, an induction substrate 17-106, a protection element 17-112 and a circuit assembly 17-120.

In this embodiment, the adhesive layer 17-108, the induction substrate 17-106, the adhesive layer 17-107, the circuit assembly 17-120, the adhesive layer 17-104, and the protection element 17-112 are arranged along a first winding axis 17-AX1 of the first coil assembly 17-101 is in sequence.

Figure 52:
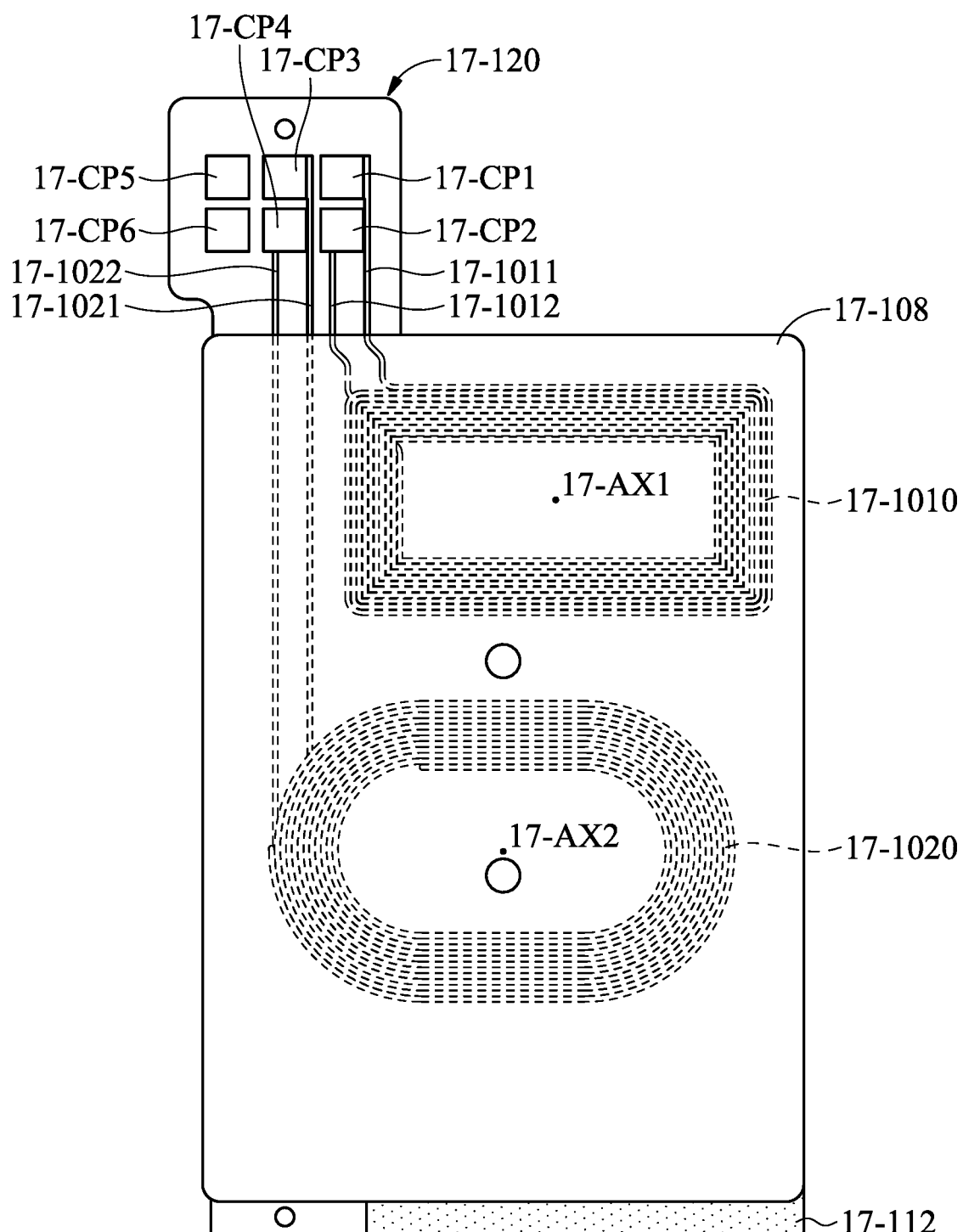
FIG. 52 is a top view of the coil module 17-100 after assembly according to an embodiment of the present disclosure.
Figure 53:
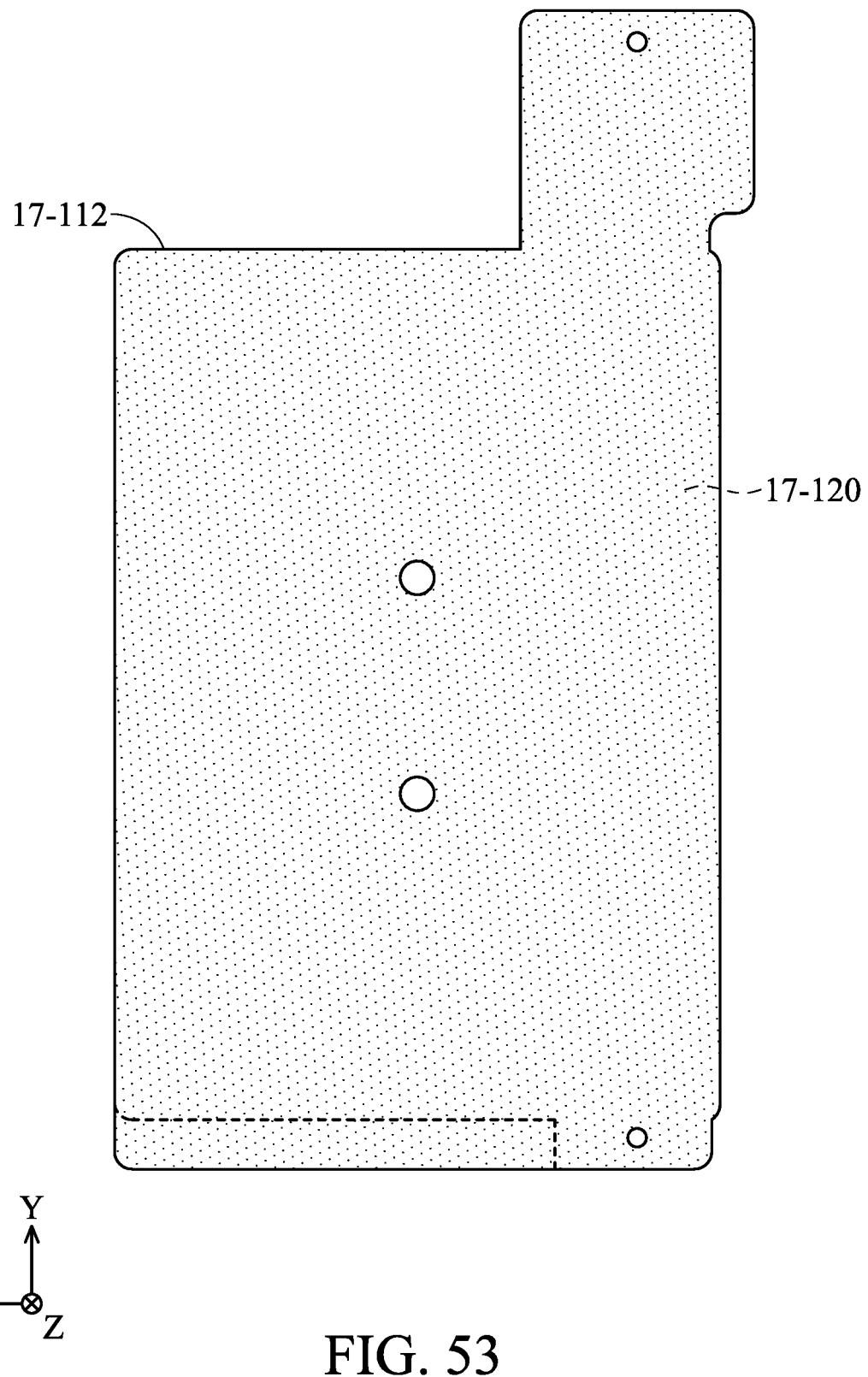
FIG. 53 is a bottom view of the coil module 17-100 after assembly according to an embodiment of the present disclosure.

Please also refer to FIG. 51 to FIG. 53. FIG. 52 is a top view of the coil module 17-100 after assembly according to an embodiment of the present disclosure, and FIG. 53 is a bottom view of the coil module 17-100 after assembly according to an embodiment of the present disclosure. The first coil assembly 17-101 and the second coil assembly 17-102 are disposed in the circuit assembly 17-120 (the first connection assembly). The first coil assembly 17-101 and the second coil assembly 17-102 can perform different functions, such as wireless charging and wireless communication.

The first coil assembly 17-101 includes a first coil body 17-1010, a first leading wire 17-1011, and a second leading wire 17-1012. The second coil assembly 17-102 includes a second coil body 17-1020, a third leading wire 17-1021, and a fourth leading wire 17-1022.

The second coil body 17-1020 is wound around a second winding axis 17-AX2, and the second winding axis 17-AX2 is parallel to the first winding axis 17-AX1. As shown in FIG. 52, the first winding axis 17-AX1 does not pass through the range surrounded by the second coil assembly 17-102 and the second coil body 17-1020.

It is worth noting that the first coil body 17-1010 and the second coil body 17-1020 are disposed on the same plane, such as on the same layer in the circuit assembly 17-120. Based on this structural design, miniaturization can be achieved and the interference between the first coil assembly 17-101 and the second coil assembly 17-102 can be reduced.

The circuit assembly 17-120 (the first connection assembly) is similar to the circuit assembly 16-120 of the foregoing embodiment. The circuit assembly 17-120 includes a body 17-1200, and circuit lines (the circuit members) are disposed in the body 17-1200. A plurality of electrical contacts 17-CP1~17-CP6 is disposed on the body 17-1200. The electrical contact 17-CP1 and the electrical contact 17-CP2 are respectively connected to the first leading wire 17-1011 and the second leading wire 17-1012, and the electrical contact 17-CP3 and the electrical contact 17-CP4 are respectively connected to the third leading wire 17-1021 and the fourth leading wire 17-1022.

The electrical contact 17-CP5 and the electrical contact 17-CP6 can serve as fixing contacts for being connected to an external electronic device (the external circuit). In some embodiments, the electrical contact 17-CP5 and the electrical contact 17-CP6 are electrically independent of the circuit members in the circuit assembly 17-120, the first coil assembly 17-101 and the second coil assembly 17-102.

For example, the electrical contact 17-CP5 and the electrical contact 17-CP6 may be metal pads, which may be connected to the external electronic device by soldering, welding, or a conductive adhesive. Based on the design of the fixing contacts, positioning accuracy and mechanical strength can be improved.

Figure 54:
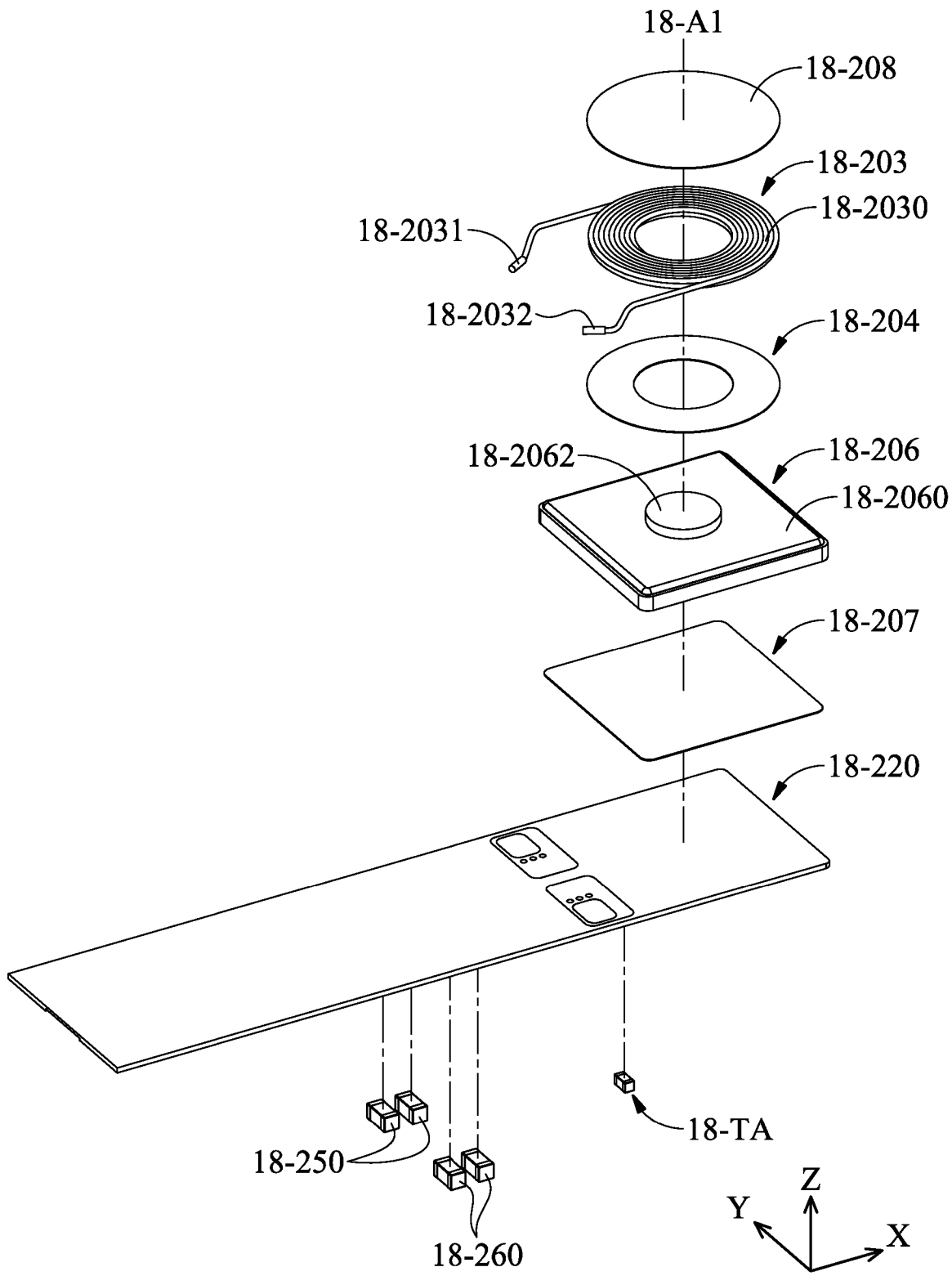
FIG. 54 is an exploded diagram of a coil module 18-200 according to an embodiment of the present disclosure.

Please refer to FIG. 54, which is an exploded diagram of a coil module 18-200 according to an embodiment of the present disclosure. As shown in FIG. 54, the coil module 18-200 is a coil module that can be used for transmitting energy or signals. The coil module 18-200 may include a first coil mechanism and a second coil mechanism. The first coil mechanism (not shown) may be a receiving terminal, and the second coil mechanism may be a transmitting terminal. The first coil mechanism may include a first coil assembly and a second coil assembly (not shown), and the second coil mechanism may include a third coil assembly 18-203, an adhesive layer 18-204, an adhesive layer 18-207, an adhesive layer 18-208, an induction substrate 18-206 and a circuit assembly 18-220.

In this embodiment, the adhesive layer 18-208, the third coil assembly 18-203, the adhesive layer 18-204, the induction substrate 18-206, the adhesive layer 18-207 and the circuit assembly 18-220 are arranged in the first direction 18-A1 in sequence. The first direction 18-A1 may be the extending direction of a winding axis of the third coil assembly 18-203.

In this embodiment, the induction substrate 18-206 may also be referred to as a second base, and the circuit assembly 18-220 may also be referred to as a second connection assembly.

In this embodiment, the third coil assembly 18-203 can serve as a charging coil to be wireless charged by an external charging device. For example, the third coil assembly 18-203 can operate as a resonant charging coil based on the standard of the Alliance for Wireless Power (A4WP), but it is not limited thereto. In addition, the third coil assembly 18-203 can operate as an inductive charging coil based on the standard of Wireless Power Consortium (WPC), such as the Qi standard. Therefore, the third coil assembly 18-203 can respond to different forms of charging so as to enlarge the range of applications in this embodiment. For example, in the case of a close distance (for example, 1 cm or less), the inductive type operation is used; and at a long distance, a resonance type operation is used.

In this embodiment, the third coil assembly 18-203 can also serve as a communication coil, for example, operating in a Near Field Communication (NFC) mode to communicate with external electronic devices.

In this embodiment, the induction substrate 18-206 is disposed adjacent to the coil assembly, and the induction substrate 18-206 is configured to change the electromagnetic field distribution near the coil assembly. The induction substrate 18-206 may be a ferrite, but it is not limited thereto. For example, in other embodiments, the induction substrate 18-206 may also include a nanocrystalline material. The induction substrate 18-206 may have a magnetic permeability corresponding to the coil assemblies so that the electromagnetic waves of the coil assemblies can be more concentrated.

The adhesive layer 18-204, the adhesive layer 18-207 and the adhesive layer 18-208 may be double-sided adhesive tape or single-sided adhesive tape to adhere to one or two adjacent elements. In some embodiments, one or more of the adhesive layer 18-204, the adhesive layer 18-207 and the adhesive layer 18-208 may be made of polyethylene terephthalate (PET), but it is not limited thereto.

Figure 55:
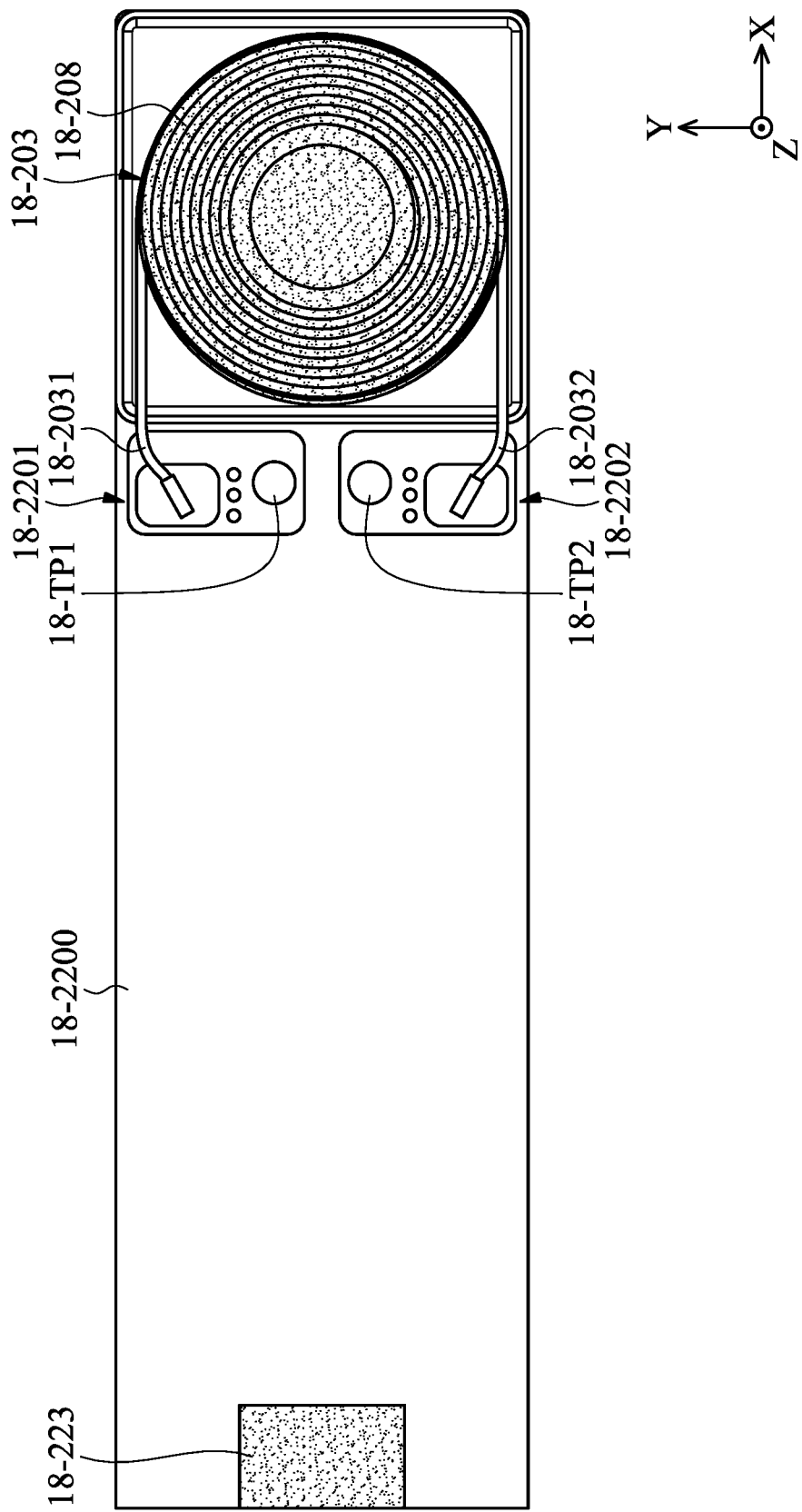
FIG. 55 is a top view of the coil module 18-200 after assembly according to an embodiment of the present disclosure.
Figure 56:
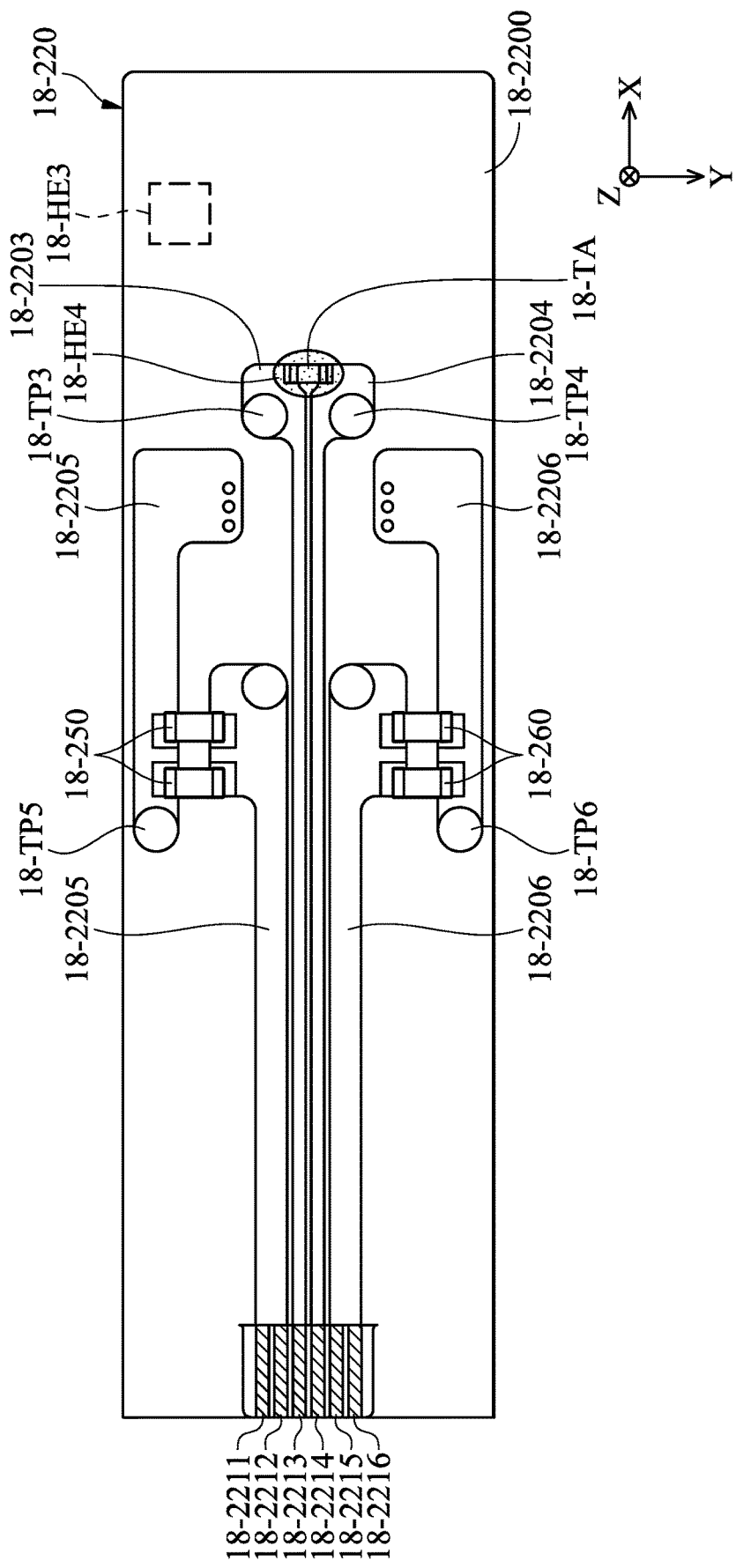
FIG. 56 is a bottom view of the coil module 18-200 after assembly according to an embodiment of the present disclosure.

Please also refer to FIG. 54 to FIG. 56. FIG. 55 is a top view of the coil module 18-200 after assembly according to an embodiment of the present disclosure, and FIG. 56 is a bottom view of the coil module 18-200 after assembly according to an embodiment of the present disclosure. The third coil assembly 18-203 includes a third body 18-2030, a fifth leading wire 18-2031 and a sixth leading wire 18-2032.

In addition, the second coil mechanism of the present disclosure further includes a third temperature sensing assembly 18-TA configured to sense the temperature of the second coil mechanism. The circuit assembly 18-220 (the second connection assembly) may be a circuit board electrically connected to the third temperature sensing assembly 18-TA. The induction substrate 18-206 (the second base) is located between the third coil assembly 18-203 and the third temperature sensing assembly 18-TA, and the circuit assembly 18-220 is located between the induction substrate 18-206 and the third temperature sensing assembly 18-TA.

In other embodiments of the present disclosure, the induction substrate 18-206 (the second base) may be located between the third coil assembly 18-203 and the third temperature sensing assembly 18-TA, and the third temperature sensing assembly 18-TA is located between the circuit assembly 18-220 (the second connection assembly) and the induction substrate 18-206 (the second base)(this embodiment is not shown in the figures). For example, a part of the third temperature sensing assembly 18-TA may be buried in the bottom of the induction substrate 18-206.

The second coil mechanism of the present disclosure further includes a heat conductive assembly configured to improve the thermal conduction efficiency between the third coil assembly 18-203 and the third temperature sensing assembly 18-TA. The heat conductive assembly may include a first heat conductive element, a second heat conductive element, a third heat conductive element 18-HE3, a fourth heat conductive element 18-HE4, and a first adhesive element. The adhesive layer 18-204 can serve as the first heat conductive element and is disposed between the third coil assembly 18-203 and the induction substrate 18-206, and the adhesive layer 18-204 has a plate-shaped structure. In other embodiments, the first heat conductive element may be heat conductive glue.

The adhesive layer 18-207 can serve as the second heat conductive element and is disposed between the induction substrate 18-206 and the circuit assembly 18-220, and the adhesive layer 18-207 has a plate-shaped structure. In other embodiments, the second heat conductive element can be heat conductive double-sided tape as well.

As shown in FIG. 56, the third heat conductive element 18-HE3 may be a metal part buried in the circuit assembly 18-220, and the third heat conductive element 18-HE3 is not electrically connected to the circuit of the circuit assembly 18-220. The configuration of the third heat conductive element 18-HE3 can improve the heat conduction efficiency and improve the mechanical strength of the circuit assembly 18-220 at the same time. The fourth heat conductive element 18-HE4 may be a heat conductive but non-electrical conducting glue that is in direct contact with the circuit assembly 18-220 and the third temperature sensing assembly 18-TA.

The adhesive layer 18-208 can serve as the first adhesive element which is in direct contact with the third coil assembly 18-203. The third coil assembly 18-203 is located between the adhesive layer 18-208 and the adhesive layer 18-204. The first heat conductive element (the adhesive layer 18-204) and the second heat conductive element (the adhesive layer 18-207) have different materials. The second heat conductive element and the third heat conductive element have different materials, the third heat conductive element 18-HE3 and the fourth heat conductive element 18-HE4 have different materials, and the first, second, third and fourth heat conductive elements have different materials.

When viewed in the first direction 18-A1, the maximum size of the first heat conductive element is different from the maximum size of the second heat conductive element, the maximum size of the second heat conductive element is different from the maximum size of the third heat conductive element 18-HE3, the maximum size of the third heat conductive element 18-HE3 is different from the maximum size of the fourth heat conductive element 18-HE4, and the maximum sizes of the first, second, third, and fourth heat conductive elements are different.

As shown in FIG. 55 and FIG. 56, the circuit assembly 18-220 includes a second connecting body 18-2200, a first line 18-2201, a second line 18-2202, a third line 18-2203, a fourth line 18-2204, a fifth line 18-2205, and a sixth line 18-2206.

The first line 18-2201 and the second line 18-2202 are electrically connected to the third coil assembly 18-203. The third line 18-2203 and the fourth line 18-2204 are electrically connected to the third temperature sensing assembly 18-TA. The minimum width of the first line 18-2201 and the minimum width of the third line 18-2203 in the Y-axis are different, and the minimum width of the first line 18-2201 is greater than the minimum width of the third line 18-2203 in the Y-axis.

The fifth line 18-2205 is electrically connected to the first line 18-2201, and the sixth line 18-2206 is electrically connected to the second line 18-2202. The minimum width of the third line 18-2203 and the minimum width of the fifth line 18-2205 in the Y-axis are different. The minimum width of the fifth line 18-2205 in the Y-axis is greater than the minimum width of the third line 18-2203, and the first line 18-2201 and the fifth line 18-2205 are disposed on opposite sides of the second connecting body 18-2200.

Furthermore, the circuit assembly 18-220 (the second connection assembly) further includes at least one first electronic component 18-250, at least one second electronic component 18-260, a first test portion 18-TP1, a second test portion 18-TP2, a third test portion 18-TP3, a fourth test portion 18-TP4, a fifth test portion 18-TP5 and a sixth test portion 18-TP6.

The first electronic component 18-250 is disposed on the fifth line 18-2205. The second electronic component 18-260 is disposed on the sixth line 18-2206. The first test portion 18-TP1 to the sixth test portion 18-TP6 are respectively disposed on the first line 18-2201 to the sixth line 18-2206.

The third coil assembly 18-203 is individually tested by the first test portion 18-TP1 and the second test portion 18-TP2, the third temperature sensing assembly 18-TA is individually tested by the third test portion 18-TP3 and the fourth test portion 18-TP4, and the third coil assembly 18-203 and the first electronic component 18-250 are tested by the fifth test portion 18-TP5 and the sixth test portion 18-TP6.

In addition, the circuit assembly 18-220 further includes a first pin 18-2211, a second pin 18-2212, a third pin 18-2213, a fourth pin 18-2214, a fifth pin 18-2215 and a sixth pin 18-2216.

The first pin 18-2211 and the second pin 18-2212 are electrically connected to the fifth line 18-2205. The third pin 18-2213 is electrically connected to the third line 18-2203. The fourth pin 18-2214 is electrically connected to the fourth line 18-2204. The fifth pin 18-2215 and the sixth pin 18-2216 are electrically connected to the sixth line 18-2206, and the first pin 18-2211 to the sixth pin 18-2216 are substantially the same width.

In addition, the circuit assembly 18-220 further includes a structural strengthening element 18-223 corresponding to the first pin 18-2211 to the sixth pin 18-2216, and the structural strengthening element 18-223 and the first pin 18-2211 are disposed on opposite sides of the second connecting body 18-2200 of the circuit assembly 18-220.

As shown in FIG. 56, in this embodiment, the ends of the third line 18-2203 and the fourth line 18-2204 have a tapered structure corresponding to the third temperature sensing assembly 18-TA, and the third line 18-2203 is located between the fifth line 18-2205 and the sixth line 18-2206.

Figure 57:
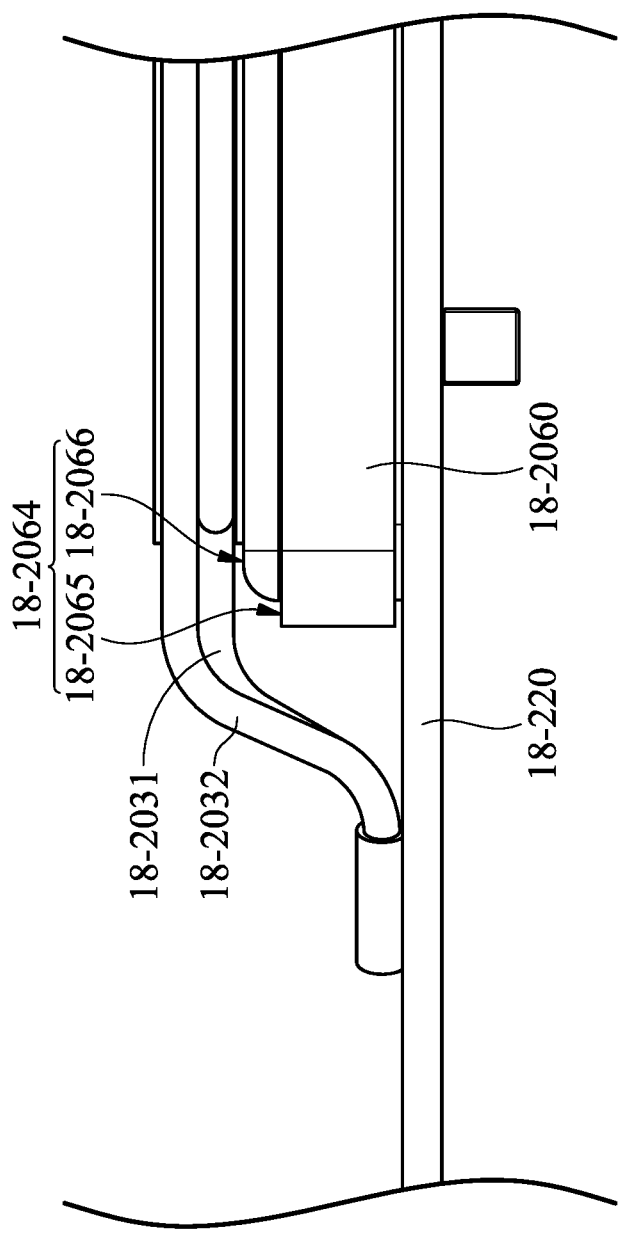
FIG. 57 is an enlarged side view of the coil module 18-200 according to an embodiment of the present disclosure.

Please refer to FIG. 54 and FIG. 57. FIG. 57 is an enlarged side view of the coil module 18-200 according to an embodiment of the present disclosure. The induction substrate 18-206 may include a second base body 18-2060 and a second magnetic element 18-2062, both of which have magnetically conductive materials. As shown in FIG. 57, the edge of the second base body 18-2060 has a tapered structure 18-2064, and the tapered structure 18-2064 further has a stepped structure 18-2065 and a circular arc structure 18-2066.

In some embodiments of the present disclosure, the second base body 18-2060 may have a leading wire accommodating portion (not shown) configured to accommodate the fifth leading wire 18-2031 and the sixth leading wire 18-2032 of the third coil assembly 18-203.

Figure 58:
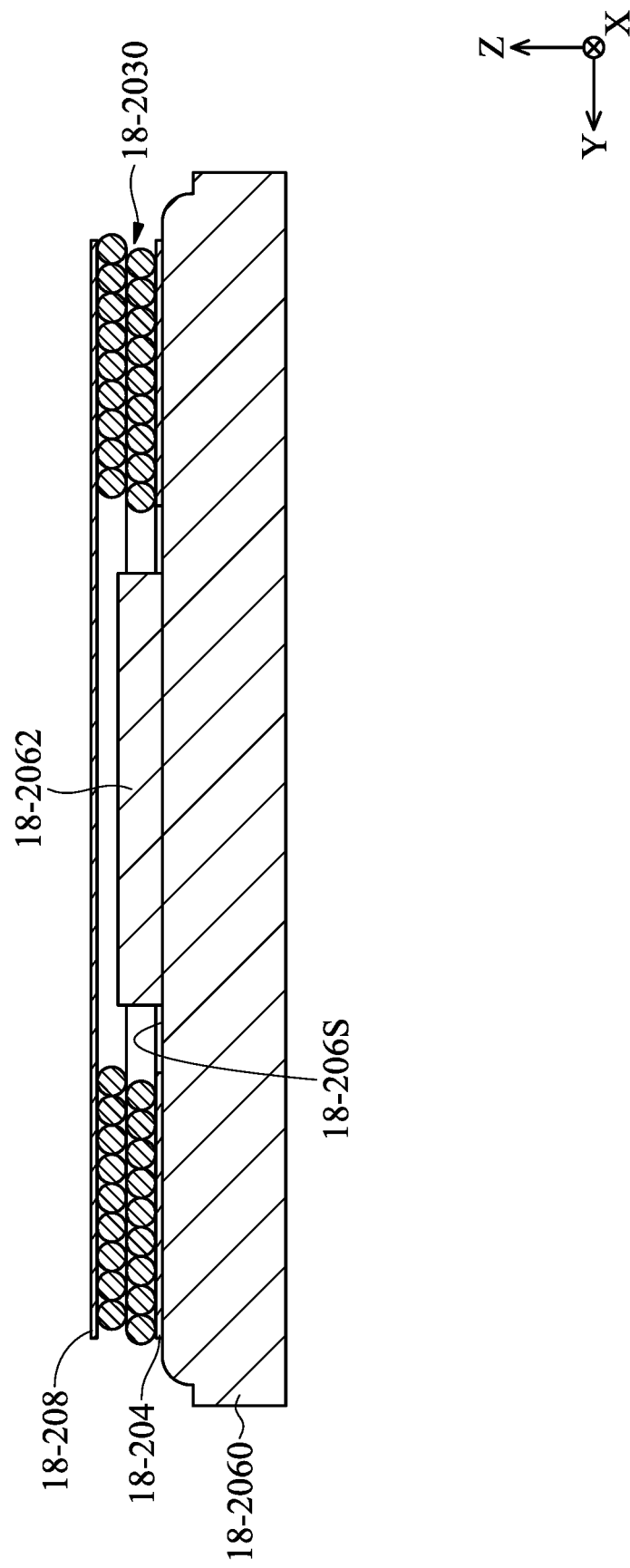
FIG. 58 is a schematic cross-sectional view of the coil module 18-200 according to an embodiment of the present disclosure.

Please refer to FIG. 58, which is a schematic cross-sectional view of the coil module 18-200 according to an embodiment of the present disclosure. The second magnetic element 18-2062 is disposed together with the third body 18-2030 on a surface 18-206S of the second base body 18-2060. In the first direction 18-A1 (the Z-axis), the maximum size of the third body 18-2030 is greater than the maximum size of the second magnetic element 18-2062. Furthermore, the adhesive layer 18-208 (the first adhesive element) does not contact the second magnetic element 18-2062.

Figure 59:
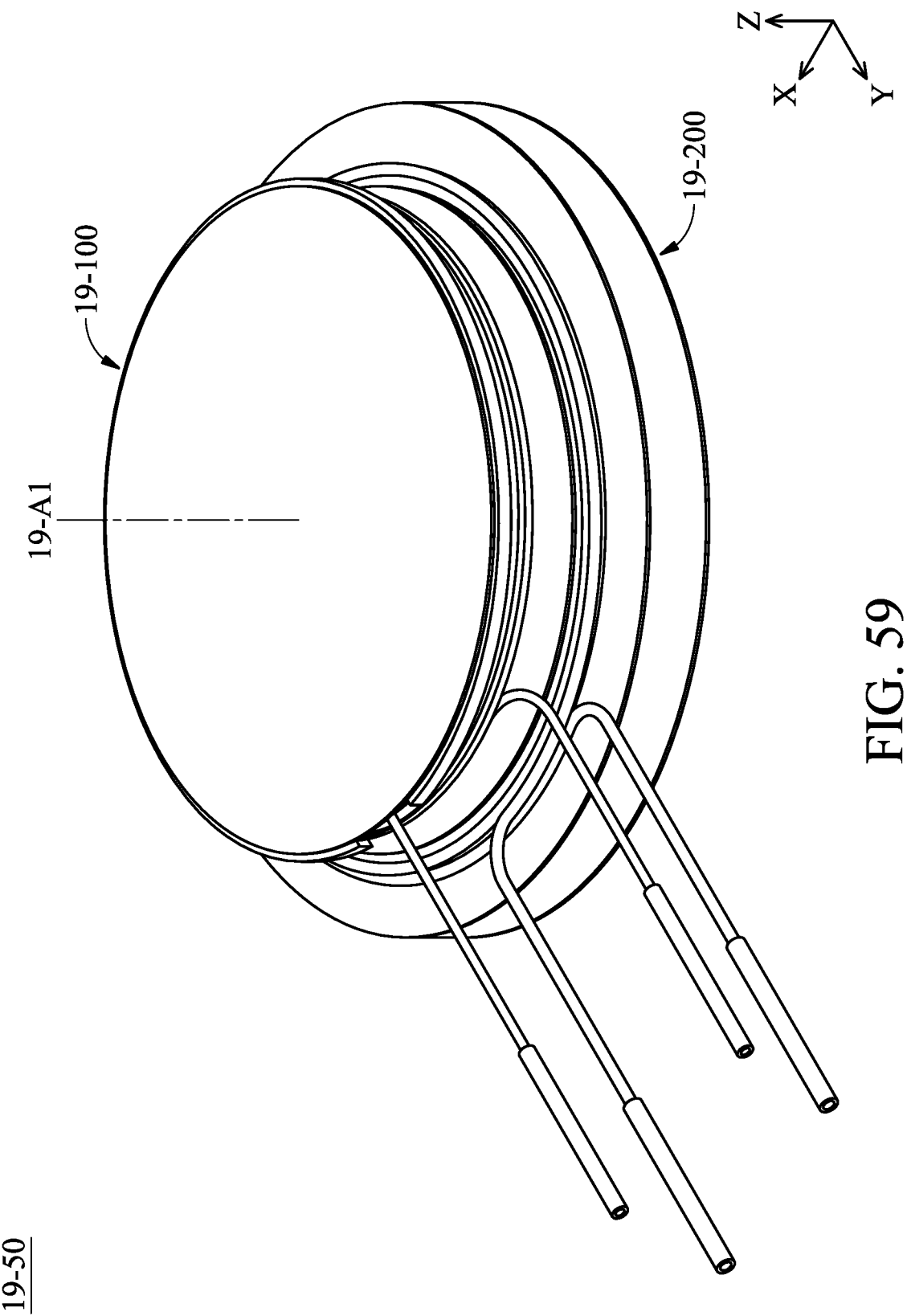
FIG. 59 is a perspective diagram of a coil module 19-50 according to an embodiment of the present disclosure.

Please refer to FIG. 59, which is a perspective diagram of a coil module 19-50 according to an embodiment of the present disclosure. As shown in FIG. 59, the coil module 19-50 is a coil module that can be used for transmitting energy or signals. The coil module 19-50 may include a first coil mechanism 19-100 and a second coil mechanism 19-200. The first coil mechanism 19-100 is configured to correspond to the second coil mechanism 19-200, and when the first coil mechanism 19-100 and the second coil mechanism 19-200 transmit energy or information, the first coil mechanism 19-100 and the second coil mechanism 19-200 are arranged in a first direction 19-A1 (the Z-axis). In some embodiments, the second coil mechanism 19-200 is used for transmitting energy, the first coil mechanism 19-100 is used for receiving energy, and the first coil mechanism 19-100 is used for receiving energy transmitted from the second coil mechanism 19-200.

Figure 60:
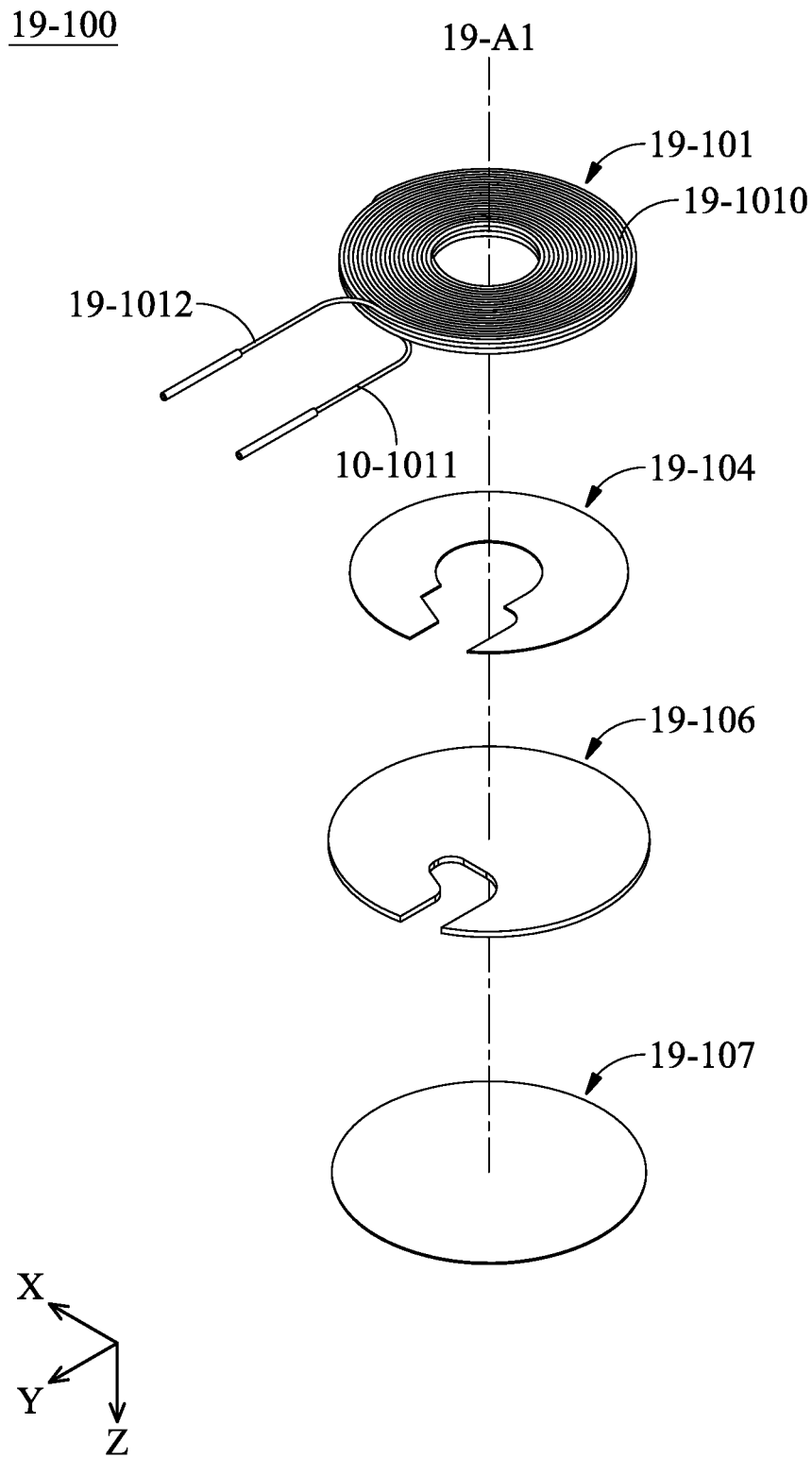
FIG. 60 is an exploded diagram of the first coil mechanism 19-100 according to an embodiment of the present disclosure.

Please refer to FIG. 60, which is an exploded diagram of the first coil mechanism 19-100 according to an embodiment of the present disclosure. The first coil mechanism 19-100 may include a first coil assembly 19-101, an adhesive layer 19-104, an adhesive layer 19-107, and an induction substrate 19-106. In this embodiment, the induction substrate 19-106 may also be referred to as a first base, the adhesive layer 19-104 may be referred to as a first protection assembly, and the adhesive layer 19-107 may be referred to as a second protection assembly.

In this embodiment, the first coil assembly 19-101, the adhesive layer 19-104, the induction substrate 19-106, and the adhesive layer 19-107 are arranged in the first direction 19-A1 in sequence. The first direction 19-A1 may be the extending direction of a winding axis of the first coil assembly 19-101 and the second coil assembly 19-102. The induction substrate 19-106 corresponds to the first coil assembly 19-101.

In this embodiment, the first coil assembly 19-101 can serve as a charging coil to be wireless charged by an external charging device. For example, first coil assembly 19-101 can operate as a resonant charging coil based on the standard of the Alliance for Wireless Power (A4WP), but it is not limited thereto. In addition, the first coil assembly 19-101 can operate as an inductive charging coil based on the standard of Wireless Power Consortium (WPC), such as the Qi standard. Therefore, the first coil assembly 19-101 can respond to different forms of charging so as to enlarge the range of applications in this embodiment. For example, in the case of a close distance (for example, 1 cm or less), the inductive type operation is used; and at a long distance, a resonance type operation is used.

In this embodiment, the induction substrate 19-106 is disposed adjacent to the coil assembly (the first coil assembly 19-101), and the induction substrate 19-106 is configured to change the electromagnetic field distribution near the coil assembly. The induction substrate 19-106 may be a ferrite, but it is not limited thereto. For example, in other embodiments, the induction substrate 19-106 may also include a nanocrystalline material. The induction substrate 19-106 may have a magnetic permeability corresponding to the coil assemblies so that the electromagnetic waves of the coil assemblies can be more concentrated.

The adhesive layer 19-104, and the adhesive layer 19-107 may be double-sided adhesive tape or single-sided adhesive tape to adhere to one or two adjacent elements. In some embodiments, one or more of the adhesive layer 19-104 and the adhesive layer 19-107 may be made of polyethylene terephthalate (PET), but it is not limited thereto.

Figure 61:
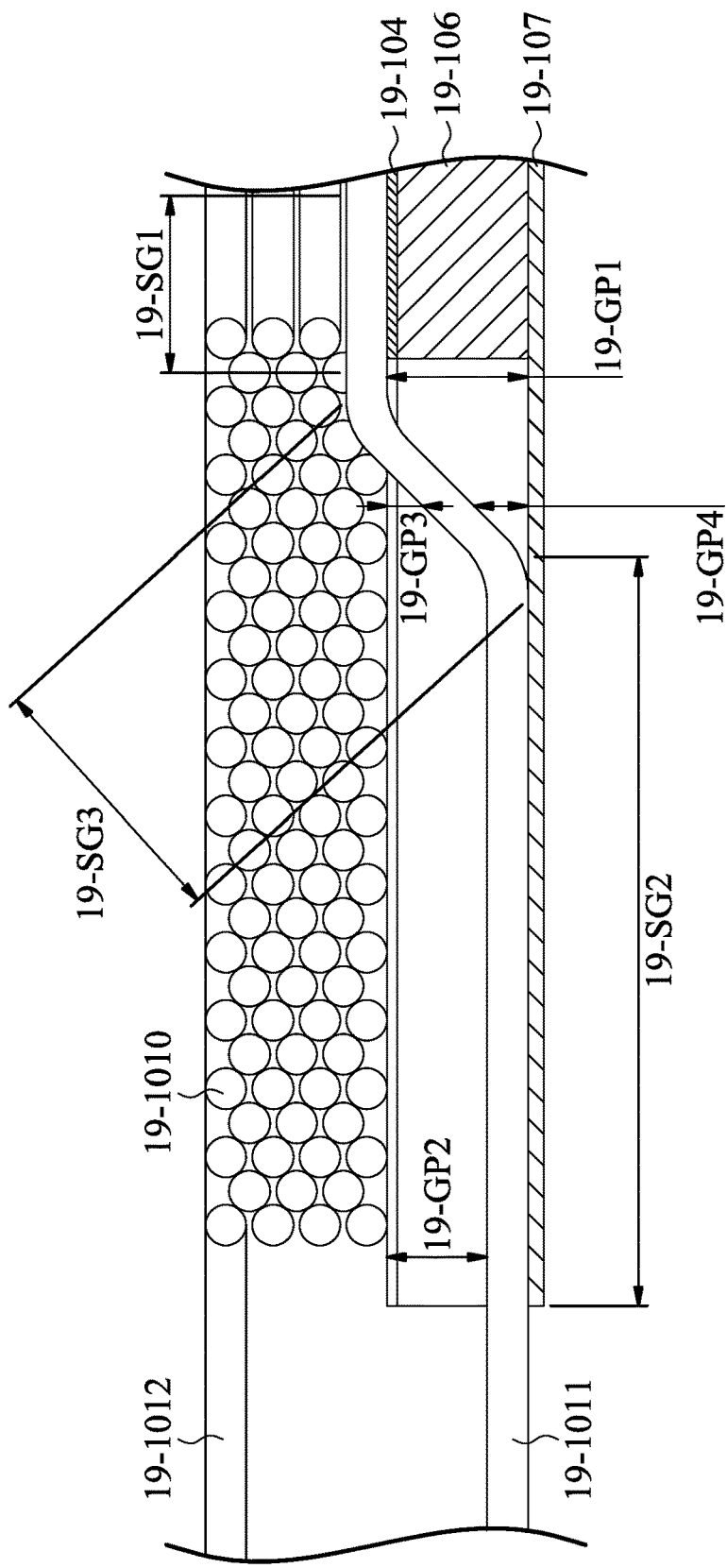
FIG. 61 is a cross-sectional view of the first coil mechanism 19-100 according to an embodiment of the present disclosure.

Please refer to FIG. 61, which is a cross-sectional view of the first coil mechanism 19-100 according to an embodiment of the present disclosure. The first coil assembly 19-101 includes a first body 19-1010, a first leading wire 19-1011 and a second leading wire 19-1012. Specifically, the first leading wire 19-1011 includes a first segment 19-SG1, a second segment 19-SG2, and a third segment 19-SG3. The adhesive layer 19-104 and the adhesive layer 19-107 are in direct contact with the induction substrate 19-106.

The first segment 19-SG1 is connected to the first body 19-1010, and there is a first gap 19-GP1 between the first segment 19-SG1 and the adhesive layer 19-107 (the second protection assembly). The second segment 19-SG2 is connected to the adhesive layer 19-107 (the second protection assembly), and there is a second gap 19-GP2 between the second segment 19-SG2 and the first body 19-1010. The first segment 19-SG1 is connected to the second segment 19-SG2 via the third segment 19-SG3, there is a third gap 19-GP3 between the third segment 19-SG3 and the first body 19-1010, and there is a fourth gap 19-GP4 between the third segment 19-SG3 and the adhesive layer 19-107 (the second protection assembly).

Figure 62:
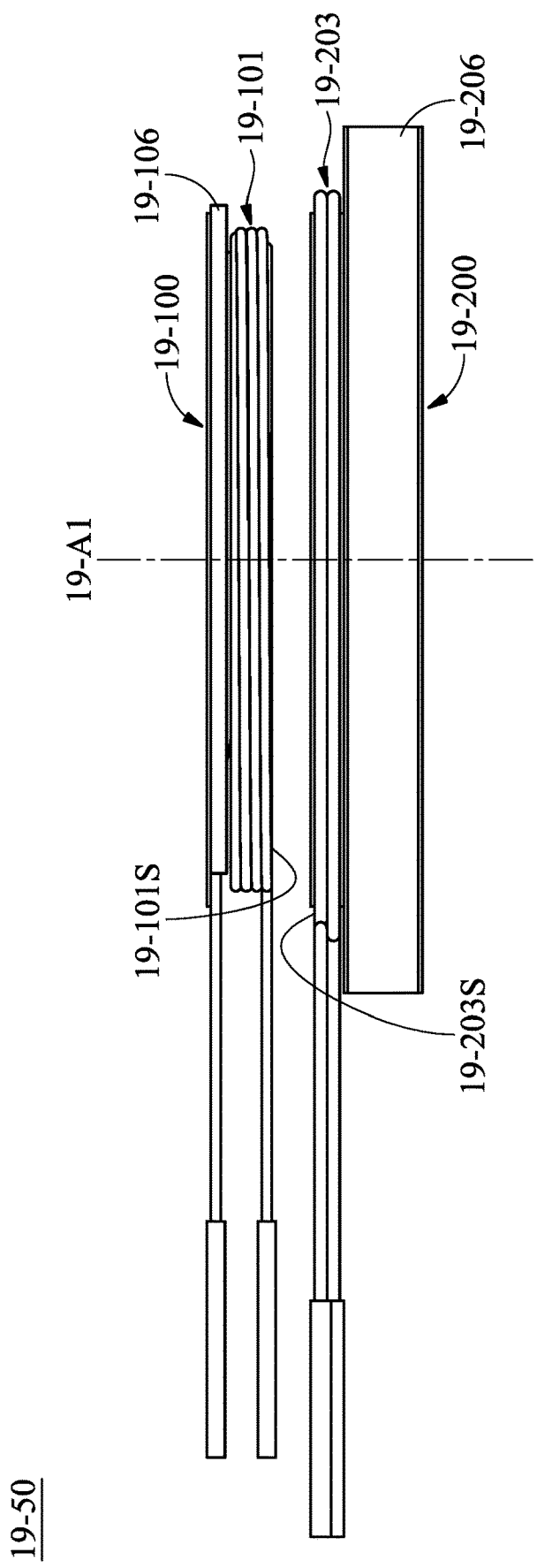
FIG. 62 is a side view of the coil module 19-50 according to an embodiment of the present disclosure.

Please refer to FIG. 62, which is a side view of the coil module 19-50 according to an embodiment of the present disclosure. In the first direction 19-A1, the maximum size of the first coil assembly 19-101 is different than the maximum size of the induction substrate 19-106. For example, the thickness of the first coil assembly 19-101 in the first direction 19-A1 is different from the thickness of the induction substrate 19-106.

The second coil mechanism 19-200 includes an induction substrate 19-206 (the second base) and a third coil assembly 19-203. The third coil assembly 19-203 is disposed on the induction substrate 19-206. In the first direction 19-A1, the maximum size of the first coil assembly 19-101 is larger than the maximum size of the induction substrate 19-106. In the first direction 19-A1, the maximum size of the third coil assembly 19-203 is smaller than the maximum size of the induction substrate 19-206.

In the first direction 19-A1, the maximum size of the first coil mechanism 19-100 is smaller than the maximum size of the second coil mechanism 19-200. In the first direction 19-A1, the maximum size of the induction substrate 19-106 (the first base) is smaller than the maximum size of the induction substrate 19-206 (the second base). In the first direction 19-A1, the maximum size of the first coil assembly 19-101 is larger than the maximum size of the third coil assembly 19-203, and the wire diameter of the first coil assembly 19-101 is smaller than that of the third coil assembly 19-203. In other embodiments, the maximum size of the first coil assembly 19-101 may be smaller than the maximum size of the third coil assembly 19-203.

The first coil assembly 19-101 includes a first surface 19-101S facing the third coil assembly 19-203, and the third coil assembly 19-203 includes a third surface 19-203S facing the first Coil assembly 19-101. The roughness of the first surface 19-101S is different than the roughness of the third surface 19-203S. The roughness of the first surface 19-101S is less than the roughness of the third surface 19-203S. The number of layers in the first coil assembly 19-101 is greater than the number of layers in the third coil assembly 19-203. The induction substrate 19-106 (the first base) and the induction substrate 19-206 (the second base) have different magnetic permeability materials. For example, the induction substrate 19-106 has nanocrystalline material, and the induction substrate 19-206 has ferrite material.

Figure 63:
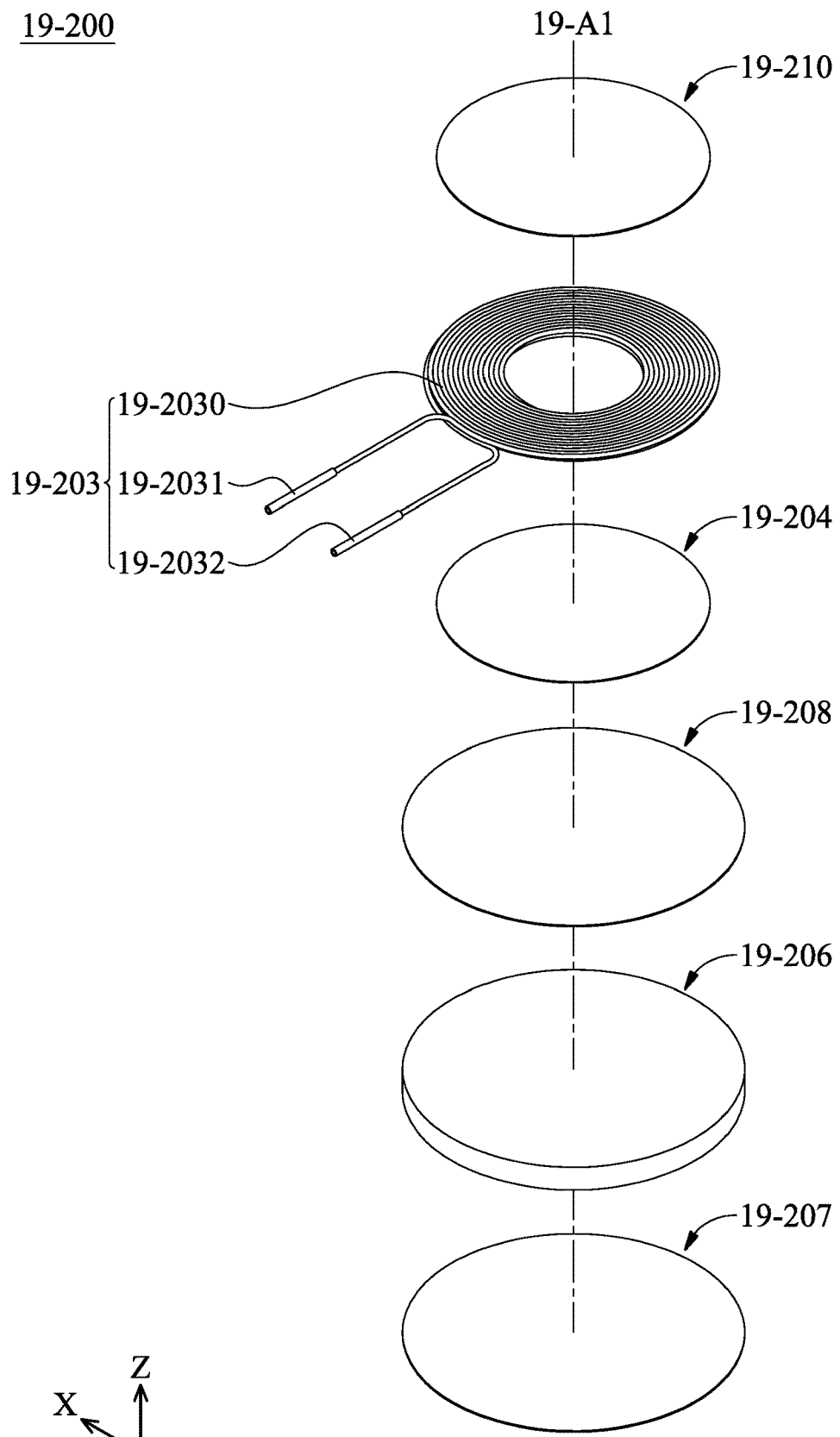
FIG. 63 is an exploded diagram of the second coil mechanism 19-200 according to an embodiment of the present disclosure.
Figure 64:
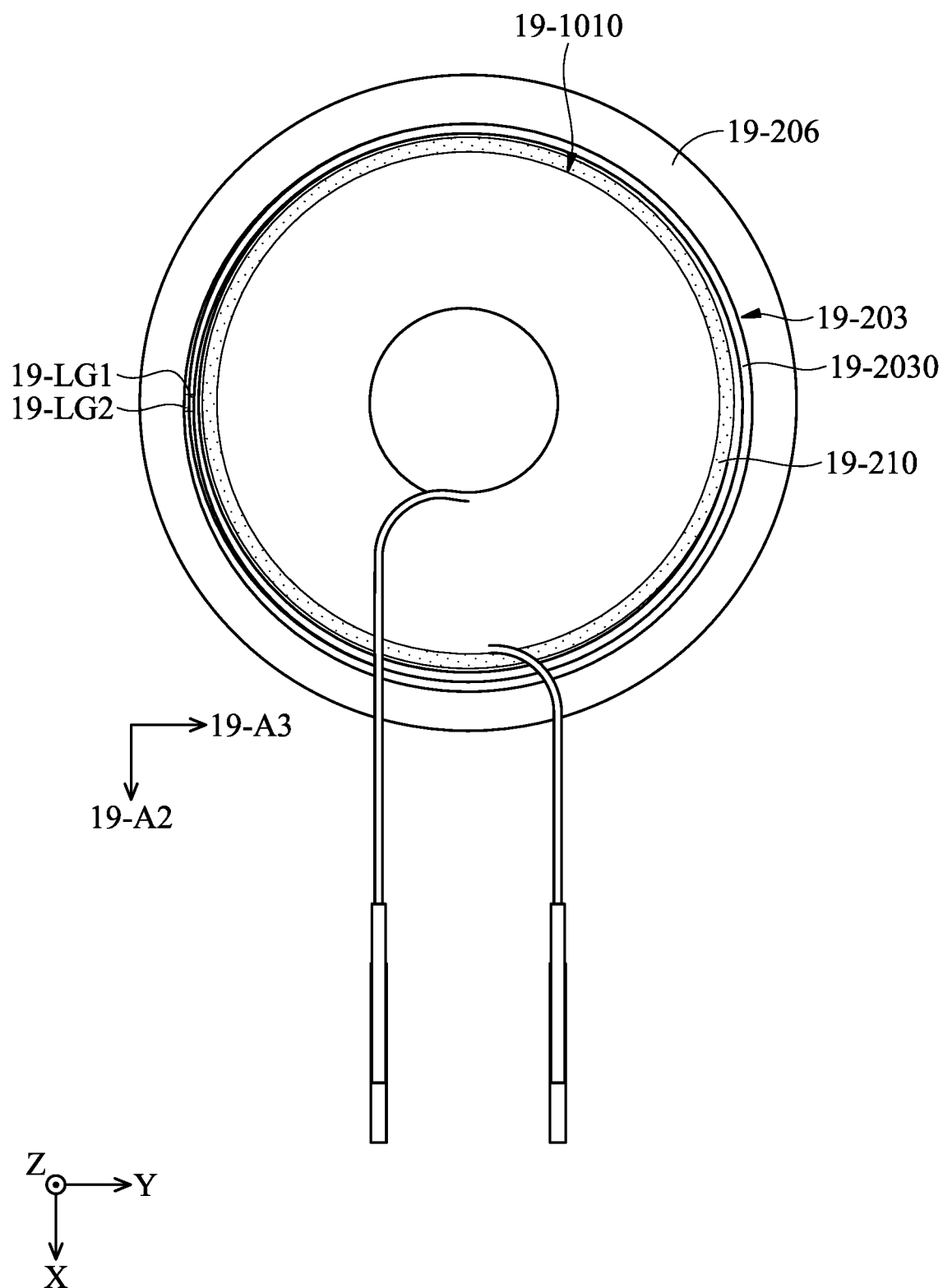
FIG. 64 is a top view of a partial structure of the second coil mechanism 19-200 according to an embodiment of the present disclosure.

Please refer to FIG. 63 and FIG. 64. FIG. 63 is an exploded diagram of the second coil mechanism 19-200 according to an embodiment of the present disclosure, and FIG. 64 is a top view of a partial structure of the second coil mechanism 19-200 according to an embodiment of the present disclosure. The second coil mechanism 19-200 includes the third coil assembly 19-203, an adhesive layer 19-204, an adhesive layer 19-207, an adhesive layer 19-208, an adhesive layer 19-210, and the induction substrate 19-206.

In this embodiment, the adhesive layer 19-210, the third coil assembly 19-203, the adhesive layer 19-204, the adhesive layer 19-208, the induction substrate 19-206, and the adhesive layer 19-207 are arranged in the first direction 19-A1 (the Z-axis) in sequence. The first direction 19-A1 may be the extending direction of the winding axis of the third coil assembly 19-203.

It should be noted that elements with the same name in different embodiments in the present disclosure may have the same function.

The third coil assembly 19-203 has a third body 19-2030, a fifth leading wire 19-2031 and a sixth leading wire 19-2032. The fifth leading wire 19-2031 and the sixth leading wire 19-2032 are electrically connected to the third body 19-2030. As shown in FIG. 62 and FIG. 64, when viewed in the first direction 19-A1 (the Z-axis), the maximum size of the first body 19-1010 in a second direction 19-A2 (the X-axis) is different from the maximum size of the third body 19-2030, and the second direction 19-A2 is perpendicular to the first direction 19-A1. When viewed in the first direction 19-A1, the maximum size of the first body 19-1010 in the second direction 19-A2 is smaller than the maximum size of the third body 19-2030.

Figure 65:
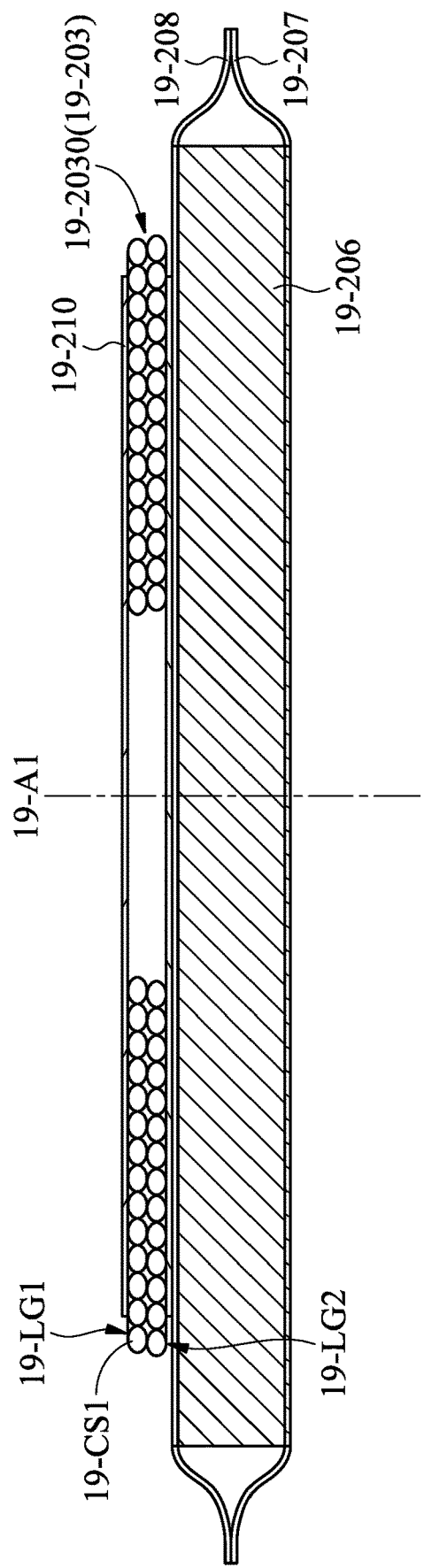
FIG. 65 is a cross-sectional view of the second coil mechanism 19-200 according to an embodiment of the present disclosure.

Please refer to FIG. 64 and FIG. 65, and FIG. 65 is a cross-sectional view of the second coil mechanism 19-200 according to an embodiment of the present disclosure. The third coil assembly 19-203 may further include a first linear segment 19-LG1, substantially extending in the second direction 19-A2 (the X-axis). A first cross-section 19-CS1 of the first linear segment 19-LG1 is perpendicular to the second direction 19-A2, and the maximum size of the first cross-section 19-CS1 in the first direction 19-A1 is different from the maximum size of the first cross-section 19-CS1 in a third direction 19-A3 (the Y-axis). The first direction 19-A1, the second direction 19-A2 and the third direction 19-A3 are perpendicular to each other, and the maximum size of the first cross-section 19-CS1 in the first direction 19-A1 is smaller than the maximum size of the first cross-section 19-CS1 in the third direction 19-A3.

The third coil assembly 19-203 further includes a second linear segment 19-LG2, which is substantially parallel to the first linear segment 19-LG1. When viewed in the first direction 19-A1, the first linear segment 19-LG1 overlaps at least a portion of the second linear segment 19-LG2. In addition, when viewed in the third direction 19-A3, the first linear segment 19-LG1 overlaps at least a portion of the second linear segment 19-LG2.

The adhesive layer 19-210 may be referred to as a first adhesive assembly, and the adhesive layer 19-210 is in direct contact with the third body 19-2030. When viewed in the first direction 19-A1 (FIG. 6), the adhesive layer 19-210 (the first adhesive assembly) does not overlap at least a portion of the third body 19-2030, and the outer edge of the adhesive layer 19-210 (the first adhesive assembly) is smaller than the outer edge of the third body 19-2030.

In this embodiment, the adhesive layer 19-208 may be referred to as a third protection assembly, and the adhesive layer 19-207 may be referred to as a fourth protection assembly. The adhesive layer 19-208 and the adhesive layer 19-207 can be made of polyethylene terephthalate (PET), but it is not limited thereto.

The adhesive layer 19-208 (the third protection assembly) is in direct contact with the induction substrate 19-206 (the second base). When viewed in the first direction 19-A1, the induction substrate 19-206 (the second base) does not overlap at least a portion of the adhesive layer 19-208 (the third protection assembly), and the outer edge of the adhesive layer 19-208 (the third protection assembly) is larger than the outer edge of the induction substrate 19-206 (the second base).

The adhesive layer 19-207 (the fourth protection assembly) is in direct contact with the induction substrate 19-206 (the second base). When viewed in the first direction 19-A1, the induction substrate 19-206 (the second base) does not overlap at least a portion of the adhesive layer 19-207 (the fourth protection assembly), and the outer edge of the adhesive layer 19-207 (the fourth protection assembly) is larger than the outer edge of the induction substrate 19-206 (the second base).

The adhesive layers 19-208 (the third protection assembly) and the adhesive layers 19-207 (the fourth protection assembly) are in direct contact with each other. When viewed in the first direction 19-A1, the sizes of the adhesive layer 19-208 (the third protection assembly) and the adhesive layer 19-207 (the fourth protection assembly) are larger than the size of the induction substrate 19-206 (the second base), and a portion of the induction substrate 19-206 (the second base) is located between the adhesive layer 19-208 (the third protection assembly) and the adhesive layer 19-207 (the fourth protection assembly).

The present disclosure provides a coil module for transmitting energy or signals, including at least one coil assembly and at least one induction substrate. The induction substrate is disposed adjacent to the coil assembly, and the induction substrate is configured to change the electromagnetic field distribution near the coil assembly, so that the electromagnetic waves of the coil assembly are more concentrated. Based on the design of the coil module of the present disclosure, it can improve mechanical strength, use efficiency, charging efficiency, heat dissipation efficiency, achieve the overall miniaturization, the overall weight reduction and reduce electromagnetic interference.

Figure 66:
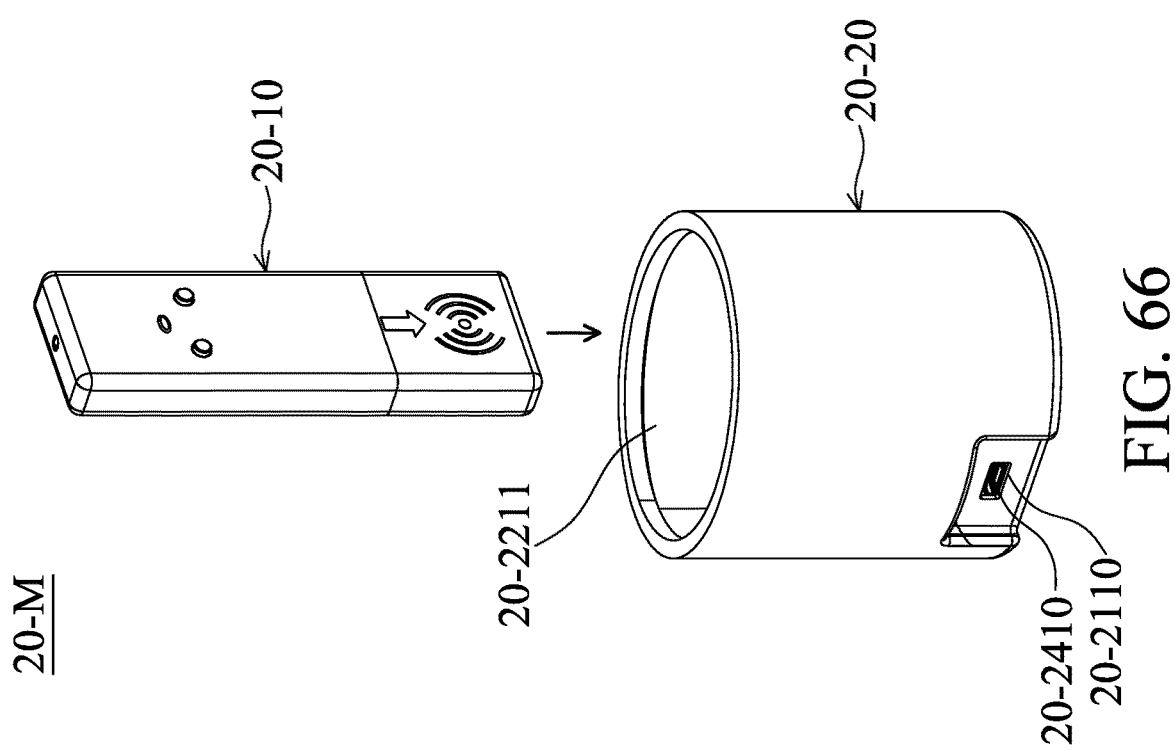
FIG. 66 is a schematic diagram of a coil module according to an embodiment of the invention.

Referring to FIG. 66, in an embodiment of the invention, the coil module 20-M includes a first coil mechanism 20-10 and a second coil mechanism 20-20. For example, the first coil mechanism 20-10 can be a smartphone, a smartwatch, a smart ring, a bluetooth earbuds, or a charging case with the function of wireless charging, and the second coil mechanism 20-20 can be a charging base.

Each of the first coil mechanism 20-10 and the second coil mechanism 20-20 can include one or more coils. For example, the first coil mechanism 20-10 can include a receiving coil (a first coil assembly) and/or a communication coil (a second coil assembly, such as a Near-field communication coil, NFC), and the second coil mechanism 20-20 can include one or more transmitting coils (the third coil assemblies) to match receiving coils with different dimensions or inductances. When the first coil mechanism 20-10 is adjacent to or disposed on the second coil mechanism 20-20, an inductive coupling can be generated between the first coil assembly in the first coil mechanism 20-10 and the third coil assembly in the second coil mechanism 20-20. Therefore, the second coil mechanism 20-20 can provide power to the first coil mechanism 20-10 in a wireless manner, and the first coil mechanism 20-10 can store the received power in a power storage member (such as a chargeable battery).

Figure 67:
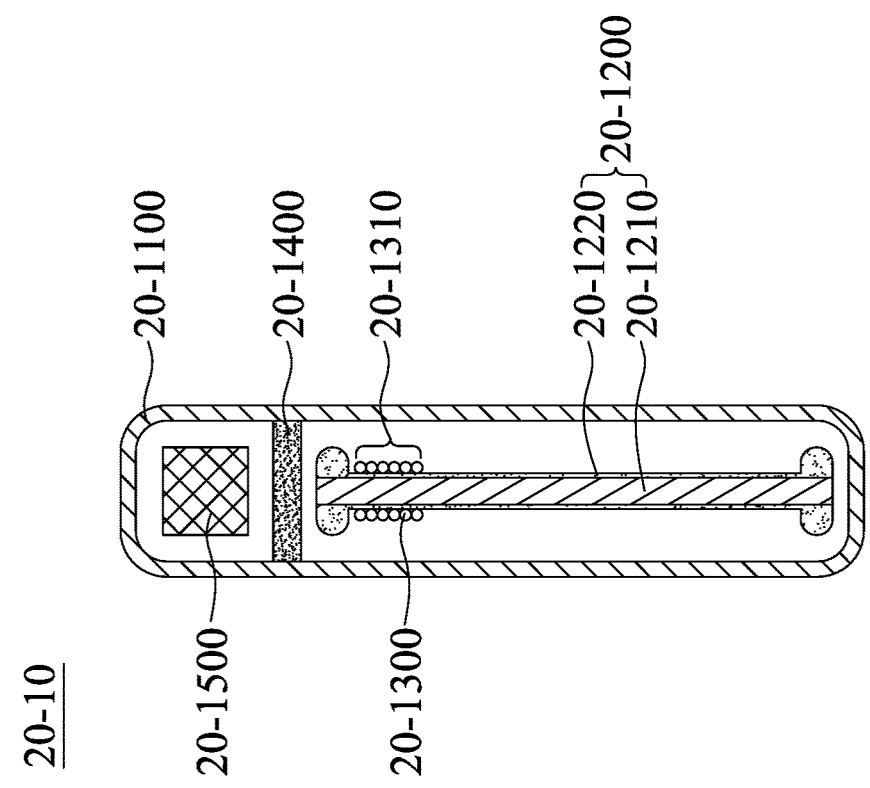
FIG. 67 is a schematic diagram of a first coil mechanism according to an embodiment of the invention.

As shown in FIG. 67, the first coil mechanism 20-10 primarily includes a case 20-1100, a first base 20-1200, a first coil assembly 20-1300, a magnetic shielding member 20-1400, and a power storage member 20-1500.

The base 20-1100 has a hollow structure, and the first base 20-1200, the first coil assembly 20-1300, the magnetic shielding member 20-1400, and the power storage member are accommodated in an accommodating space of the hollow structure.

The first base 20-1200 includes a magnetic permeability member 20-1210 and a first winding support 20-1220. The first winding support 20-1220 surrounds the magnetic permeability member 20-1210, and the first coil assembly 1300 winds around the first winding support 20-1220. Therefore, the first coil assembly 20-1300 surrounds the magnetic permeability member 20-1210 and the first winding support 20-1220. In some embodiments, the magnetic permeability member 20-1210 can be omitted from the first base 20-1200, and the first base 20-1200 can merely include the first winding support 20-1220 made of non-conductive material (such as plastic).

The magnetic shielding member 20-1400 is disposed between the power storage member 20-1500 and the first winding support 20-1220, so as to reduce the electromagnetic interference (EMI) between the power storage member 20-1500 and the first coil assembly 20-1300. For example, the magnetic shielding member 20-1400 can be made of iron, aluminum, a combination thereof, or other suitable metal.

It should be noted that, the main portion of the first coil assembly 20-1300 (a first main body 20-1310) is winded around the first winding support 20-1220, and the leads (not shown) at its opposite ends can pass through the magnetic shielding member 20-1400 to electrically connect the power storage member 20-1500.

Figure 68:
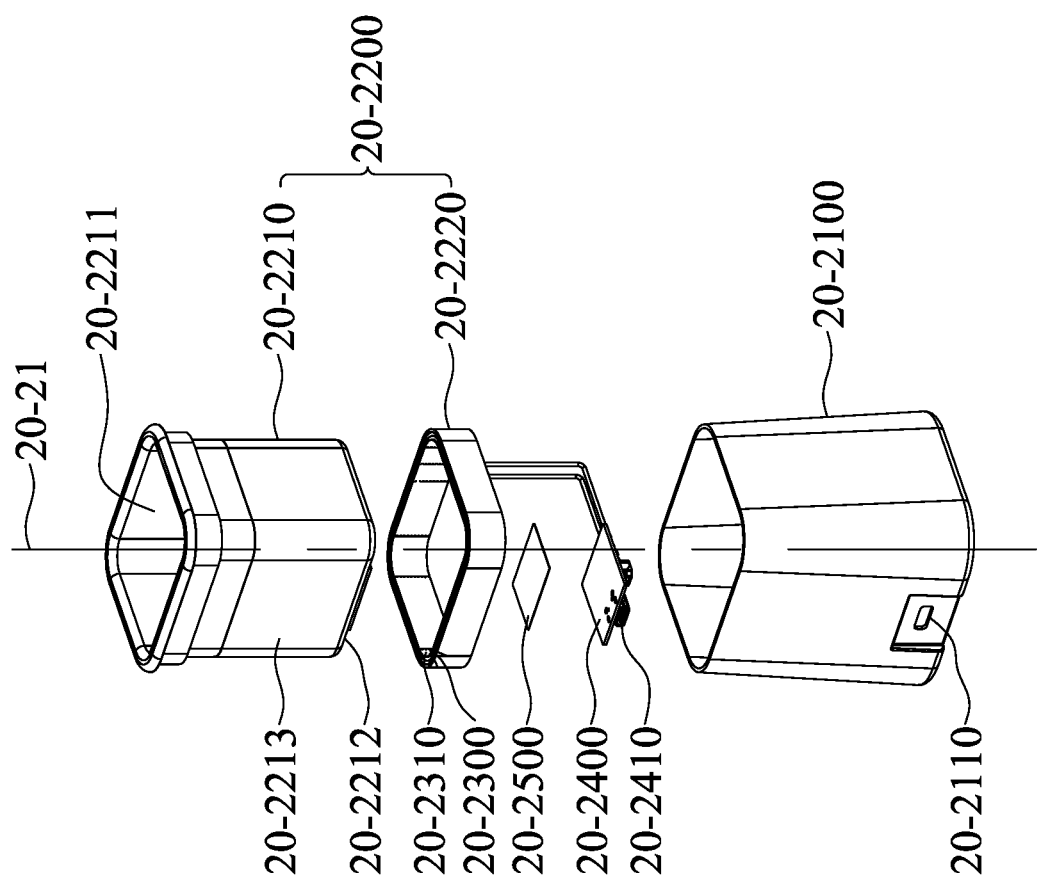
FIG. 68 is an exploded-view diagram of a second coil mechanism according to an embodiment of the invention.

FIG. 68 is an exploded-view diagram of the second coil mechanism 20-20 according to an embodiment of the invention. As shown in FIG. 68, the second coil mechanism 20-20 primarily includes a case 20-2100, a second base 20-2200, a third coil assembly 20-2300, a circuit board 20-2400, and an adhesive member 20-2500.

The second base 20-2200 includes a second winding support 20-2210 and a magnetic permeability member 20-2220. The second winding support 20-2210 can form an inner frame of the second coil mechanism 20-20 to engage with the case 20-2100, and have a depression portion 20-2211 to accommodate the first coil mechanism 20-10. When the second winding support 20-2210 is engaged with the case 20-2100, the opening of the depression portion 20-2211 faces a direction away from the case 20-2100, and a gap is formed between the second winding support 20-2210 and the case 20-2100 (as shown in FIG. 4). The magnetic permeability member 20-2220, the third coil assembly 20-2300, and the circuit board 20-2400 are accommodated in the gap.

The third coil assembly 20-2300 winds around the second winding support 20-2210, and the magnetic permeability member 20-2220 surrounds the third coil assembly 20-2300. In this embodiment, the second winding support 20-2210 has a bottom plate 20-2212 and a lateral wall 20-2213, wherein the third coil assembly 20-2300 and the bottom plate 20-2212 are arranged along a main axis 20-21 of the second coil mechanism 20-20, and the lateral wall 20-2213 is connected to the bottom plate 20-2212 and extended from the edge of the bottom plate 20-2212.

The main portion of the third coil assembly 20-2300 winding around the second winding support 20-2210 is the third main body 20-2310, and the leads at the opposite ends of the coil can be extended downwardly and connected to the circuit board 20-2400. The circuit board 20-2400 can be affixed to the bottom plate 20-2212 of the second winding support 20-2210 by the adhesive member 20-2500.

As shown in FIG. 66 and FIG. 68, in this embodiment, the circuit board 20-2400 has a connecting terminal 20-2410, and a through hole 20-2110 communicated with the gap and the external environment is formed on the case 20-2100 of the second coil mechanism 20-20. When the second winding support 20-2210 is engaged with the case 20-2100 and the circuit board 20-2400 is affixed to the bottom plate 20-2212 of the second winding support the connecting terminal 20-2410 is aligned with the through hole 20-2110 and exposed from the through hole 20-2110. Therefore, the user can insert an external plug into the connecting terminal 20-2410 via the through hole 20-2110 to supply power or transmit signal. For example, the connecting terminal 20-2410 can be a universal serial bus terminal (USB, such as a standard USB, a mini USB, a micro USB, or a USB Type-C), a lightning terminal, or an alternating current power connector, but it is not limited thereto.

Figure 69:
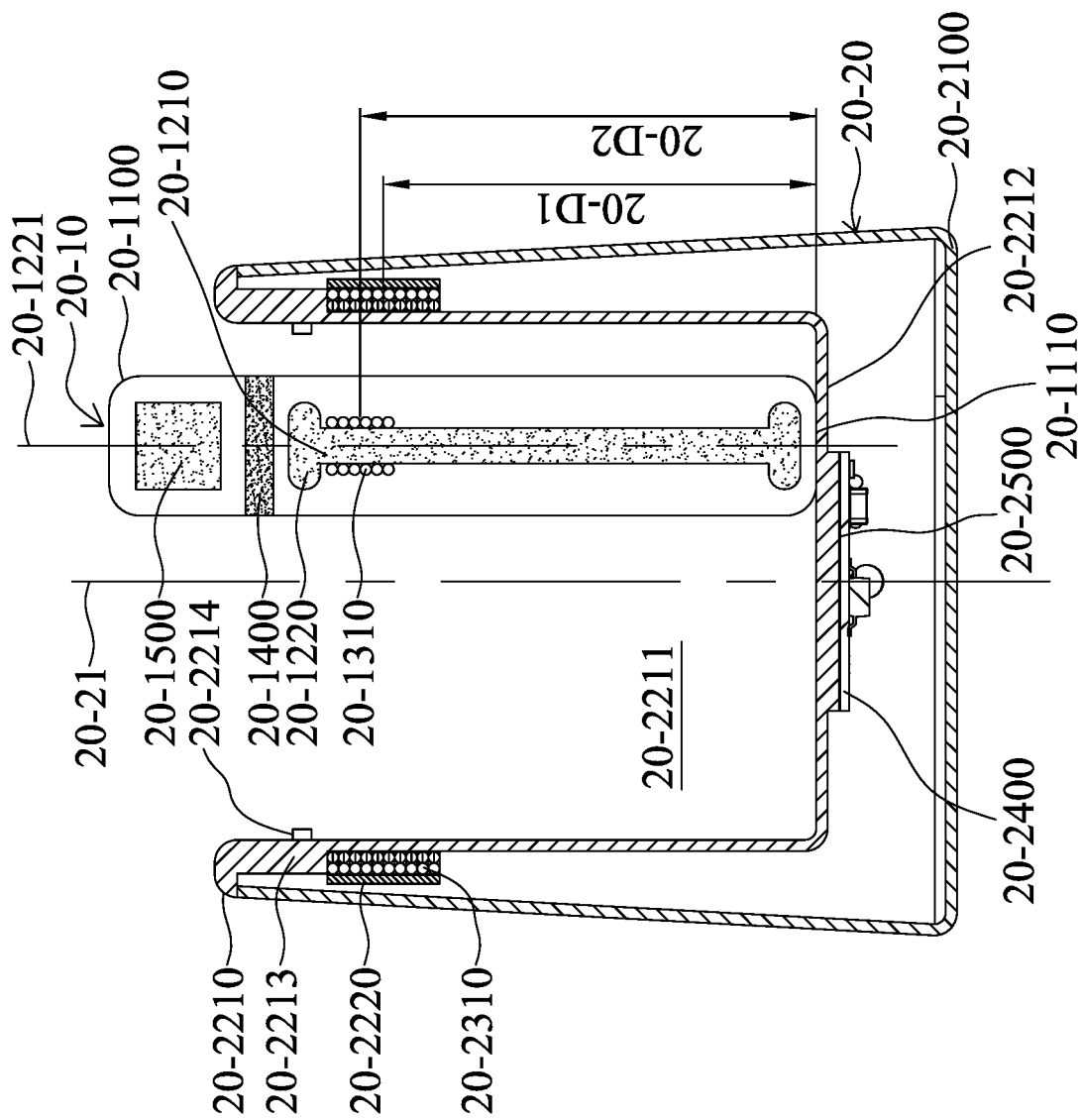
FIG. 69 is a schematic diagram of the first coil mechanism disposed on the second coil mechanism in a first condition according to an embodiment of the invention.

When the user desires to use the second coil mechanism 20-20 to charge the first coil mechanism 20-10, the first coil mechanism 20-10 can be disposed in the depression portion 20-2211 of the second coil mechanism 20-20. As shown in FIG. 69, the first coil mechanism 20-10 disposed in the depression portion 20-2211 may in a first condition relative to the second coil mechanism 20-20. Under these conditions, the longitudinal axis 20-1221 of the first winding support 20-1220 of the first coil mechanism 20-10 is parallel to the main axis 20-21 of the second coil mechanism 20-20.

In the direction of the main axis 20-21 of the second coil mechanism 20-20, a first distance 20-D1 is formed between the center of the third main body 20-2310 of the third coil assembly 20-2300 and the bottom plate 20-2212. The case 20-1100 of the first coil mechanism 20-10 has a bottom 20-1110, and the first winding support 20-1220 and the bottom 20-1110 are arranged along the longitudinal axis 20-1221. In the direction of the longitudinal axis 20-1221, a second distance 20-D2 is formed between the center of the first main body 20-1310 of the first coil assembly 20-1300 and the bottom 20-1110. The first distance 20-D1 is different from the second distance 20-D2. In this embodiment, the first distance 20-D1 is shorter than the second distance 20-D2.

Figure 70:
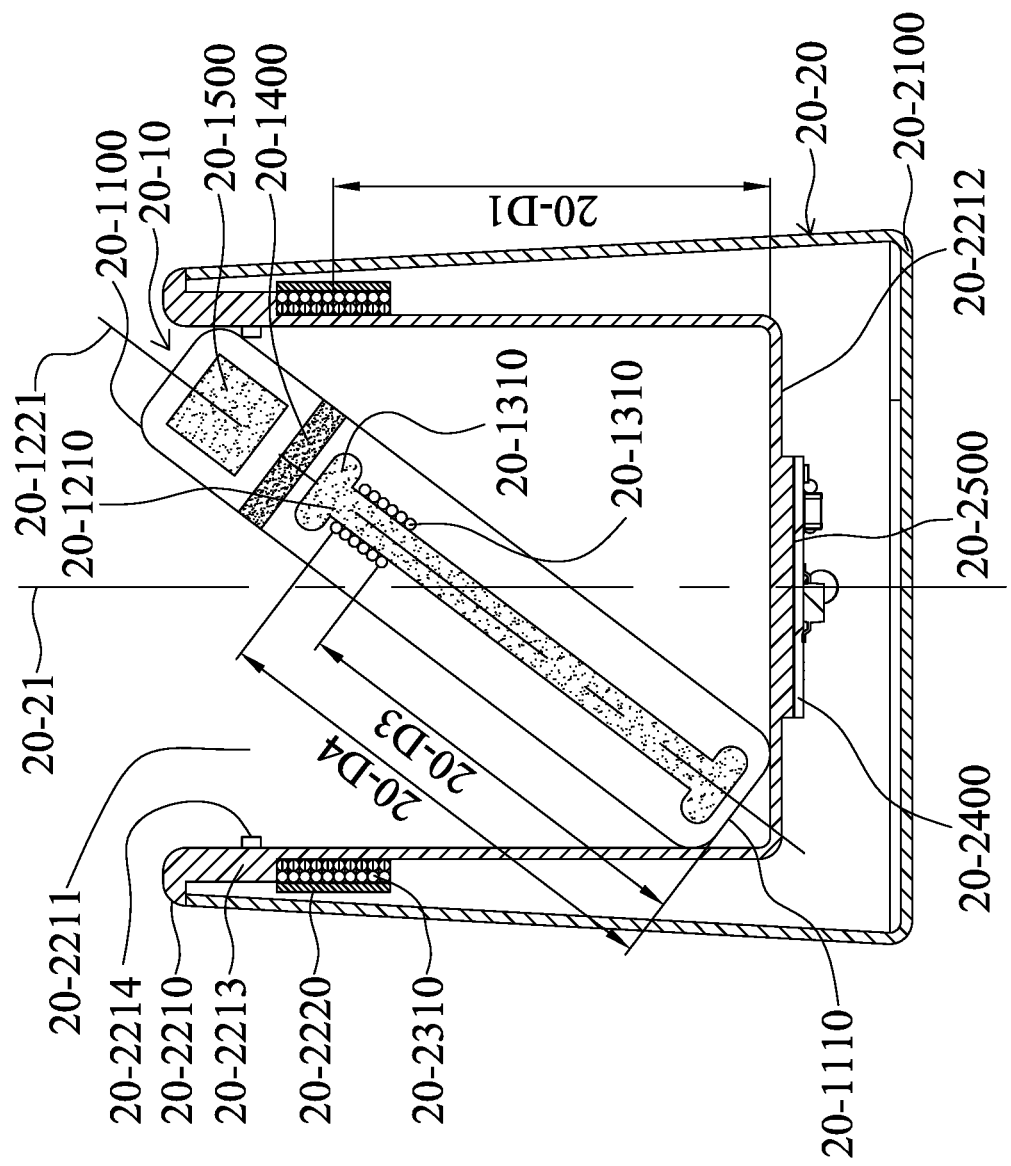
FIG. 70 is a schematic diagram of the first coil mechanism disposed on the second coil mechanism in a second condition according to an embodiment of the invention.

Referring to FIG. 70, the first coil mechanism 20-10 disposed in the depression portion 20-2211 may in a second condition relative to the second coil mechanism 20-20. Under these conditions, the longitudinal axis 20-1221 of the first winding support 20-1220 of the first coil mechanism 20-10 is not parallel to the main axis 20-21 of the second coil mechanism 20-20.

In the direction of the longitudinal axis 20-1221, the shortest distance between the first main body 20-1310 of the first coil assembly 20-1300 and the bottom 20-1110 is a third distance 20-D3, and the greatest distance between the first main body 20-1310 of the first coil assembly 20-1300 and the bottom 20-1110 is a fourth distance 20-D4. The third distance 20-D3 is shorter than the fourth distance 20-D4, and the fourth distance 20-D4 is greater than the first distance 20-D1. As seen from a direction perpendicular to the main axis the center of the first main body 20-1310 overlaps the third main body 20-2310. Therefore, no matter the first coil mechanism 20-10 is disposed on the second coil mechanism in any angle, the efficiency of the wireless charging can be maintained.

As shown in FIG. 69 and FIG. 70, in this embodiment, a positioning assembly 20-2214 is disposed in the depression portion 20-2211 of the second coil mechanism 20-20, so that the posture of the first coil assembly 20-10 can be restricted in a chargeable range in the depression portion 20-2211. The reducing of the charging efficiency because the first coil mechanism 20-10 with insufficient length falls to the bottom of the depression portion 20-2211 can be prevented. For example, in this embodiment, the positioning assembly 20-2214 is an annular protrusion protruding from the inner wall of the depression portion 20-2211, and the chargeable range is limited in that the included angle between the main axis 20-21 and the longitudinal axis 20-1221 is not 90 degrees.

Moreover, in this embodiment, as seen from the longitudinal axis 20-1221, the power storage member 20-1500 overlaps the first winding support 20-1220. As seen from the direction perpendicular to the longitudinal axis 20-1221, the power storage member 20-1500 does not overlap the first winding support 20-1220. Therefore, the electromagnetic interference between the power storage member 20-1500 and the first coil assembly 20-1300 can be reduced. In this embodiment, the bottom 20-1110 of the first coil mechanism 20-10 has an arc-shaped structure, so as to prevent the second coil mechanism 20-20 from scratching when the first coil mechanism 20-10 is in contact with the second coil mechanism 20-20.

Figure 71:
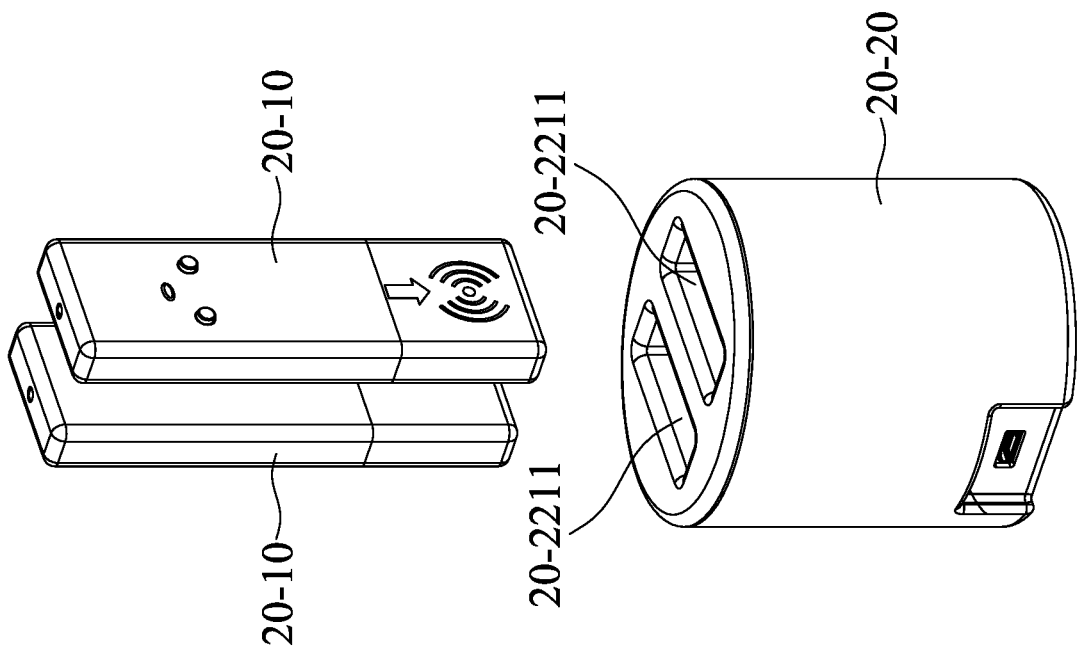
FIG. 71 is a schematic diagram of a coil module according to another embodiment of the invention.

Referring to FIG. 71, in some embodiments, the second winding support 20-2210 has a plurality of depression portions 20-2211, and the second coil mechanism 20-20 surrounds the depression portions 20-2211. Thus, a plurality of first coil mechanisms 20-10 can enter these depression portions 20-2211, and can be charged simultaneously.

Figure 72:
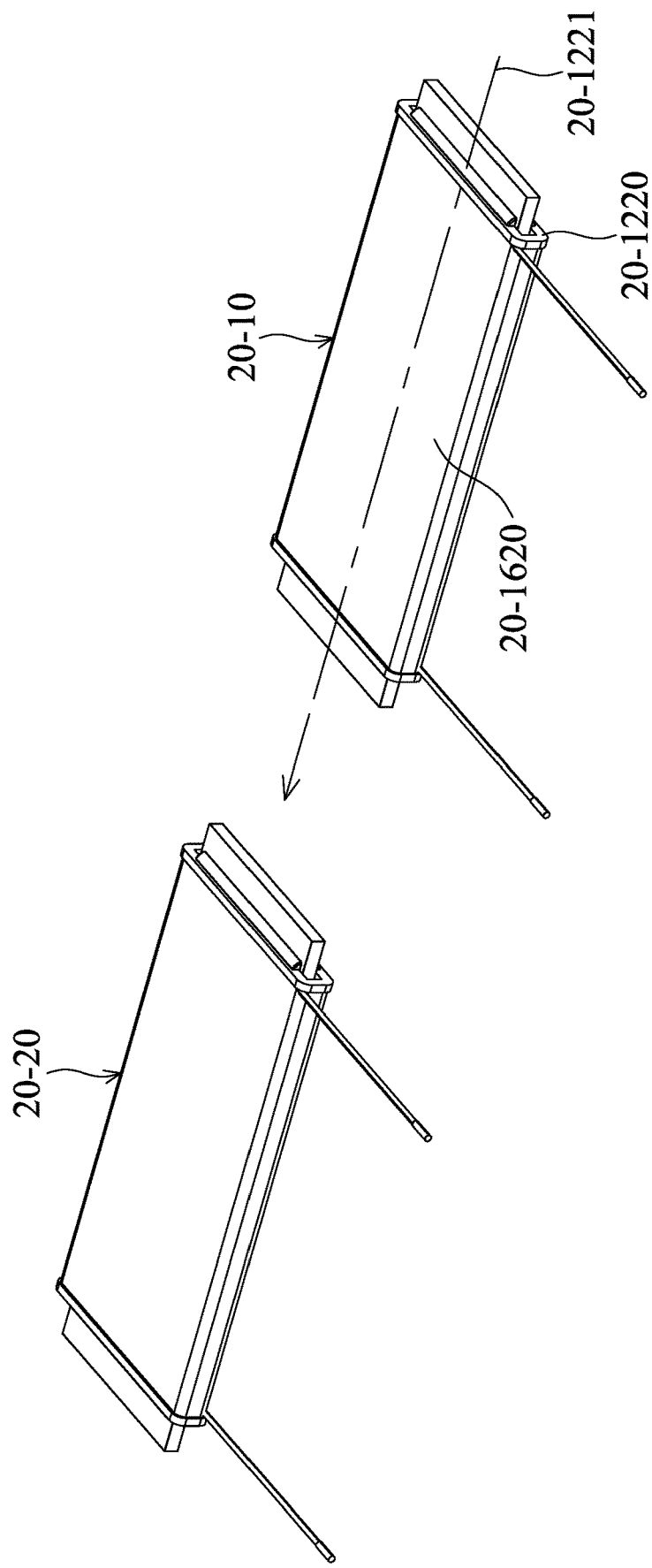
FIG. 72 is a schematic diagram of a coil module according to another embodiment of the invention.
Figure 73:
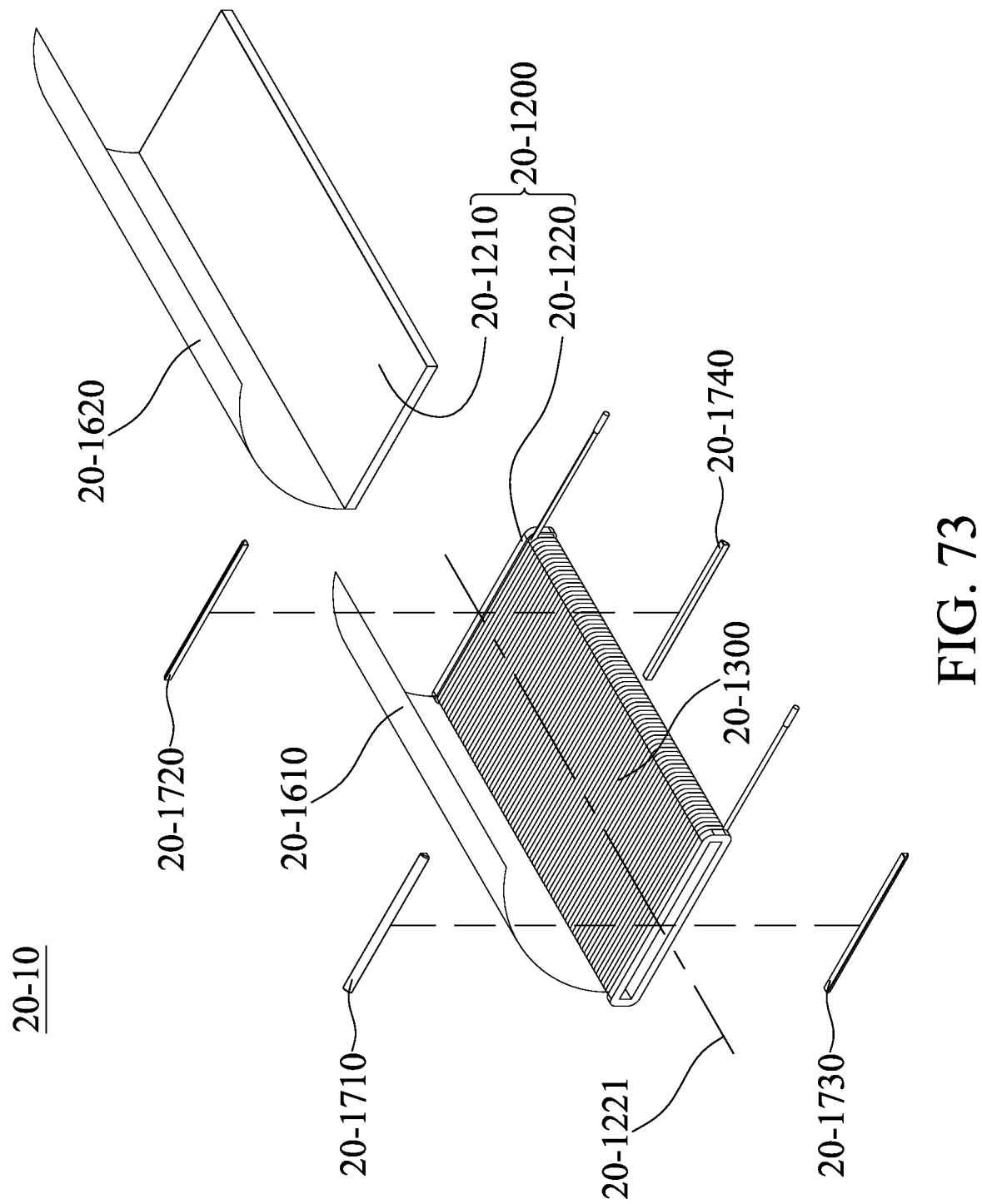
FIG. 73 is a schematic diagram of a first coil mechanism according to another embodiment of the invention.

Referring to FIG. 72, in another embodiment, a coil module 20-M includes a first coil mechanism 20-10 and a second coil mechanism 20-20. The first coil mechanism 20-10 can be assembled in an electronic device having the function of wireless charging, such as a smartphone, a smartwatch, a smart ring, a bluetooth earbuds, or a charging case, and the second coil mechanism 20-20 can be assembled in a charging base. The first coil mechanism 20-10 can approach the second coil mechanism 20-20 along a longitudinal axis 20-1221, so as to generate an inductive coupling between the first coil mechanism 20-10 and the second coil mechanism 20-20.

Figure 74:
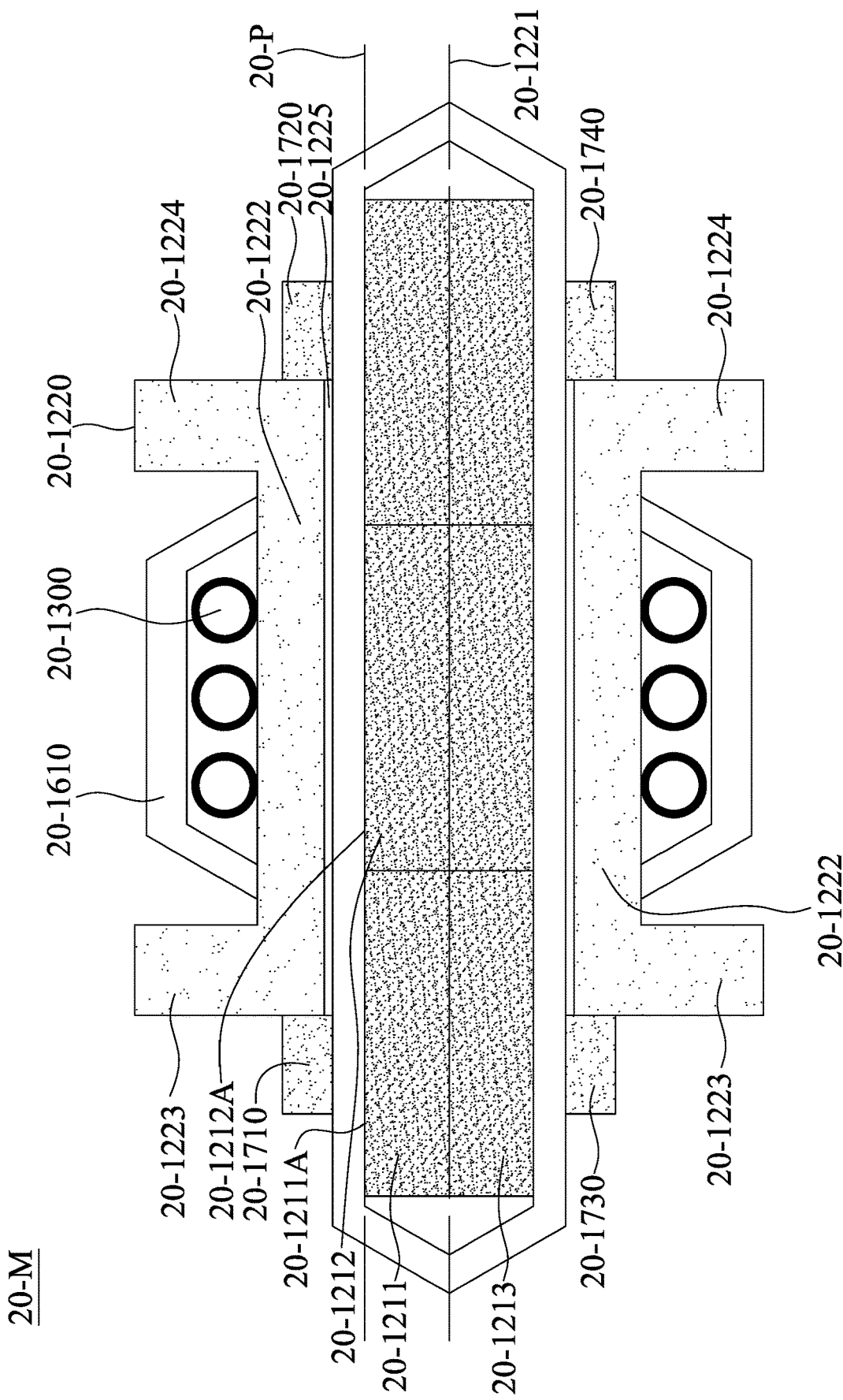
FIG. 74 is a cross-sectional view of the first coil mechanism according to another embodiment of the invention.

Referring to FIG. 8 and FIG. 74, in this embodiment, the first coil mechanism 20-10 primarily includes a first base 20-1200, a first coil assembly 20-1300, at least one first adhesive assembly 20-1610, at least one second adhesive assembly 20-1620, a first adhesive component 20-1710, a second adhesive component 20-1720, a third adhesive component 20-1730, and a fourth adhesive component 20-1740.

The first base 20-1200 includes a plurality of magnetic permeability members 20-1210 and a first winding support 20-1220. The first winding support 20-1220 includes a winding main body 20-1222, a first retaining wall 20-1223, and a second retaining wall 20-1224. The winding main body 20-1222 is extended along the longitudinal axis 20-1221 of the first winding support 20-1220, and a hollow structure 20-1225 is formed in the inner of the winding main body 20-1222. In this embodiment, the winding main body 20-1222 includes non-metallic material (such as plastic).

The first retaining wall 20-1223 and the second retaining wall 20-1224 are connected to the winding main body 20-1222, respectively disposed on the opposite sides of the winding main body 20-1222, and protrude from the winding main body 20-1222. The first coil assembly 20-1300 winds around the winding main body 20-1222, and disposed between the first retaining wall 20-1223 and the second retaining wall 20-1224. Since the first retaining wall 20-1223 and the second retaining wall 20-1224 protrude from the winding main body 20-1222, they can restrict the range of the first coil assembly 20-1300, and the falling of the first coil assembly 20-1300 from the first winding support 20-1220 can be prevented.

The extending directions of the first retaining wall 20-1223 and the second retaining wall 20-1224 are parallel to the winding direction of the first coil assembly 20-1300. In other words, in this embodiment, the extending directions of the first retaining wall 20-1223 and the second retaining wall 20-1224 are perpendicular to the longitudinal axis 20-1221 of the first winding support 20-1220. In some embodiments, the extending directions of the first retaining wall 20-1223 and the second retaining wall 20-1224 are not parallel and not perpendicular to the longitudinal axis 20-1221 of the first winding support 20-1220.

The first adhesive assembly 20-1610 covers the first coil assembly 20-1300. For example, the first adhesive assembly 20-1610 can be a heat-resistance insulation tape having adhesion. Owing to the first adhesive assembly 20-1610, the influence to other electronic components in the electronic device caused by the heat from the first coil assembly 20-1300 when the coil module 20-M operates can be reduced. In should be noted that, the first adhesive assembly 20-1610 only includes an adhesive on the surface that faces the first coil assembly 20-1300, so as to prevent other electronic components from becoming attached to the outer surface of the first adhesive assembly 20-1610 during assembly.

Moreover, in this embodiment, the length of the first adhesive assembly 20-1610 in the longitudinal axis 20-1221 is greater than the arrangement area of the first coil assembly 20-1300, so that the first adhesive assembly 20-1610 can completely cover the first coil assembly 20-1300. In this embodiment, a portion of the first adhesive assembly 20-1610 is attached to the first winding support 20-1220.

In some embodiments, the first adhesive assembly 20-1610 includes suitable heat-resistance material, such as polyimide (PI). In some embodiments, the first adhesive assembly 20-1610 can bear temperatures of over 100° C. In some embodiments, the resistivity of the first adhesive assembly 20-1610 is greater than 640 Ωm.

The magnetic permeability members 20-1210 are disposed in the hollow structure 20-1225. For example, the magnetic permeability members 20-1210 includes a first magnetic permeability member 20-1211, a second magnetic permeability member 20-1212, and a third magnetic permeability member 20-1213. Each of the first magnetic permeability member 20-1211, the second magnetic permeability member 20-1212, and the third magnetic permeability member 20-1213 has a plate structure. The first magnetic permeability member 20-1211 and the second magnetic permeability member 20-1212 are arranged along the longitudinal axis 20-1221, and the first magnetic permeability member 20-1211 and the third magnetic permeability member 20-1213 are arranged along the direction perpendicular to the longitudinal axis 20-1221. The magnetic permeability members 20-1210 can be affixed to each other by welding or adhering. It should be noted that, the dimensions of the first magnetic permeability member 20-1211 is substantially the same as the dimensions of the second magnetic permeability member 20-1212, and the first magnetic permeability member 20-1211 and the second magnetic permeability member 20-1212 are arranged at the same level. In other words, a first surface 20-1211A of the first magnetic permeability member 20-1211 facing the inner wall of the hollow structure 20-1225 is substantially parallel and/or coplanar to a second surface 20-1212A of the second magnetic permeability member 20-1212 facing the inner wall of the hollow structure 20-1225. The first surface 20-1211A and the second surface 20-1212A simultaneously overlap a virtual plane 20-P.

Since the magnetic permeability members 20-1210 includes fragile material, the second adhesive assembly 20-1620 can cover the magnetic permeability members 20-1210 to achieve an integrated appearance of the magnetic permeability members 20-1210. In this embodiment, the second adhesive assembly 20-1620 is in direct contact with the first magnetic permeability member 20-1211, the second magnetic permeability member 20-1212, and the third magnetic permeability member 20-1213, and the length of the second adhesive assembly 20-1620 in the longitudinal axis 20-1221 is greater than the total lengths of the magnetic permeability members 20-1210. Therefore, the second adhesive assembly 20-1620 can completely cover all magnetic permeability members 20-1210.

Similar to the first adhesive assembly 20-1610, the second adhesive assembly 20-1620 can be a heat-resistance insulation tape that only has adhesive on the surface that faces the magnetic permeability members 20-1210.

In some embodiments, the second adhesive assembly 20-1620 includes suitable heat-resistance material, such as polyimide. In some embodiments, the second adhesive assembly 20-1620 can bear temperatures of over 100° C. In some embodiments, the resistivity of the second adhesive assembly 20-1620 is greater than 640 Ωm.

When the magnetic permeability members 20-1210 covered by the second adhesive assembly 20-1620 are disposed in the hollow structure 20-1225, the user can use the first adhesive component 20-1710, the second adhesive component 20-1720, the third adhesive component 20-1730, and the fourth adhesive component 20-1740 to affix the magnetic permeability members 20-1210 to the first winding support 20-1220.

In particular, the first adhesive component 20-1710, the second adhesive component 20-1720, the third adhesive component 20-1730, and the fourth adhesive component 20-1740 can be glue. As shown in FIG. 74, the first adhesive component 20-1710 and the third adhesive component 20-1730 can be in contact with the first retaining wall 20-1223 and the second adhesive assembly 20-1620, and the second adhesive component 20-1720 and the fourth adhesive component 20-1740 can be in contact with the second retaining wall 20-1224 and the second adhesive assembly 20-1620. Since the first adhesive component 20-1710 and the second adhesive component 20-1720 are arranged along the longitudinal axis 20-1221, the third adhesive component 20-1730 and the fourth adhesive component 20-1740 are arranged along the longitudinal axis 20-1221, and the first winding support 20-1220 is disposed between the first adhesive component 20-1710 the third adhesive component 20-1730 and between the second adhesive component 20-1720 and the fourth adhesive component 20-1740, the magnetic permeability members 20-1210 can be steadily affixed to the first winding support 20-1220.

In some embodiments, when the magnetic permeability members 20-1210 covered by the second adhesive assembly 20-1620 are disposed in the hollow structure 20-1225, a gap is formed between the first winding support 20-1220 and the outer surface 20-1621 of the second adhesive assembly 20-1620 facing the first winding support 20-1220, so as to facilitate the assembly. The user can fill an adhesive member (not shown) in the gap, so as to affix the magnetic permeability members 20-1210 more steadily. The adhesive member can be heat-resistance insulation glue, and its thermal conductivity coefficient exceeds 20 W/Mk.

Furthermore, as shown in FIG. 74, in this embodiment, the total length of the magnetic permeability members 20-1210 in the longitudinal axis 20-1221 is greater than the length of the first winding support 20-1220. Thus, the length of the second adhesive assembly 20-1620 in the longitudinal axis 20-1221 is also greater than the length of the first adhesive assembly 20-1610.

Figure 75:
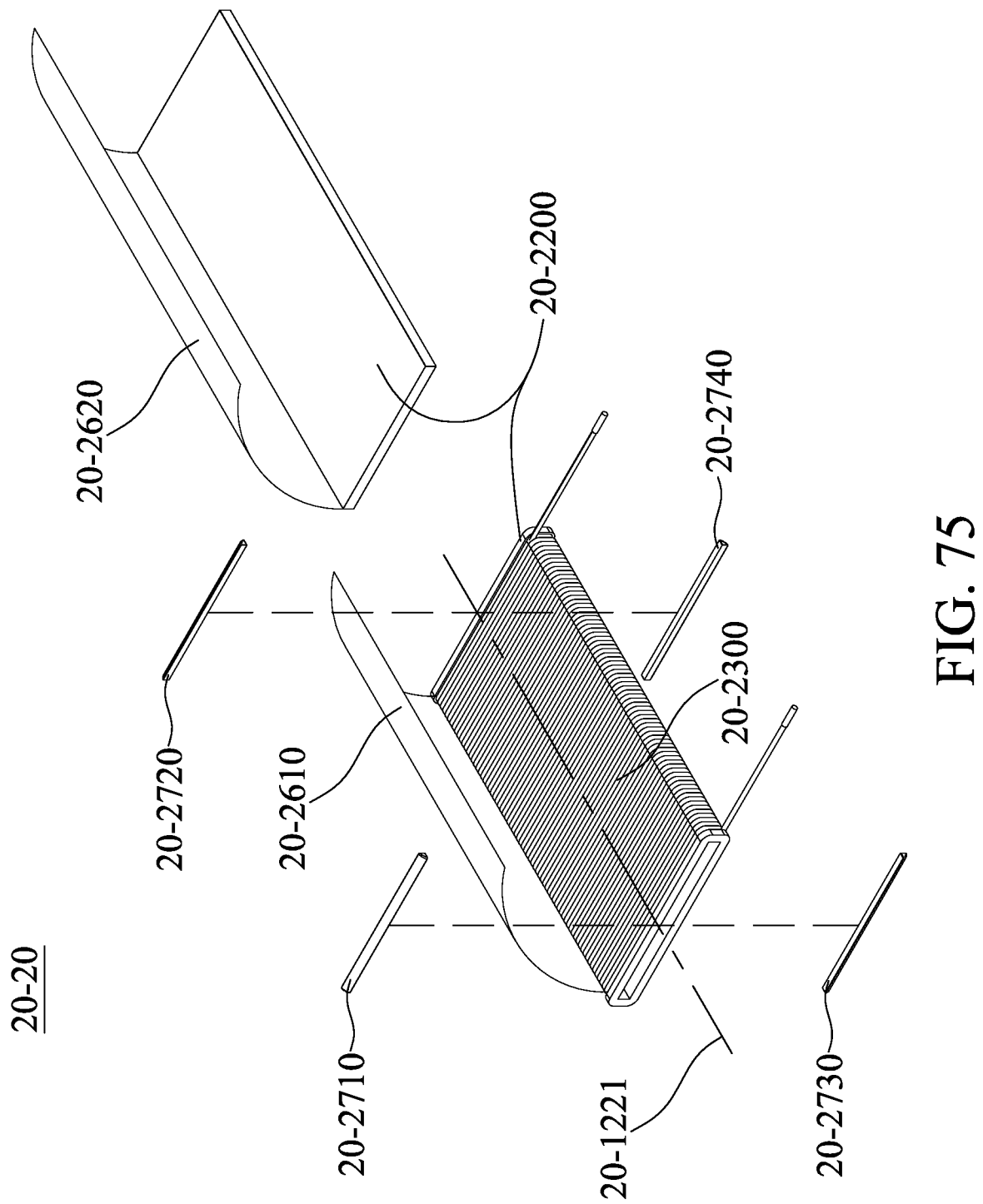
FIG. 75 is a schematic diagram of a second coil mechanism according to another embodiment of the invention.

As shown in FIG. 75, in this embodiment, the second coil mechanism 20-20 primarily includes a second base 20-2200, a third coil assembly 20-2300, at least one first adhesive assembly 20-2610, at least one second adhesive assembly 20-2620, a first adhesive component 20-2710, a second adhesive component 20-2720, a third adhesive component 20-2730, and a fourth adhesive component 20-2740.

The structure and the arrangement of the second base 20-2200, the third coil assembly 20-2300, the first adhesive assembly 20-2610, the second adhesive assembly 20-2620, the first adhesive component 20-2710, the second adhesive component 20-2720, the third adhesive component 20-2730, and the fourth adhesive component 20-2740 are the same as that of the first base 20-1200, the first coil assembly 20-1300, the first adhesive assembly 20-1610, the second adhesive assembly 20-1620, the first adhesive component 20-1710, the second adhesive component 20-1720, the third adhesive component 20-1730, and the fourth adhesive component 20-1740 of the first coil mechanism 20-10, so that the features thereof are not repeated in the interest of brevity.

Figure 76:
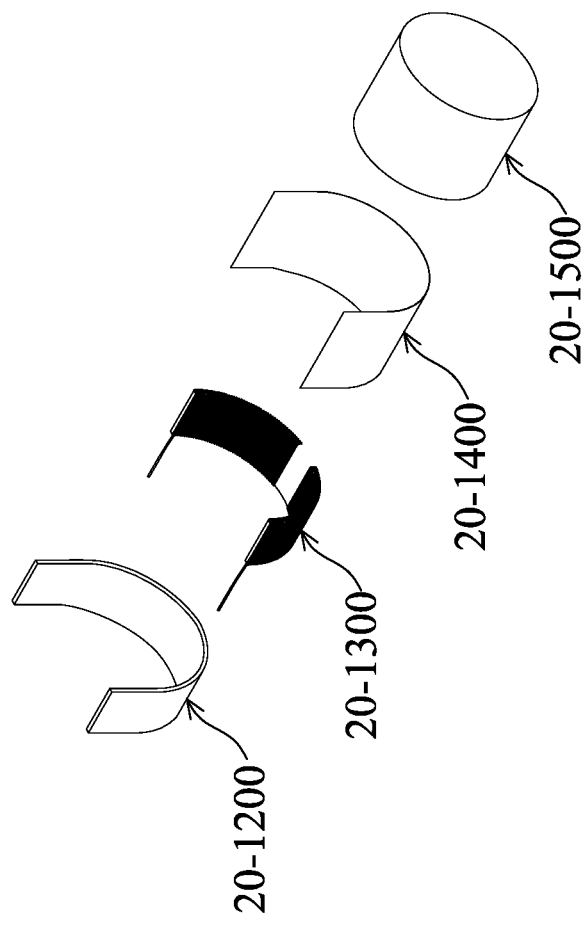
FIG. 76 is an exploded-view diagram of a first coil mechanism according to another embodiment of the invention.

Referring to FIG. 76, in another embodiment, a first coil mechanism 20-10 of a coil module 20-M can be assembled in an electronic device having the function of wireless charging, such as a smartphone, a smartwatch, a smart ring, a bluetooth earbuds, or a charging case. The first coil mechanism 20-10 primarily includes a first base 20-1200, a first coil assembly 20-1300, a magnetic shielding member 20-1400, and a power storage member 20-1500.

Figure 77:
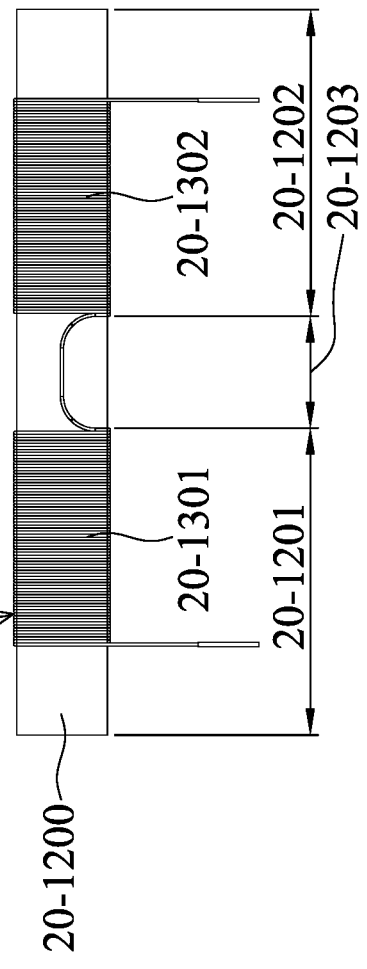
FIG. 77 is a schematic diagram of a first base and a first coil assembly according to another embodiment of the invention.

The first base 20-1200 includes a longitudinal structure, and has magnetic permeability material. As shown in FIG. 77, in assembly, the first coil assembly 20-1300 can wind around the first base 20-1200. In detail, the first base 20-1200 can be divided into a first section 20-1201, a second section 20-1202, and a middle section 20-1203, wherein the middle section 20-1203 is disposed between the first section 20-1201 and the second section 20-1202, and connects the first section 20-1201 to the second section 20-1202.

The first coil assembly 20-1300 can wind around the first section 20-1201 of the first base 20-1200 along a first direction, so as to form a first coil member 20-1301. For example, as seen from the right of the first base 20-1200, the first direction is clockwise.

Next, when the first coil assembly 20-1300 winds to the middle section 20-1203, the user can stop winding and pull the coil to the second section 20-1202. The first coil assembly 20-1300 can wind around the second section 20-1202 of the first base 20-1200 along a second direction, so as to form a second coil member 20-1302, wherein the first direction is opposite to the second direction. That is, as seen from the right of the first base 20-1200, the second direction is counterclockwise.

Figure 78:
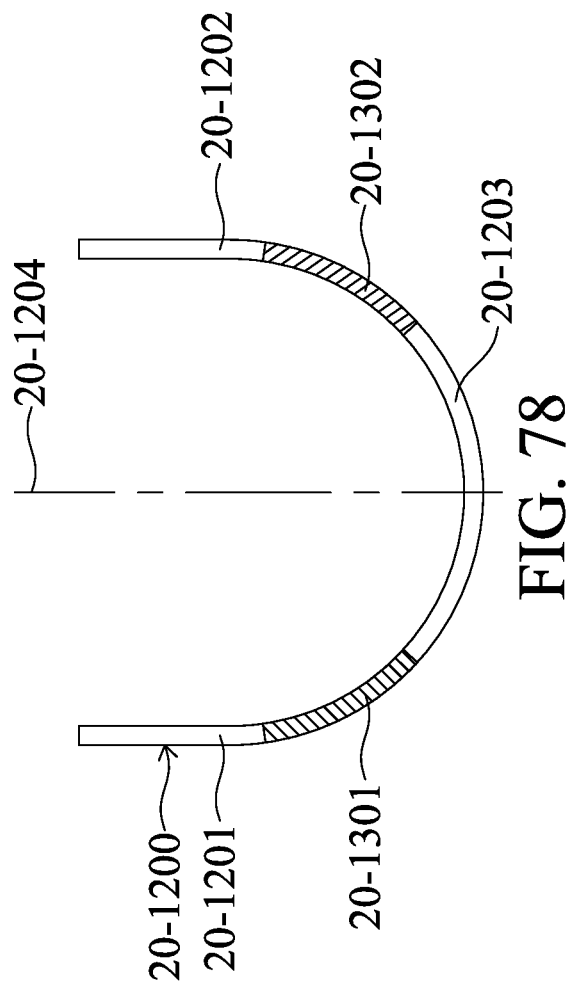
FIG. 78 is a schematic diagram of the first base and the first coil assembly according to another embodiment of the invention.

As shown in FIG. 78, after the first coil assembly 20-1300 winds around the first base 20-1200, the user can bend the first base 20-1200, so as to deform the first base 20-1200 to form a U-shaped appearance. The first section 20-1201, where the first coil member 20-1301 disposed on, includes an arc-shaped structure at one side of the U-shaped appearance. The second section 20-1202, where the second coil member 20-1302 disposed on, includes another arc-shaped structure at the other side of the U-shaped appearance. In other words, the first section 20-1201 and the second section 20-1202 are disposed on the opposite sides of a main axis 20-1204 of the U-shaped appearance.

Figure 79:
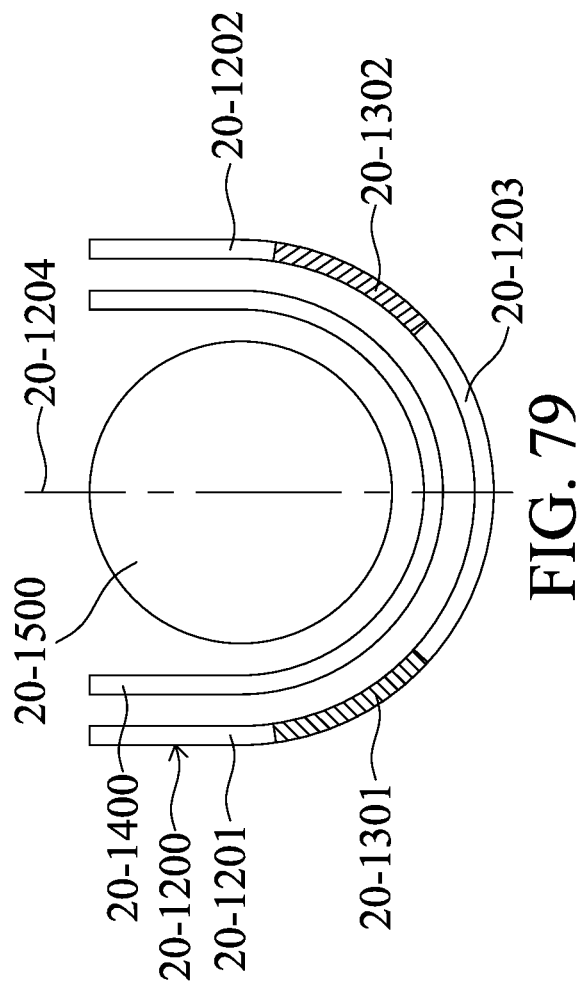
FIG. 79 is a schematic diagram of a first coil mechanism according to an embodiment of the invention.

After the first coil assembly 20-1300 winds on the first base 20-1200, the lead at its end can connect the power storage member 20-1500. As shown in FIG. 76 and FIG. 79, the power storage member 20-1500 and the middle section 20-1203 can be arranged along the main axis 20-1204, so that the U-shaped appearance surrounds the power storage member 20-1500. The magnetic shielding member 20-1400 is disposed between the power storage member 20-1500 and the first base 20-1200, and between the power storage member 20-1500 and the first coil assembly 20-1300, so that the electromagnetic interference between the power storage member 20-1500 and the first coil assembly 20-1300 can be reduced. For example, the magnetic shielding member 20-1400 can be made of iron, aluminum, a combination thereof, or other suitable metal.

As shown in FIG. 76 and FIG. 79, since the first coil member 20-1301 winds around the first section 20-1201, the first section 20-1201 is disposed between a portion of the first coil member 20-1301 and the power storage member 20-1500, and a portion of the first coil member 20-1301 is disposed between the first section 20-1201 and the power storage member 20-1500. Similarly, since the second coil member 20-1302 winds around the second section 20-1202, the second section 20-1202 is disposed between a portion of the second coil member 20-1302 and the power storage member 20-1500, and a portion of the second coil member 20-1302 is disposed between the second section 20-1202 and the power storage member 20-1500. In this embodiment, the first coil member 20-1301 and the second coil member 20-1302 do not wind around the whole first section 20-1201 and the whole second section 20-1202, so that a portion of the first section 20-1201 and a portion of the second section 20-1202 are exposed.

Figure 80:
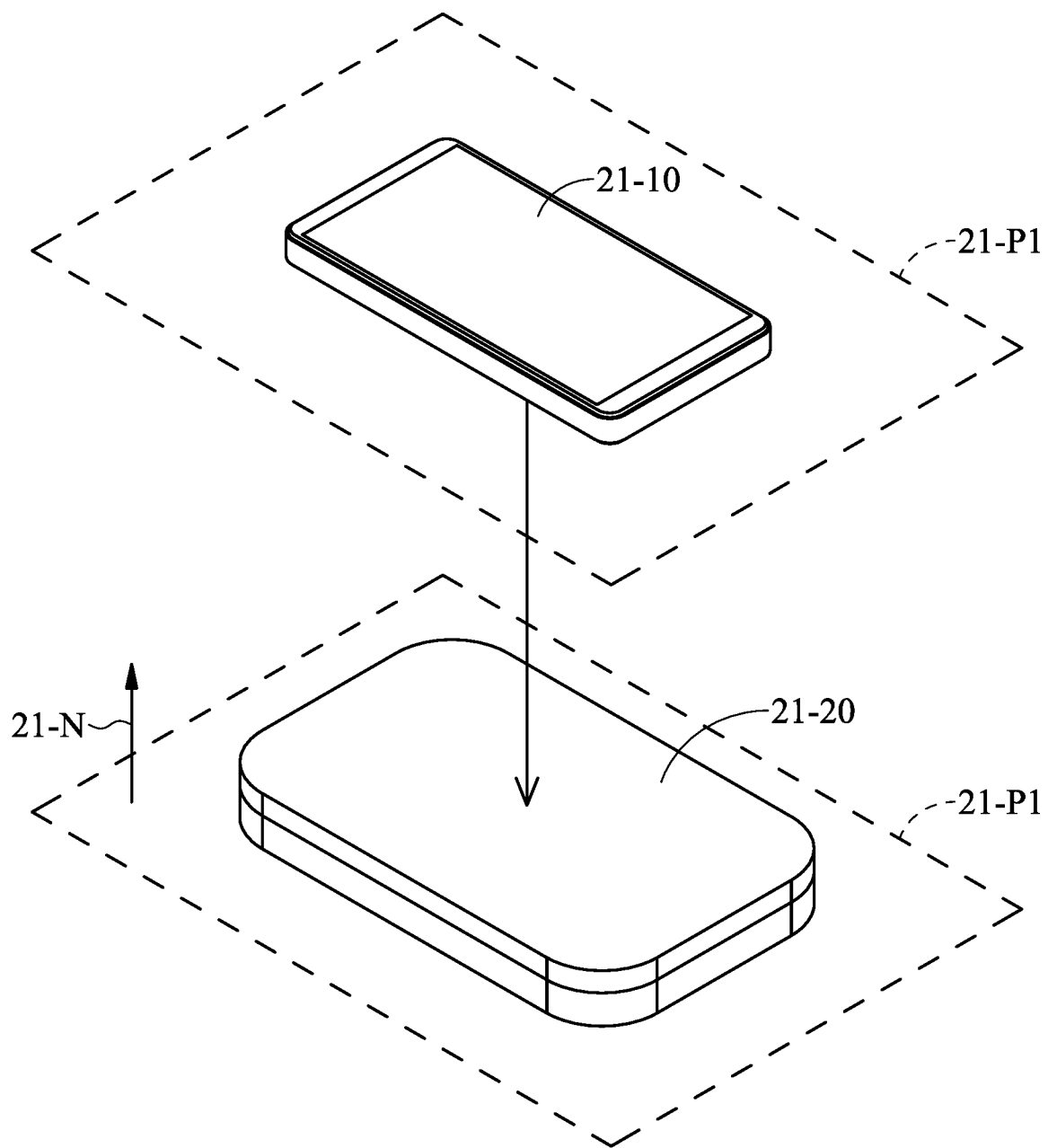
FIG. 80 is a schematic diagram of a coil module according to an embodiment of the invention.

Referring to FIG. 80, in an embodiment of the invention, the coil module 21-M includes a first coil mechanism 21-10 and a second coil mechanism 21-20. For example, the first coil mechanism 21-10 can be a smartphone, a smartwatch, a smart ring, a bluetooth earbuds, or a charging case with the function of wireless charging, and the second coil mechanism 21-20 can be a charging base.

Each of the first coil mechanism 21-10 and the second coil mechanism 21-20 can include one or more coils. For example, the first coil mechanism 21-10 can include a receiving coil (a first coil assembly) and/or a communication coil (a second coil assembly, such as a Near-field communication coil, NFC), and the second coil mechanism 21-20 can include one or more transmitting coils to match receiving coils with different dimensions or inductances. When the first coil mechanism 21-10 is adjacent to or disposed on the second coil mechanism 21-20, an inductive coupling can be generated between the receiving coil in the first coil mechanism 21-10 and at least one of the transmitting coils in the second coil mechanism 21-20. Therefore, the second coil mechanism 21-20 can provide power to the first coil mechanism 21-10 in a wireless manner, and the first coil mechanism 21-10 can storage the received power in a power storage member (such as a chargeable battery).

It should be noted that, the receiving coil of the first coil mechanism 21-10 is substantially horizontally disposed on a first virtual plane 21-P1, and the transmitting coils of the second coil mechanism 21-20 are substantially horizontally disposed on a second virtual plane 21-P2. When the first coil mechanism 21-10 is adjacent to the second mechanism 21-20 to charge, the first virtual plane 21-P1 is substantially parallel to the second virtual plane 21-P2 (in other words, the first virtual plane 21-P1 and the second virtual plane 21-P2 are perpendicular to a normal direction 21-N), so as to achieve a better charging performance.

Figure 81:
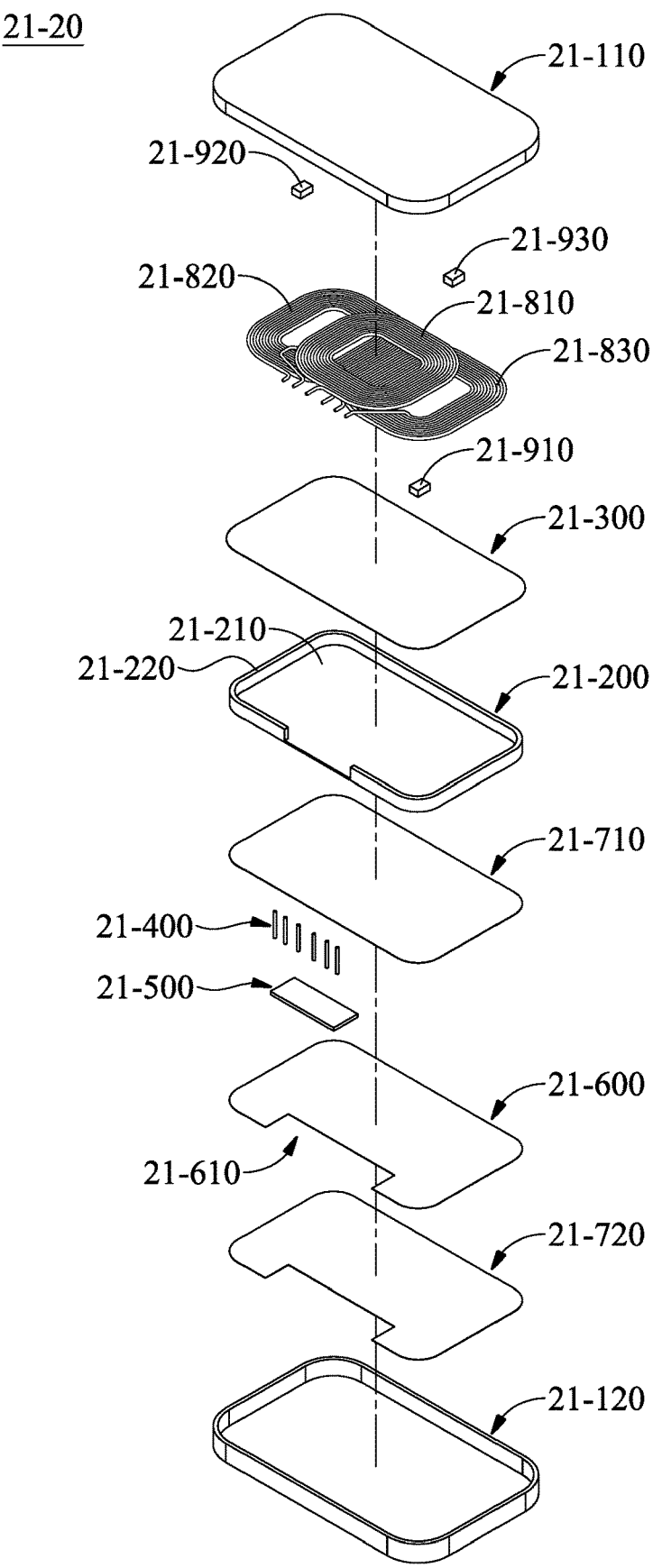
FIG. 81 is an exploded-view diagram of a second coil mechanism according to an embodiment of the invention.

As shown in FIG. 81, the second coil mechanism 21-20 primarily includes an upper cover 21-110, a lower cover 21-120, a base 21-200, an adhesive assembly 21-300, a connecting assembly 21-400, an electronic member 21-500, a thermal-conductive assembly 21-600, a plurality of sticking members 21-710 and 21-720, a plurality of transmitting coils, and a plurality of temperature sensors. In this embodiment, the transmitting coils includes a third coil assembly 21-810, a fourth coil assembly 21-820, and a fifth coil assembly 21-830, and the temperature sensors includes a third coil assembly temperature sensor 21-910, a fourth coil assembly temperature sensor 21-920, and a fifth coil assembly temperature sensor 21-930.

The upper cover 21-110 and the lower cover 21-120 can be engaged together. After engaged, they can form a hollow box. The base 21-200, the adhesive assembly 21-300, the connecting assembly 21-400, the electronic member 21-500, the thermal-conductive assembly 21-600, the sticking members 21-710 and 21-720, the third coil assembly 21-810, the fourth coil assembly 21-820, the fifth coil assembly 21-830, the third coil assembly temperature sensor 21-910, the fourth coil assembly temperature sensor 21-920, and the fifth coil assembly temperature sensor 21-930 are accommodated in the hollow box.

Figure 82:
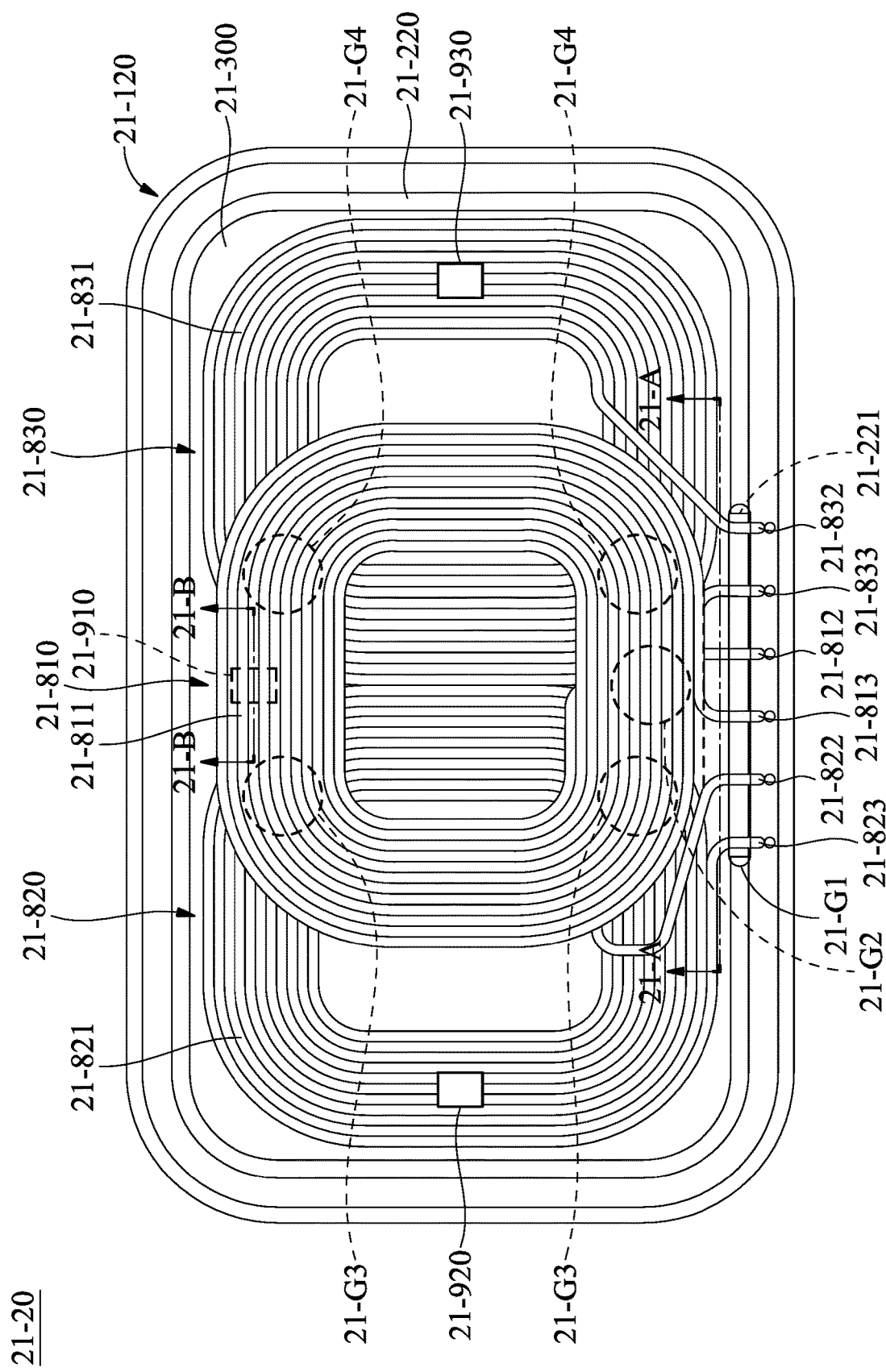
FIG. 82 is a top view diagram of the second coil mechanism according to an embodiment of the invention, wherein an upper cover is omitted.

As shown in FIG. 81 and FIG. 82, the base 21-200 includes a bottom plate 21-210 and a lateral wall 21-220 extending from the bottom plate 21-210. Both the bottom plate 21-210 and the lateral wall 21-220 have magnetic permeability material. The third coil assembly 21-810, the fourth coil assembly 21-820, and the fifth coil assembly 21-830 are electrically independent, and are disposed on the bottom plate 21-210 of the base 21-200. As seen from a direction perpendicular to the normal direction 21-N, at least a portion of the lateral wall 21-220 overlaps the third coil assembly 21-810, the fourth coil assembly 21-820, and/or the fifth coil assembly 21-830.

In detail, the third coil assembly 21-810 includes an annular third main body 21-811 and leads (third coil assembly leads) 21-812 and 21-813 at the opposite ends of the coil, the fourth coil assembly 21-820 includes an annular fourth main body 21-821 and leads (fourth coil assembly leads) 21-822 and 21-823 at the opposite ends of the coil, and the fifth coil assembly 21-830 includes an annular third main body 21-831 and leads (fifth coil assembly leads) 21-832 and 21-833 at the opposite ends of the coil. The fourth main body 21-821 and the fifth main body 21-831 are affixed to the base 21-200 through the adhesive assembly 21-300, and the third main body 21-811 is disposed on the fourth main body 21-821 and the fifth main body 21-831. Therefore, as seen from the normal direction 21-N, the third main body 21-811 and the fourth main body 21-821 are partially overlapped, and third main body 21-811 and the fifth main body 21-831 are partially overlapped. As seen from a direction perpendicular to the normal direction 21-N, the fourth main body 21-821 and the fifth main body 21-831 are disposed between the third main body 21-811 and the base 21-200.

In this embodiment, the adhesive assembly 21-300 is a heat-resistance insulation tape or heat-conductive glue with adhesion on the opposite surfaces. For example, the adhesive assembly 21-300 can include polyimide (PI) or other suitable material. Moreover, in some embodiments, the appearance of the adhesive assembly 21-300 can correspond to the fourth main body 21-821 and the fifth main body 21-831, so that the adhesive assembly 21-300 does not exceed the outline of the fourth main body 21-821 and the outline of the fifth main body 21-831.

Figure 83:
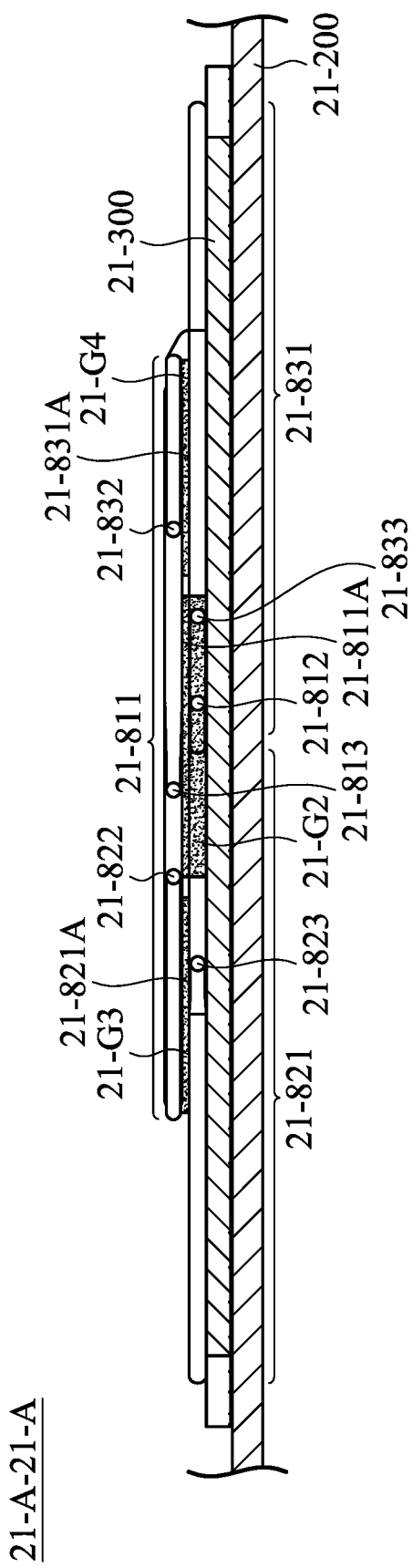
FIG. 83 is a cross-sectional view along line 21-A-21-A in FIG. 82.

FIG. 83 is a cross-sectional view along line 21-A-21-A in FIG. 82. Referring to FIG. 81, FIG. 82, and FIG. 83, in order to make the most of available space to reduce the thickness of the second coil mechanism 21-20 in the normal direction 21-N, the leads 21-812 and 21-813 of the third coil assembly 21-810, the leads 21-822 and 21-823 of the fourth coil assembly 21-820, and the leads 21-832 and 21-833 of the fifth coil assembly 21-830 can be arranged as follows.

First, the lead 21-812 of the third coil assembly 21-810 at the inner side of the third main body 21-811 can pass through the space between the fourth main body 21-821 and the fifth main body 21-831 and the space between the base 21-200 and a surface 21-811A of the third main body 21-811 facing the fourth main body 21-821, and transverse a portion of the third main body 21-811 and extend to the position adjacent to the lead 21-813. The lead 21-833 of the fifth coil assembly 21-830 at the exterior side of the fifth main body 21-831 can also pass the aforementioned space, and extend to the position adjacent to the lead 21-813. As shown in the direction perpendicular to the normal direction 21-N, the leads 21-812 and 21-833 overlap the fourth main body 21-821 and/or the fifth coil assembly 21-830.

Next, the lead 21-822 of the fourth coil assembly 21-820 at the inner side of the fourth main body 21-821 can pass through the space between the upper cover 21-110 and a surface 21-821A of the fourth main body 21-821 facing the third main body 21-811, and transverse a portion of the fourth main body 21-821 and extend to the position adjacent to the lead 21-813. The lead 21-832 of the fifth coil assembly 21-830 at the inner side of the fifth main body 21-831 can pass through the space between the upper cover 21-110 and a surface 21-831A of the fifth main body 21-831 facing the third main body 21-811, and transverse a portion of the fifth main body 21-831 and extend to the position adjacent to the lead 21-813.

Finally, the lead 21-823 at the exterior side of the fourth main body 21-821 can also extend to the position adjacent to the lead 21-813.

Although the coil module 21-M has a plurality of transmitting coils, the thickness of the transmitting coils is within two layers. Therefore, the coil module 21-M can be miniaturized.

The leads 21-812, 21-813, 21-822, 21-823, 21-832 and 21-833 can be connected to the connecting assembly 21-400, and can be affixed by a first adhesive component 21-G1. For example, the first adhesive component 21-G1 can be a glue, which is in direct contact with the leads 21-812, 21-813, 21-822, 21-823, 21-832 and 21-833 and annularly surrounds the leads 21-812, 21-813, 21-822, 21-823, 21-832 and 21-833.

In this embodiment, a receiving portion 21-221 is formed on the lateral wall 21-220 of the base 21-200 to receive the leads 21-812, 21-813, 21-822, 21-823, 21-832 and 21-833. The first adhesive component 21-G1 can be filled in the receiving portion 21-221, so that the first adhesive component 21-G1 is in contact with the lateral wall 21-200, the adhesive assembly 21-300, and the connecting assembly 21-400. However, since the first adhesive component 21-G1 and the adhesive assembly 21-300 include different material, they are not integrally formed as one piece, and the greatest dimensions of the first adhesive component 21-G1 and the adhesive assembly 21-300 in the normal direction 21-N are different. In this embodiment, the thermal conductivity coefficient of the adhesive assembly 21-300 is greater than 1 W/Mk, and preferably is greater than 20 W/Mk. The thermal conductivity coefficient of the first adhesive component 21-G1 is smaller than the thermal conductivity coefficient of the adhesive assembly 21-300.

Referring to FIG. 81, FIG. 82 and FIG. 83, in this embodiment, the adhesive assembly 21-300 is not in contact with the third main body 21-811, so that the user can use the second adhesive component 21-G2, the third adhesive component 21-G3, and the fourth adhesive component 21-G4 to affix the third main body 21-811 of the third coil assembly 21-810 to the fourth main body 21-821 and fifth main body 21-831 and position the third main body 21-811, the fourth main body 21-821, and fifth main body 21-831.

The second adhesive component 21-G2 is filled in the space where the leads 21-812, 21-823 and 21-833 passing. In other words, the second adhesive component 21-G2 is filled in the space between the fourth main body 21-821 and the fifth main body 21-831 and between the base 21-200 and the surface 21-811A of the third main body 21-811. The second adhesive component 21-G2 is in contact with the third main body 21-811, the fourth main body 21-821, the fifth main body 21-831, the adhesive assembly 21-300, and the leads 21-812, 21-823 and 21-833. Similar to the first adhesive component 21-G1, the second adhesive component 21-G2 can be a glue. It should be noted that, since the second adhesive component 21-G2 and the adhesive assembly 21-300 include different material, they are not integrally formed as one piece, and the greatest dimensions of the second adhesive component 21-G2 and the adhesive assembly 21-300 in the normal direction 21-N are different.

The third adhesive component 21-G3 is filled between the third main body 21-811 and the fourth main body 21-821. The third adhesive component 21-G3 is in contact with the third main body 21-811 and the fourth main body 21-821, and is a distance away from the fifth main body 21-831. As seen from the normal direction 21-N, the third adhesive component 21-G3 does not exceed the outline of the third main body 21-811 and the outline of the fourth main body 21-821. Moreover, the greatest dimensions of the third adhesive component 21-G3 and the adhesive assembly 21-300 in the normal direction 21-N are different.

The fourth adhesive component 21-G4 is filled between the third main body 21-811 and the fifth main body 21-831. The fourth adhesive component 21-G4 is in contact with the third main body 21-811 and the fifth main body 21-831, and is a distance away from the fourth main body 21-821. As seen from the normal direction 21-N, the fourth adhesive component 21-G4 does not exceed the outline of the third main body 21-811 and the outline of the fifth main body 21-831. Moreover, the greatest dimensions of the fourth adhesive component 21-G4 and the adhesive assembly 21-300 in the normal direction 21-N are different.

Figure 84:
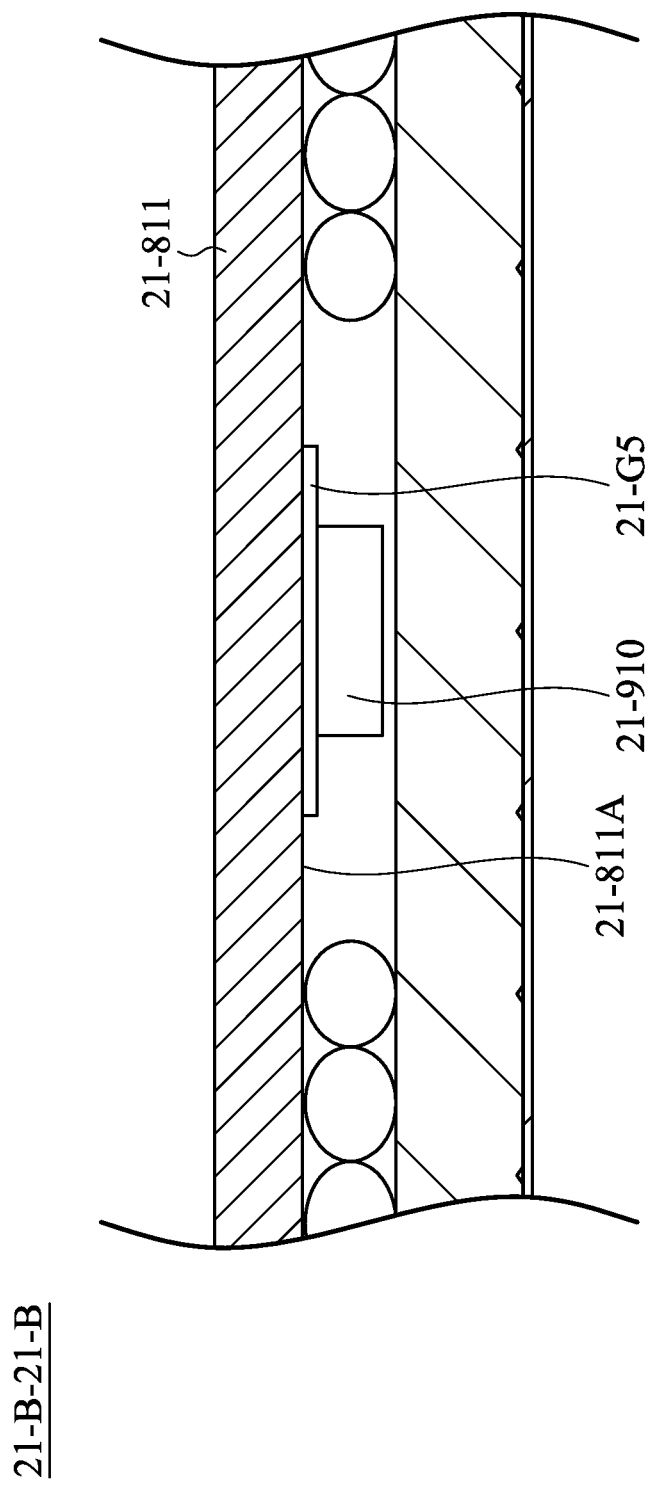
FIG. 84 is a cross-sectional view along line 21-B-21-B in FIG. 82.

Referring to FIG. 81 and FIG. 84, the third coil assembly temperature sensor 21-910 is disposed on the surface 21-811A of the third main body 21-811 to measure the temperature of the third coil assembly 21-810. The third coil assembly temperature sensor 21-910 can be affixed to the third main body 21-811 by a fifth adhesive component 21-G5. As seen from the normal direction 21-N, the fifth adhesive component 21-G5 does not exceed the outline of the third main body 21-811. As seen from the direction perpendicular to the normal direction 21-N, the third coil assembly temperature sensor 21-910 overlaps the fourth coil assembly 21-820. Furthermore, the third coil assembly temperature sensor 21-910 is electrically connected to the connecting assembly 21-400. In some embodiments, the fifth adhesive component 21-G5 is in contact with the third coil assembly temperature sensor 21-910 and the adhesive assembly 21-300, or the third coil assembly temperature sensor 21-910 and the base 21-200, so as to affix the third coil assembly temperature sensor 21-910 from below.

The fourth coil assembly temperature sensor 21-920 is disposed on the surface 21-821A of the fourth main body 21-811 to measure the temperature of the fourth coil assembly 21-820. As seen from the direction perpendicular to the normal direction 21-N, the fourth coil assembly temperature sensor 21-920 overlaps the third coil assembly 21-810. Moreover, the fourth coil assembly temperature sensor 21-920 is electrically connected to the connecting assembly 21-400.

The fifth coil assembly temperature sensor 21-930 is disposed on the surface 21-831A of the fifth main body 21-831 to measure the temperature of the fifth coil assembly 21-830. As seen from the direction perpendicular to the normal direction 21-N, the fifth coil assembly temperature sensor 21-930 overlaps the third coil assembly 21-810. Moreover, the fifth coil assembly temperature sensor 21-930 is electrically connected to the connecting assembly 21-400.

Figure 85:
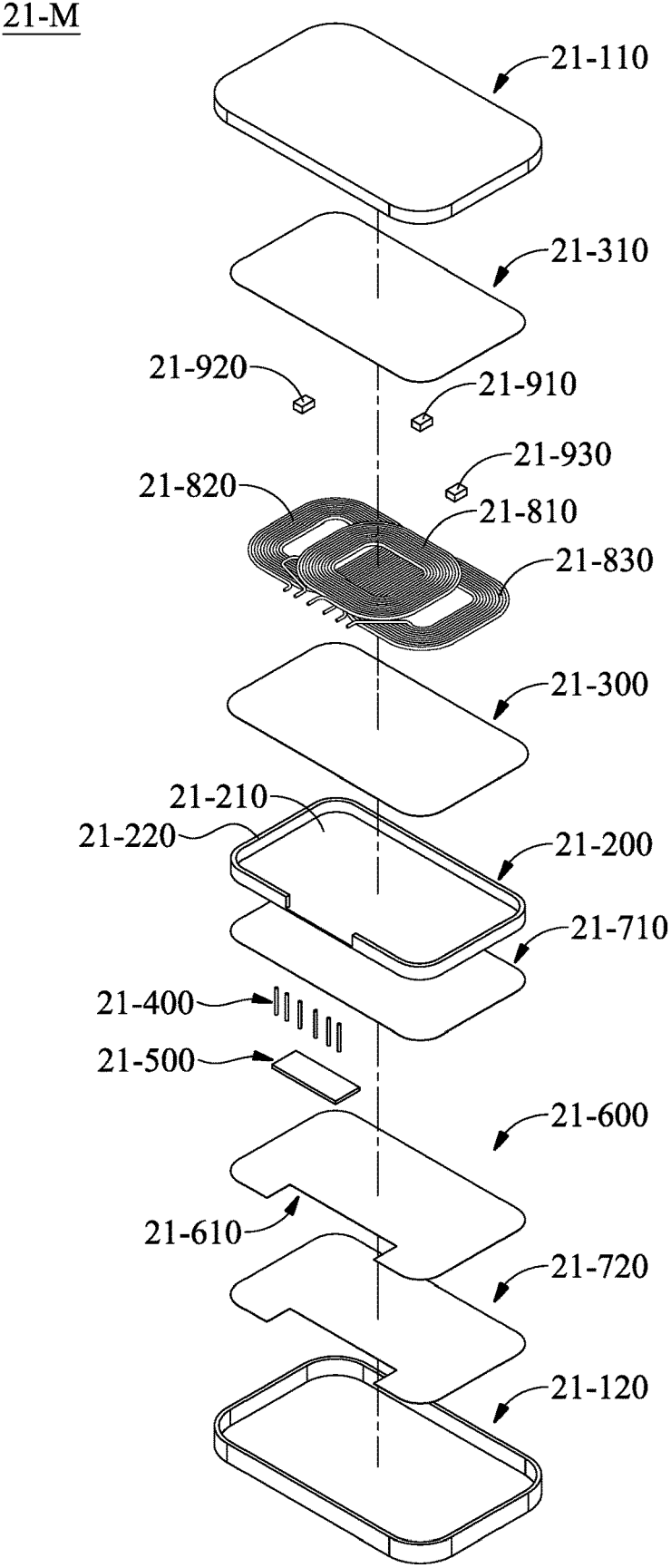
FIG. 85 is a exploded-view diagram of a second coil mechanism according to another embodiment of the invention.

Referring to FIG. 85, in some embodiments, the third coil assembly temperature sensor 21-910 is disposed on the surface of the third main body 21-811 facing the upper cover 21-110, and the second coil mechanism 21-20 further includes an another adhesive assembly 21-310. The adhesive assembly 21-310 is in contact with the third main body 21-811, the fourth main body 21-821, the fifth main body 21-831, the third coil assembly temperature sensor 21-910, the fourth coil assembly temperature sensor 21-920, and the fifth coil assembly temperature sensor 21-930, so that the aforementioned members can be affixed relative to the upper cover 21-110.

Referring to FIG. 81, the base 21-200 can be affixed to the thermal-conductive assembly 21-600 by the sticking member 21-710, and the thermal-conductive assembly 21-600 can be affixed to the lower cover 21-120 by the sticking member 21-720. The thermal-conductive assembly 21-600 can include aluminum, graphite, ceramic, or metal with low magnetic permeability. The thermal-conductive assembly 21-600 is configured to dissipate the heat transferred from the third coil assembly 21-810, a fourth coil assembly 21-820, and a fifth coil assembly 21-830 to the base 21-200. In the normal direction 21-N, the thickness of the thermal-conductive assembly 21-600 is different from the thickness of the base 21-200. The thermal conductivity coefficient of the thermal-conductive assembly 21-600 is different from the thermal conductivity coefficient of the base 21-200, and the magnetic permeability coefficient of the base 21-200 is greater than the magnetic permeability coefficient of the thermal-conductive assembly 21-600. For example, the magnetic permeability coefficient of the thermal-conductive assembly 21-600 is less than $125 \times 10^{-6}$ H/m.

The electronic member 21-500 can be a circuit board. The electronic member 21-500 can be electrically connected to the connecting assembly 21-400, and disposed between the thermal-conductive assembly 21-600 and the lower cover 21-120. In this embodiment, a depression 21-610 is formed on the thermal-conductive assembly 21-600, and the electronic member 21-500 is accommodated in the depression 21-610. Therefore, the electronic member 21-500 can also be affixed to the base 21-200 by the sticking member 21-710.

Since the thermal-conductive assembly 21-600 has the depression 21-610, as seen from the normal direction 21-N, the electronic member 21-500 overlaps the base 21-200 and does not overlap the thermal-conductive assembly 21-600, and the projection area of the base 21-200 is greater than the projection area of the thermal-conductive assembly 21-600. In some embodiments, the depression 21-610 is formed on the base 21-200. Thus, in these embodiments, the electronic member 21-500 overlaps the base 21-200 as seen from the direction perpendicular to the normal direction 21-N.

Figure 86:
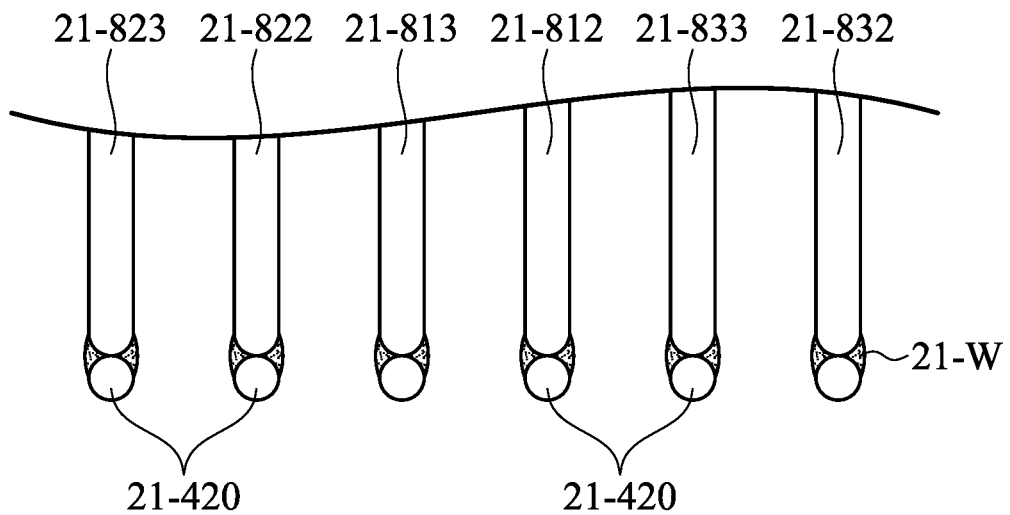
FIG. 86 is a schematic diagram of the leads and the connecting assembly according to an embodiment of the invention.

The connecting manner between the leads 21-812, 21-813, 21-822, 21-823, 21-832 and 21-833 and the connecting assembly 21-400 is discussed below. Referring to FIG. 86, in some embodiments, the connecting assembly 21-400 includes a plurality of pins 21-420. The pins 21-420 is connected to the leads 21-812, 21-813, 21-822, 21-823, 21-832 and 21-833 one-to-one through the conductive components 21-W. For example, the conductive components 21-W can be solders. The first adhesive component 21-G1 can cover the conductive components 21-W. It should be noted that, the leads 21-812, 21-813, 21-822, 21-823, 21-832 and 21-833 are extended along the direction perpendicular to the normal direction 21-N in parallel, and the pins 21-420 are extended along the normal direction 21-N.

Figure 87:
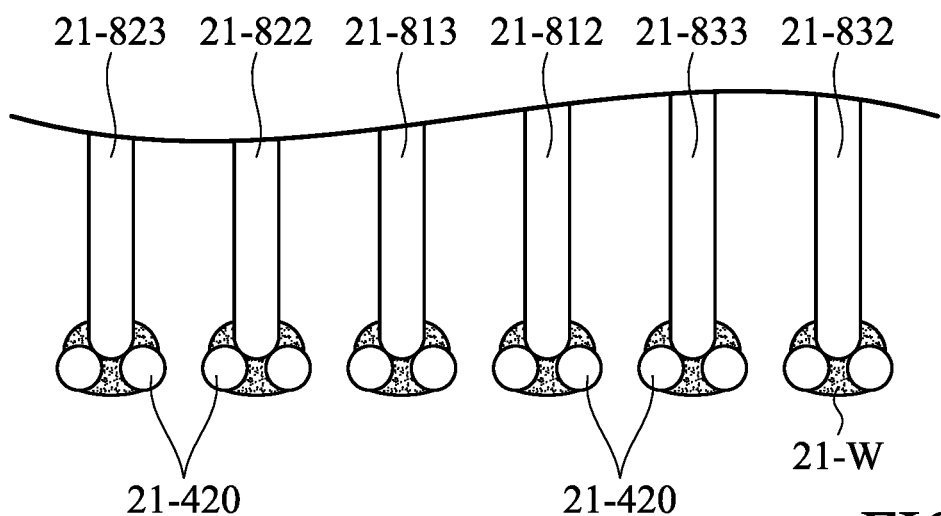
FIG. 87 is a schematic diagram of the leads and the connecting assembly according to another embodiment of the invention.

Referring to FIG. 87, in some embodiments, each of the leads 21-812, 21-813, 21-822, 21-823, 21-832 and 21-833 are disposed between the adjacent pins 21-420. One of the conductive components 21-W can connect one of the leads 21-812, 21-813, 21-822, 21-823, 21-832 and 21-833 to two pins 21-420.

Figure 88:
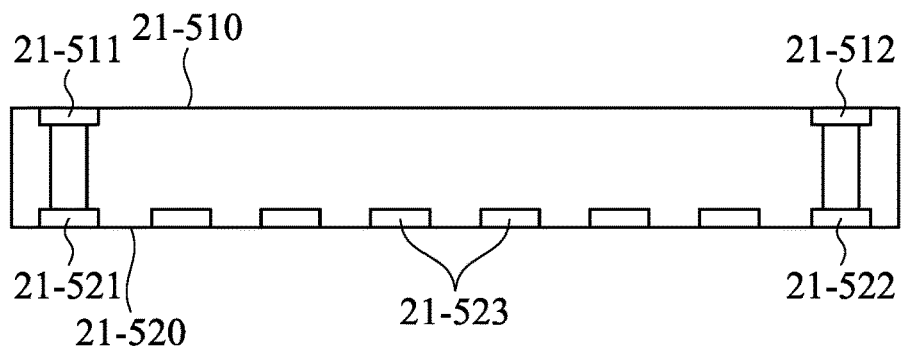
FIG. 88 is a schematic diagram of an electronic member according to some embodiments of the invention.

Referring to FIG. 88, in some embodiments, a first surface 21-510 of the electronic member 21-500 facing the third coil assembly 21-810 includes a plurality of electrical contacts (such as a first electrical contact 21-511 and a third electrical contact 21-512), and a second surface 21-520 away from the third coil assembly 21-810 includes a plurality of electrical contacts (such as a second electrical contact 21-521, a fourth electrical contact 21-522, and at least one reinforcing contact 21-523).

The first electrical contact 21-511 is in contact with the leads 21-812, 21-813, 21-822, 21-823, 21-832 and/or 21-833 or electrically connected to the third coil assembly temperature sensor 21-910, the fourth coil assembly temperature sensor 21-920, or the fifth coil assembly temperature sensor 21-930. The first electrical contact 21-511 is electrically connected to the second electrical contact 21-521 through the wire(s) in the electronic member 21-500. Therefore, the second electrical contact 21-521 can be electrically connected to the leads 21-812, 21-813, 21-822, 21-823, 21-832, 21-833, the third coil assembly temperature sensor 21-910, the fourth coil assembly temperature sensor 21-920, or the fifth coil assembly temperature sensor 21-930.

Similarly, the third electrical contact 21-512 is in contact with the leads 21-812, 21-813, 21-822, 21-823, 21-832 and/or 21-833 or electrically connected to the third coil assembly temperature sensor 21-910, the fourth coil assembly temperature sensor 21-920, or the fifth coil assembly temperature sensor 21-930. The third electrical contact 21-512 is electrically connected to the fourth electrical contact 21-522 through the wire(s) in the electronic member 21-500. Therefore, the fourth electrical contact 21-522 can be electrically connected to the leads 21-812, 21-813, 21-822, 21-823, 21-832, 21-833, the third coil assembly temperature sensor 21-910, the fourth coil assembly temperature sensor 21-920, or the fifth coil assembly temperature sensor 21-930.

Figure 89:
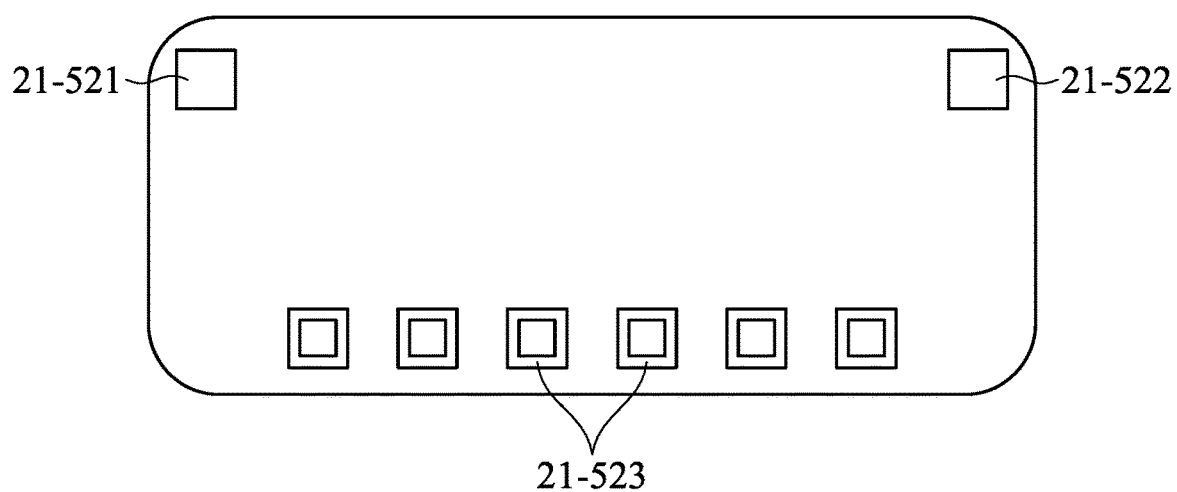
FIG. 89 is a bottom view diagram of the electronic member according to some embodiments of the invention.

The reinforcing contact 21-523 has metal material, and is electrically independent from the leads 21-812, 21-813, 21-822, 21-823, 21-832, 21-833, the third coil assembly temperature sensor 21-910, the fourth coil assembly temperature sensor 21-920, and the fifth coil assembly temperature sensor 21-930. As shown in FIG. 89, as seen from the normal direction 21-N, the pattern formed by the connections of the second electrical contact 21-521, the fourth electrical contact 21-522 and the reinforcing contact 21-523 surrounds the center of the electronic member 21-500, so as to enhance the strength of the electronic member 21-500.

Figure 90:
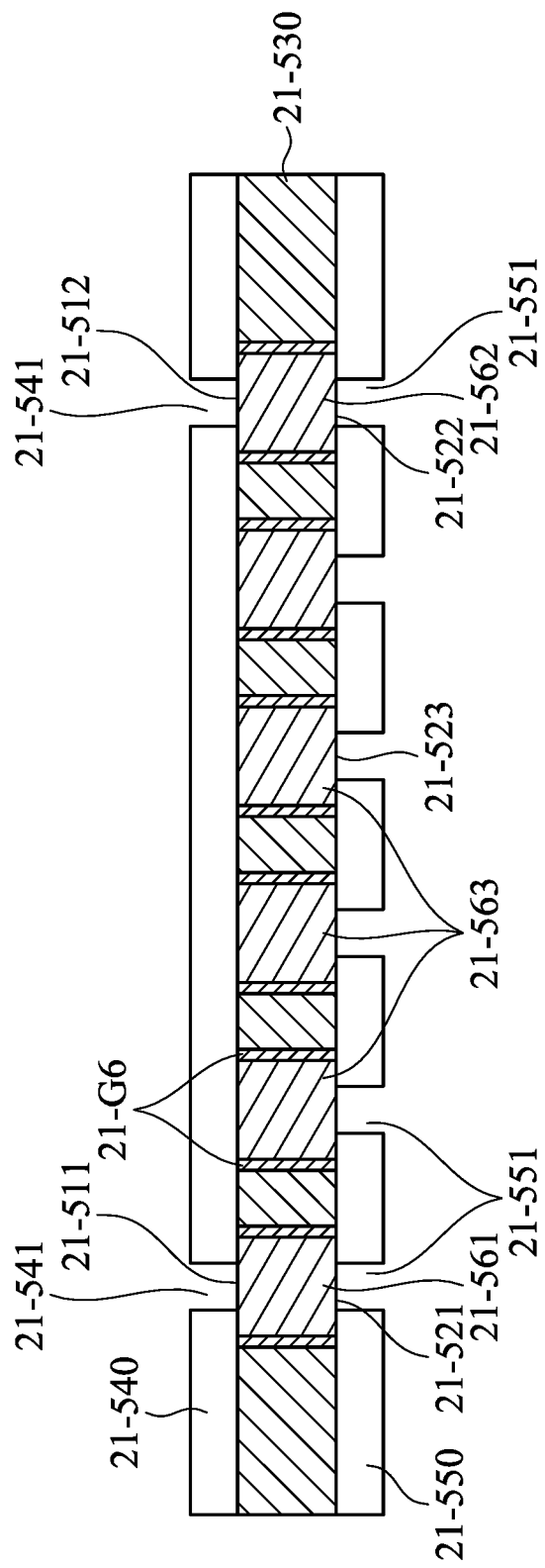
FIG. 90 is a schematic diagram of an integrated structure formed by a base and an electronic member according to some embodiments of the invention.

Referring to FIG. 90, in some embodiments, the base 21-200 and the electronic member 21-500 can form an integrated structure. As shown in the figure, the integrated structure includes a bottom plate 21-530, a first insulation layer 21-540, a second insulation layer 21-550, and a plurality of metal members. The aforementioned metal members includes a first metal member 21-561, a second metal member 21-562, and a third metal member 21-563.

The bottom plate 21-530 is disposed between the first insulation layer 21-540 and the second insulation layer 21-550. The bottom plate 21-530 includes a plate structure and has magnetic permeability material. A plurality of receiving portion is formed on the bottom plate 21-530, such as a first accommodating portion 21-531, a second accommodating portion 21-532, and at least one third accommodating portion 21-533. The first metal member 21-561, the second metal member 21-562, and the third metal member 21-563 can be respectively accommodated in the first accommodating portion 21-531, the second accommodating portion 21-532, and the third accommodating portion 21-533.

The first insulation layer 21-540 has openings 21-541 at the positions corresponding to the first metal member 21-561 and the second metal member 21-562, so that the first electrical contact 21-511 and the third electrical contact 21-512 on the first surface 21-510 of the electronic member 21-500 can be formed. The first insulation layer 21-540 does not include the opening at the position corresponding to the third metal member 21-563, therefore, the third metal member 21-563 is not exposed from the first insulation layer 21-540.

The second insulation layer 21-550 has openings 21-551 at the positions corresponding to the first metal member 21-561, the second metal member 21-562, and the third metal member 21-563, so that the second electrical contact 21-521 the fourth electrical contact 21-522, and the reinforcing contact 21-523 on the second surface 21-520 of the electronic member 21-500 can be formed.

In some embodiments, the first metal member 21-561, the second metal member 21-562, and the third metal member 21-563 are affixed to the bottom plate 21-530 by sixth adhesive components 21-G6. In some embodiments, the sixth adhesive components 21-G6 are in contact with the first insulation layer 21-540 and/or the second insulation layer 21-550.

Figure 91:
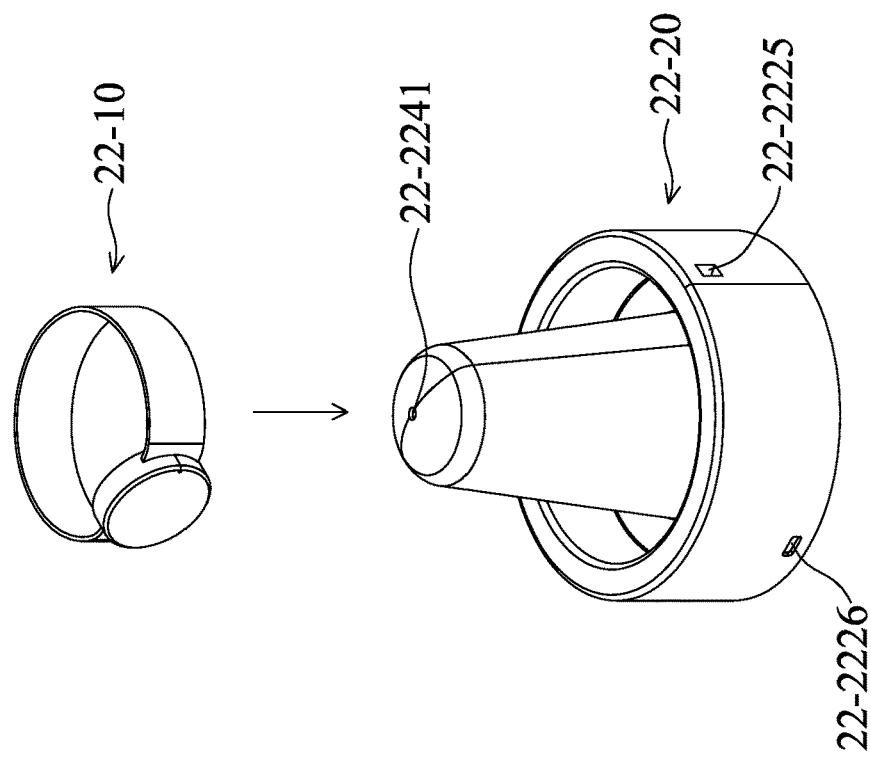
FIG. 91 is a schematic diagram of a coil module according to an embodiment of the invention.

Referring to FIG. 91, in an embodiment of the invention, the coil module 22-M includes at least one first coil mechanism 22-10 and a second coil mechanism 22-20. The first coil mechanism 22-10 can be a portable electronic device with the function of wireless charging, such as a smartwatch, a smart ring, or a bluetooth earbuds. The second coil mechanism 22-20 can be a charging base.

Each of the first coil mechanism 22-10 and the second coil mechanism 22-20 can include one or more coils. For example, the first coil mechanism 22-10 can include a receiving coil and/or a communication coil (such as a Near-field communication coil, NFC), and the second coil mechanism 22-20 can include one or more transmitting coils to match receiving coils with different dimensions or inductances. When the first coil mechanism 22-10 is adjacent to or disposed on the second coil mechanism 22-20, an inductive coupling can be generated between the receiving coil in the first coil mechanism 22-10 and at least one of the transmitting coils in the second coil mechanism 22-20. Therefore, the second coil mechanism 22-20 can provide power to the first coil mechanism 22-10 in a wireless manner, and the first coil mechanism 22-10 can store the received power in a power storage member (such as a chargeable battery).

Figure 92:
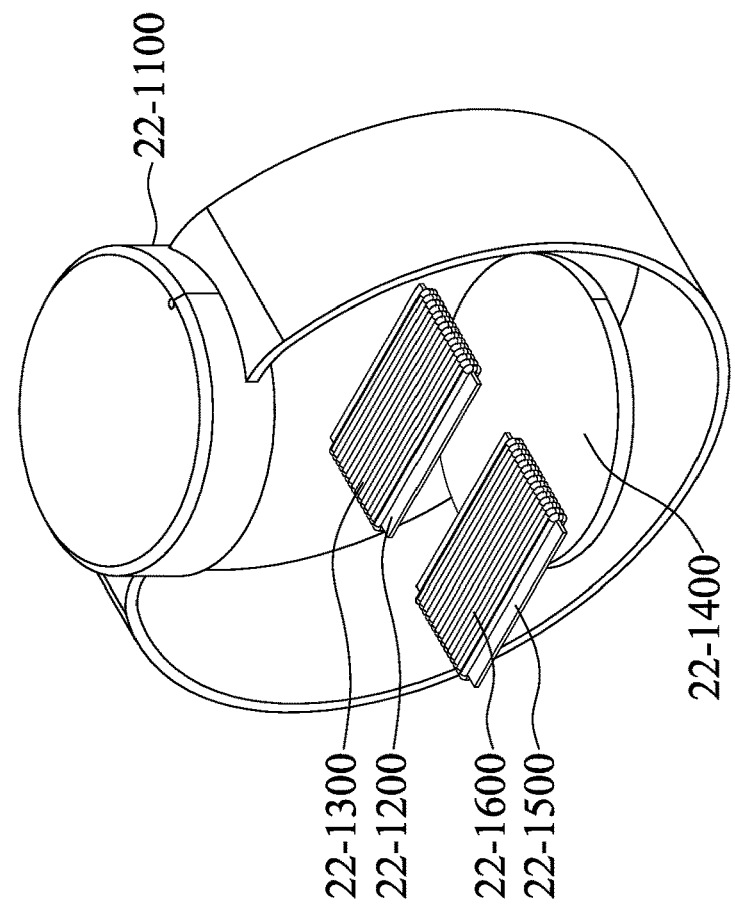
FIG. 92 is an exploded-view diagram of a first coil mechanism according to an embodiment of the invention.

As shown in FIG. 92, each first coil mechanism 21-10 includes a case 22-1100, a first base 22-1200, a first coil assembly 22-1300, a power storage member 22-1400, a winding support 22-1500, and a second coil assembly 22-1600.

The case 22-1100 has an annular structure, and the first base 22-1200, the first coil assembly 22-1300, the power storage member 22-1400, the winding support 22-1500, and the second coil assembly 22-1600 are disposed in the case 22-1100. The first coil assembly 22-1300 winds around the first base 22-1200 to form a first main body 22-1310, and is electrically connected to the power storage member 22-1400. The second coil assembly 22-1600 winds around the winding support 22-1500. Both the first base 22-1200 and the winding support 22-1500 include magnetic permeability material. In some embodiments, the first base 22-1200 and the winding support 22-1500 are integrally formed as one piece.

It should be noted that, the first coil assembly 22-1300 and the second coil assembly 22-1600 are electrically independent of each other. In this embodiment, the first coil assembly 22-1300 is a receiving coil, and the second coil assembly 22-1600 is a communication coil.

Figure 93:
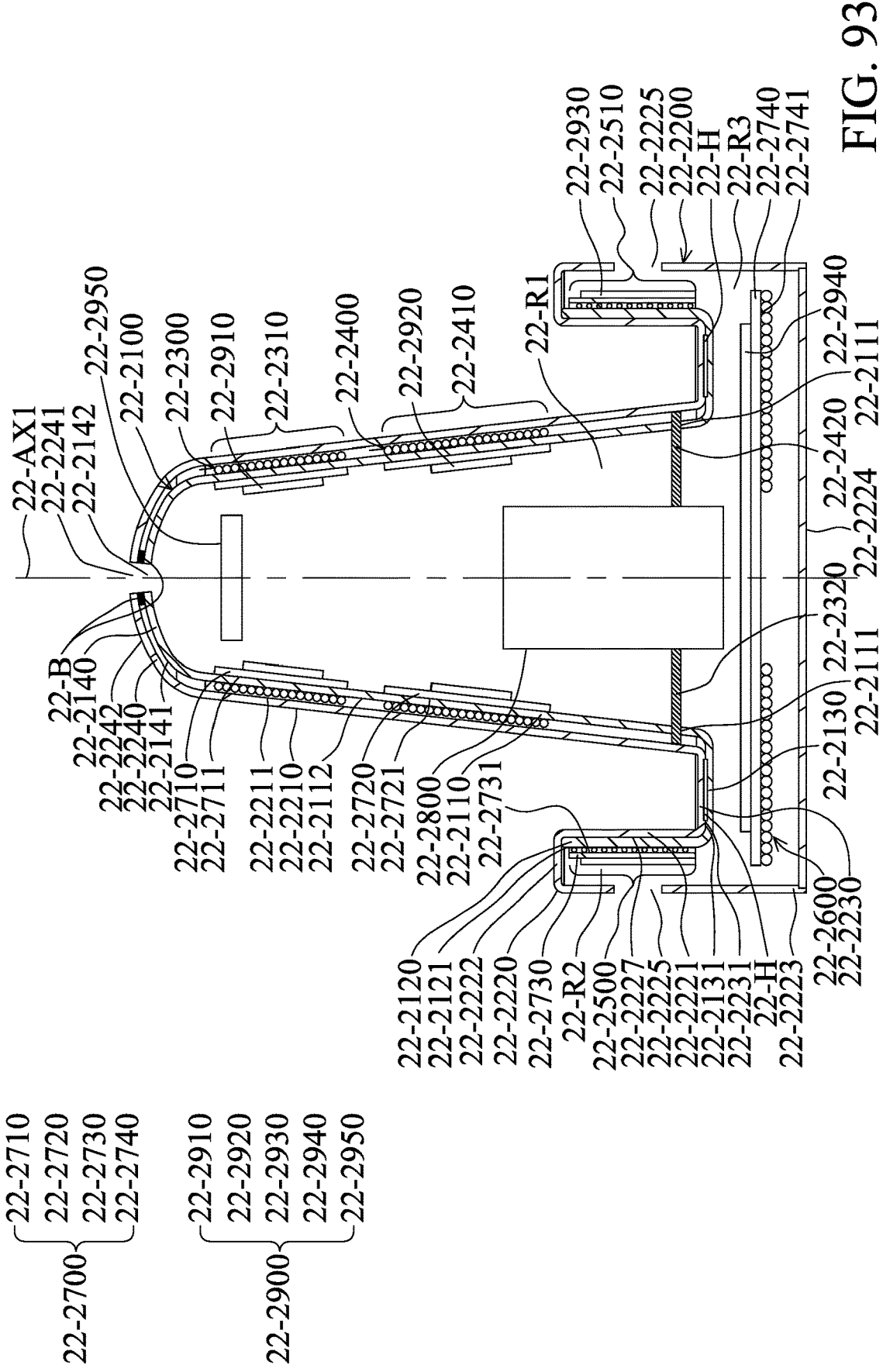
FIG. 93 is a cross-sectional view of a second coil mechanism according to an embodiment of the invention.

Referring to FIG. 93, in this embodiment, the second coil mechanism 22-20 primarily includes a first housing 22-2100, a second housing 22-2200, a third coil assembly 22-2300, a fourth coil assembly 22-2400, a fifth coil assembly 22-2500, a sixth coil assembly 22-2600, a second base 22-2700, a control assembly 22-2800, and a heat dissipation assembly 22-2900.

The first housing 22-2100 has a first section 22-2110, a second section 22-2120, a third section 22-2130, and a fourth section 22-2140. The first section 22-2110 has a conical tapered structure, which is substantially extended along a main axis 22-AX1 of the second coil mechanism 22-20 and surrounds the main axis 22-AX1. The second section 22-2120 has a cylindrical structure. The wall of the second section 22-2120 is substantially parallel to the main axis 22-AX1 of the second coil mechanism 22-20.

The third section 22-2130 is disposed between the first section 22-2110 and the second section 22-2120, and connects the first section 22-2110 to the second section 22-2120. In this embodiment, the third section 22-2130 has an annular plate structure, which is substantially perpendicular to the main axis 22-AX1. The fourth section 22-2140 is connected to the first section 22-2110, and has an arc-shaped structure. The first section 22-2110 is disposed between the third section 22-2130 and the fourth section 22-2140. Moreover, a plurality of holes 22-2111 are formed on the first section 22-2110 and adjacent to the third section 22-2130, and at least one heat dissipation hole 22-2142 is formed on the fourth section 22-2140.

The second housing 22-2200 has a fifth section 22-2210, a sixth section 22-2220, a seventh section 22-2230, and an eighth section 22-2240, respectively corresponding to the first section 22-2110, the second section 22-2120, the third section 22-2130, and the fourth section 22-2140 of the first housing 22-2100.

Similar to the first section 22-2110, the fifth section 22-2210 has a conical tapered structure, which is substantially extended along the main axis 22-AX1 and surrounds the main axis 22-AX1. The sixth section 22-2220 has a cylindrical structure, and the wall of the sixth section 22-2220 is substantially parallel to the main axis 22-AX1 of the second coil mechanism 22-20. The sixth section 22-2220 has an engage portion 22-2221, a top wall 22-2222, a lateral wall 22-2223, and a bottom wall 22-2224. The engage portion 22-2221 is parallel to the second section 22-2120. The top wall 22-2222 is disposed between the engage portion 22-2221 and the lateral wall 22-2223, and connects the engage portion 22-2221 to the lateral wall 22-2223. The lateral wall 22-2223 is disposed between the top wall 22-2222 and the bottom wall 22-2224, and connects the top wall 22-2222 to the bottom wall 22-2224. In this embodiment, the engage portion 22-2221 and the lateral wall 22-2223 are substantially parallel to the main axis 22-AX1, and the top wall 22-2222 and the bottom wall 22-2224 are substantially perpendicular to the main axis 22-AX1. Furthermore, at least one heat dissipation hole 22-2225 and at least one opening 22-2226 are formed on the lateral wall 22-2223 of the sixth section 22-2220.

The seventh section 22-2230 is disposed between the engage portion 22-2221 of the sixth section 22-2220 and the fifth section 22-2210, and connects the engage portion 22-2221 to the fifth section 22-2210. In this embodiment, the seventh section 22-2230 has an annular plate structure, which is substantially perpendicular to the main axis 22-AX1. The eighth section 22-2240 is connected to the fifth section 22-2210, and has an arc-shaped structure. The fifth section 22-2210 is disposed between the seventh section 22-2230 and the eighth section 22-2240. Moreover, at least one heat dissipation hole 22-2241 is formed on the eighth section 22-2240.

As shown in FIG. 93, when the first housing 22-2100 is engaged with the second housing 22-2200, the third section 22-2130 of the first housing 22-2100 is affixed to the seventh section 22-2230 of the second housing 22-2200. For example, they can affixed to each other by an adhesive member 22-H (such as an adhesive glue) being in contact with an outer surface 22-2131 of the third section 22-2130 and an inner surface 22-2231 of the seventh section 22-2230. The outer surface 22-2131 of the third section 22-2130 and the inner surface 22-2231 of the seventh section 22-2230 are parallel to each other and perpendicular to the main axis 22-AX1. The second section 22-2120 is in contact with the sixth section 22-2220. A gap is formed between the first section 22-2110 and the fifth section 22-2210, and another gap is formed between the fourth section 22-2140 and the eighth section 22-2240.

A first receiving space 22-R1 is formed in the inner of the first section 22-2110, a second receiving space 22-R2 is formed in the region between the engage portion 22-2221 and the lateral wall 22-2223, and a third receiving space 22-R3 is formed in the region between the top wall 22-2222 and the bottom wall 22-2224 and surrounding by the lateral wall 22-2223. The first receiving space 22-R1, the second receiving space 22-R2, and the third receiving space 22-R3 are communicated with each other.

The heat dissipation hole 22-2241 on the eighth section 22-2240 and the heat dissipation hole 22-2142 on the fourth section 22-2140 can form a first heat dissipation path. The first heat dissipation path communicates the first receiving space 22-R1 with the external environment. In this embodiment, the heat dissipation hole 22-2241 is aligned with the dissipation hole 22-2142, and the main axis 22-AX1 passes through the heat dissipation holes 22-2241 and 22-2142. The heat dissipation hole 22-2225 on lateral wall 22-2223 of the sixth section 22-2220 forms a second heat dissipation path. The second heat dissipation path communicates the second receiving space 22-R2 with the external environment.

The holes 22-2111 on the first section 22-2110 are communicated with the gap between the first section 22-2110 and the fifth section 22-2210, and communicated with the first receiving space 22-R1. The opening 22-2226 on the lateral wall 22-2223 of the sixth section 22-2220 is communicated with the third receiving space 22-R3 and the external environment.

Moreover, in this embodiment, in order to prevent the conical portion of the first housing 22-2100 cannot correctly assemble to the conical portion of the second housing 22-2200 due to the component deviation, at least one buffering member 22-B can be disposed between the fourth section 22-2140 and the eighth section 22-2240, and contact the fourth section 22-2140 and the eighth section 22-2240. For example, the buffering member 22-B includes elastic material, such as sponge or foam. It should be noted that, the buffering member 22-B is disposed at the position where does not covering the heat dissipation holes 22-2241 and 22-2242.

The third coil assembly 22-2300 winds around the outer surface 22-2112 of the first section 22-2110. The third coil assembly 22-2300 is adjacent to the fourth section 22-2140 and disposed between the first section 22-2110 and the fifth section 22-2210. The fourth coil assembly 22-2400 also winds around the outer surface 22-2112 of the first section 22-2110. The third coil assembly 22-2300 is adjacent to the third section 22-2130 and disposed between the first section 22-2110 and the fifth section 22-2210.

The main portion of the third coil assembly 22-2300 winding on the first housing 22-2100 is a third main body 22-2310, and the main portion of the fourth coil assembly 22-2400 winding on the first housing 22-2100 is a fourth main body 22-2410. Since the first section 22-2110 has the conical tapered structure, the outer surface 22-2112 is not parallel to the main axis 22-ax1. The third main body 22-2310 is formed as the three-dimensional structure/the tapered structure tapering away from the fourth coil assembly 22-2400, and the fourth main body 22-2410 is formed as the three-dimensional structure/the tapered structure tapering toward the third main body 22-2310.

In this embodiment, the winding axis of the third main body 22-2310 and the winding axis of the fourth main body 22-2410 coincides or is parallel to the main axis 22-AX1 of the second coil assembly 22-1600. As seen from the main axis 22-AX1, the third main body 22-2310 overlaps the fourth main body 22-2410.

The second base 22-2700 includes a magnetic permeability member 22-2710 (a third coil assembly magnetic permeability member) disposed in the first receiving space 22-R1. The surface 22-2711 (the third magnetic permeability member surface) of the magnetic permeability member 22-2710 facing the third main body 22-2310 is attached to the wall of the first section 22-2110. Since the magnetic permeability member 22-2710 corresponds to the third main body 22-2310, the magnetic permeability member 22-2710 overlaps the third main body 22-2310 as seen from the direction perpendicular to the main axis 22-AX1. Furthermore, since the first section 22-2110 has the conical tapered structure, the surface 22-2711 of the magnetic permeability member 22-2710 overlaps the third main body 22-2310 as seen from the main axis 22-AX1.

In the main axis 22-AX1, the length of the magnetic permeability member 22-2710 is greater than or the same as the length of the third main body 22-2310. Therefore, the shortest distance between the surface 22-2711 and the main axis 22-AX1 is less than the shortest distance between the third main body 22-2310 and the main axis 22-AX1.

The second base 22-2700 further includes a magnetic permeability member 22-2720 (a fourth coil assembly magnetic permeability member) disposed in the first receiving space 22-R1. The surface 22-2721 (the fourth magnetic permeability member surface) of the magnetic permeability member 22-2720 facing the fourth main body 22-2410 is attached to the wall of the first section 22-2110. Since the magnetic permeability member 22-2720 corresponds to the fourth main body 22-2410, the magnetic permeability member 22-2720 overlaps the fourth main body 22-2410 as seen from the direction perpendicular to the main axis 22-AX1. Furthermore, since the first section 22-2110 has the conical tapered structure, the surface 22-2721 of the magnetic permeability member 22-2720 overlaps the fourth main body 22-2410 as seen from the main axis 22-AX1.

In this embodiment, the magnetic permeability member 22-2710 and the magnetic permeability member 22-2720 are separate, and the surface 22-2711 is parallel to the surface 22-2721. In some embodiments, the magnetic permeability member 22-2710 and the magnetic permeability member 22-2720 are integrally formed as one piece.

Moreover, the leads 22-2320 and 22-2420 at the ends of the third coil assembly 22-2300 and the fourth coil assembly 22-2400 are needed to be extended downwardly, so the leads 22-2320 and 22-2420 will transverse the third main body 22-2310 and/or the fourth main body 22-2410. The enough space is formed between the first section 22-2110 and the fifth section 22-2210 to receive at least two layers of wires (the third main body 22-2310 and lead 22-2320 or 22-2420, or the fourth main body 22-2410 and lead 22-2320 or 22-2420). In this embodiment, a gap which is sufficient to receive the wire is formed between the inner surface 22-2111 of the fifth section 22-2210 and the third main body 22-2310, and the same gap is also formed between the inner surface 22-2111 of the fifth section 22-2210 and the fourth main body 22-2410. In other words, the shortest distance between the third coil assembly 22-2300 and the first section 22-2110 is less than the shortest distance between the third coil assembly 22-2300 and the fifth section 22-2210.

Referring to FIG. 93, the fifth coil assembly 22-2500 winds around the outer surface 22-2121 of the second section 22-2120, so as to form a fifth main body 22-2510. The winding axis of the fifth main body 22-2510 is parallel or coincides to the main axis 22-AX1. The second section 22-2120 is disposed between the fifth main body 22-2510 and the engage portion 22-2221 of the sixth section 22-2220. In this embodiment, the surface of the engage portion 22-2221 of the sixth section 20-2220 facing the fifth main body 22-2510 is the inner surface 22-2227. The outer surface 22-2121 and the inner surface 22-2227 are substantially parallel to the main axis 22-AX1. Since the first section 22-2110 has the conical tapered structure, the outer surface 22-2121 of the second section 22-2120 is not parallel to the outer surface 22-2112 of the first section 22-2110.

The second base 22-2700 includes a magnetic permeability member 22-2730 (a fifth coil assembly magnetic permeability member). The magnetic permeability member 22-2730 is disposed in the second receiving space 22-R2 and surrounds the fifth coil assembly 22-2500. The shortest distance between the surface 22-2731 (the fifth magnetic permeability member surface) of the magnetic permeability member 22-2730 facing the fifth main body 22-2510 and the main axis 22-AX1 is greater than the shortest distance between the fifth main body 22-2510 and the main axis 22-AX1. Since the magnetic permeability member 22-2730 is parallel to the main axis 22-AX1 and the magnetic permeability members 22-2710 and 22-2720 are inclined relative to the main axis 22-AX1, the surface 22-2731 of the magnetic permeability member 22-2730 is not parallel to the surface 22-2711 of the magnetic permeability member 22-2710 and the surface 22-2721 of the magnetic permeability member 22-2720. Furthermore, the third coil assembly 22-2300, the fourth coil assembly 22-2400, and fifth coil assembly 22-2500 are electrically independent of each other.

As shown in FIG. 93, as seen from the main axis 22-AX1, the magnetic permeability member 22-2710, the third main body 22-2310, the fifth main body 22-2510, and the magnetic permeability member 22-2730 are arranged in order from inside to outside, and the surface 22-2711 of the magnetic permeability member 22-2710 does not overlap the surface 22-2731 of the magnetic permeability member 22-2730. As seen from the direction perpendicular to the main axis 22-AX1, the surface 22-2711 of the magnetic permeability member 22-2710, the surface 22-2721 of the magnetic permeability member 22-2720, and the surface 22-2731 of the magnetic permeability member 22-2730 do not overlap each other.

In this embodiment, the thermal conductivity coefficient of the first housing 22-2100 is greater than the thermal conductivity coefficient of the second housing 22-2200. Thus, the thermal conductivity coefficient of the first section 22-2110 is greater than the thermal conductivity coefficient of the fifth section 22-2210, and the thermal conductivity coefficient of the second section 22-2120 is greater than the thermal conductivity coefficient of the sixth section 22-2220. For example, the thermal conductivity coefficient of the first section 22-2110 and the thermal conductivity coefficient of the second section 22-2120 can exceed 20 W/mK.

The magnetic permeability coefficient of the first section 22-2110 and the magnetic permeability coefficient of the fifth section 22-2210 is lower than the magnetic permeability coefficient of the magnetic permeability member 22-2710 and the magnetic permeability coefficient of the magnetic permeability member 22-2720. The magnetic permeability coefficient of the second section 22-2120 and the magnetic permeability coefficient of the sixth section 22-2220 is lower than the magnetic permeability coefficient of the magnetic permeability member 22-2730. For example, the magnetic permeability coefficient of the first section 22-2110, the magnetic permeability coefficient of the second section 22-2120, the magnetic permeability coefficient of the fifth section 22-2210, and the magnetic permeability coefficient of the sixth section 22-2220 can be less than $125 \times 10^{-6}$ H/m.

When the user desires to use the second coil mechanism 22-20 to charge the first coil mechanism 22-10, the first coil assembly 22-1300 of the first coil mechanism 22-10 can be disposed in the gap between the third main body 22-2310 and the fifth main body 22-2510. According to the position of the first coil mechanism 22-10 relative to the second coil mechanism 22-20, the first main body 22-1310 can overlap the third main body 22-2310, the fourth main body 22-2410 and/or the fifth main body 22-2510, so that the purpose of charging can be achieved by generating the inductive coupling.

It should be noted that, when in use, the first coil mechanism 22-10 is disposed on the second coil mechanism 22-20, the winding direction of the first main body 22-1310 is not perpendicular to the winding direction of third main body 22-2310, the fourth main body 22-2410, and/or the fifth main body 22-2510, so as to enhance the efficacy of charging. Moreover, since the outer surface 22-2141 of the fourth section 22-2140 and the surface 22-2242 of the eighth section 22-2240 are not parallel to perpendicular to the main axis 22-AX1, they do not include sharp corner. The damage of the first coil mechanism 22-10 due to the collision when disposing can be avoided.

Figure 94:
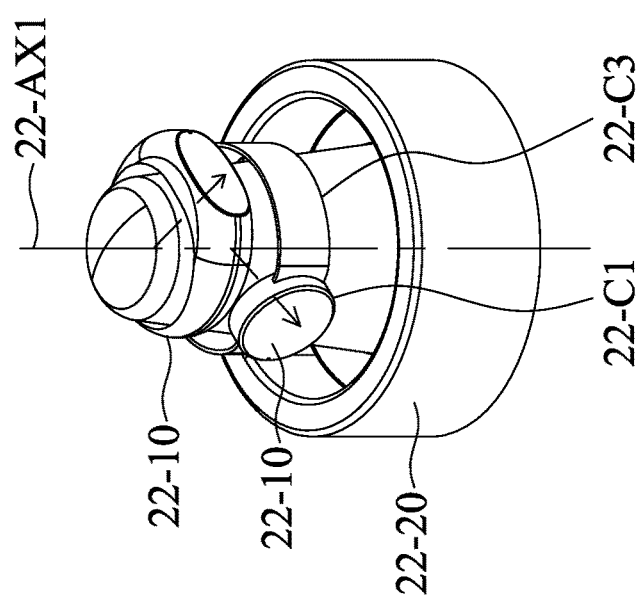
FIG. 94 is a schematic diagram that represents that a plurality of first coil mechanisms are disposed on the second coil mechanism according to an embodiment of the invention.

As shown in FIG. 94, the first coil mechanisms 22-10 can be disposed on the second coil mechanism 22-20 in any orientation. In FIG. 94, as seen from the main axis 22-AX1, the included angle between the connection line between the main axis 22-AX1 and the center of the first coil assembly 22-1300 of one of the first coil mechanisms 22-10 and the connection line between the main axis 22-AX1 and the center of the first coil assembly 22-1300 of another one of the first coil mechanisms 22-10 is not zero.

Figure 95:
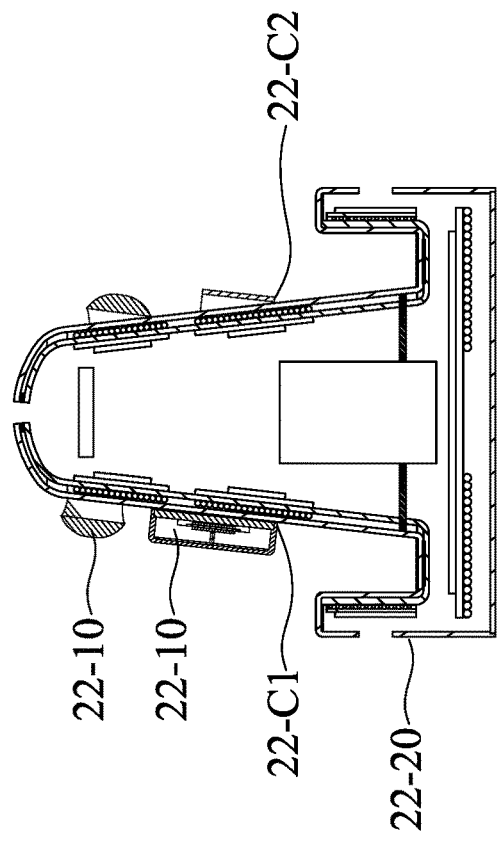
FIG. 95 is a schematic diagram that represents that a plurality of first coil mechanisms are disposed on the second coil mechanism according to an embodiment of the invention.

The outer surface of the conical portion of the second coil mechanism 22-20 (i.e. the outer surface of the fifth section 22-2210) can be a positioning assembly of the coil module 22-M. As shown in FIG. 94 and FIG. 95, when the annular first coil mechanism 22-10 is disposed on the second coil mechanism 22-20, they can contact each other on at least three contact point (such as a first contact point 22-C1, a second contact point 22-C2, and a third contact point 22-C3). The included angle between the connection line between the main axis 22-AX1 and the first contact point 22-C1 and the connection line between the main axis 22-AX1 and the second contact point 22-C2 exceeds 45 degrees (for example, exceeds 120 degrees).

Referring to FIG. 93, the sixth coil assembly 22-2600 is disposed in the third receiving space 22-R3 or the first receiving space 22-R1. The sixth coil assembly 22-2600 includes a sixth main body 22-2610 having a plate structure, and is electrically connected to the control assembly 22-2800. As seen from the direction perpendicular to the main axis 22-AX1, the third main body 22-2310, the fourth main body 22-2410, the fifth main body 22-2510, and the sixth main body 22-2610 do not overlap from each other. The sixth main body 22-2610 is a receiving coil, and can interact with the external transmitting coil to charge the second coil mechanism 22-20.

In this embodiment, the wire diameter of the fifth main body 22-2510 is larger than the wire diameter of the third main body 22-2310, and the wire diameter of the third main body 22-2310 is larger than the wire diameter of the sixth main body 22-2610.

The second base 22-2700 can further include a magnetic permeability member 22-2740 (a sixth coil assembly magnetic permeability member), and the sixth coil assembly 22-2600 is disposed on a surface 22-2741 (a sixth magnetic permeability member surface) of the magnetic permeability member 22-2740. The surface 22-2741 is substantially perpendicular to the main axis 22-AX1, and is not parallel to the surface 22-2711 of the magnetic permeability member 22-2710. As seen from the direction perpendicular to the main axis 22-AX1, the surface 22-2711 of the magnetic permeability member 22-2710, the surface 22-2721 of the magnetic permeability member 22-2720, the surface 22-2731 of the magnetic permeability member 22-2730, and the surface 22-2741 of the magnetic permeability member 22-2740 do not overlap. As seen from the main axis 22-AX1, the surface 22-2741 of the magnetic permeability member 22-2740 overlaps the surface 22-2711 of the magnetic permeability member 22-2710, and the surface 22-2741 of the magnetic permeability member 22-2740 overlaps the surface 22-2731 of the magnetic permeability member 22-2730.

The lead 22-2320 of the third coil assembly 22-2300 and the lead 22-2420 of the fourth coil assembly 22-2400 can pass through the holes 22-2111 on the first section 22-2110 to connect the control assembly 22-2800.

Figure 96:
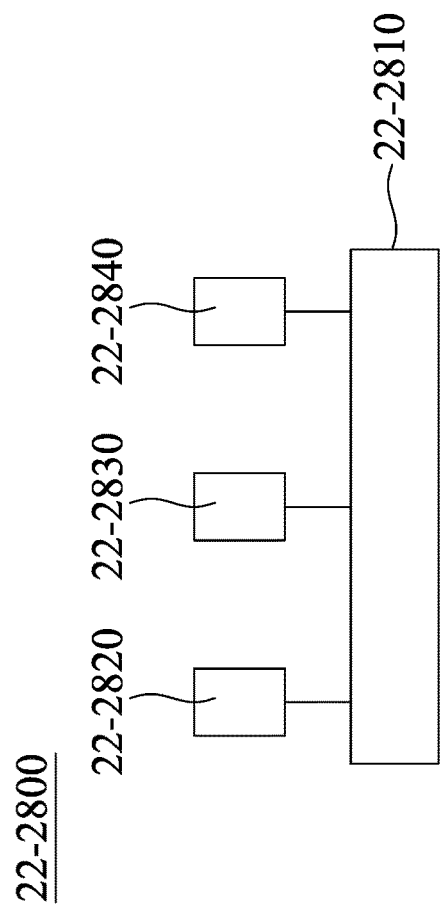
FIG. 96 is a schematic diagram of a control assembly according to an embodiment of the invention.

As shown in FIG. 96, the control assembly 22-2800 includes an electronic member 22-2810, a power storage member 22-2820, a temperature sensor 22-2830, and an electroacoustic transducer 22-2840. The electronic member 22-2810 is electrically connected to the third coil assembly 22-2300, the fourth coil assembly 22-2400, the fifth coil assembly 22-2500, and the sixth coil assembly 22-2600, and is disposed in the third receiving space 22-R3 (or the first receiving space 22-R1). For example, the electronic member 22-2810 can be a circuit board, and have a connecting terminal. The connecting terminal is aligned with the opening 22-2226 on the lateral wall 22-2223 of the sixth section 22-2220 (as shown in FIG. 91), and the external circuit can connect to the connecting terminal through the opening 22-2226 to transfer power or signal. For example, the connecting terminal can be a universal serial bus (USB, such as standard USB, mini USB, micro USB, or USB TYPE-C) terminal, a lightning terminal, or an alternating current power connector, but it is not limited thereto.

The power storage member 22-2820 is disposed in the first receiving space 22-R1, and is electrically connected to the electronic member 22-2810. The power storage member 22-2820 is configured to store electric energy or chemical energy. In some embodiments, the magnetic permeability member 22-2710 is disposed between the power storage member 22-2820 and the third main body 22-2310. In some embodiments, the magnetic permeability member 22-2740 is disposed between the power storage member 22-2820 and the sixth main body 22-2610.

The temperature sensor 22-2830 is electrically connected to the electronic member 22-2810, and is configure to measure the temperature of the second coil mechanism 22-20. In some embodiments, the temperature sensor 22-2830 is disposed on the magnetic permeability member 22-2710. The electroacoustic transducer 22-2840 is electrically connected to the electronic member 22-2810, and is configured to transform the electrical energy to the acoustic energy.

As shown in FIG. 93, the heat dissipation assembly 22-2900 includes a plurality of thermal conductive members (such as a thermal conductive member 22-2910 (a first thermal conductive member), a thermal conductive member 22-2920, a thermal conductive member 22-2930 (a second thermal conductive member), and a thermal conductive member 22-2940 (a third thermal conductive member)), and an active heat dissipation member 22-2950. The thermal conductive members 22-2910, 22-2920, 22-2930 and 22-2940 can be, for example, heat dissipation sheets, and can respectively correspond to the third coil assembly 22-2300, the fourth coil assembly 22-2400, the fifth coil assembly 22-2500 and the sixth coil assembly 22-2600.

The thermal conductive member 22-2910 and the thermal conductive member 22-2920 are accommodated in the first receiving space 22-R1, and respectively disposed on the magnetic permeability members 22-2710 and 22-2720. The thermal conductive members 22-2930 and 22-2940 are respectively accommodated in the second receiving space 22-R2 and the third receiving space 22-R3, and respectively disposed on the magnetic permeability members 22-2730 and 22-2740.

The active heat dissipation member 22-2950 can be a fan disposed in the first receiving space 22-R1 (or in the second receiving space 22-R1 or the third receiving space 22-R3). Owing to the operation of the fan, the fluid can flow into the second coil mechanism 22-20 through one of the first heat dissipation path and the second heat dissipation path, and exhaust from the second coil mechanism 22-20 through the other one of the first heat dissipation path and the second heat dissipation path. Therefore, the heat inside the second coil mechanism 22-20 can be taken away.

As aforementioned discussed, the coil module 22-M can perform a first function by the inductive coupling generated between the sixth main body 22-2610 and the external transmitting coil or by the connection of the external circuit via the connecting terminal. That is, the coil module 22-M can use the sixth main body 22-2610 or the electronic member 22-2810 to receive the power provided from the external coil or the external circuit, so as to charge the power storage member 22-2820. The coil module 22-M can perform a second function by the inductive coupling generated between the first main body 22-1310 and at least one of the third main body 22-2310, the fourth main body 22-2410, and the fifth main body 22-2510. That is, the third main body 22-2310, the fourth main body 22-2410 or the fifth main body 22-2510 can provide power to the first main body 22-1310 to charge the first coil mechanism 22-10. Moreover, the coil module 22-M can perform a third function by the second coil assembly 22-1600 of the first coil mechanism 22-10. That is, the second coil assembly 22-1600 and the external device can transmit the signal to each other in a wireless manner. It should be noted that, the first function and the second function can be simultaneously performed, and the second function and the third function cannot be simultaneously performed.

In some embodiments, in order to reduce the dimensions of the second coil mechanism 22-20 to achieve the purpose of the miniaturization, the second housing 22-2200 can form at least one lead receiving portion at the position corresponding to the third coil assembly 22-2300 and the fourth coil assembly 22-2400, and the third coil assembly 22-2300 and the fourth coil assembly 22-2400 can be accommodated in the lead receiving portion. In some embodiments, the lead receiving portion can be formed on the first housing 22-2100 at the position corresponding to the third coil assembly 22-2300 and the fourth coil assembly 22-2400. In some embodiments, both the first housing 22-2100 and the second housing 22-2200 have lead receiving portions.

Referring to FIG. 97 and FIG. 98, in some embodiments, the second coil mechanism 22-20 further includes a frame 22-F. The frame 22-F includes a top wall 22-F1 and a lateral wall 22-F2, wherein the lateral wall 22-F2 is extended from the edge of the top wall 22-F1, and is substantially parallel to the main axis 22-AX1. When the lateral wall 22-F2 of the frame 22-F is detachably assembled to the second housing 22-2200, a storage space 22-S can formed therebetween. The frame 22-F can protect the first coil mechanism 22-10 and the second coil mechanism 22-20, and include shielding material to shield the electromagnetic wave of the third coil assembly 22-2300, the fourth coil assembly 22-2400 and/or the fifth coil assembly 22-2500.

In FIG. 97, as seen from the direction perpendicular to the main axis 22-AX1, the lateral wall 22-F2 overlaps the first section 22-2110 of the first housing 22-2100. In FIG. 98, as seen from the direction perpendicular to the main axis 22-AX1, the lateral wall 22-F2 overlaps the sixth section 22-2220 of the second housing 22-2200.

Furthermore, in these embodiments, the frame 22-F has at least one positioning assembly 22-F3. When the frame 22-F and the second housing 22-2200 are assembled, the positioning assembly 22-F3 is in contact with the first coil mechanism 22-10 disposed in the storage space 22-S. Owing to the two positioning assemblies (the outer surface of the conical portion of the second coil mechanism 22-20 and the positioning assembly 22-F3), no matter the second coil mechanism 22-20 sways toward any direction, the position of the first coil mechanism 22-10 in the storage space 22-S can be maintained relative to the second coil mechanism 22-20. For example, the positioning assembly 22-F3 includes elastic material (such as rubber).

Figure 99:
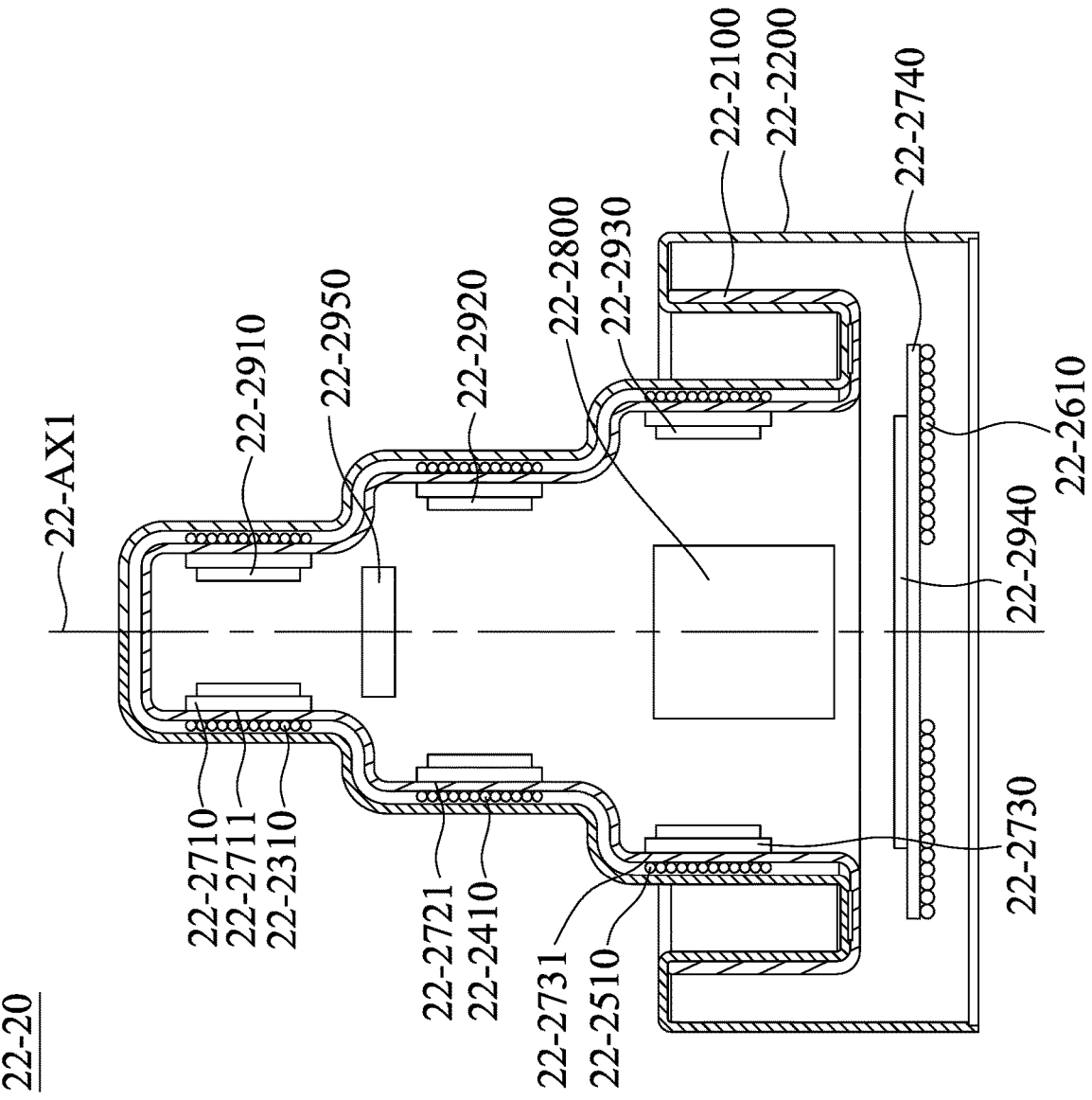
FIG. 99 is a schematic diagram of a second coil mechanism according to another embodiment of the invention.

FIG. 99 is a schematic diagram of a second coil mechanism 22-20 according to another embodiment of the invention. The second coil mechanism 22-20 in FIG. 99 is similar to the second coil mechanism 22-20 in FIG. 93. The difference is in that, in the second coil mechanism 22-20 in FIG. 99, the first section 22-2110 of the first housing 22-2100 and the fifth section 22-2210 of the second housing 22-2200 form a stepped structure, and the fifth coil assembly 22-2500 and the magnetic permeability member 22-2730 are disposed between the first section 22-2110 and the fifth section 22-2210.

According to the aforementioned arrangement, the surface 22-2711 of the magnetic permeability member 22-2710 facing the third main body 22-2310, the surface 22-2721 of the magnetic permeability member 22-2720 facing the fourth main body 22-2410, and the surface 22-2731 of the magnetic permeability member 22-2730 facing the fifth main body 22-2410 are parallel to each other, and are parallel to the main axis 22-AX1. As seen from the main axis 22-AX1, the third main body 22-2310 does not overlap the magnetic permeability member 22-2710, the fourth main body 22-2410 does not overlap the magnetic permeability member 22-2720, and the fifth main body 22-2510 does not overlap the magnetic permeability member 22-2730. The shortest distance between the surface 22-2731 of the magnetic permeability member 22-2730 and the main axis 22-AX1 is less than the shortest distance between the fifth main body 22-2510 and the main axis 22-AX1.

In some embodiments, the first section 22-2110 of the first housing 22-2100 and the fifth section 22-2210 of the second housing 22-2200 have stepped structures. However, some segments of the aforementioned stepped structures extending along the main axis 22-AX1 are parallel to the main axis 22-AX1, and some segments of the aforementioned stepped structures extending along the main axis 22-AX1 are inclined relative to the main axis 22-AX1. Thus, for example, the magnetic permeability member 22-2710 can be cylindrical and the magnetic permeability member 22-2720 can be conical, and the surface 22-2711 of the magnetic permeability member 2710 is not parallel to the surface 22-2721 of the magnetic permeability member 22-2720.

Referring to FIG. 100, in an embodiment of the invention, the coil module 23-M includes at least one first coil mechanism 23-10 and a second coil mechanism 23-20. The first coil mechanism 23-10 can be a portable electronic device with the function of wireless charging, such as a smartphone, a smartwatch, a smart ring, a bluetooth earbuds, or a charging case. The second coil mechanism 23-20 can be a charging base.

Each of the first coil mechanism 23-10 and the second coil mechanism 23-20 can include one or more coils. For example, the first coil mechanism 23-10 can include a receiving coil (a first coil assembly) and/or a communication coil (a second coil assembly, such as a Near-field communication coil (NFC)), and the second coil mechanism 23-20 can include one or more transmitting coils (third coil assemblies) to match receiving coils with different dimensions or inductances. When the first coil mechanism 23-10 is adjacent to or disposed on the second coil mechanism 23-20, an inductive coupling can be generated between the first coil assembly in the first coil mechanism 23-10 and at least one of the third coil mechanisms in the second coil mechanism 23-20. Therefore, the second coil mechanism 23-20 can provide power to the first coil mechanism 23-10 in a wireless manner, and the first coil mechanism 23-10 can store the received power in a power storage member (such as a chargeable battery).

As shown in FIG. 101, in this embodiment, the second coil mechanism 23-20 primarily includes a base 23-100, a third coil assembly 23-200, and a protecting assembly 23-300, wherein the base 23-100 includes a winding support 23-110 and a magnetic permeability member 23-120.

The winding support 23-110 is made of non-conductive material (for example, the winding support 23-110 can include non-metallic material), and includes a support main body 23-111, a first wall 23-112, and a second wall 23-113. The support main body 23-111 has a hollow structure 23-R. When the first coil mechanism 23-10 is disposed on the second coil mechanism 23-20, the first coil mechanism 23-10 is accommodated in the hollow structure 23-R. Therefore, the inner wall of the hollow structure 23-R can be used as a positioning assembly to restrict the disposing position of the first coil mechanism 23-10.

The main axis 23-21 of the second coil mechanism passes through the hollow structure 23-R from its opening. The first wall 23-112 and the second wall 23-113 are connected to the support main body 23-111. In the direction of the main axis 23-21, the first wall 23-112 and the second wall 23-113 are respectively disposed on opposite ends of the support main body 23-111. As seen from the main axis 23-21, the distance between the outer wall of the support main body 23-111 and the main axis 23-21 is less than the distance between the outer wall of the second wall 23-113 and the main axis 23-21. In other words, the first wall 23-112 and the second wall 23-113 protrude from the support main body 23-111.

In this embodiment, the support main body 23-111 of the second coil mechanism 23-20 has a stadium running tracks-shaped cross-section. Therefore, a first side 23-111A of the support main body 23-111 can include a plane structure, and a second side 23-111B on opposite side can also include a plane structure. As seen from the main axis 23-21, the first side 23-111A extends along a straight line, and the second side 23-111B extends along another straight line.

Figure 102:
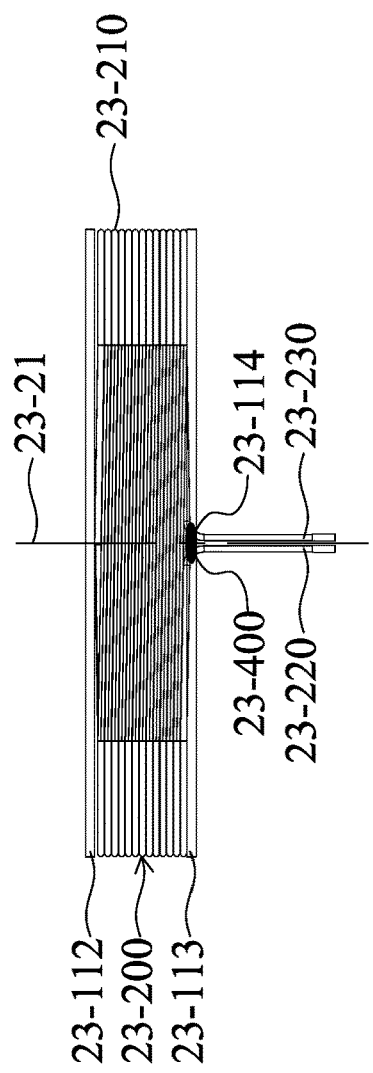
FIG. 102 is a front view diagram of the second coil mechanism according to an embodiment of the invention.

As shown in FIG. 102, the third coil assembly 23-200 winds around the support main body 23-111 to form a third main body 23-210, and the third main body 23-210 is disposed between the first wall 23-112 and the second wall 23-113. The first wall 23-112 and the second wall 23-113 can restrict the winding range of the third coil assembly 23-200.

The first wall 23-112 has a complete annular shape. The second wall 23-113 has a lead receiving portion 23-114 at the first side 23-111A of the support main body 23-111. The leads 23-220 and 23-230 of the third coil assembly 23-200 connected to the third main body 23-210 can pass through the second wall 23-113 via the lead receiving portion 23-114 and extend to the position below the winding support 23-110. In this embodiment, the portions of the receiving portion 23-114 which in contact with the leads 23-220 and 23-230 include arc-shaped structures, so that the damage of the leads 23-220 and 23-230 due to the large angle bending or the contact with the sharp angle can be avoided. Furthermore, an adhesive component 23-400 can be filled in the lead receiving portion 23-114 and in contact with the leads 23-220, 23-230 and lead receiving portion 23-114, so as to affix the leads 23-220 and 23-230.

Figure 104:
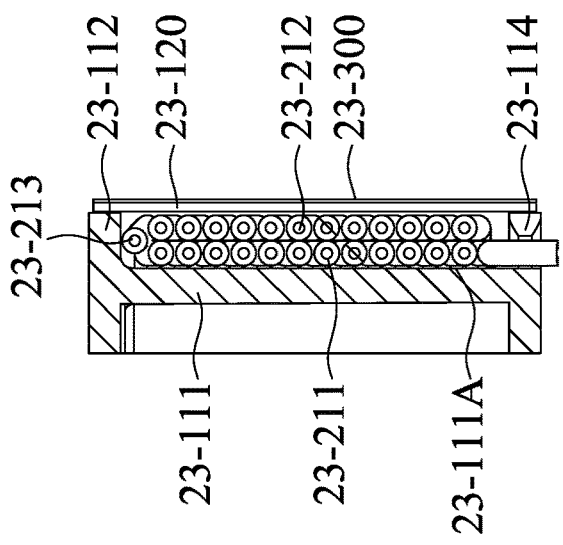
FIG. 104 is a partial cross-sectional view of the second coil mechanism according to an embodiment of the invention.
Figure 105:
FIG. 105 is a top view diagram of a protecting assembly according to an embodiment of the invention.
Figure 103:
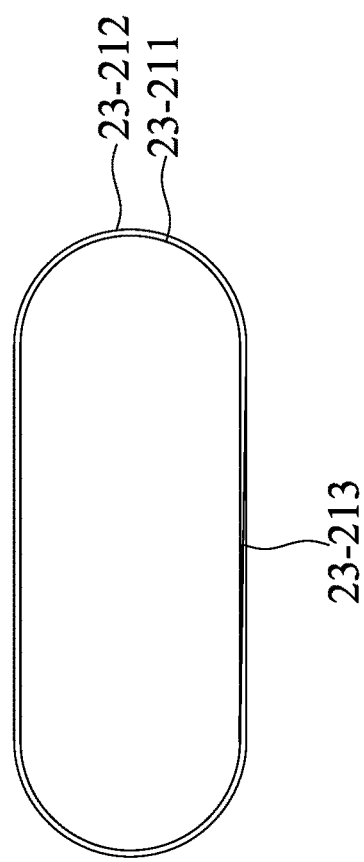
FIG. 103 is a top view diagram of a third coil assembly according to an embodiment of the invention.

Referring to FIG. 103 and FIG. 104, in this embodiment, the third main body 23-210 includes a first coil portion 23-211, a second coil portion 23-212, and a coil connecting portion 23-213. The first coil portion 23-211 winds around the support main body 23-111, and the second coil portion 23-212 winds around the first coil portion 23-211. Therefore, the first coil portion 23-211 is disposed between the support main body 23-111 and the second coil portion 23-212, and is in contact with the support main body 23-111 and the second coil portion 23-212.

The coil connecting portion 23-213 connects the first coil portion 23-211 to the second coil portion 23-212, and is disposed therebetween. In this embodiment, the coil connecting portion 23-213 is disposed on the first side 23-111A of the support main body 23-111, and the shortest distance between the coil connecting portion 23-213 and the first wall 23-112 is less than the shortest distance between the coil connecting portion 23-213 and the second wall 23-113.

The magnetic permeability member 23-120 of the base 23-100 has a plate structure and surrounds the third main body 23-210. As shown in FIG. 104, in this embodiment, the magnetic permeability member 23-120 is attached to the first wall 23-112 and the second wall 23-113, and the third main body 23-210 is attached to the support main body 23-111. A gap is formed between the third main body 23-210 and the magnetic permeability member 23-120. Thus, the shortest distance between the magnetic permeability member 23-120 and the third main body is greater than the shortest distance between the magnetic permeability member 23-120 and the first wall 23-112 and the shortest distance between the magnetic permeability member 23-120 and the second wall 23-113.

In this embodiment, the third main body 23-210 is spaced apart from the magnetic permeability member 23-120 at the first side 23-111A and the second side 23-111B of the support main body 23-111. In some embodiments, the third main body 23-210 is spaced apart from the magnetic permeability member 23-120 merely at the first side 23-111A or the second side 23-111B.

For example, the magnetic permeability member 23-120 can include ferrite material, resin material, and/or nanocrystalline material, but it is not limited thereto.

The protecting assembly 23-300 is disposed outside the magnetic permeability member 23-120 to prevent the damage of the magnetic permeability member 23-120 due to the collision between the magnetic permeability member 23-120 and other components. The gap between the third main body 23-210 and the magnetic permeability member 23-120 is disposed between the protecting assembly 23-300 and the support main body 23-111. In other words, as seen from the normal direction of the first side 23-111A of the support main body 23-111, the protecting assembly 23-300 and the gap are overlapped (the normal direction is perpendicular to the main axis 23-21).

For example, the protecting assembly 23-300 can be made of polyethylene terephthalate (PET). The total length of the protecting assembly 23-300 can exceed the perimeter of the magnetic permeability member 23-120 or the perimeter of the support main body 23-111. Thus, when the protecting assembly 23-300 winds around the magnetic permeability member 23-120, the protecting assembly 23-300 includes an overlap portion 23-310 (as shown in FIG. 6). The user can engage the overlap portion to form a closed structure. In some embodiments, different from the closed structure of the protecting assembly 23-300, the magnetic permeability member 23-120 can include an open structure (that is, the magnetic permeability member 23-120 does not completely surround the support main body 23-111).

Moreover, in this embodiment, in the main axis 23-21, the greatest dimensions of the magnetic permeability member 23-120 are larger than the greatest dimensions of the winding support 23-110, and the greatest dimensions of the protecting assembly 23-300 are larger than the greatest dimensions of the magnetic permeability member 23-120.

Figures 106, 107:
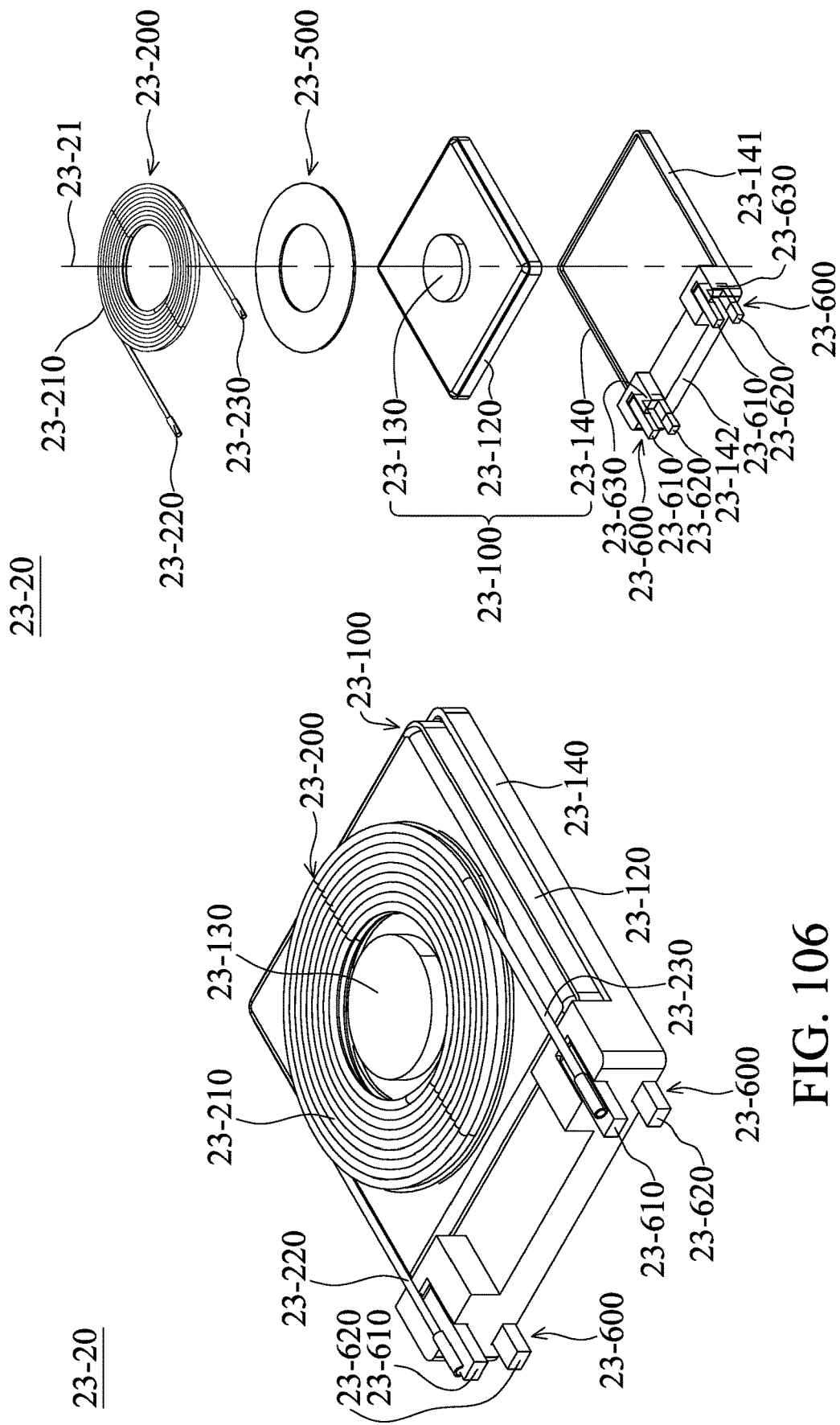
FIG. 106 is a schematic diagram of a second coil mechanism according to another embodiment of the invention.
FIG. 107 is an exploded-view diagram of the second coil mechanism according to another embodiment of the invention.

Referring to FIG. 106 and FIG. 107, in another embodiment, an second coil mechanism 23-20 primarily includes a base 23-100, a third coil assembly 23-200, a attaching assembly 23-500, and a plurality of circuit assemblies 23-600.

The base 23-100 includes a magnetic permeability member 23-120, a magnetic permeability component 23-130, and a frame 23-140. The magnetic permeability member 23-120 is connected to the magnetic permeability component 23-130. In this embodiment, the magnetic permeability member 23-120 has a rectangular structure, and the magnetic permeability component 23-130 has a pillar structure. The center of the magnetic permeability member 23-120 and the center of the magnetic permeability component 23-130 are aligned with the main axis 23-21 of the second mechanism 23-20, and the magnetic permeability member 23-120 and the magnetic permeability component 23-130 are integrally formed as one piece. The diameter of the magnetic permeability component 23-130 is less than the side length of the magnetic permeability member 23-120, therefore, the magnetic permeability component 23-130 can be used as a winding pillar and a positioning component of the third coil assembly 23-200.

The third main body 23-210 of the third coil assembly 23-200 surrounds the magnetic permeability component 23-130, and is affixed to the magnetic permeability member 23-120 by the attaching assembly 23-500. For example, the attaching assembly 23-500 can be a double sided tape or glue.

The frame 23-140 can be made of non-conductive material (for example, the frame 23-140 can include non-metallic material), and include a board 23-141 and a lateral wall 23-142. The lateral wall 23-142 is connected to the board 23-141, and extended from the edge of the board 23-141 along the direction parallel to the main axis 23-21. The magnetic permeability member 23-120 is disposed on the board 23-141.

The circuit assemblies 23-600 are disposed on the lateral wall 23-142 of the frame 23-140. Each of the circuit assemblies 23-600 includes a first section 23-610, a second section 23-620, and a third section 23-630. The third section 23-630 is embedded in the frame 23-140, and connected to the first section 23-610 and the second section 23-620. At least a portion of the first section 23-610 and at least a portion of the second section 23-620 are exposed. In this embodiment, the extending direction of the first section 23-610 and the extending direction of the second section 23-620 are perpendicular to the main axis 23-21 of the second coil mechanism 23-20, and the extending direction of the third section 23-630 is parallel to the main axis 23-21.

The leads 23-220 and 23-230 of the third coil assembly 23-200 disposed on the magnetic permeability member 23-120 can be affixed to the upper surfaces of the first sections 23-610 by welding. The second sections 23-620 can be electrically connected to an external circuit. Therefore, the third circuit assembly 23-200 can be electrically connected to the external circuit via the circuit assemblies 23-600.

In this embodiment, the circuit assemblies 23-600 are disposed on the same side of the frame 23-140, and the first sections 23-610 of these circuit assemblies 23-600 are parallel to each other. The first sections 23-610 of these circuit assemblies 23-600 are extended from the frame 23-140 toward the same direction. Since the leads 23-220 and 23-230 are disposed on the first sections 23-610, the extending directions of the leads 23-220 and 23-230 are parallel to the extending directions of the first sections 23-610.

In this embodiment, the outermost surface of the second coil mechanism 23-20 on the top side facing the external environment (a first outermost surface) is the surface of the third main body 23-210 facing the external environment, and the outermost surface of the second coil mechanism 23-20 on the bottom side facing the external environment (a second outermost surface) is the surface of the second section 23-620 and/or the surface of the board 23-141 facing the external environment.

The first outermost surface and the second outermost surface are facing different directions. In the main axis 23-21, the magnetic permeability member 23-120 is a distance away from the second outermost surface, and the distance between the center of the first section 23-610 and the second outermost surface is larger than the distance between the center of the second section 23-620 and the second outermost surface.

Figures 108, 109:
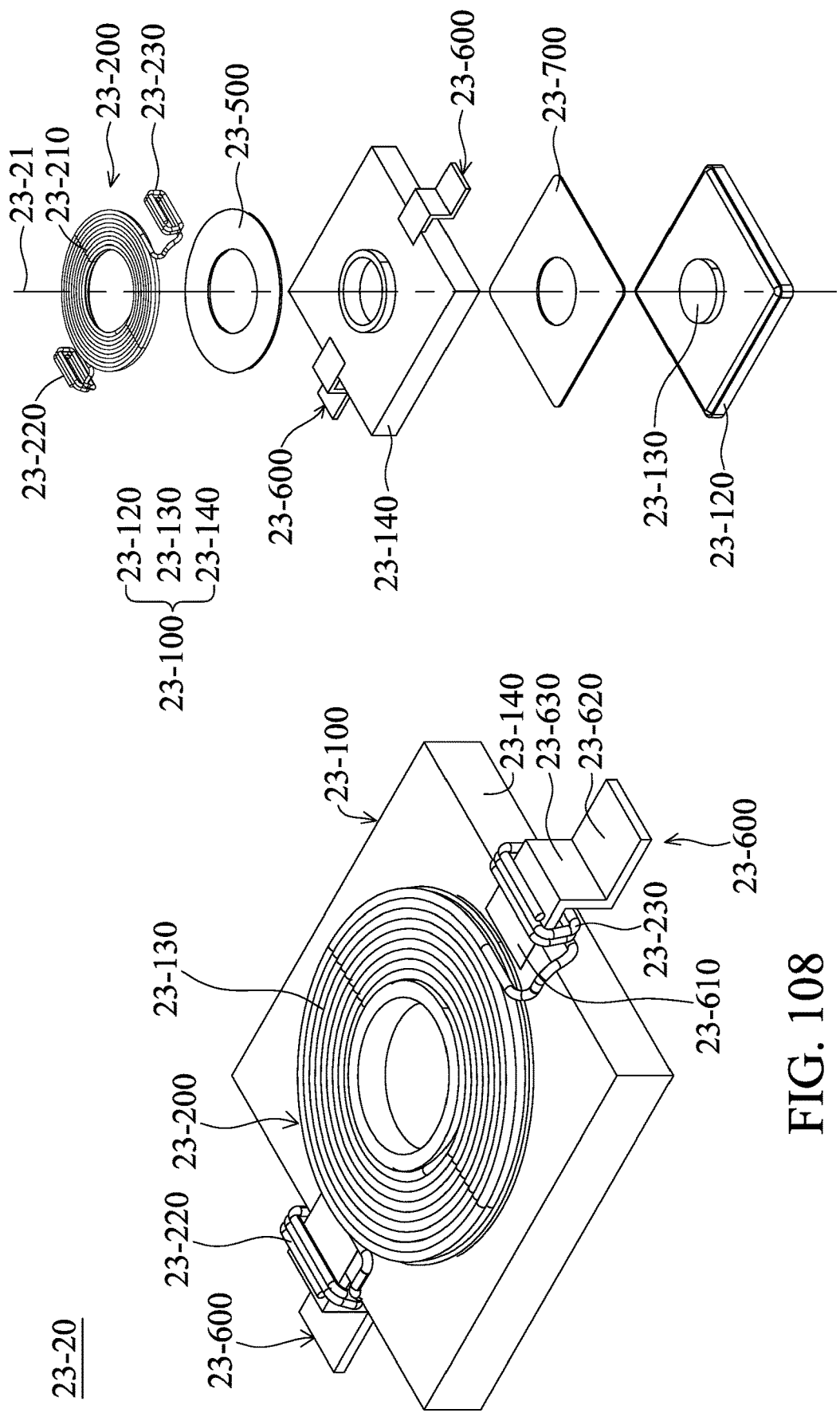
FIG. 108 is a schematic diagram of a second coil mechanism according to another embodiment of the invention.
FIG. 109 is an exploded-view diagram of the second coil mechanism according to another embodiment of the invention.
Figure 110:
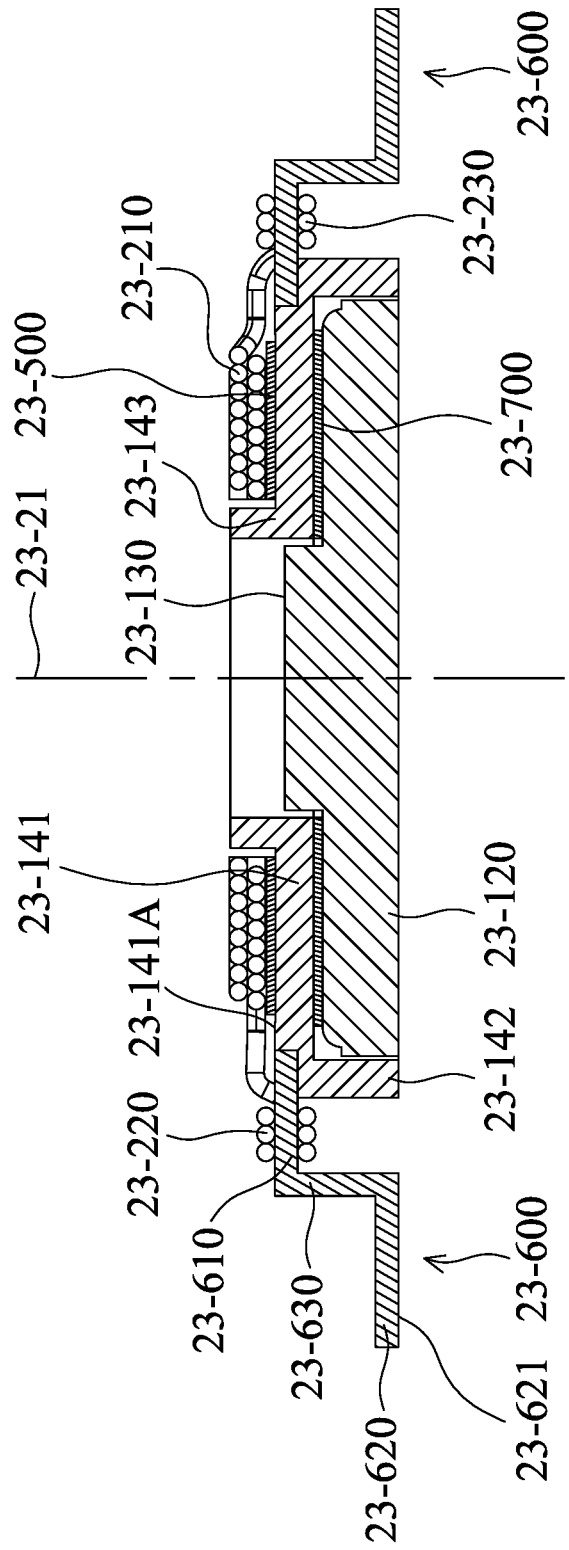
FIG. 110 is a cross-sectional view of the second coil mechanism according to another embodiment of the invention.

Referring to FIG. 108, FIG. 109, and FIG. 110, in another embodiment, an second coil mechanism 23-20 primarily includes a base 23-100, a third coil assembly 23-200, a attaching assembly 23-500, a plurality of circuit assemblies 23-600, and an additional attaching assembly 23-700.

The base 23-100 includes a magnetic permeability member 23-120, a magnetic permeability component 23-130, and a frame 23-140. The magnetic permeability member 23-120 is connected to the magnetic permeability component 23-130. In this embodiment, the magnetic permeability member 23-120 has a rectangular structure, and the magnetic permeability component 23-130 has a pillar structure. The center of the magnetic permeability member 23-120 and the center of the magnetic permeability component 23-130 are aligned with the main axis 23-21 of the second mechanism 23-20, and the magnetic permeability member 23-120 and the magnetic permeability component 23-130 are integrally formed as one piece.

The frame 23-140 can be made of non-conductive material (for example, the frame 23-140 can include non-metallic material), and include a board 23-141, a lateral wall 23-142, and a positioning component 23-143. The lateral wall 23-142 is connected to the board 23-141, extended from the edge of the board 23-141 along the direction parallel to the main axis 23-21, and protrudes from the lower surface of the board 23-141. The positioning component 23-143 is a hollow annular structure disposed on the board 23-141. The positioning component 23-143 extends along the main axis 23-21 and protrudes from the upper surface 23-141A of the board 23-141.

The attaching assembly 23-700 adheres the magnetic permeability member 23-120 to the board 23-141, so as to fixedly dispose the magnetic permeability member 23-120 and the magnetic permeability component 23-130 in the frame 23-140. For example, the attaching assembly 23-700 can be a double sided tape or glue. The space formed by the board 23-141 and the lateral wall 23-142 can accommodate the magnetic permeability member 23-120, and the space formed by the position component 23-143 can accommodate the magnetic permeability component 23-130. It should be noted that, the magnetic permeability member 23-120 has a chamfer or a fillet at the corner corresponding to the connecting point of the board 23-141 and the lateral wall 23-142, so as to prevent the damage of the component(s) due to the collision during assembly. Moreover, for facilitating the assembly, the diameter of the magnetic permeability component 23-130 can be less than the inner diameter of the positioning component 23-143, so that a gap can be formed between the magnetic permeability component 23-130 and the positioning component 23-143.

The third coil assembly 23-200 is affixed to the upper surface 23-141A of the board 23-141 via the attaching assembly 23-500, and surrounds the positioning component 23-143. For example, the attaching assembly 23-500 can be a double sided tape or glue. The portion of the third coil assembly 23-200 surrounding the positioning component 23-143 can form a third main body 23-210. In the main axis 23-21, the board 23-141 is disposed between the third main body 23-210 and the magnetic permeability member 23-120, and the shortest distance between the upper surface 23-141A of the board 23-141 and the third main body 23-210 is less than the upper surface 23-141A of the board 23-141 and the magnetic permeability component 23-130.

As seen from the main axis 23-21, the positioning component 23-143 is disposed between the magnetic permeability component 23-130 and the third main body 23-210. In this embodiment, the gap between the positioning component 23-143 and the magnetic permeability component 23-130 (a first gap) is greater than the gap between the positioning component 23-143 and the third main body 23-210 (a second gap).

The circuit assemblies 23-600 are connected to the frame 23-140. Each of the circuit assemblies 23-600 includes a first section 23-610, a second section 23-620, and a third section 23-630. The first section 23-610 can be affixed to the board 23-141 by an adhesive member (not shown, such as glue). The third section 23-630 connects the first section 23-610 to the second section 23-620. In this embodiment, the extending direction of the first section 23-610 and the extending direction of the second section 23-620 are perpendicular to the main axis 23-21 of the second coil mechanism 23-20, and the extending direction of the third section 23-630 is parallel to the main axis 23-21. In some embodiments, the extending direction of the first section 23-610 is different from the extending direction of the second section 23-620.

In this embodiment, the first section 23-610, the second section 23-620, and the third section 23-630 form a Z-shaped structure, so that the distance between the third section 23-630 and the main axis 23-21 is larger than the distance between the lateral 23-142 and the main axis 23-21. As seen from the main axis 23-21, the first section 23-610 does not overlap the second section 23-620.

The leads 23-220 and 23-230 at opposite ends of the third coil assembly 23-200 disposed on the magnetic permeability member 23-120 winds around the first sections 23-610. The surfaces 23-621 of the second sections 23-620 facing away from the third main body 23-210 can be connected to an external circuit by welding (such as a surface-mount technology (SMT)). Therefore, the third circuit assembly 23-200 can be electrically connected to the external circuit via the circuit assemblies 23-600.

In this embodiment, the circuit assemblies 23-600 are disposed on opposite sides of the frame 23-140. Thus, in these circuit assemblies 23-600, the first sections 23-610 are extended from the frame 23-140 toward the opposite directions.

In this embodiment, the outermost surface of the second coil mechanism 23-20 on the top side facing the external environment (a first outermost surface) is the surface of the third main body 23-210 and/or the surface of the positioning component 23-143 facing the external environment, and the outermost surface of the second coil mechanism 23-20 on the bottom side facing the external environment (a second outermost surface) is the surface of the second section 23-620, the surface of the lateral wall 23-142, and/or the surface of the magnetic permeability member 23-120 facing the external environment.

The first outermost surface and the second outermost surface are facing different directions. In the main axis 23-21, a gap is formed between the first section 23-610 and the first outermost surface, at least a portion of the leads 23-220 and 23-230 are disposed in this gap, and the greatest wire diameter of the leads 23-220 and 23-230 is smaller than this gap. In the main axis 23-21, the distance between the center of the first section 23-610 and the second outermost surface is larger than the distance between the center of the second section 23-620 and the second outermost surface.

Figure 113:
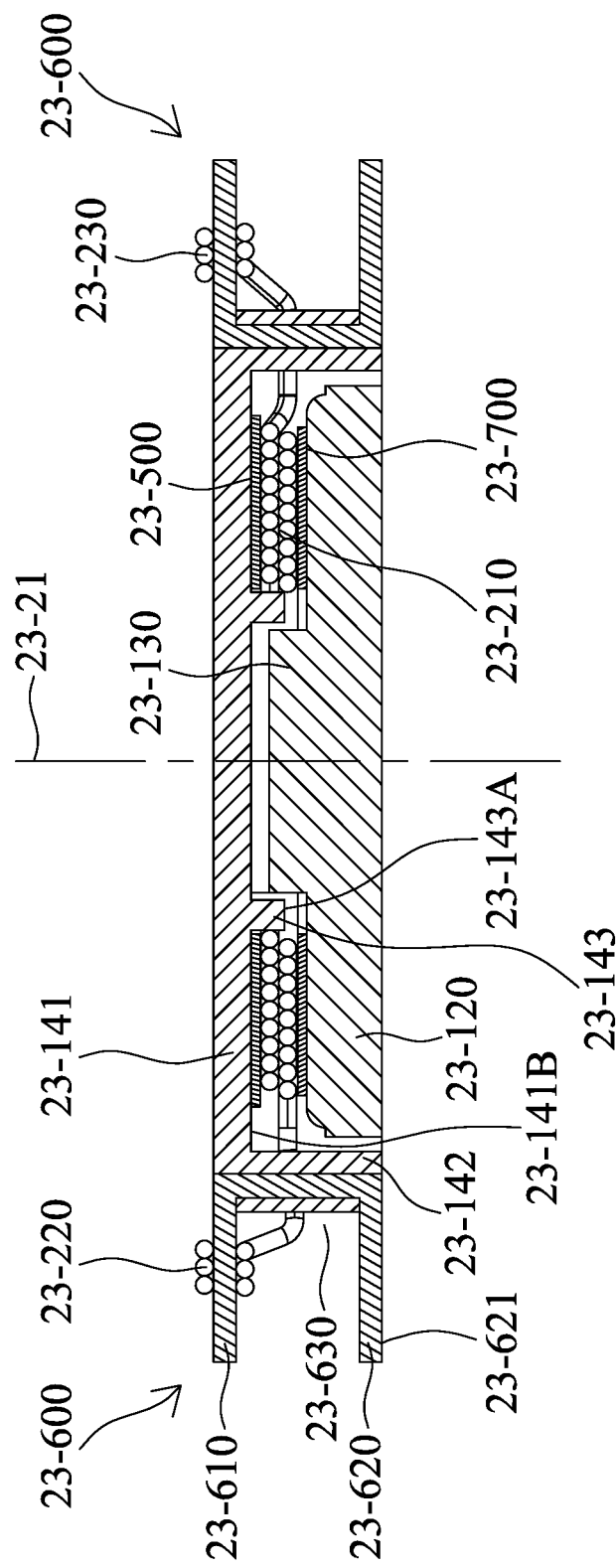
FIG. 113 is a cross-sectional view of the second coil mechanism according to another embodiment of the invention.

Referring to FIG. 111, FIG. 112, and FIG. 113, in another embodiment, an second coil mechanism 23-20 primarily includes a base 23-100, a third coil assembly 23-200, a attaching assembly 23-500, a plurality of circuit assemblies 23-600, and an additional attaching assembly 23-700.

The base 23-100 includes a magnetic permeability member 23-120, a magnetic permeability component 23-130, and a frame 23-140. The magnetic permeability member 23-120 is connected to the magnetic permeability component 23-130. In this embodiment, the magnetic permeability member 23-120 has a rectangular structure, and the magnetic permeability component 23-130 has a pillar structure. The center of the magnetic permeability member 23-120 and the center of the magnetic permeability component 23-130 are aligned with the main axis 23-21 of the second mechanism 23-20, and the magnetic permeability member 23-120 and the magnetic permeability component 23-130 are integrally formed as one piece.

The frame 23-140 can be made of non-conductive material (for example, the frame 23-140 can include non-metallic material), and include a board 23-141, a lateral wall 23-142, and a positioning component 23-143. The lateral wall 23-142 is connected to the board 23-141, extended from the edge of the board 23-141 along the direction parallel to the main axis 23-21, and protrudes from the lower surface of the board 23-141. The positioning component 23-143 is a hollow annular structure disposed on the board 23-141. The positioning component 23-143 extends along the main axis 23-21 and protrudes from the lower surface 23-141B of the board 23-141.

The third main body 23-210 of the third coil assembly 23-200 is affixed to the lower surface 23-141B of the board 23-141 via the attaching assembly 23-500, and surrounds the positioning component 23-143. The magnetic permeability member 23-120 is affixed to the third coil assembly 23-200 via the attaching assembly 23-700. For example, the attaching assembly 23-500 and the attaching assembly 23-700 can be double sided tapes or glue.

The space formed by the board 23-141 and the lateral wall 23-142 can accommodate the magnetic permeability member 23-120 and the third coil assembly 23-200. The third main body 23-210 is disposed between the positioning component 23-143 and the lateral wall 23-142. The space formed by the position component 23-143 can accommodate the magnetic permeability component 23-130.

In this embodiment, in the main axis 23-21, the distance between the lower surface 23-141B of the board 23-141 and the surface 23-143A of the positioning component 23-143 is less than the thickness of the third main body 23-210.

Moreover, the magnetic permeability member 23-120 has a chamfer or a fillet at the corner, so as to prevent the damage of the component(s) due to the collision during assembly. For facilitating the assembly, the diameter of the magnetic permeability component 23-130 can be less than the inner diameter of the positioning component 23-143, so that a gap can be formed between the magnetic permeability component 23-130 and the positioning component 23-143.

As seen from the main axis 23-21, the positioning component 23-143 is disposed between the magnetic permeability component 23-130 and the third main body 23-210. In this embodiment, the gap between the positioning component 23-143 and the magnetic permeability component 23-130 (a first gap) is greater than the gap between the positioning component 23-143 and the third main body 23-210 (a second gap).

The circuit assemblies 23-600 are disposed on the frame 23-140. Each of the circuit assemblies 23-600 includes a first section 23-610, a second section 23-620, and a third section 23-630. The third section 23-630 is embedded in the lateral wall 23-142, so that the distance between the third section 23-630 and the main axis 23-21 is less than the distance between the outer surface of the lateral wall 23-142 and the main axis 23-21. At least a portion of the first section 23-610 and at least a portion of the second section 23-620 are exposed. The third section 23-630 connects the first section 23-610 to the second section 23-620. In this embodiment, the extending direction of the first section 23-610 and the extending direction of the second section 23-620 are perpendicular to the main axis 23-21 of the second coil mechanism 23-20, and the extending direction of the third section 23-630 is parallel to the main axis 23-21.

In this embodiment, the first section 23-610, the second section 23-620, and the third section 23-630 form a C-shaped structure. Thus, as seen from the main axis 23-21, the first section 23-610 overlaps the second section 23-620. The leads 23-220 and 23-230 of the third coil assembly 23-200 pass through the grooves 23-144 on the lateral wall 23-142 and wind around the first sections 23-610. The surfaces 23-621 of the second sections 23-620 facing away from the third main body 23-210 can be connected to an external circuit by welding (such as a surface-mount technology (SMT)). Therefore, the third circuit assembly 23-200 can be electrically connected to the external circuit via the circuit assemblies 23-600.

In this embodiment, as seen from the main axis 23-21 the first sections 23-610 do not overlap the grooves 23-144. Furthermore, since the circuit assemblies 23-600 are disposed on opposite sides of the frame 23-140, in these circuit assemblies 23-600, the first sections 23-610 are extended from the frame 23-140 toward the opposite directions.

In summary, a coil module is provided, including a second coil mechanism. The second coil mechanism includes a third coil assembly and a second base corresponding to the third coil assembly. The second base has a positioning assembly corresponding to a first coil mechanism.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present application. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A coil module, comprising:
    a second coil mechanism, configured to correspond a first coil mechanism, wherein the second coil mechanism comprises:
    a third coil assembly;
    a base, configured to support the third coil assembly, wherein the second mechanism further comprises a second virtual plane configured to correspond to and face a first virtual plane of the first coil mechanism, the first virtual plane is parallel to the second virtual plane, and the first virtual plane and the second virtual plane are perpendicular to a normal direction; and
    a fourth coil assembly, wherein the fourth coil assembly is electrically independent from the third coil assembly and comprises:
    a fourth main body; and
    a fourth coil assembly lead, traversing at least a portion of the fourth main body, wherein the fourth main body has a surface facing the fourth coil assembly lead and the third coil assembly.

2. The coil module as claimed in claim 1, wherein the third coil assembly further comprises:
    a third main body; and
    a third coil assembly lead, traversing at least a portion of the third main body, wherein the third main body has a surface facing the third coil assembly lead and the fourth coil assembly.

3. The coil module as claimed in claim 2, wherein the second coil mechanism further comprises a fifth coil assembly, which is electrically independent from the third coil assembly and the fourth coil assembly, and the fifth coil assembly comprises:
    a fifth main body; and
    a fifth coil assembly lead, traversing at least a portion of the fifth main body, wherein the fifth main body has a surface facing the fifth coil assembly lead and the fourth coil assembly, and the surface of the third main body facing the fourth coil assembly further faces the fifth coil assembly.

4. The coil module as claimed in claim 3, wherein as seen from a direction perpendicular to the normal direction, the third main body overlaps the fourth coil assembly lead, and the third main body overlaps the fifth coil assembly lead.

5. The coil module as claimed in claim 3, wherein as seen from a direction perpendicular to the normal direction, the third coil assembly lead, the fourth coil assembly lead, and the fifth coil assembly lead are overlapped.

6. The coil module as claimed in claim 3, wherein the second coil mechanism further comprises a third coil assembly temperature sensor disposed on the surface of the third main body facing the fourth coil assembly, and the fourth coil assembly is disposed between the third coil assembly and the base, wherein as seen from a direction perpendicular to the normal direction, the third coil assembly temperature sensor overlaps the fourth main body.

7. The coil module as claimed in claim 3, wherein the second coil mechanism further comprises a fourth coil assembly temperature sensor disposed on the surface of the fourth main body facing the third coil assembly, and the fourth coil assembly is disposed between the third coil assembly and the base, wherein as seen from a direction perpendicular to the normal direction, the fourth coil assembly temperature sensor overlaps the third main body.

8. The coil module as claimed in claim 3, wherein the second coil mechanism further comprises:
    an adhesive assembly, which is in contact with the fourth main body and the fifth main body, and is separate from the third main body;
    a first adhesive component, which is in contact with one, two or three of the third coil assembly lead, the fourth coil assembly lead, and the fifth coil assembly lead, wherein the adhesive assembly and the first adhesive component are not integrally formed as one piece;
    in the normal direction, the greatest dimensions of the adhesive assembly are different from the greatest dimensions of the first adhesive component;
    the first adhesive component annularly surrounds the third coil assembly lead;
    the first adhesive component is in contact with the adhesive assembly;
    the thermal conductivity coefficient of the first adhesive component is smaller than the thermal conductivity coefficient of the adhesive assembly;

the base has a receiving portion, configured to receive at least one of the third coil assembly lead, the fourth coil assembly lead, and the fifth coil assembly lead;

the base further comprises a bottom plate and a lateral wall extending from the edge of the bottom plate;

as seen from a direction perpendicular to the normal direction, at least a portion of the lateral wall overlaps at least one of the third main body, the fourth main body, and the fifth main body;

both the bottom plate and the lateral wall include magnetic permeability material;

the first adhesive component is in contact with the lateral wall;

wherein the second coil mechanism further comprises a second adhesive component, which is in contact with at least one of the third main body and the fourth main body;

the second adhesive component is in contact with the adhesive assembly;

the adhesive assembly and the second adhesive component are not integrally formed as one piece;

in the normal direction, the greatest dimensions of the adhesive assembly are different from the greatest dimensions of the second adhesive component;

wherein the second coil mechanism further comprises a thermal-conductive assembly corresponding to at least one of the base, the third main body, the fourth main body, and the fifth main body;

the thermal conductivity coefficient of the thermal-conductive assembly is different from the thermal conductivity coefficient of the base;

the thermal conductivity coefficient of the adhesive assembly is greater than 1 W/mK;

the thermal conductivity coefficient of the adhesive assembly is greater than 20 W/mK;

the magnetic permeability coefficient of the base is greater than the magnetic permeability coefficient of the thermal-conductive assembly;

the magnetic permeability coefficient of the thermal-conductive assembly is less than 125×10−6 H/m;

in the normal direction, the greatest dimensions of the base are different from the greatest dimensions of the thermal-conductive assembly;

as seen from the normal direction, the projection area of the base is different from the projection area of the thermal-conductive assembly;

as seen from the normal direction, the projection area of the base is greater than the projection area of the thermal-conductive assembly;

wherein the second coil mechanism further comprises a connecting assembly electrically connected to at least one of the third coil assembly lead, the fourth coil assembly lead, and the fifth coil assembly lead;

the first adhesive component is in contact with the connecting assembly;

as seen from the direction perpendicular to the normal direction, the connecting assembly overlaps the base;

the third coil assembly, the fourth coil assembly, and the fifth coil assembly are electrically independent of each other.

9. The coil module as claimed in claim 8, wherein the second coil mechanism further comprises at least one third adhesive component, which is in contact with the third main body and the fourth main body, and is separate from the fifth main body;

in the normal direction, the greatest dimensions of the adhesive assembly are different from the greatest dimensions of the third adhesive component;

wherein the second coil mechanism further comprises a fourth adhesive component, which is in contact with the third main body and the fifth main body, and is separate from the fourth main body;

in the normal direction, the greatest dimensions of the adhesive assembly are different from the greatest dimensions of the fourth adhesive component;

as seen from the normal direction, the fourth adhesive component does not exceed the outline of the third main body and the outline of the fifth main body;

wherein the second coil mechanism further comprises at least one fifth adhesive component and a third coil assembly temperature sensor, and the fifth adhesive component is in contact with the third coil assembly temperature sensor and the third main body;

the fifth adhesive component is in contact with the base or the adhesive assembly;

as seen from the normal direction, the fifth adhesive component does not exceed the outline of the third main body;

as seen from the normal direction, the adhesive assembly does not exceed the outline of the fourth main body and the outline of the fifth main body.

10. The coil module as claimed in claim 3, wherein the second coil mechanism further comprises an additional adhesive assembly, which is in contact with the third main body and the fourth main body;

the additional adhesive assembly is in contact with the fifth main body;

wherein the second coil mechanism further comprises a third coil assembly temperature sensor and a fourth coil assembly temperature sensor, and the additional adhesive assembly is in contact with the third coil assembly temperature sensor and the fourth coil assembly temperature sensor.

11. The coil module as claimed in claim 8, wherein the connecting assembly further comprises at least one pin electrically connected to at least one of the third coil assembly lead, the fourth coil assembly lead, and the fifth coil assembly lead;

the extending direction of the pin is different from the extending direction of the third coil assembly lead;

at least two of the third coil assembly lead, the fourth coil assembly lead, and the fifth coil assembly lead are parallel to each other.

12. The coil module as claimed in claim 8, wherein the connecting assembly further comprises a plurality of pins;

at least one of the third coil assembly lead, the fourth coil assembly lead, and the fifth coil assembly lead is disposed between the pins;

wherein the second coil mechanism further comprises a conductive component, which is in contact with the connecting assembly;

the conductive component is in contact with at least one of the pins;

the conductive component is in contact with at least one of the third coil assembly lead, the fourth coil assembly lead, and the fifth coil assembly lead.

13. The coil module as claimed in claim 3, wherein the second coil mechanism further comprises an electronic member having a plate structure, a third coil assembly temperature sensor, and a fourth coil assembly temperature sensor, and the electronic member is electrically connected to at least one of the third coil assembly lead, the fourth coil assembly lead, the fifth coil assembly lead, the third coil assembly temperature sensor, and the fourth coil assembly temperature sensor;
- wherein the second coil mechanism further comprises a thermal-conductive assembly, and as seen from the normal direction, the electronic member overlaps the base, and the electronic member does not overlap the thermal-conductive assembly.

14. The coil module as claimed in claim 3, wherein the second coil mechanism further comprises an electronic member having a plate structure, a third coil assembly temperature sensor, and a fourth coil assembly temperature sensor, and the electronic member is electrically connected to at least one of the third coil assembly lead, the fourth coil assembly lead, the fifth coil assembly lead, the third coil assembly temperature sensor, and the fourth coil assembly temperature sensor;

- as seen from a direction perpendicular to the normal direction, the electronic member overlaps the base.

15. The coil module as claimed in claim 3, wherein the second coil mechanism further comprises an electronic member having a plate structure, a third coil assembly temperature sensor, and a fourth coil assembly temperature sensor, and the electronic member is electrically connected to at least one of the third coil assembly lead, the fourth coil assembly lead, the fifth coil assembly lead, the third coil assembly temperature sensor, and the fourth coil assembly temperature sensor, and comprises:
- a first surface, facing the third coil assembly;
- a second surface, facing away from the third coil assembly;
- a first electrical contact, disposed on the first surface;
- a second electrical contact, disposed on the second surface, wherein the second electrical contact is electrically connected to at least one of the third coil assembly lead, the fourth coil assembly lead, the fifth coil assembly lead, the third coil assembly temperature sensor, and the fourth coil assembly temperature sensor via the first electrical contact;
- a third electrical contact, disposed on the first surface;
- a fourth electrical contact, disposed on the second surface, wherein the fourth electrical contact is electrically connected to at least one of the third coil assembly lead, the fourth coil assembly lead, the fifth coil assembly lead, the third coil assembly temperature sensor, and the fourth coil assembly temperature sensor via the third electrical contact; and
- a reinforcing contact, having metal material and electrically independent from the fourth electrical contact is electrically connected to at least one of the third coil assembly lead, the fourth coil assembly lead, the fifth coil assembly lead, the third coil assembly temperature sensor, and the fourth coil assembly temperature sensor, wherein the reinforcing contact is disposed on the second surface, and as seen from the normal direction, the pattern formed by the connections of the second electrical contact, the fourth electrical contact, and the reinforcing contact surrounds a center of the electronic member.

16. The coil module as claimed in claim 15, wherein the electronic member and the base form an integrated structure, and the integrated structure comprises:
- a bottom plate, comprising a plate structure and having magnetic permeability material;
- a first accommodating portion, formed on the bottom plate and configured to accommodate a first metal member, wherein the first electrical contact and the second electrical contact are respectively formed on opposite sides of the first metal member;
- a second accommodating portion, formed on the bottom plate and configured to accommodate a second metal member, wherein the third electrical contact and the fourth electrical contact are respectively formed on opposite sides of the second metal member;
- a third accommodating portion, formed on the bottom plate and configured to accommodate a third metal member, wherein the reinforcing contact is formed by the third metal member;
- a first insulation layer, covering the bottom plate and having a plurality of openings corresponding to the first metal member and the second metal member, wherein the first insulation layer covers the third metal member, so that the third metal member is not exposed;
- a second insulation layer, covering the bottom plate and having a plurality of openings corresponding to the first metal member, the second metal member and the third metal member, wherein the bottom plate is disposed between the first insulation layer and the second insulation layer; and
- a sixth adhesive component, which is in contact with the first metal member and the bottom plate, and is in contact with the first insulation layer and the second insulation layer.

* * * * *